April 25, 1961 R. K. RICHARDS ET AL 2,981,470
ELECTRONIC MULTIPLIER
Filed June 2, 1955 57 Sheets-Sheet 1

INVENTORS
RICHARD K. RICHARDS
GIFFORD A. MOREY
BY
John F. Hanifin
ATTORNEY

*INVENTORS*
RICHARD K. RICHARDS
GIFFORD A. MOREY
*BY* John F. Hanifin
ATTORNEY

April 25, 1961 R. K. RICHARDS ET AL 2,981,470

ELECTRONIC MULTIPLIER

Filed June 2, 1955 57 Sheets-Sheet 3

INVENTORS
RICHARD K. RICHARDS
GIFFORD A. MOREY

BY John F. Hanifin

ATTORNEY

April 25, 1961 R. K. RICHARDS ET AL 2,981,470

ELECTRONIC MULTIPLIER

Filed June 2, 1955 57 Sheets-Sheet 4

INVENTORS
RICHARD K. RICHARDS
GIFFORD A. MOREY

BY John F. Hanifin
ATTORNEY

April 25, 1961 R. K. RICHARDS ET AL 2,981,470

ELECTRONIC MULTIPLIER

Filed June 2, 1955 57 Sheets-Sheet 5

INVENTORS
RICHARD K. RICHARDS
GIFFORD A. MOREY

BY John F. Hanifin

ATTORNEY

April 25, 1961 R. K. RICHARDS ET AL 2,981,470

ELECTRONIC MULTIPLIER

Filed June 2, 1955 57 Sheets-Sheet 6

INVENTORS
RICHARD K. RICHARDS
GIFFORD A. MOREY
BY John F. Hanifin
ATTORNEY

April 25, 1961 R. K. RICHARDS ET AL 2,981,470

ELECTRONIC MULTIPLIER

Filed June 2, 1955

57 Sheets-Sheet 7

April 25, 1961

R. K. RICHARDS ET AL 2,981,470

ELECTRONIC MULTIPLIER

Filed June 2, 1955

57 Sheets-Sheet 8

INVENTORS
RICHARD K. RICHARDS
GIFFORD A. MOREY
BY John F. Hanifin
ATTORNEY

April 25, 1961 R. K. RICHARDS ET AL 2,981,470

ELECTRONIC MULTIPLIER

Filed June 2, 1955 57 Sheets-Sheet 12

INVENTORS
RICHARD K. RICHARDS
GIFFORD A. MOREY

BY John F. Hanifin

ATTORNEY

INVENTORS
RICHARD K. RICHARDS
GIFFORD A. MOREY
BY John F. Hanifin
ATTORNEY

April 25, 1961 R. K. RICHARDS ET AL 2,981,470

ELECTRONIC MULTIPLIER

Filed June 2, 1955 57 Sheets-Sheet 14

INVENTORS
RICHARD K. RICHARDS
GIFFORD A. MOREY
BY John F. Hanifin
ATTORNEY

INVENTORS
RICHARD K. RICHARDS
GIFFORD A. MOREY
BY John F. Hanifin
ATTORNEY

INVENTORS
RICHARD K. RICHARDS
GIFFORD A. MOREY
BY John F. Hanifin
ATTORNEY

INVENTORS
RICHARD K. RICHARDS
GIFFORD A. MOREY
BY
John F. Hanifin
ATTORNEY

April 25, 1961 R. K. RICHARDS ET AL 2,981,470

ELECTRONIC MULTIPLIER

Filed June 2, 1955 57 Sheets-Sheet 18

INVENTORS
RICHARD K. RICHARDS
GIFFORD A. MOREY

BY John F. Hanifin

ATTORNEY

INVENTORS
RICHARD K. RICHARDS
GIFFORD A. MOREY
BY John F. Hanifin
ATTORNEY

INVENTORS
RICHARD K. RICHARDS
GIFFORD A. MOREY
BY John F. Hanifin
ATTORNEY

April 25, 1961 R. K. RICHARDS ET AL 2,981,470

ELECTRONIC MULTIPLIER

Filed June 2, 1955 57 Sheets-Sheet 21

INVENTORS
RICHARD K. RICHARDS
GIFFORD A. MOREY
BY John F. Hanifin
ATTORNEY

INVENTORS
RICHARD K. RICHARDS
GIFFORD A. MOREY
BY John F. Hanifin
ATTORNEY

*INVENTORS*
RICHARD K. RICHARDS
GIFFORD A. MOREY
*BY*
John F. Hanifin
ATTORNEY

April 25, 1961 R. K. RICHARDS ET AL 2,981,470

ELECTRONIC MULTIPLIER

Filed June 2, 1955 57 Sheets-Sheet 28

INVENTORS
RICHARD K. RICHARDS
GIFFORD A. MOREY

BY John F. Hanifin

ATTORNEY

INVENTORS
RICHARD K. RICHARDS
GIFFORD A. MOREY

BY John F. Hanifin

ATTORNEY

INVENTORS
RICHARD K. RICHARDS
GIFFORD A. MOREY
BY John F. Hanifin
ATTORNEY

INVENTORS
RICHARD K. RICHARDS
GIFFORD A. MOREY
BY John F. Hanifin
ATTORNEY

INVENTORS
RICHARD K. RICHARDS
GIFFORD A. MOREY
BY John F. Hanifin
ATTORNEY

INVENTORS
RICHARD K. RICHARDS
GIFFORD A. MOREY
BY John F. Hanifin
ATTORNEY

INVENTORS
RICHARD K. RICHARDS
GIFFORD A. MOREY
BY John F. Hanifin
ATTORNEY

INVENTORS
RICHARD K. RICHARDS
GIFFORD A MOREY
BY
John F. Hanifin
ATTORNEY

April 25, 1961 R. K. RICHARDS ET AL 2,981,470

ELECTRONIC MULTIPLIER

Filed June 2, 1955 57 Sheets-Sheet 36

*INVENTORS*
RICHARD K. RICHARDS
GIFFORD A. MOREY

BY *John F. Hanifin*

ATTORNEY

April 25, 1961 R. K. RICHARDS ET AL 2,981,470

ELECTRONIC MULTIPLIER

Filed June 2, 1955 57 Sheets-Sheet 37

INVENTORS
RICHARD K. RICHARDS
GIFFORD A. MOREY

BY John F. Hanifin

ATTORNEY

INVENTORS
RICHARD K. RICHARDS
GIFFORD A. MOREY
BY John F. Hanifin
ATTORNEY

INVENTORS
RICHARD K. RICHARDS
GIFFORD A. MOREY
BY John F. Hanifin
ATTORNEY

INVENTORS
RICHARD K. RICHARDS
GIFFORD A. MOREY
BY
John F. Hanifin
ATTORNEY

INVENTORS
RICHARD K. RICHARDS
GIFFORD A. MOREY

BY John F. Hanifin

ATTORNEY

April 25, 1961 R. K. RICHARDS ET AL 2,981,470

ELECTRONIC MULTIPLIER

Filed June 2, 1955 57 Sheets-Sheet 42

INVENTORS
RICHARD K. RICHARDS
GIFFORD A. MOREY

BY John F. Hanifin

ATTORNEY

INVENTORS
RICHARD K. RICHARDS
GIFFORD A. MOREY
BY John F. Hanifin
ATTORNEY

April 25, 1961 R. K. RICHARDS ET AL 2,981,470

ELECTRONIC MULTIPLIER

Filed June 2, 1955 57 Sheets-Sheet 44

INVENTORS.
RICHARD K. RICHARDS
GIFFORD A. MOREY

BY John F. Hanifin

ATTORNEY

FIG. 5a

| | | | | | |
|---|---|---|---|---|---|
| | CHAR C BA 8421<br>¢ 0 11 0000 | CHAR C BA 8421<br>– 1 10 0000 | CHAR C BA 8421<br>BLANK 1 01 0000 | ACC MARK<br>0 0 00 0000<br>CH C BA 8421 | |
| | A 1 11 0001 | J 0 10 0001 | / 0 01 0001 | 1 1 00 0001 | |
| ALPHABETIC | B 1 11 0010 | K 0 10 0010 | S 0 01 0010 | 2 1 00 0000 | NUMERIC |
| ALPHABETIC | C 0 11 0011 | L 1 10 0011 | T 1 01 0011 | 3 0 00 0011 | NUMERIC |
| ALPHABETIC | D 1 11 0100 | M 0 10 0100 | U 0 01 0100 | 4 1 00 0100 | NUMERIC |
| ALPHABETIC | E 0 11 0101 | N 1 10 0101 | V 1 01 0101 | 5 0 00 0101 | NUMERIC |
| ALPHABETIC | F 0 11 0110 | O 1 10 0110 | W 1 01 0110 | 6 0 00 0110 | NUMERIC |
| ALPHABETIC | G 1 11 0111 | P 0 10 0111 | X 0 01 0111 | 7 1 00 0111 | NUMERIC |
| ALPHABETIC | H 1 11 1000 | Q 0 10 1000 | Y 0 01 1000 | 8 1 00 1000 | NUMERIC |
| ALPHABETIC | I 0 11 1001 | R 1 10 1001 | Z 1 01 1001 | 9 0 00 1001 | NUMERIC |
| | PLUS ZERO<br>0 0 11 1010 | MINUS ZERO<br>0 1 10 1010 | RECORD MARK<br>1 01 1010 | NUMERICAL ZERO<br>0 0 00 1010 | |
| SPEC CHAR | . 1 11 1011 | $ 0 10 1011 | , 0 01 1011 | # 1 00 1011 | |
| SPEC CHAR | ¤ 0 11 1100 | * 1 10 1100 | % 1 01 1100 | @ 0 00 1100 | |

INVENTORS
RICHARD K. RICHARDS
GIFFORD A. MOREY
BY John F. Hanifin
ATTORNEY

April 25, 1961 R. K. RICHARDS ET AL 2,981,470

ELECTRONIC MULTIPLIER

Filed June 2, 1955 57 Sheets-Sheet 48

INVENTORS
RICHARD K. RICHARDS
GIFFORD A. MOREY

BY John F. Hanifin

ATTORNEY

INVENTORS
RICHARD K. RICHARDS
GIFFORD A. MOREY
BY John F. Hanifin
ATTORNEY

April 25, 1961 R. K. RICHARDS ET AL 2,981,470

ELECTRONIC MULTIPLIER

Filed June 2, 1955

57 Sheets-Sheet 51

INVENTORS
RICHARD K. RICHARDS
GIFFORD A. MOREY
BY John F. Hanifin
ATTORNEY

April 25, 1961 R. K. RICHARDS ET AL 2,981,470

ELECTRONIC MULTIPLIER

Filed June 2, 1955 57 Sheets-Sheet 53

INVENTORS
RICHARD K. RICHARDS
GIFFORD A. MOREY

BY John F. Hanifin
ATTORNEY

INVENTORS
RICHARD K. RICHARDS
GIFFORD A. MOREY
BY John F. Hanifin
ATTORNEY

MULTIPLY FLOW DIAGRAM

INVENTORS
RICHARD K. RICHARDS
GIFFORD A. MOREY
BY John F. Hanifin
ATTORNEY

April 25, 1961 R. K. RICHARDS ET AL 2,981,470

ELECTRONIC MULTIPLIER

Filed June 2, 1955 57 Sheets-Sheet 57

▽ SPC MAR ↓ AAC MAC ⊕ ACC MARK

| | | ACCUMULATOR | | | | | | | | | | | | | MEMORY | | | | |
|---|---|---|---|---|---|---|---|---|---|---|---|---|---|---|---|---|---|---|---|
| | | PRODUCT | | | | | | | | MULTIPLIER | | | | | MULTIPLICAND | | | | |
| MPL REG | STEP | n+263 | n+262 | n+261 | n+260 | n+259 | n+258 | n+257 | n+256 | n+4 | n+3 | n+2 | n+1 | n | m-3 | m-2 | m-1 | m | AUX TGR |
| | INST | x | x | x | x | x | x | x | x | x | ⊕ | 4 | 0 | ↓▽ 5 | $x^+$ | 6 | 9 | ↓▽ $2^+$ | OFF |
| 5 | ECC 1 | | | | | | | | ↓ | | | | | $5^+$ | | | | | |
| | 2 | | | | | | | ↓ | 0 | | | | ▽ | | | | ↓ | $2^+$ | |
| | 3 | | | | | | ↓ | 6 | | | | | | | | ↓ | 9 | | |
| | 3 | | | | | ↓ | 4 | | | | | | | | ↓ | 6 | | | |
| | 3 | | | | ↓ | 3 | | | | | | | | | $x^+$ | | | ↓▽ | |
| | 4 | | | | ⊕ | | | | | | | | ↓▽ | | | | | | ON |
| 0 | 1 | | | | | | | ↓ | | | | ▽ | 0 | | | | | | |
| | 2 | | | | | | ↓ | 6 | | | | | | | | | ↓ | $2^+$ | |
| | 3 | | | | | ↓ | 4 | | | | | | | | | ↓ | 9 | | |
| | 3 | | | | ↓ | 3 | | | | | | | | | ↓ | 6 | | | |
| | 3 | | | ↓ | 0 | | | | | | | | | | $x^+$ | | | | |
| | 4 | | | ⊕ | | | | | | | | ↓▽ | | | | | | | |
| 4 | 1 | | | | | | ↓ | | | | | 4 | | | | | | | |
| | 2 | | | | | ↓ | 2 | | | | ▽ | | | | | | ↓ | $2^+$ | |
| | 3 | | | | ↓ | 0 | | | | | | | | | | ↓ | 9 | | |
| | 3 | | | ↓ | 8 | | | | | | | | | | ↓ | 6 | | | |
| | 3 | | ↓ | 2 | | | | | | | | | | | $x^+$ | | | ↓▽ | |
| | 4 | | ⊕ | | | | | | | | ↓▽ | | | | | | | | |
| | 1 | | | | | | | | | | ⊕ | ↓▽ | | | | | | | |
| | 5 | | | | | | | | | | | 4 | ↓▽ | | | | | | |
| | 5 | | | | | | | | | | | | 0 | ↓▽ | | | | | |
| | 5 | | | | | | | | ▽ | | | | | 5 | | | | ↓▽ | |
| | ANS | x | ⊕ | 2 | 8 | 0 | 2 | 6 | 0 | x | ⊕ | 4 | 0 | 5 | $x^+$ | 6 | 9 | $2^+$ | |

FIG. 7b

United States Patent Office 2,981,470

Patented Apr. 25, 1961

2,981,470

ELECTRONIC MULTIPLIER

Richard K. Richards, Poughkeepsie, and Gifford A. Morey, Wappingers Falls, N.Y., assignors to International Business Machines Corporation, New York, N.Y., a corporation of New York Filed June 2, 1955, Ser. No. 512,636

14 Claims. (Cl. 235—159)

Figures 1A, 1G:
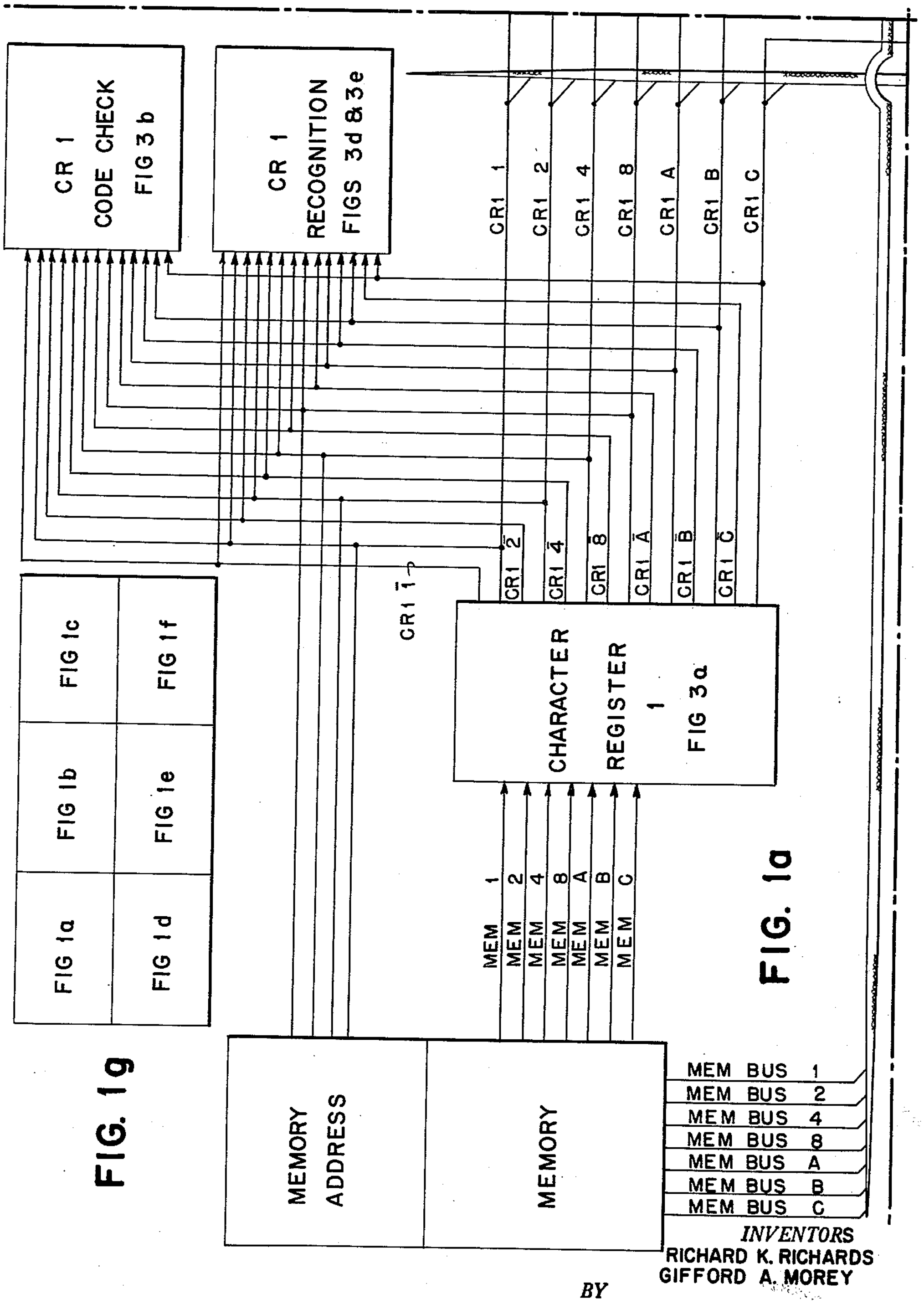
Figure 1B:
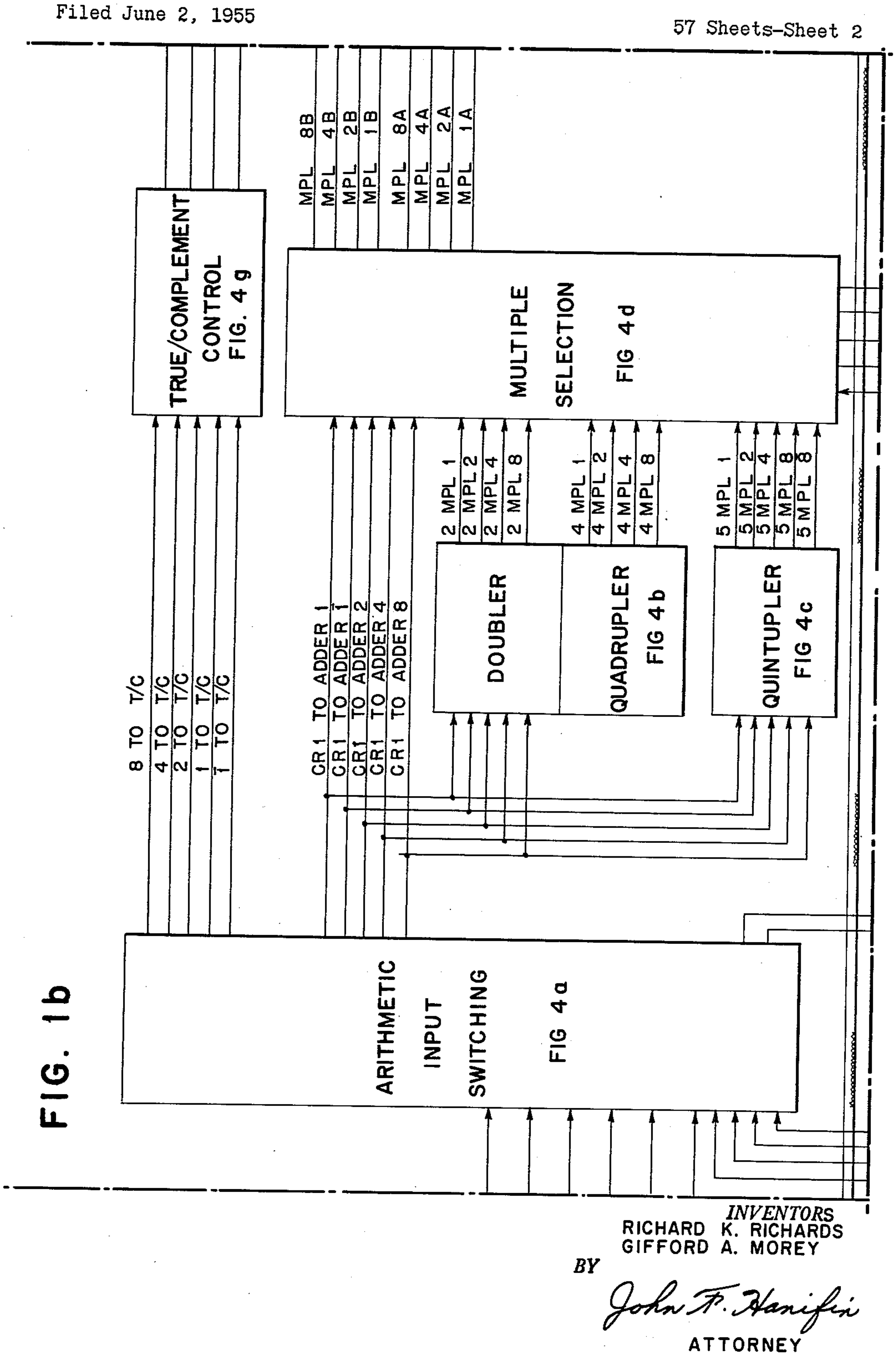
Figure 1C:
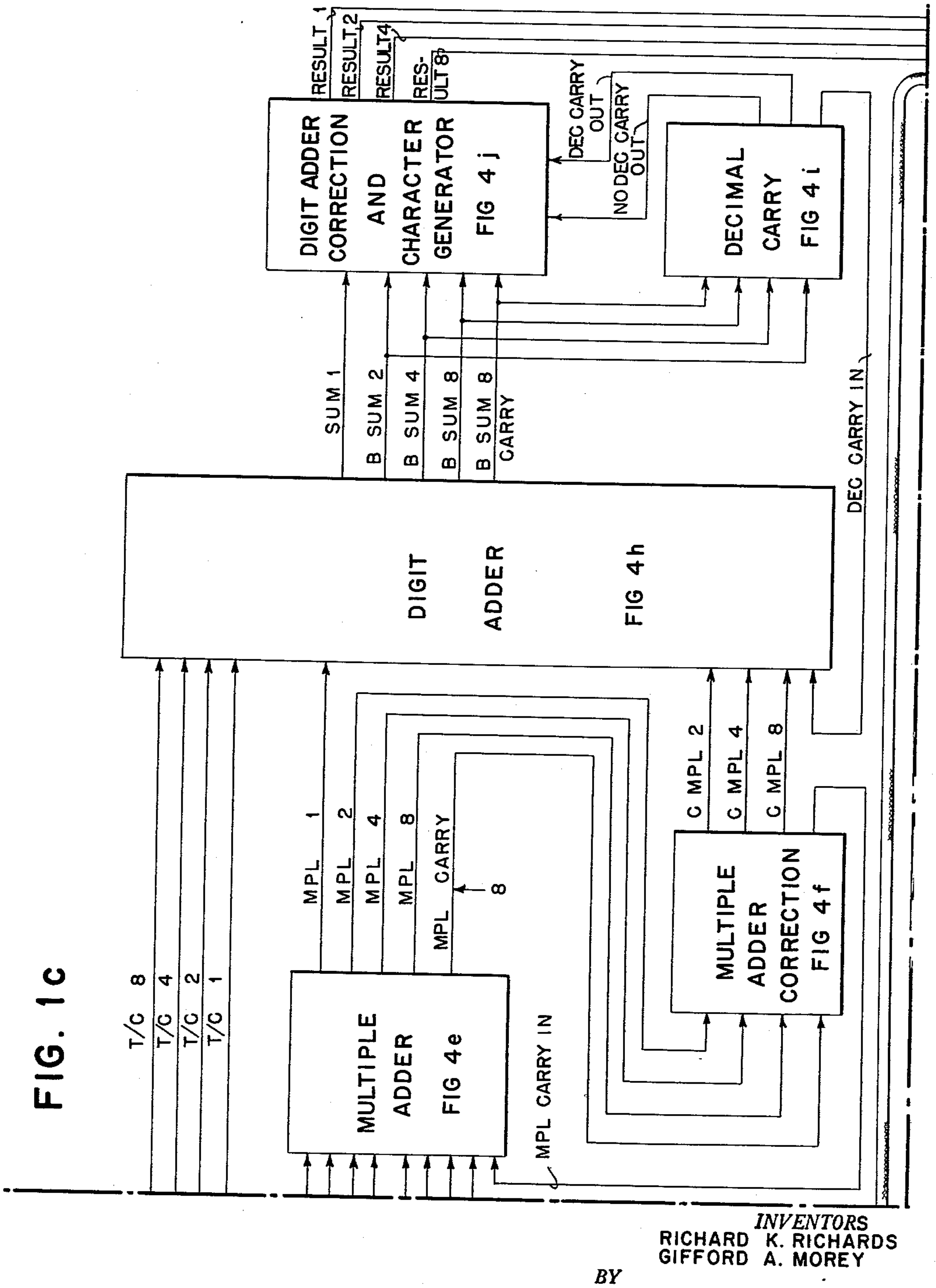
Figure 1D:
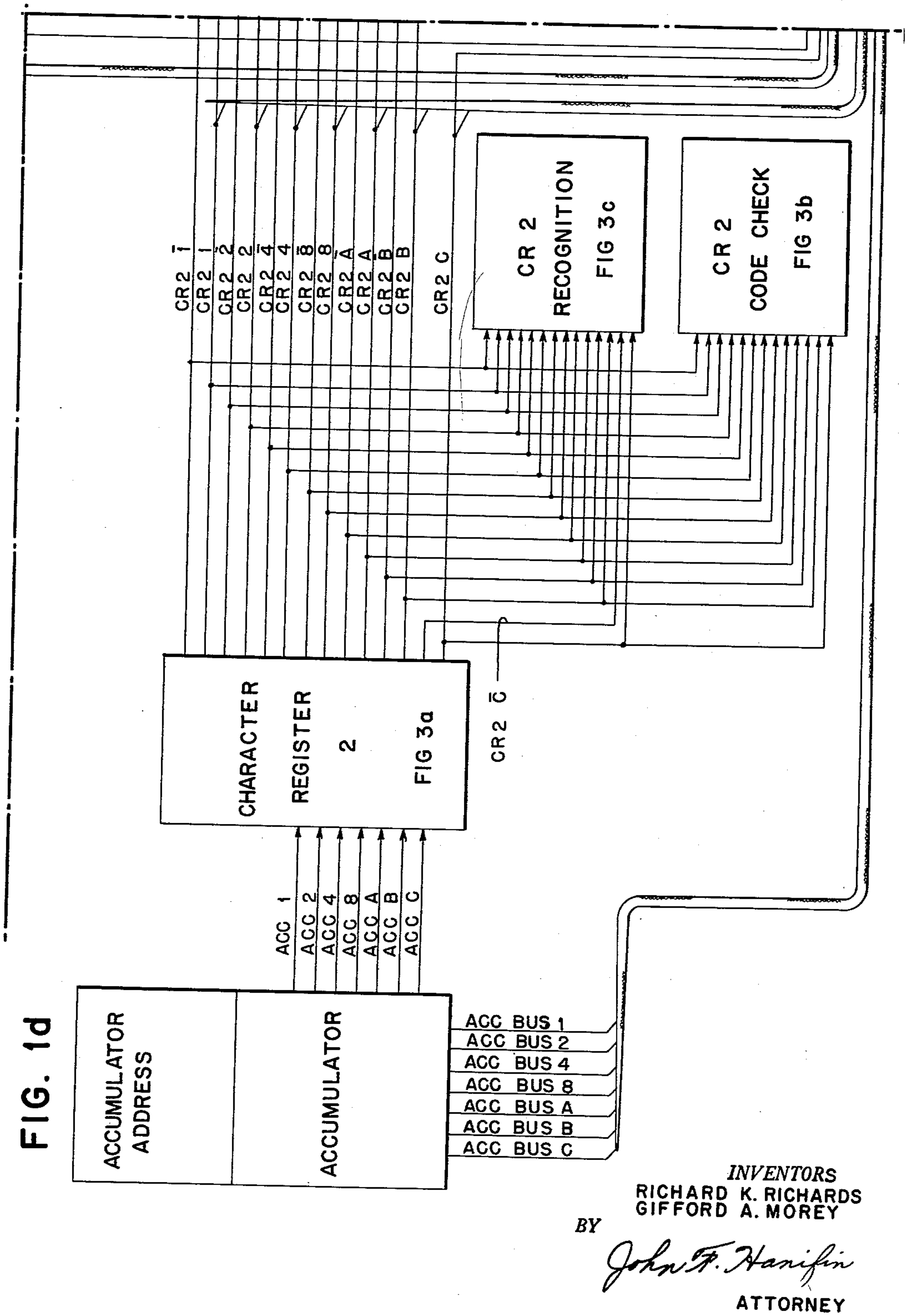
Figure 1E:
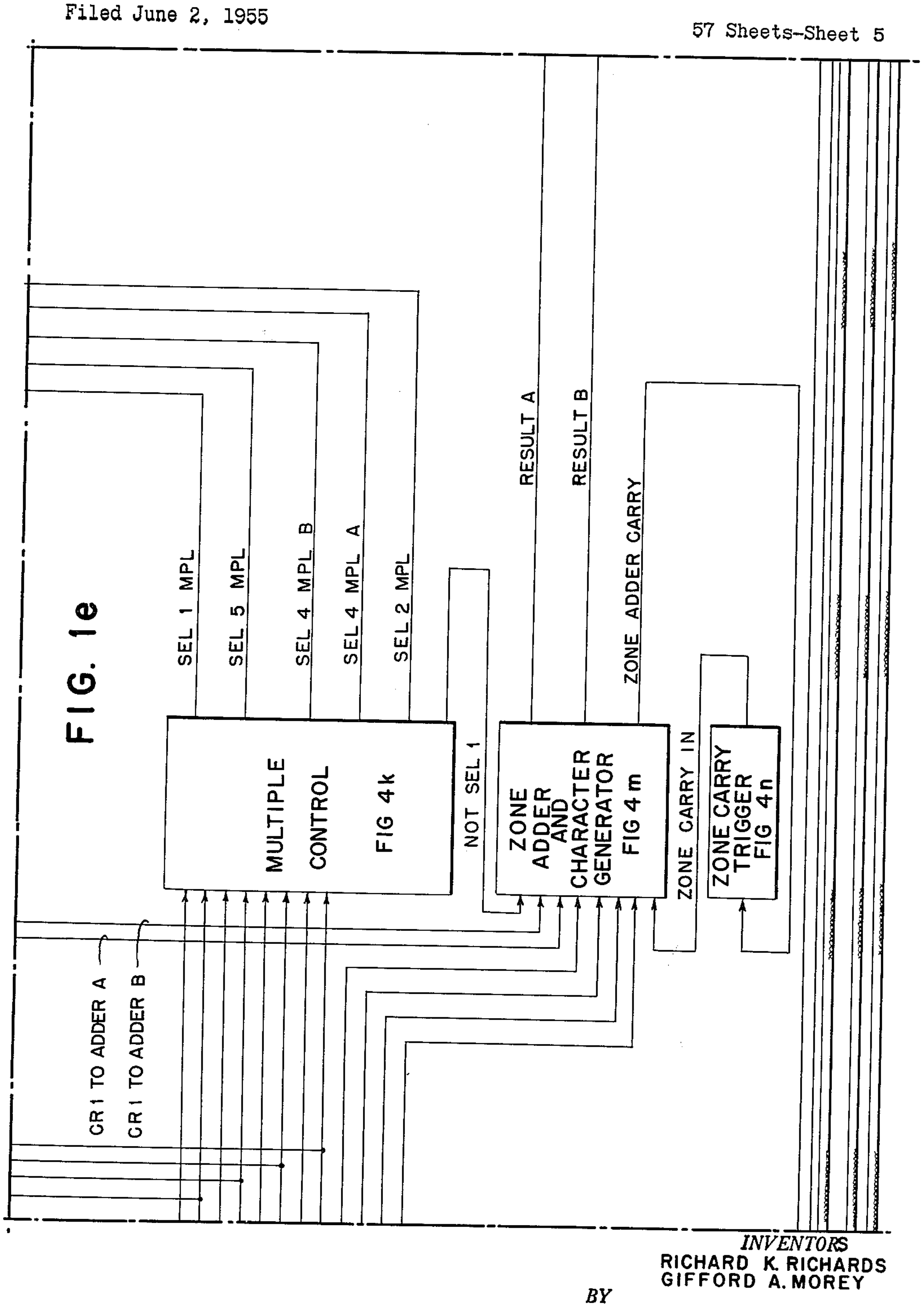
Figure 1F:
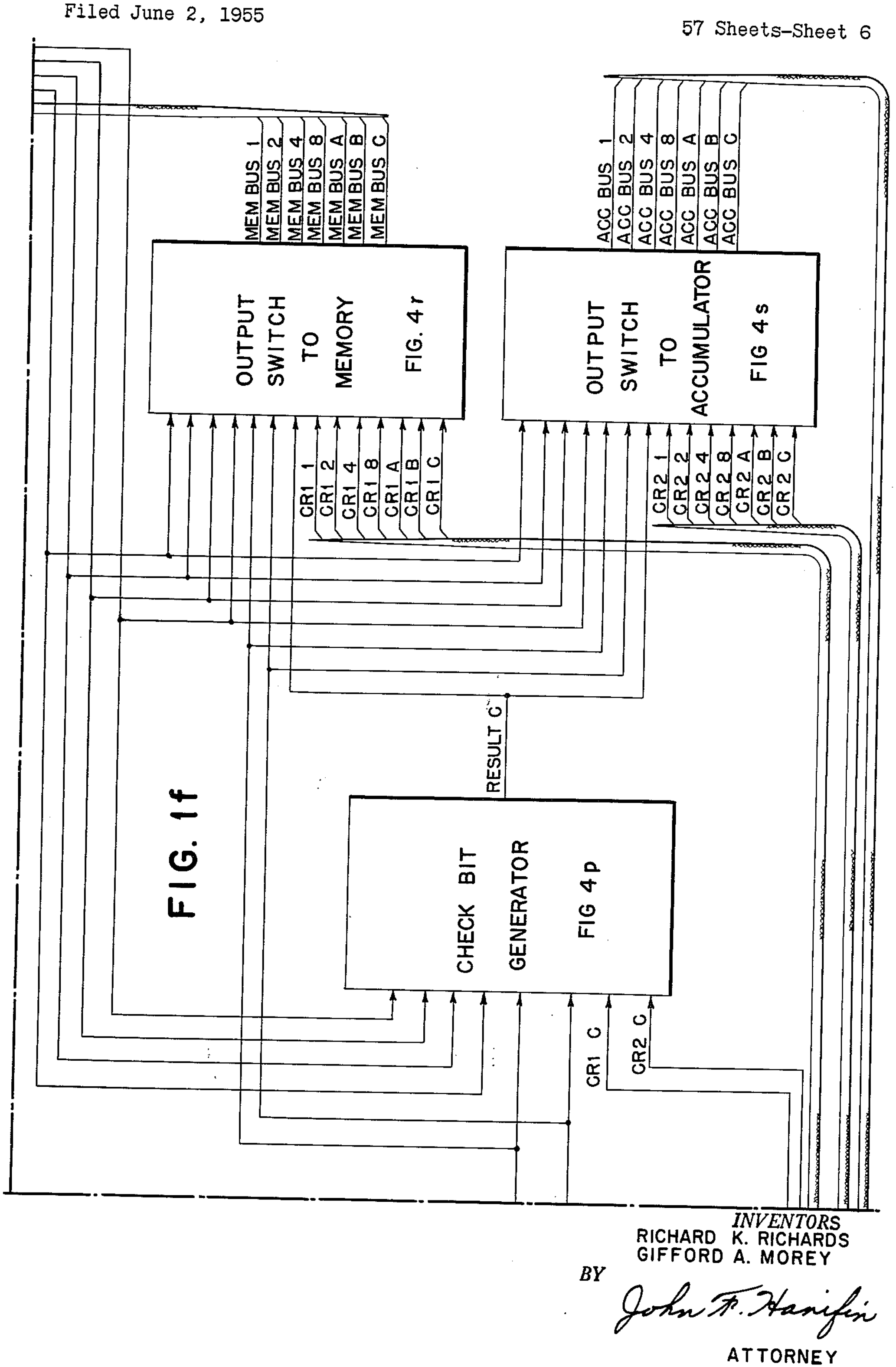

This invention relates to electronic circuits and more particularly to high speed electronic multiplying circuits.

In the apparatus of the invention, information is comprised of coded characters consisting of alphabetic, numeric and special characters. (See Code Chart, Fig. 5*a*.) Numeric characters are basically represented in the well known binary coded decimal notation wherein the respective bits have binary weighted values of 1, 2, 4 and 8. A and B zoning bits are provided to expand the code to include the alphabetic and special characters. A seventh bit, a C bit, is a check bit provided so that each character is represented by an even number of binary 1's. Information is processed in a parallel by bit and serial by character fashion.

In prior art devices it has been the practice to perform over and over addition of the multiplicand, or to add multiples of the multiplicand, to form a product. However, such devices employ words of fixed length and, consequently, have limited flexibility and efficiency when handling lengthy records. In the apparatus of this invention words of variable length are employed and handled, and extremely great efficiency and flexibility are provided and achieved by tailoring the process to the particular amounts to be processed.

A principal object of this invention is to provide an improved electronic multiplier which tailors the multiply operation to the particular values being multiplied.

Another object of the invention is to provide an electronic multiplier wherein a product is developed by multiplying each digit of the multiplicand on a serial digit by digit basis by a digit of the multiplier to form a partial product, thereafter repeat multiplication of each digit of the multiplicand on a serial digit by digit basis but by a succeeding digit of the multiplier, and at the same time adding, with proper column shift; the result of the latter multiplication to the previously formed partial product.

Another object of the invention is to provide an electronic multiplier for multiplying a multiplicand having one or more digital orders by a multiplier having one or more digital orders.

Another object is to provide an electronic multiplier wherein signals representing a multiplier digit are applied to permit transfer, digit by digit, of multiples of the multiplicand corresponding in value to that digit of the multiplier.

Another object is to provide an electronic multiplier having character recognition means sensing the end of a multiplier and the end of a multiplicand.

A further object is to provide an electronic multiplier having addressable storage means with sections for storing representations of a multiplicand, a multiplier and a product.

Another object is to provide circuit means, for providing a plurality of multiples simultaneously with reception of a fundamental digit, in combination with circuits for storing carry values for addition to succeeding higher order multiples.

Another object is to provide an electronic multiplier wherein digits are represented in a binary coded decimal notation by elements of storage having weighted values of 1, 2, 4 and 8 and wherein single, double, quadruple and quintuple multiples of digits are generated.

Other objects of the invention will be pointed out in the following description and claims and illustrated in the accompanying drawings, which disclose by way of example, the principle of the invention and the best mode which has been contemplated of applying that principle.

The apparatus of the invention, as described herein, employs electrostatic storage as a main storage called Memory and also as an auxiliary storage called Accumulator storage but it will be obvious to those skilled in the art that any type of high speed storage would be practical. The storage elements are comprised of cathode ray tubes with the Accumulator divided into two sections, one section being designated as Accumulator A and a second section being designated Accumulator B.

Characters, each of seven bits, and each in an addressable position, are combined to form words or fields whose address in Memory or Accumulator is designated by addressing the least significant character of the particular word or field. The end of a field in the Accumulator is noted by storing an Accumulator Mark Character adjacent the most significant character of the field. In Memory the sign of a field is indicated by special zoning in the A and B bit positions of the least significant digit. This special coding of a character in one field also serves to demarcate the length of an adjacent field or word stored at a preceding address.

The electronic data processing system provided herein is controlled by a stored program in which the Instructions for controlling the respective steps for any one program are stored in the Memory and in which the data, to be handled in accordance with these Instructions, is also stored. Instructions are read out of Memory, decoded by an Interpreter and employed to control circuits which thus carry out the execution of the Instruction originally stored in Memory. Instructions are always of constant length i.e., five characters each. The use of the stored Instructions, which are read out of Memory to be decoded by an Interpreter and to control Routing circuits, are of the type shown and described in the U.S. Patent application of N. Rochester et al., Serial Number 417,701, filed March 22, 1954, for an Electronic Data Process Machine.

The Accumulator in conjunction with Arithmetic circuits, comprise a computer, in wh'ch by proper control of the bits comprising the respective digits, multi-digit numbers are added, subtracted, multiplied etc. Further, as will be apparent to those skilled in the art, the system may be util'zed for general data processing and also operate upon mixed non-numeric and numeric data. Since a binary coded decimal notation is employed, the original result from the addition of two characters must be corrected. The original uncorrected result is corrected by emitted data in accordance with the condition of the uncorrected sum.

In accordance with the objects of the invention novel means are provided to produce multiplication in the processing system. Circuits are provided to produce single, double, quadruple and quintuple multiples of a multipl'cand one digit at a time as it is read from Memory in a serial by character, parallel by bit, basis. Proper multiples are combined under control of a multiplier digit and the combined multiples are added to any previously generated partial product with provision for proper column sh'ft. The entire multiplicand field is processed once, for each multiplier digit, on a serial, character by character basis, to provide a final product, all being accomplished in a completely novel manner, as described in detail below.

In the drawings:

Figs. 1*a* through 1*f*, arranged as shown in Fig. 1*g*, show an overall block diagram of the data processing system.

Figs. 1*a* through 1*f*, arranged as shown in Fig. 1*g*, block symbol of an inverter.

Figures 1H, 1I, 1J, 1K:
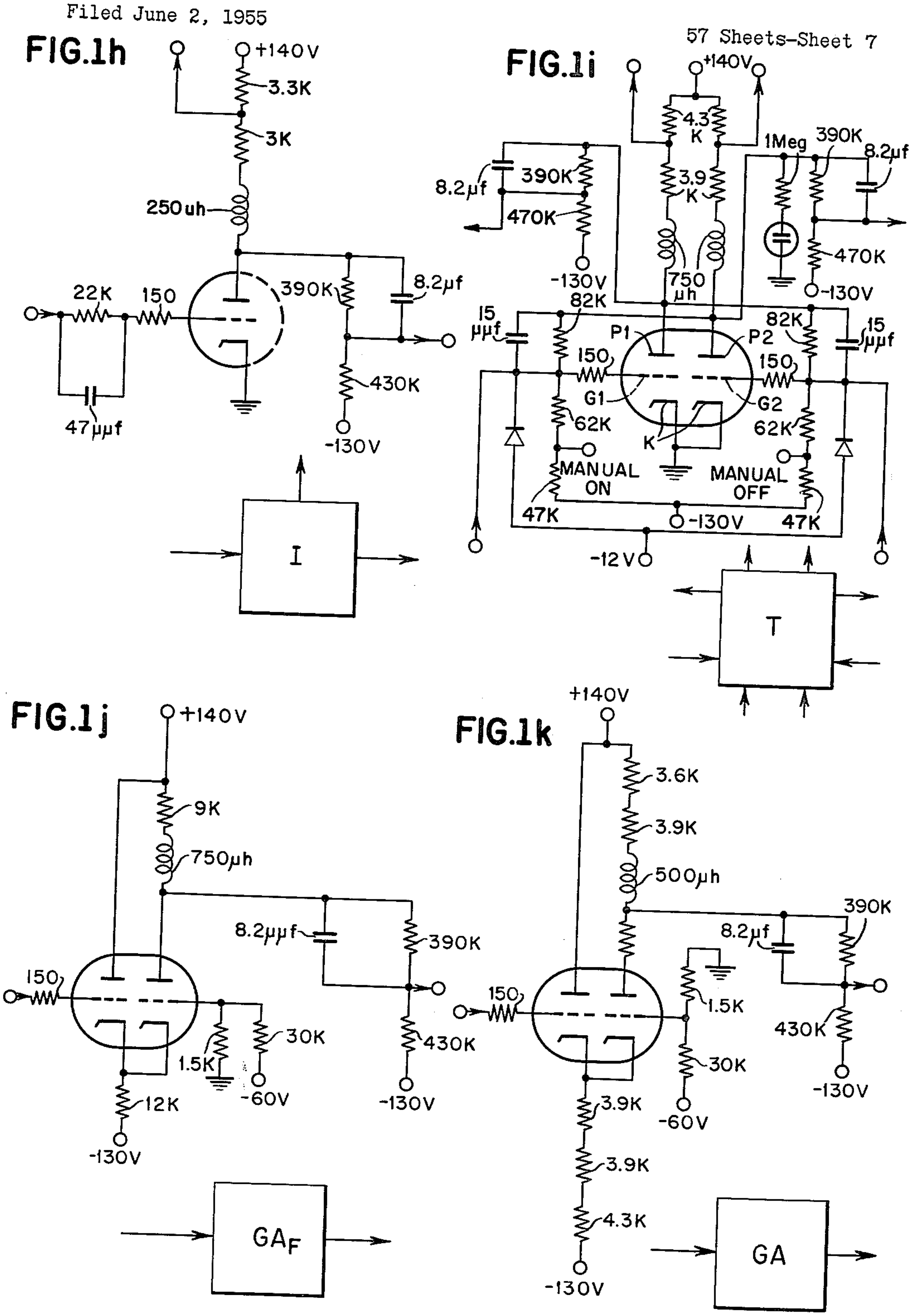

Fig. 1*i* shows a detailed diagram and corresponding block symbol of a trigger.

Figure 1M:
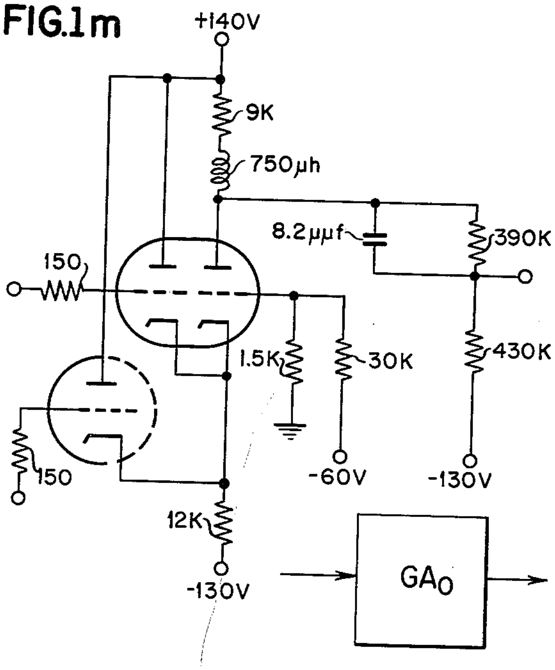

Figs. 1*j*, 1*k* and 1*m* show detail diagrams and corresponding block symbols of grounded grid amplifiers.

Figure 1P:
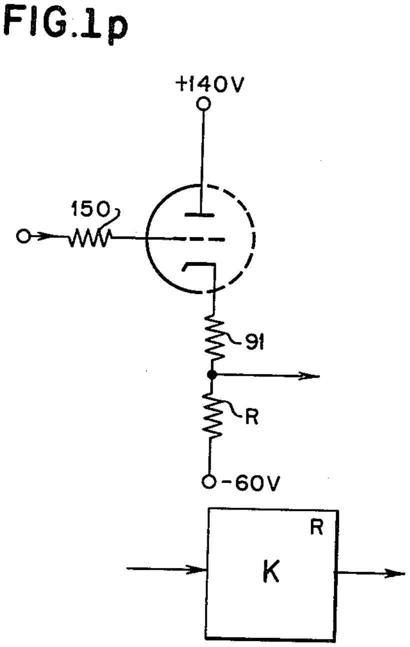
Figure 1Q:
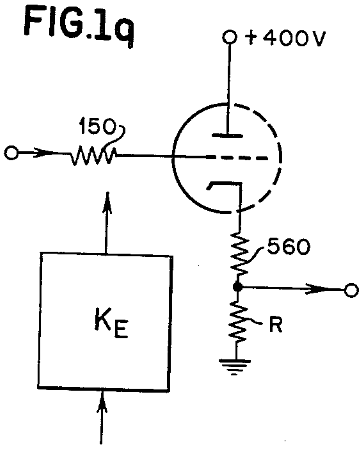
Figure 1R:
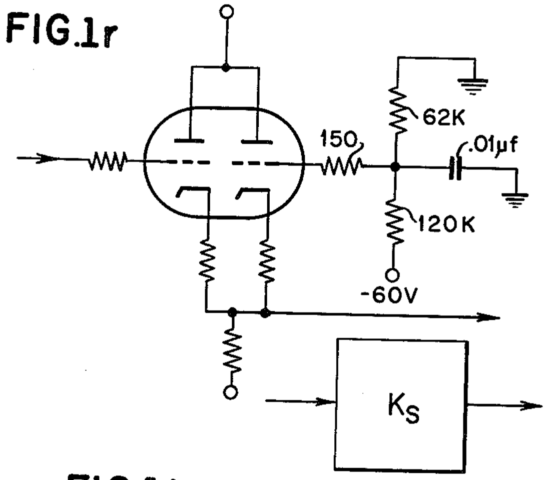
Figures 1S, 1T:
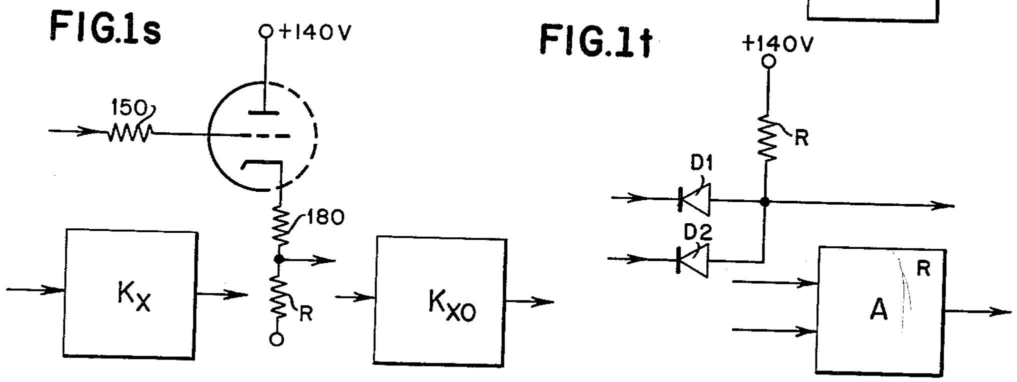
Figure 1N:
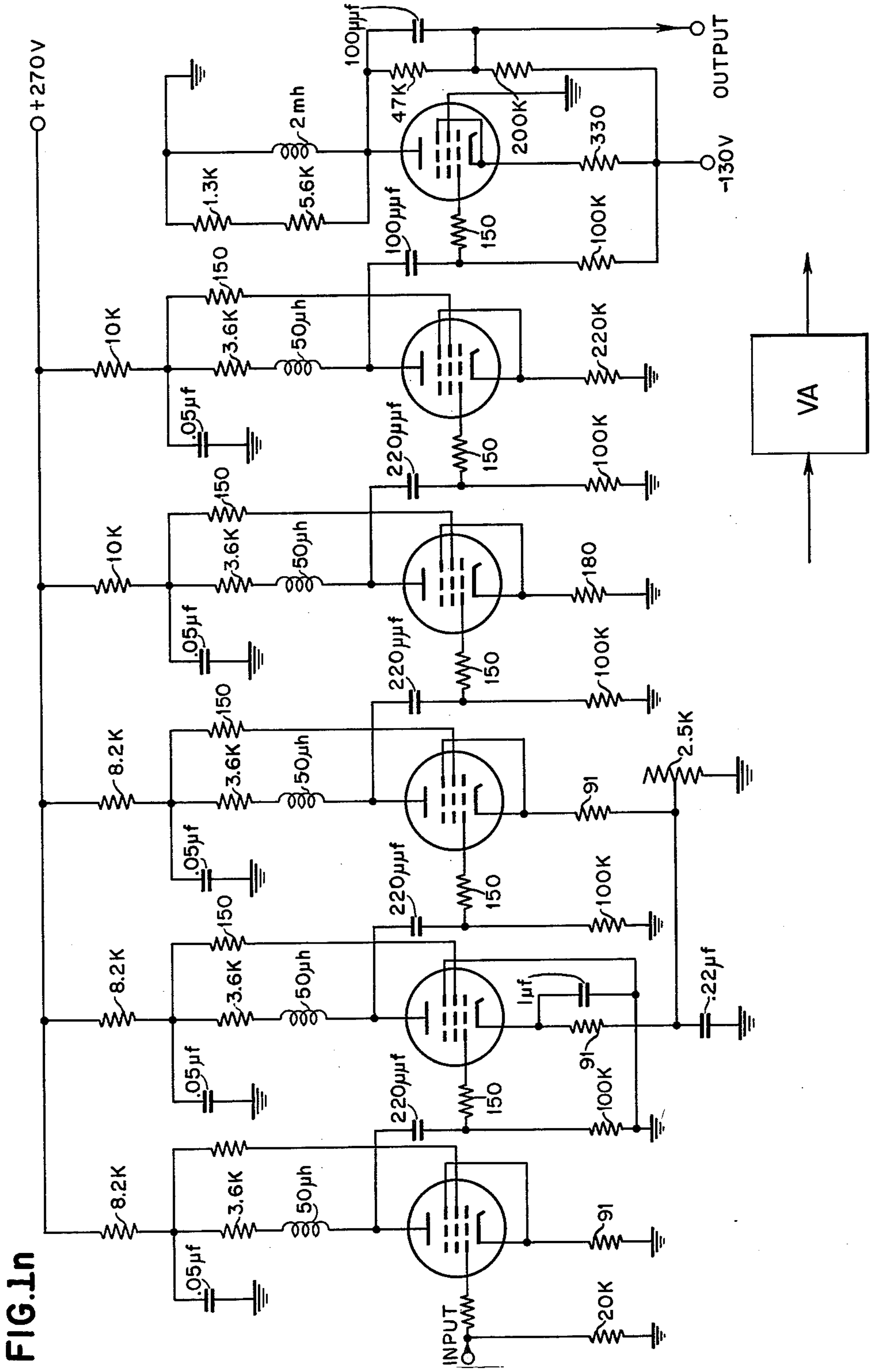

Fig. 1*n* shows a detail diagram and corresponding block symbol of a video amplifier.

Figs. 1*p*, 1*q*, 1*r* and 1*s* show detailed diagrams and corresponding block symbols of cathode followers.

Figures 1A, 1U, 1V, 1W, 1X, 1Y, 1Z:
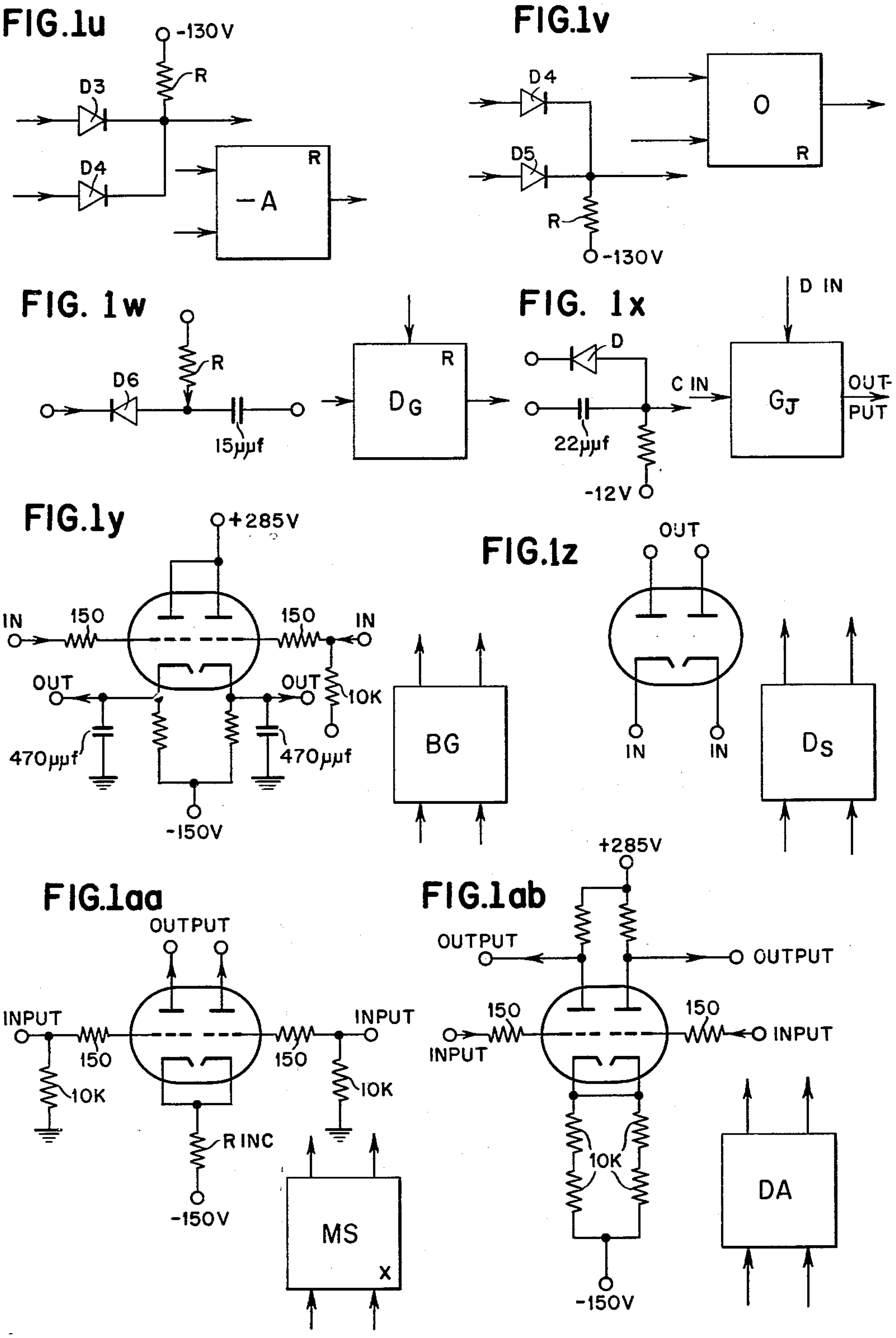

Figs. 1*t* and 1*u* show detailed diagrams and corresponding block symbols of AND circuits.

Fig. 1*v* shows a detailed diagram and corresponding block symbol of an OR circuit.

Figs. 1*w* and 1*x* show detailed diagrams and corresponding block symbols of diode gate circuits.

Fig. 1*y* shows a detailed diagram and corresponding block symbol for a bit sweep generator.

Figs. 1*z* and 1*aa* show detailed diagrams and corresponding block symbols for switch circuits.

Fig. 1*ab* shows a detailed diagram and corresponding block symbol for a differential amplifier.

Figures 2, 2B:
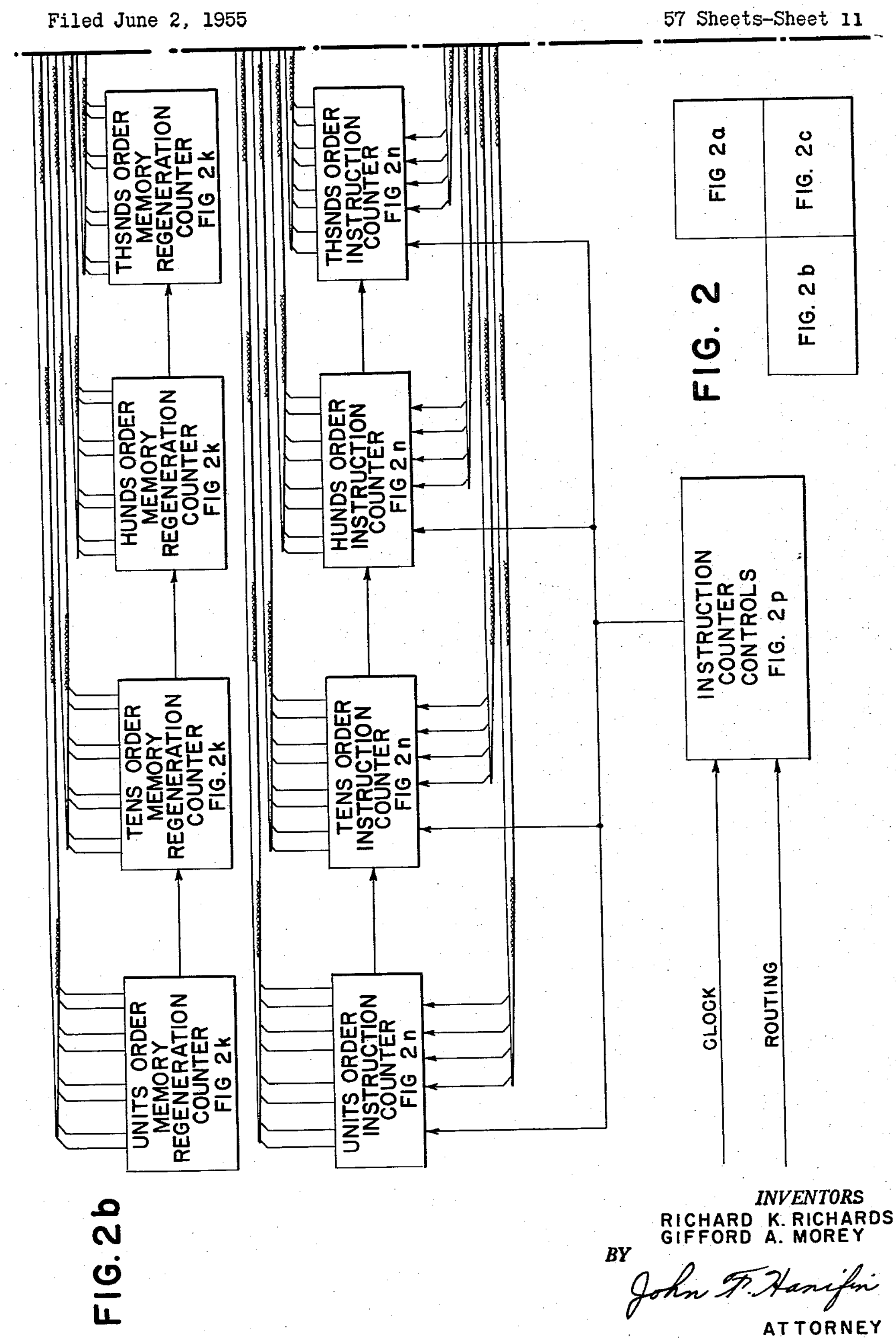

Fig. 2 is a diagram showing how various figures taken together, are to be arranged.

Figure 2A:
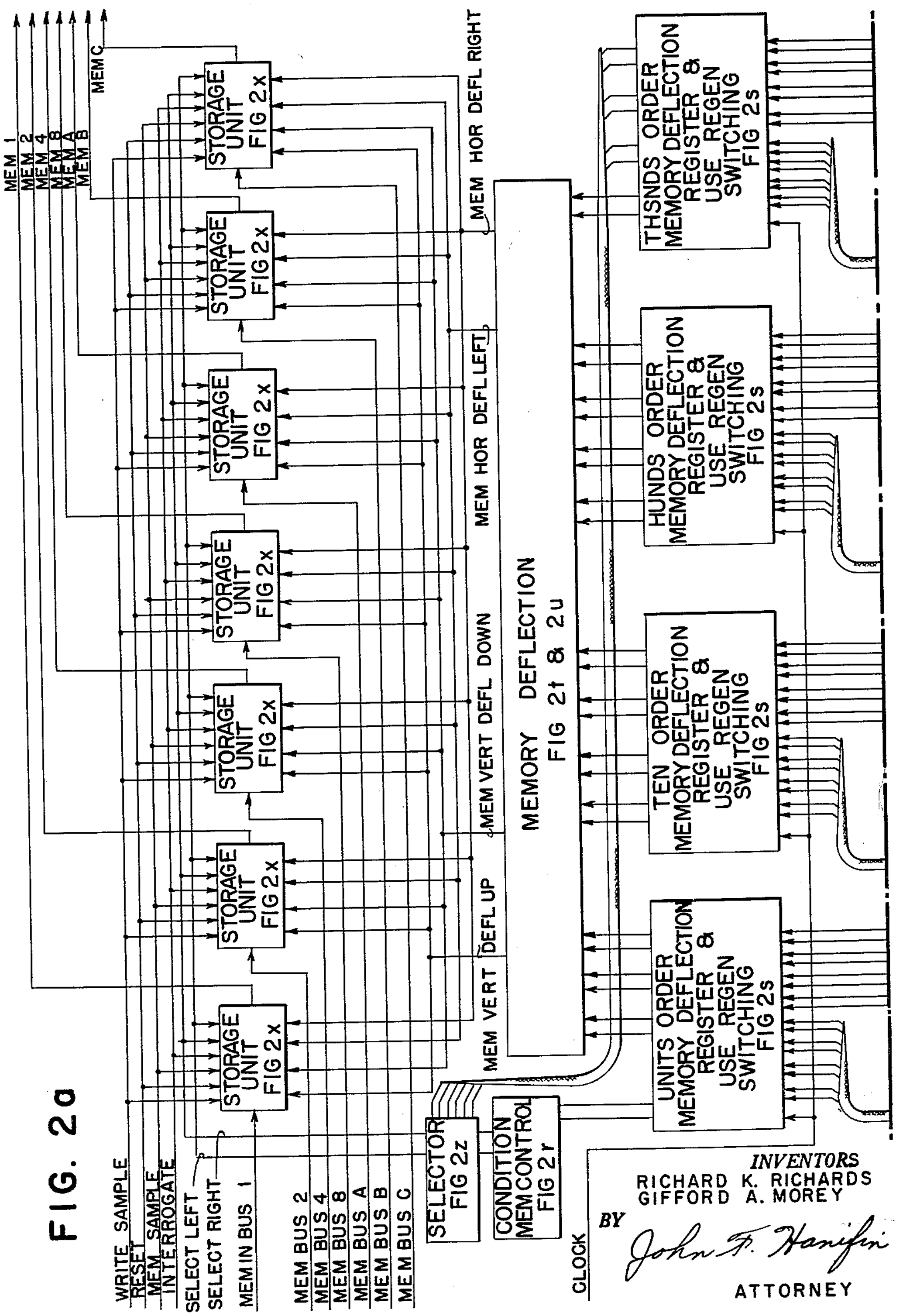
Figure 2C:
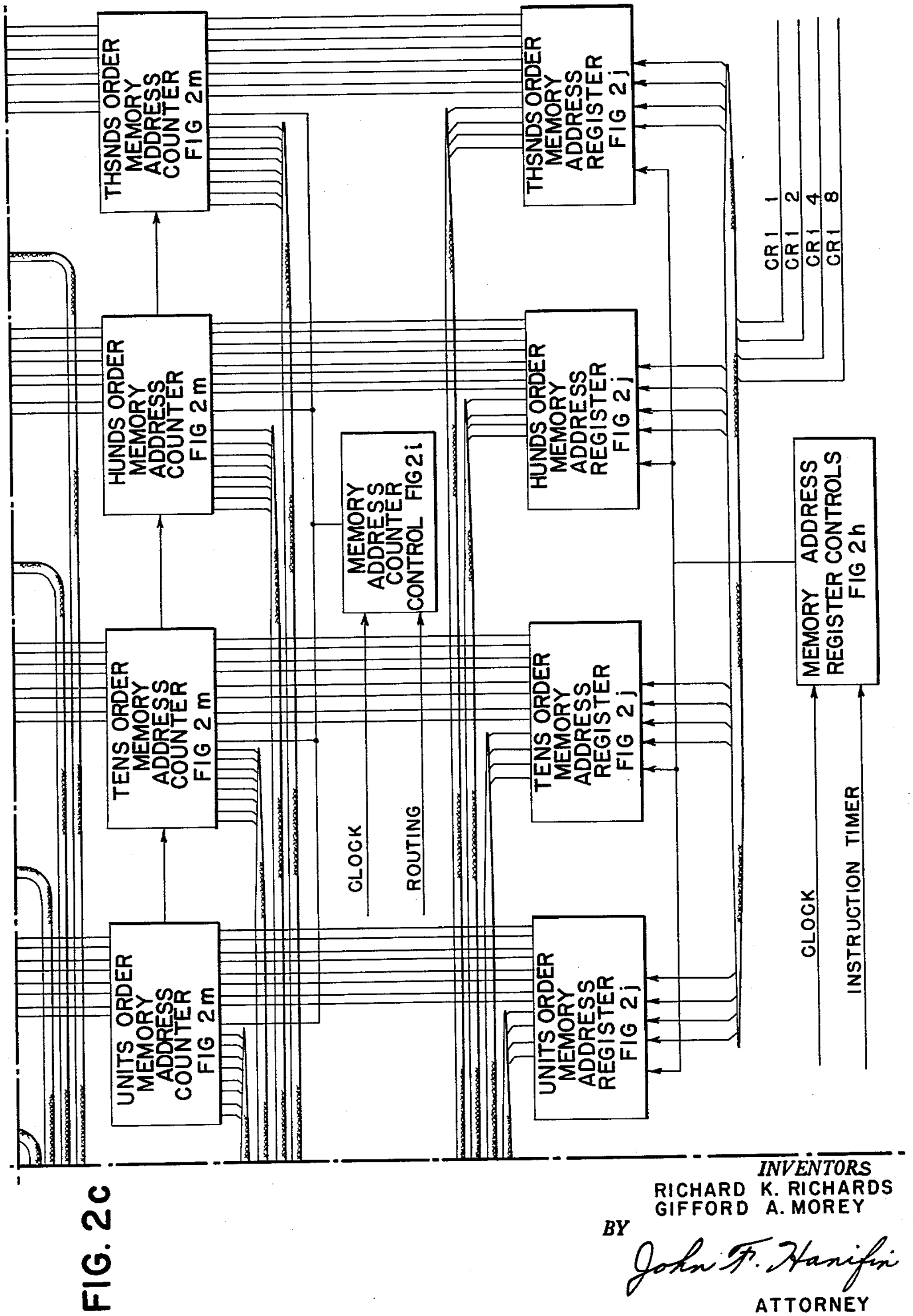

Figs. 2*a*, 2*b* and 2*c*, taken together as shown in Fig. 2, comprise an overall diagram of Memory.

Figures 2D, 2F:
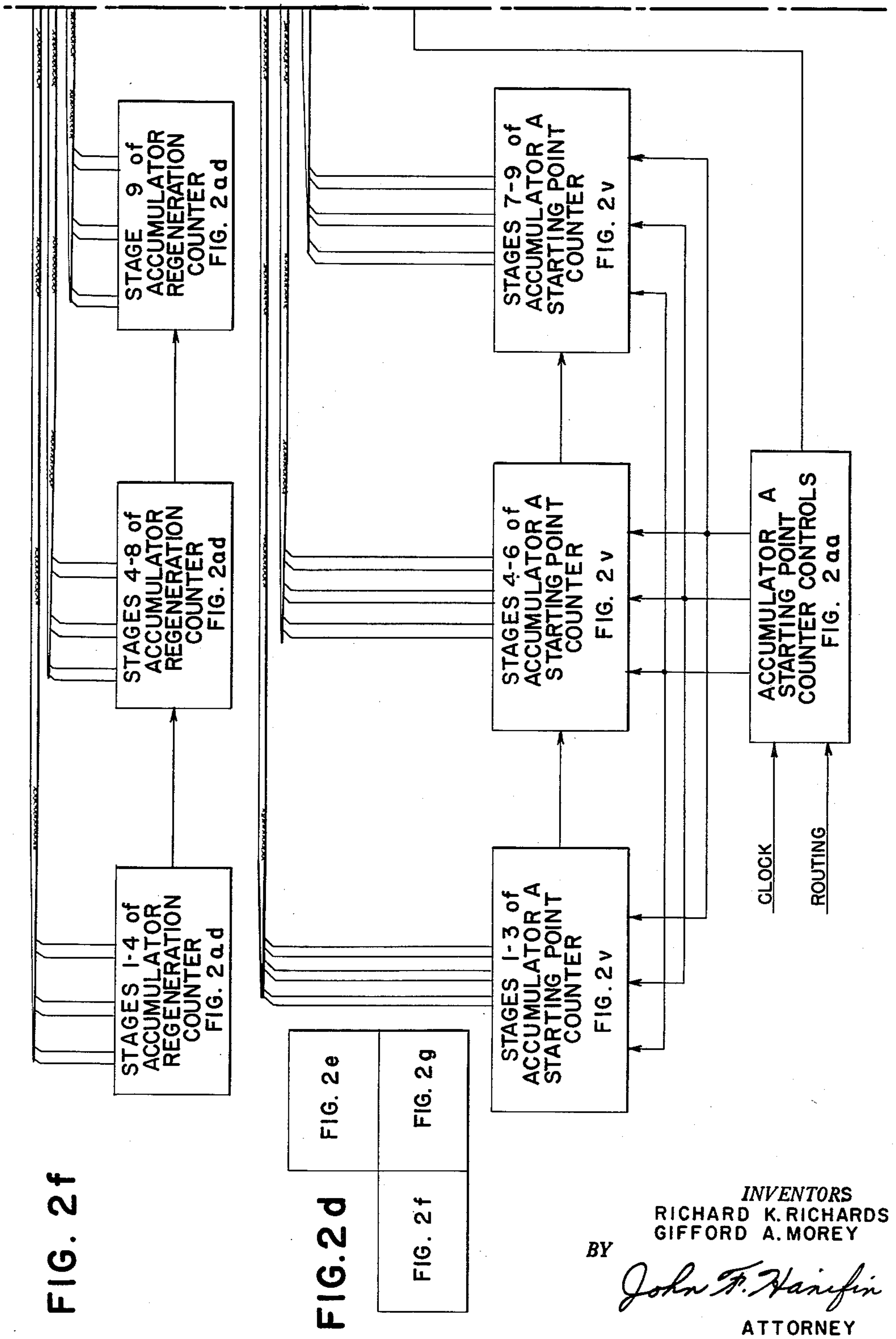

Fig. 2*d* is a diagram showing how various figures, taken together, are to be arranged.

Figure 2E:
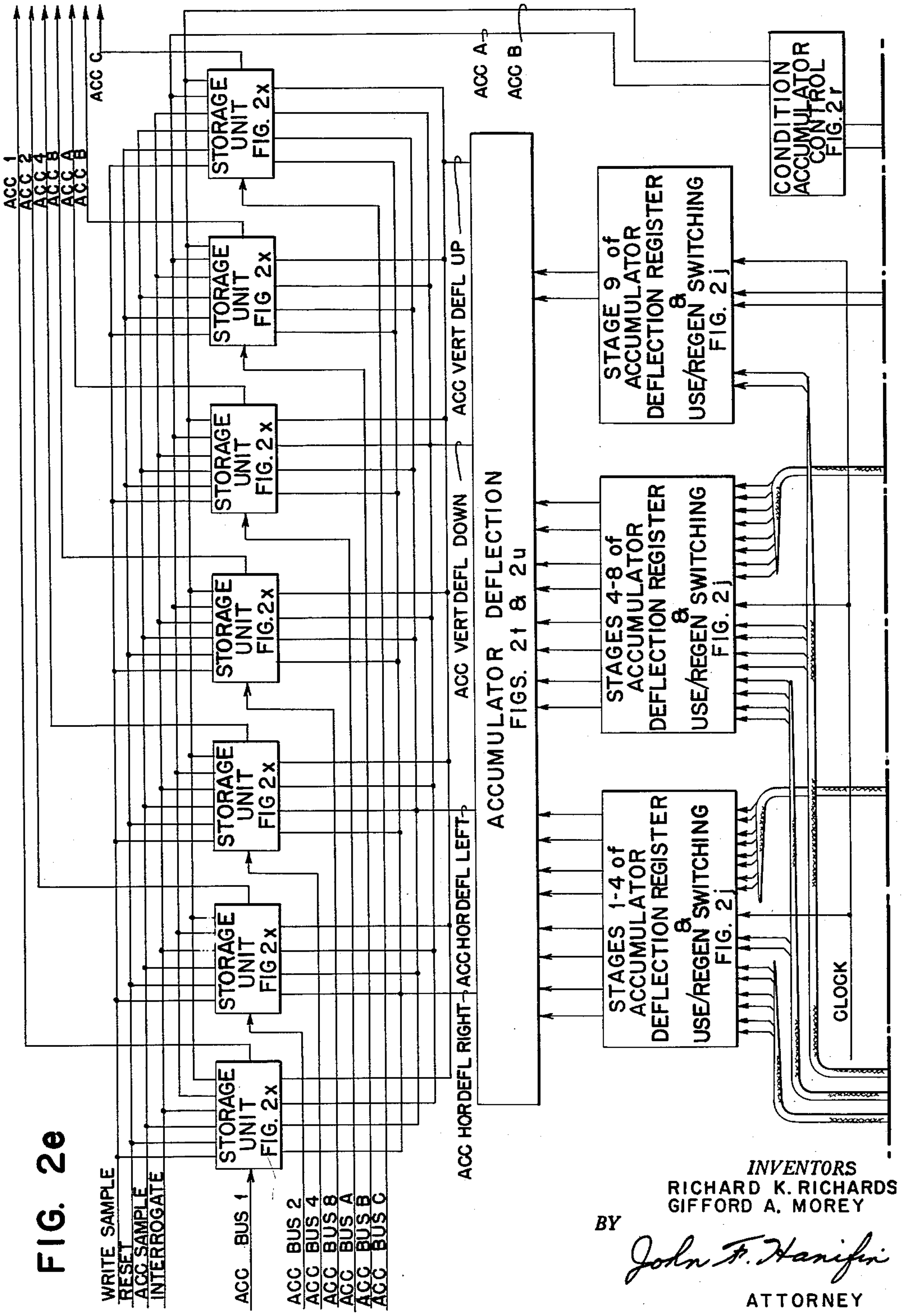
Figure 2G:
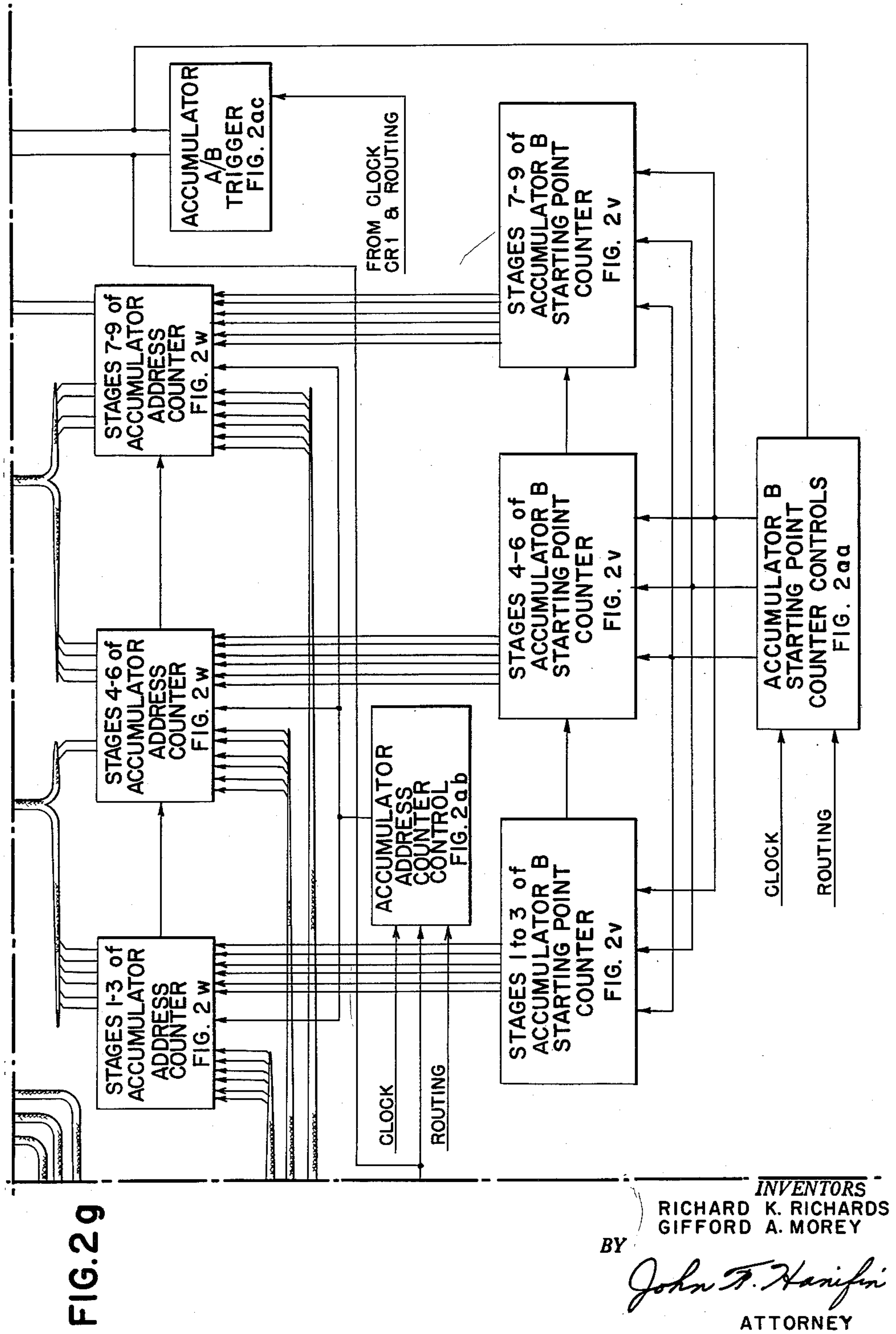

Figs. 2*e*, 2*f* and 2*g*, taken together as shown in Fig. 2*d*, comprise an overall diagram of Accumulator Storage.

Figure 2H:
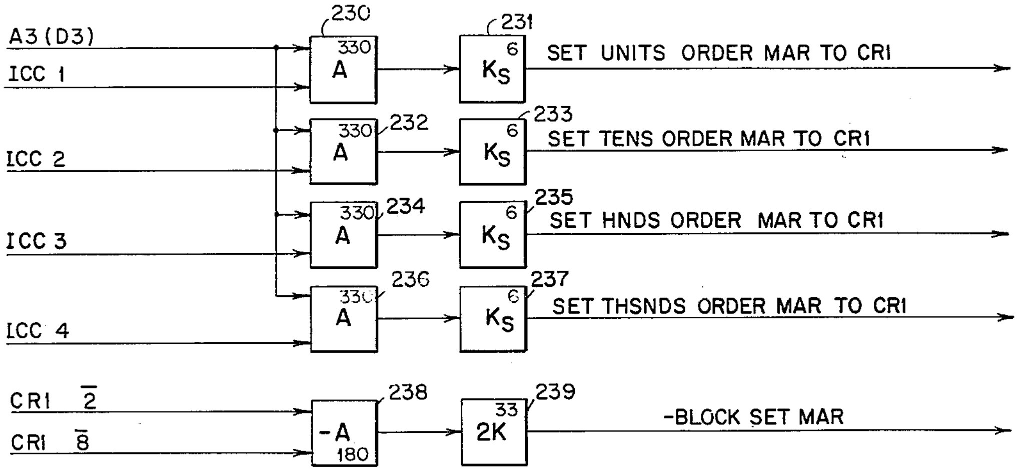
Figure 2I:
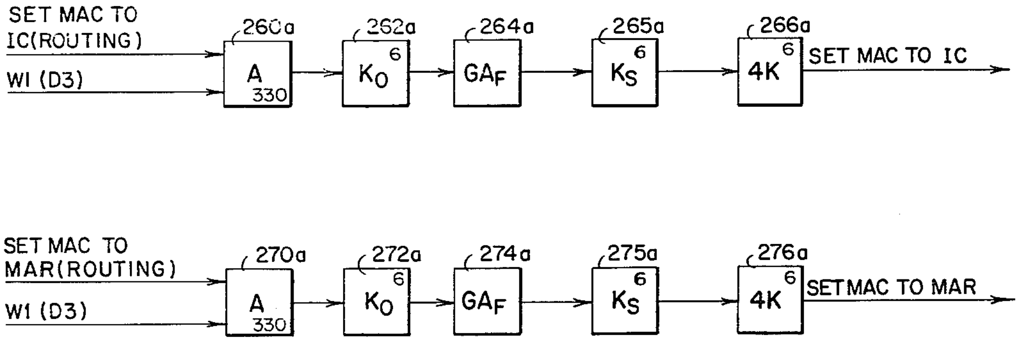

Fig. 2*h* and 2*i* constitute block diagrams of certain control circuits.

Figure 2J:
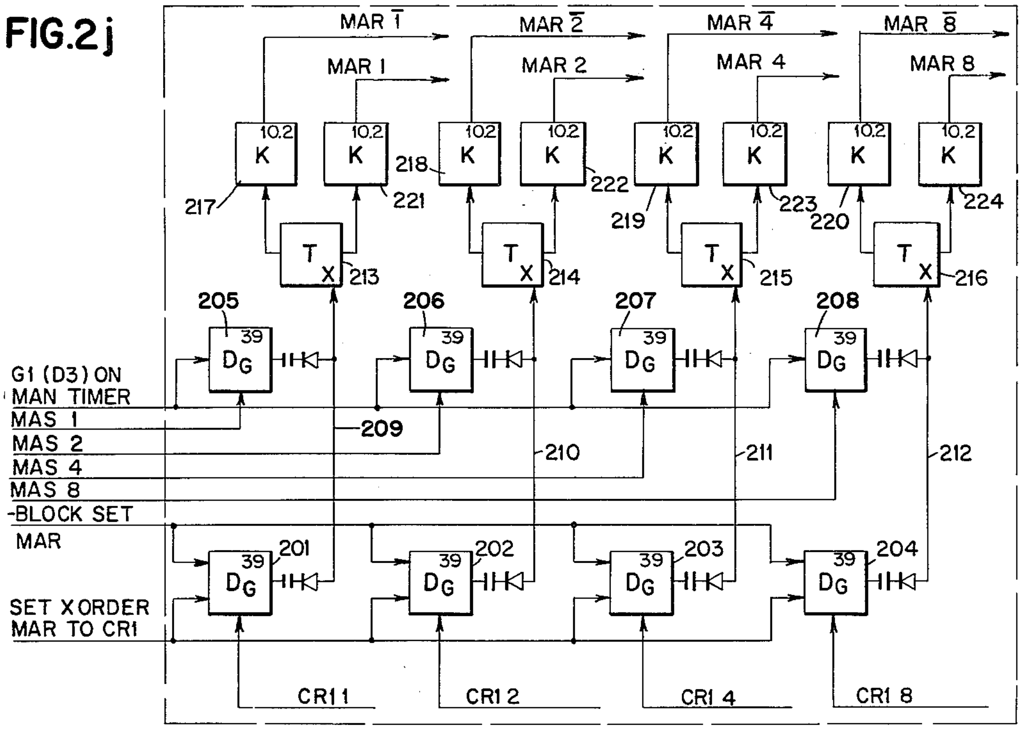

Fig. 2*j* shows a block diagram of one order of a Memory Address Register.

Figure 2K:
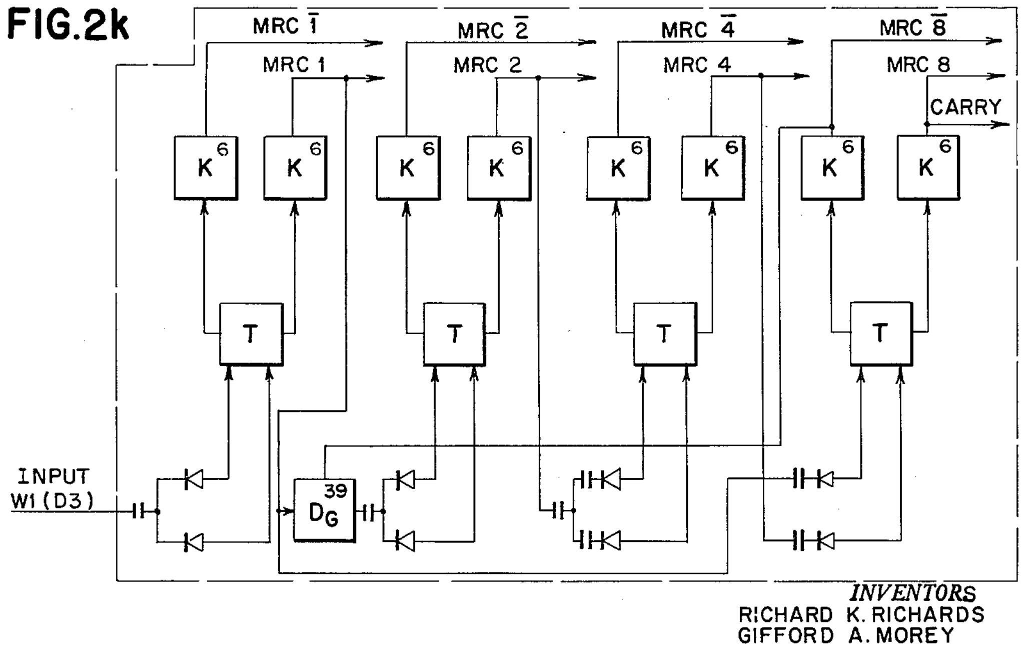

Fig. 2*k* shows a block diagram of one order of a Memory Regeneration Counter.

Figure 2M:
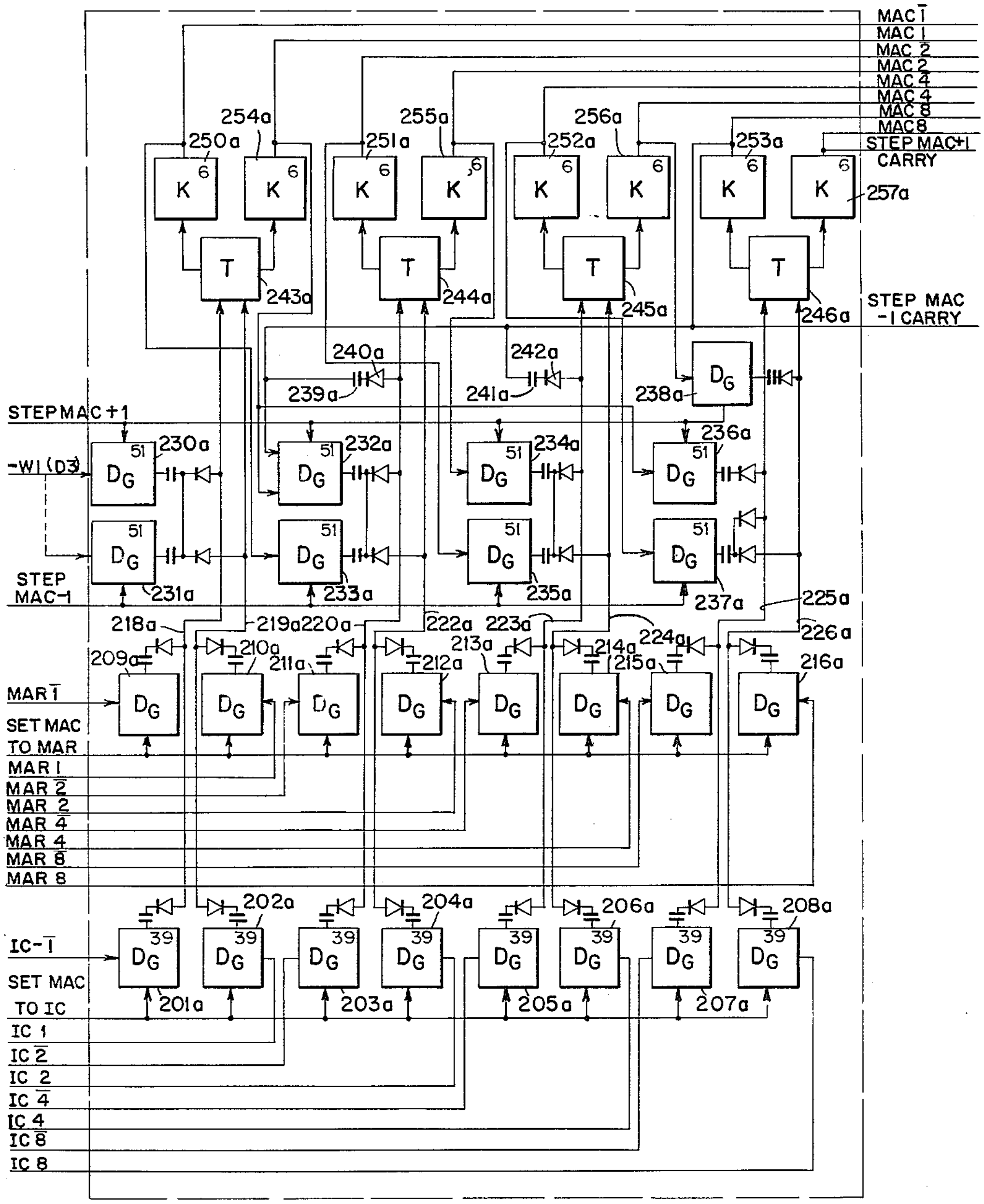

Fig. 2*m* shows a block diagram of one order of a Memory Address Counter.

Figure 2N:
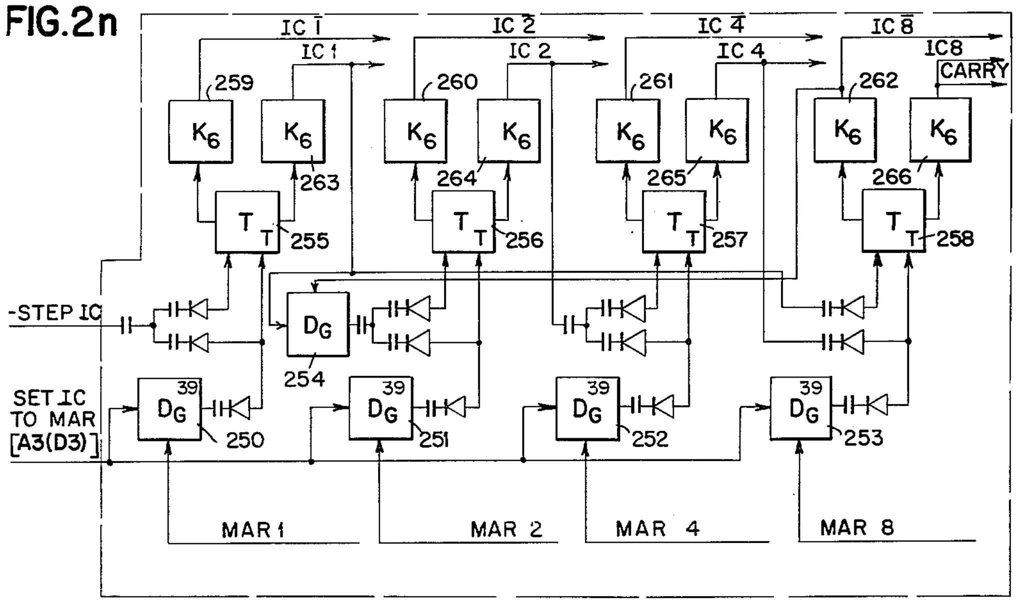

Fig. 2*n* shows a block diagram of one order of an Instruction Counter.

Figure 2P:
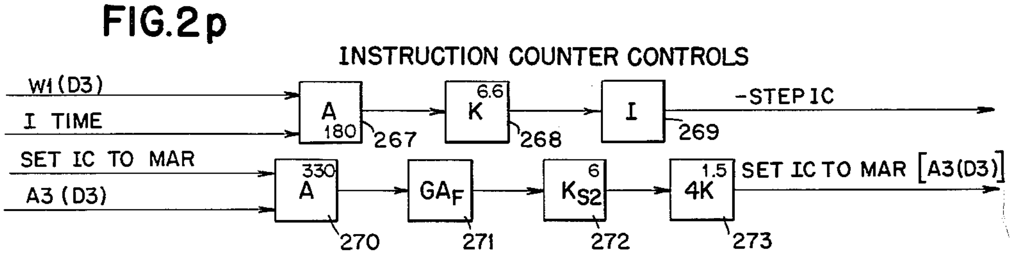
Figure 2R:
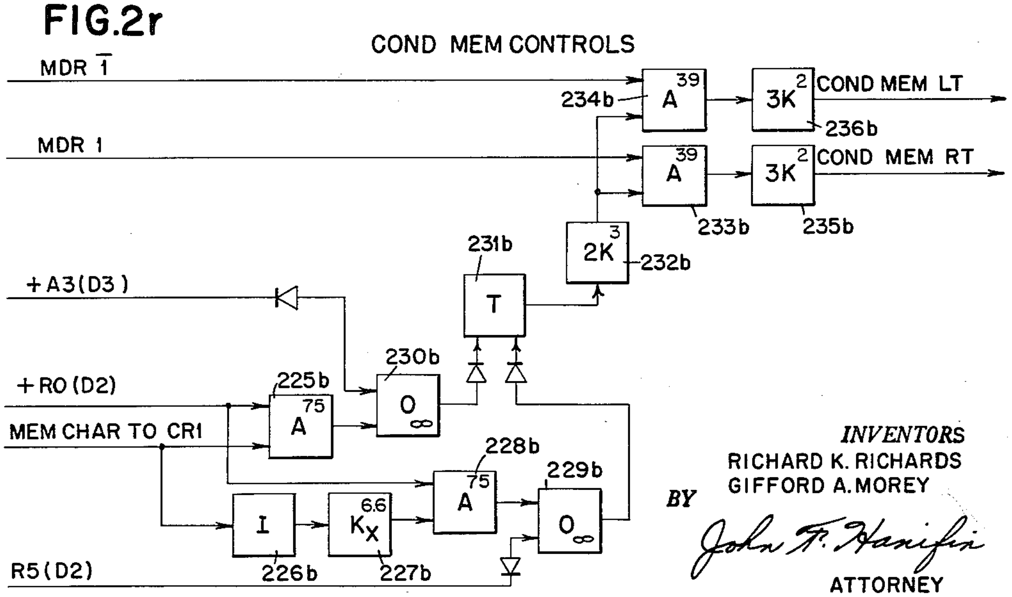

Figs. 2*p* and 2*r* show block diagrams of certain control circuits.

Figure 2S:
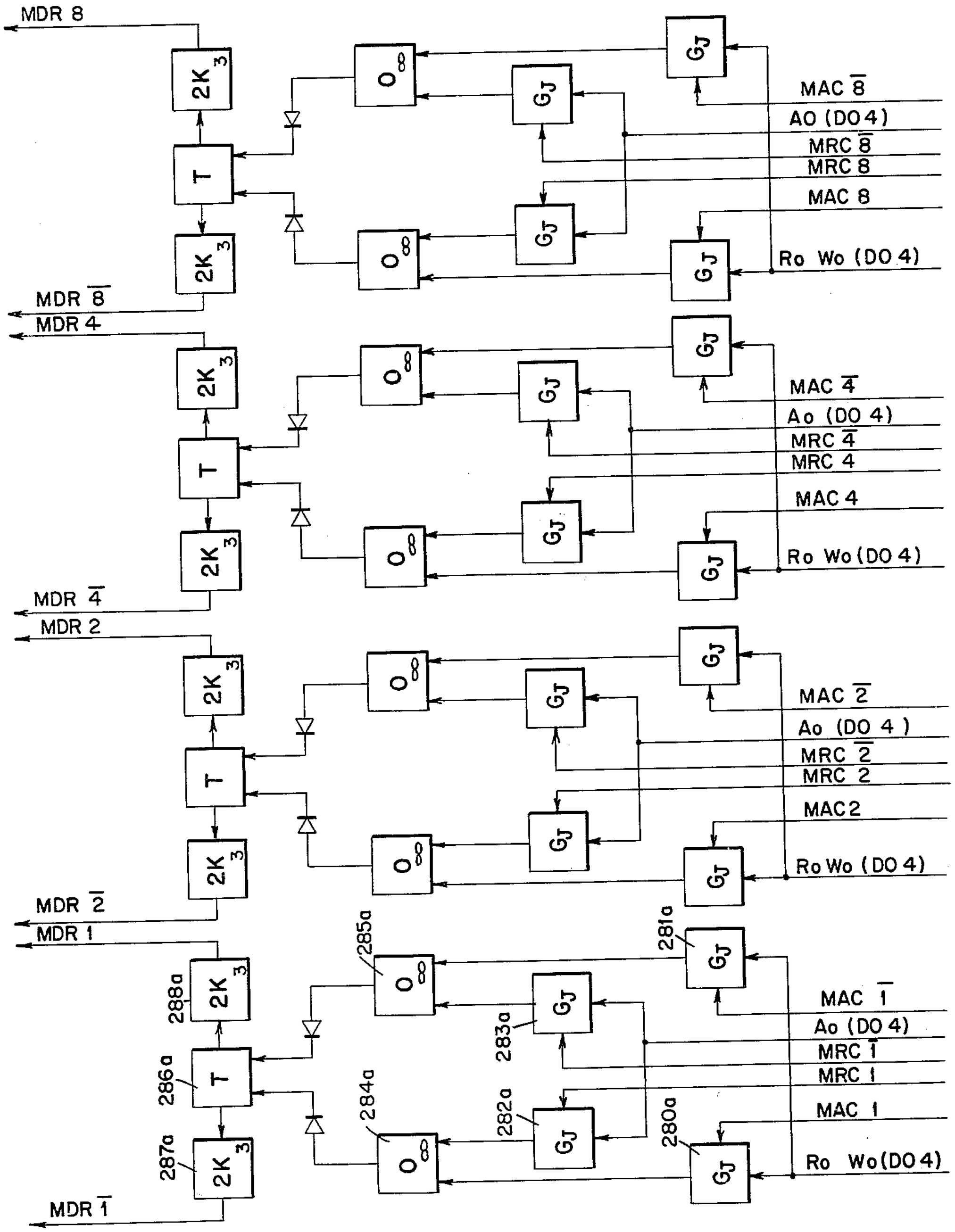

Fig. 2*s* shows a block diagram of a portion of Memory Deflection Register.

Figure 2T:
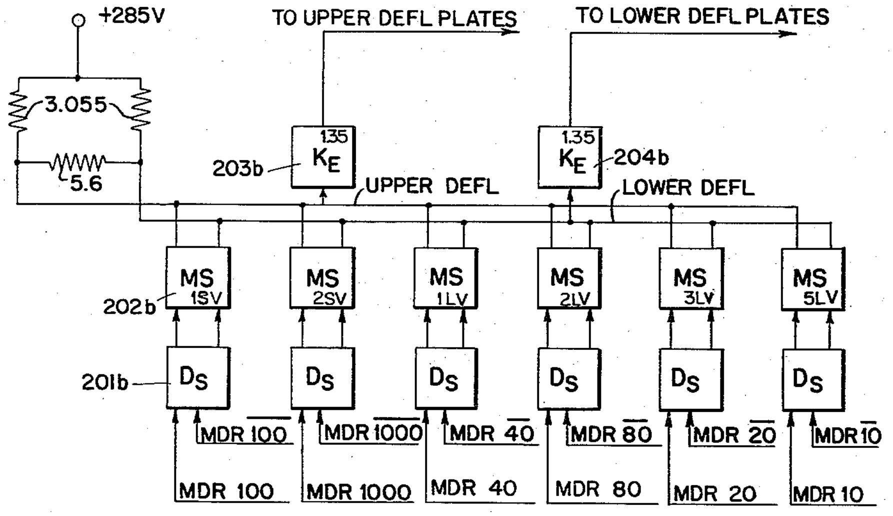
Figure 2U:
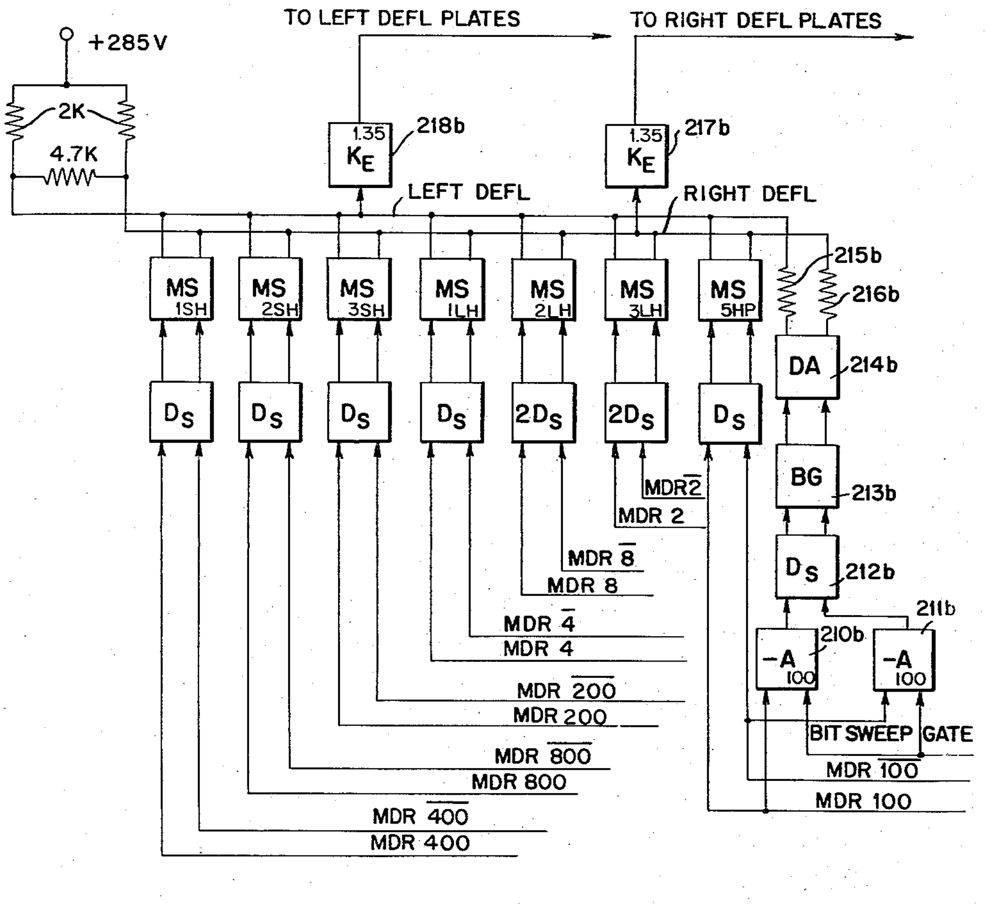

Figs. 2*t* and 2*u* show block diagrams of Memory Deflection circuits.

Figure 2V:
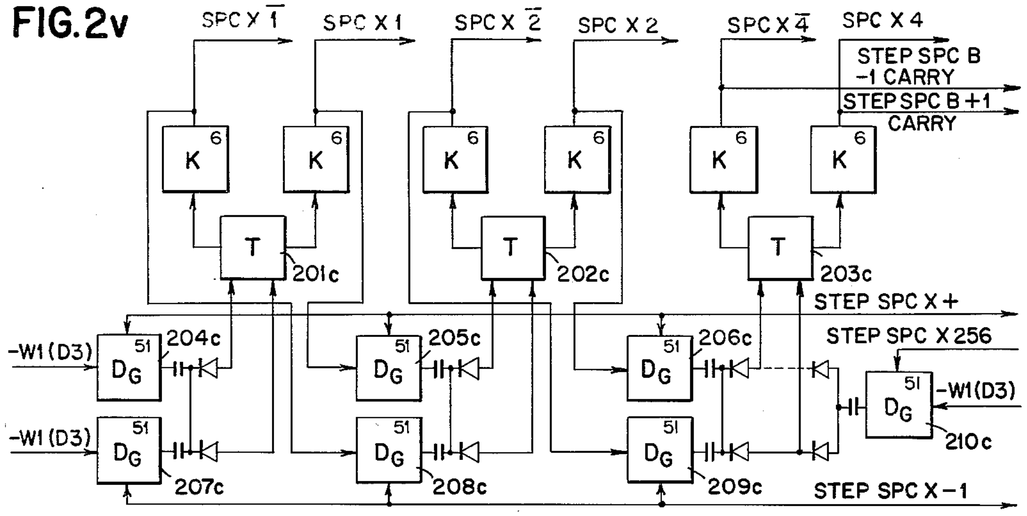

Fig. 2*v* shows a block diagram of one order of a Starting Point Counter.

Figure 2W:
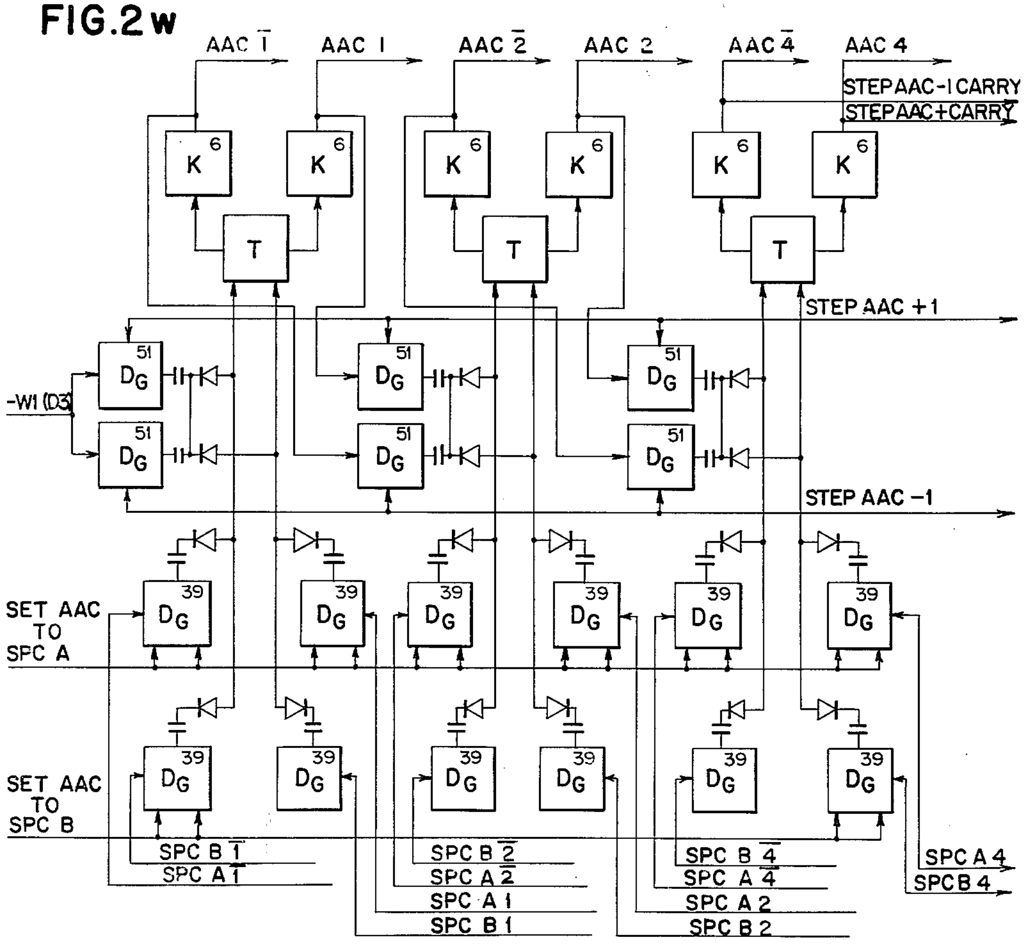

Fig. 2*w* shows a block diagram of one order of an Accumulator Address Counter.

Figures 2X, 2Y:
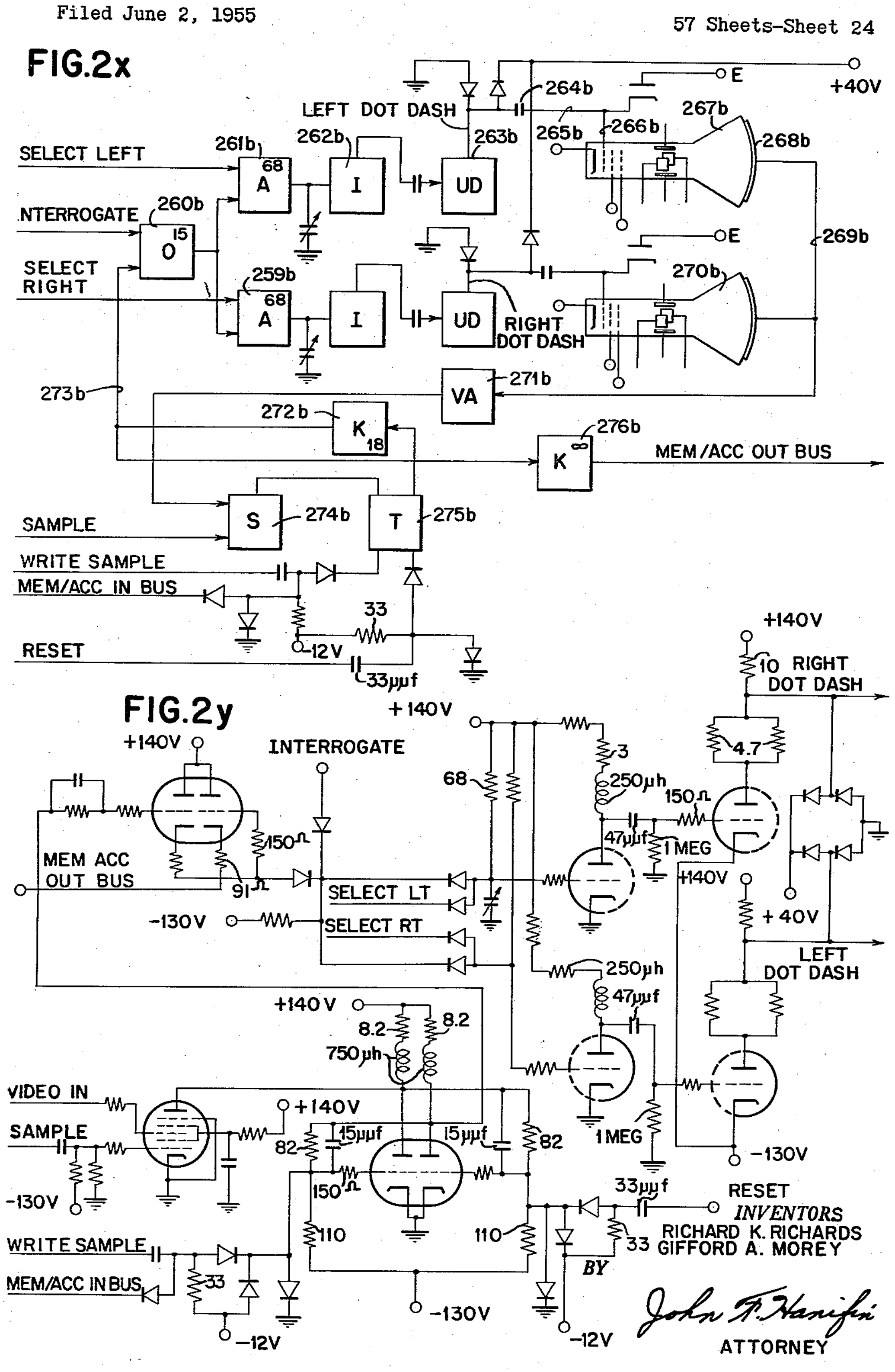

Figs. 2*x* and 2*y* show a block diagram and a detailed diagram, respectively of a Storage unit.

Figure 2Z:
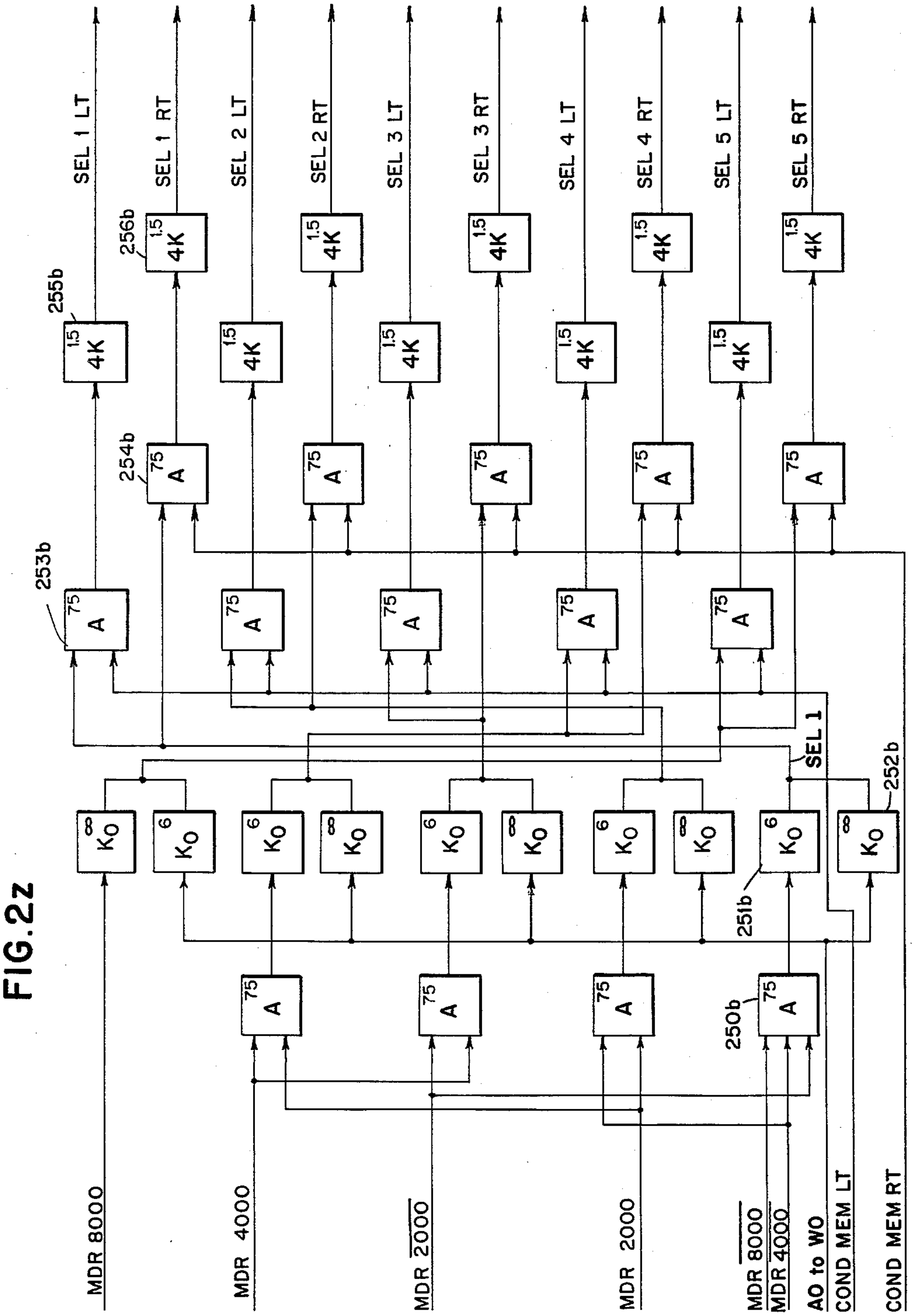
Figure 2A:
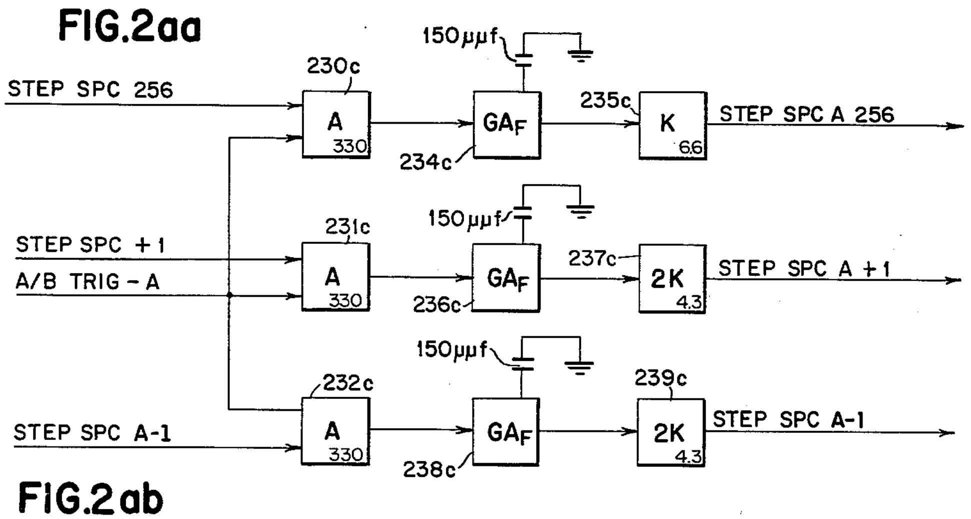
Figure 2A:
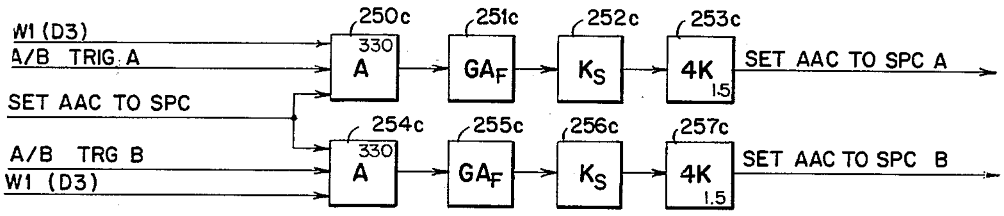
Figure 2A:
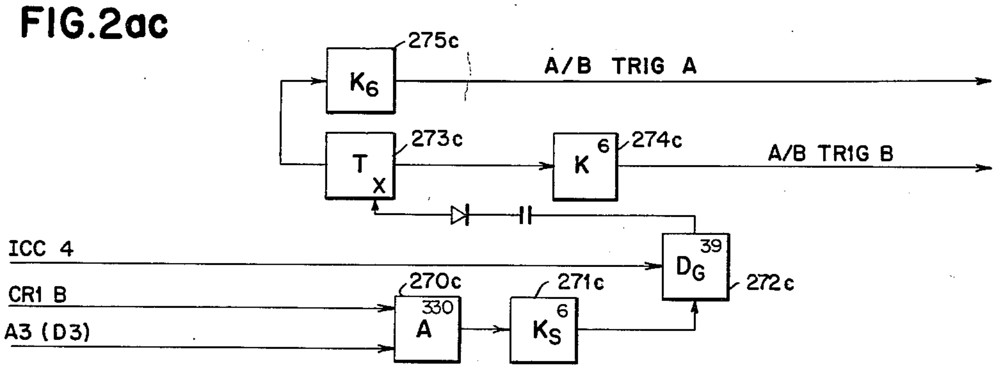
Figure 2A:
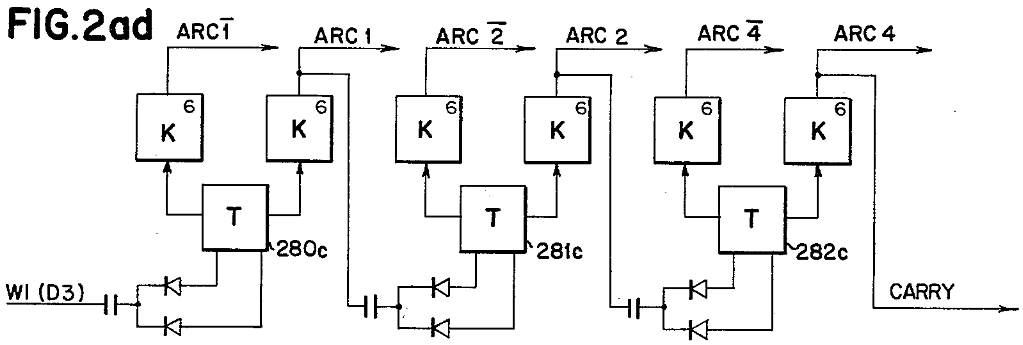

Figs. 2*z*, 2*aa*, 2*ab* and 2*ac* show block diagrams of certain control circuits.

Fig. 2*ad* shows a block diagram of an Accumulator Regeneration Counter.

Figure 3A:
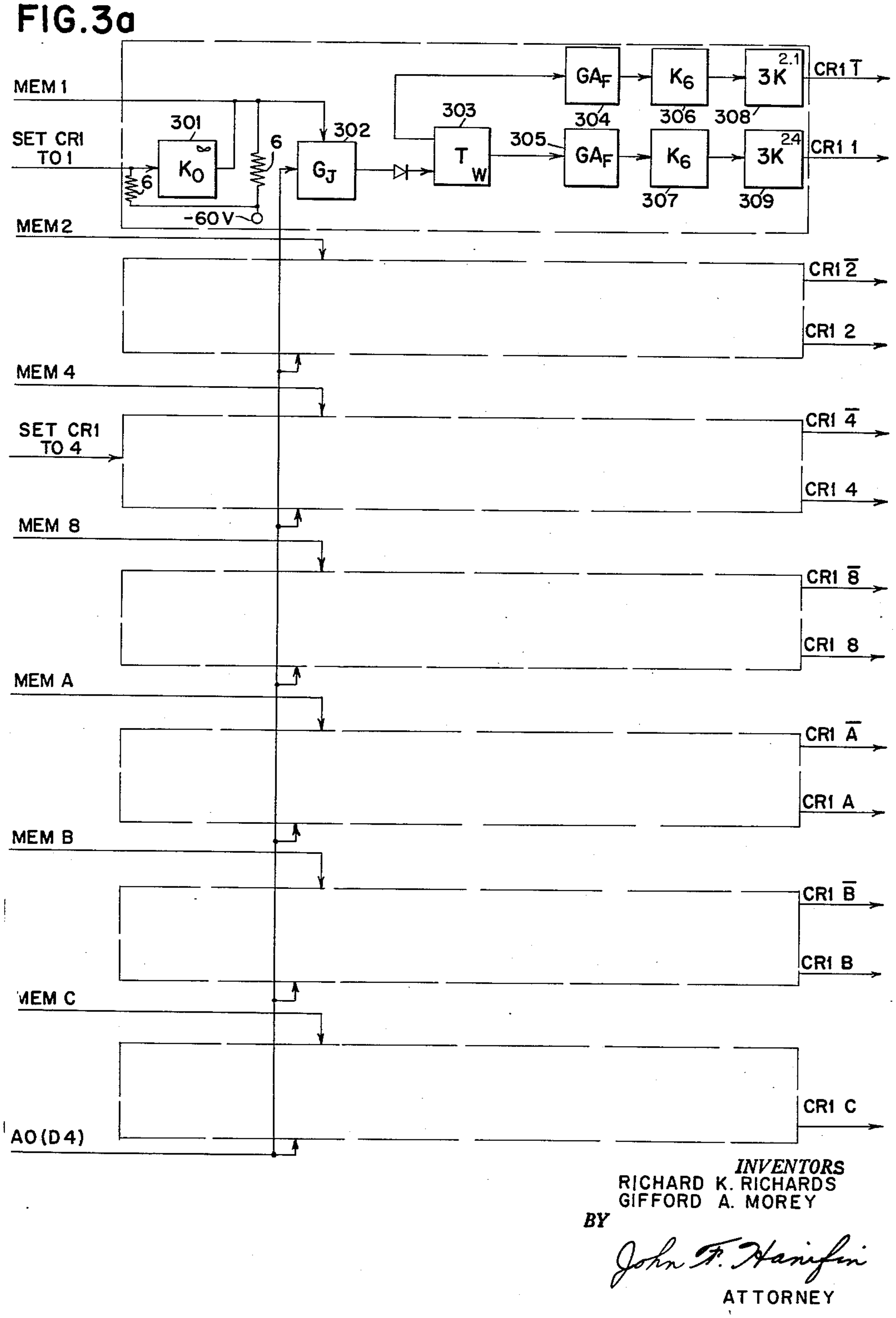

Fig. 3*a* shows a block diagram of a Character register.

Figure 3B:
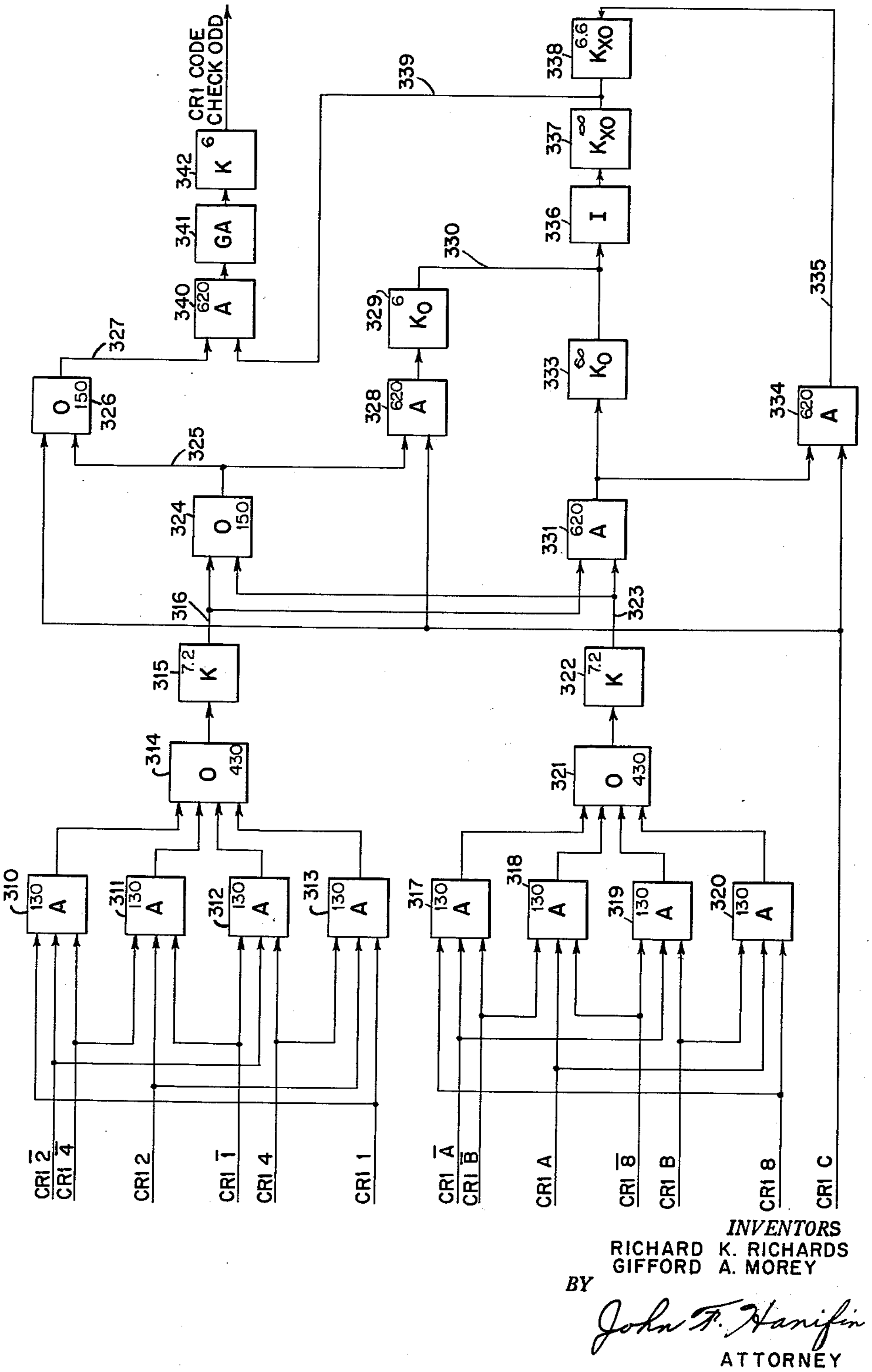

Fig. 3*b* shows a block diagram of Code Check circuits.

Figure 3C:
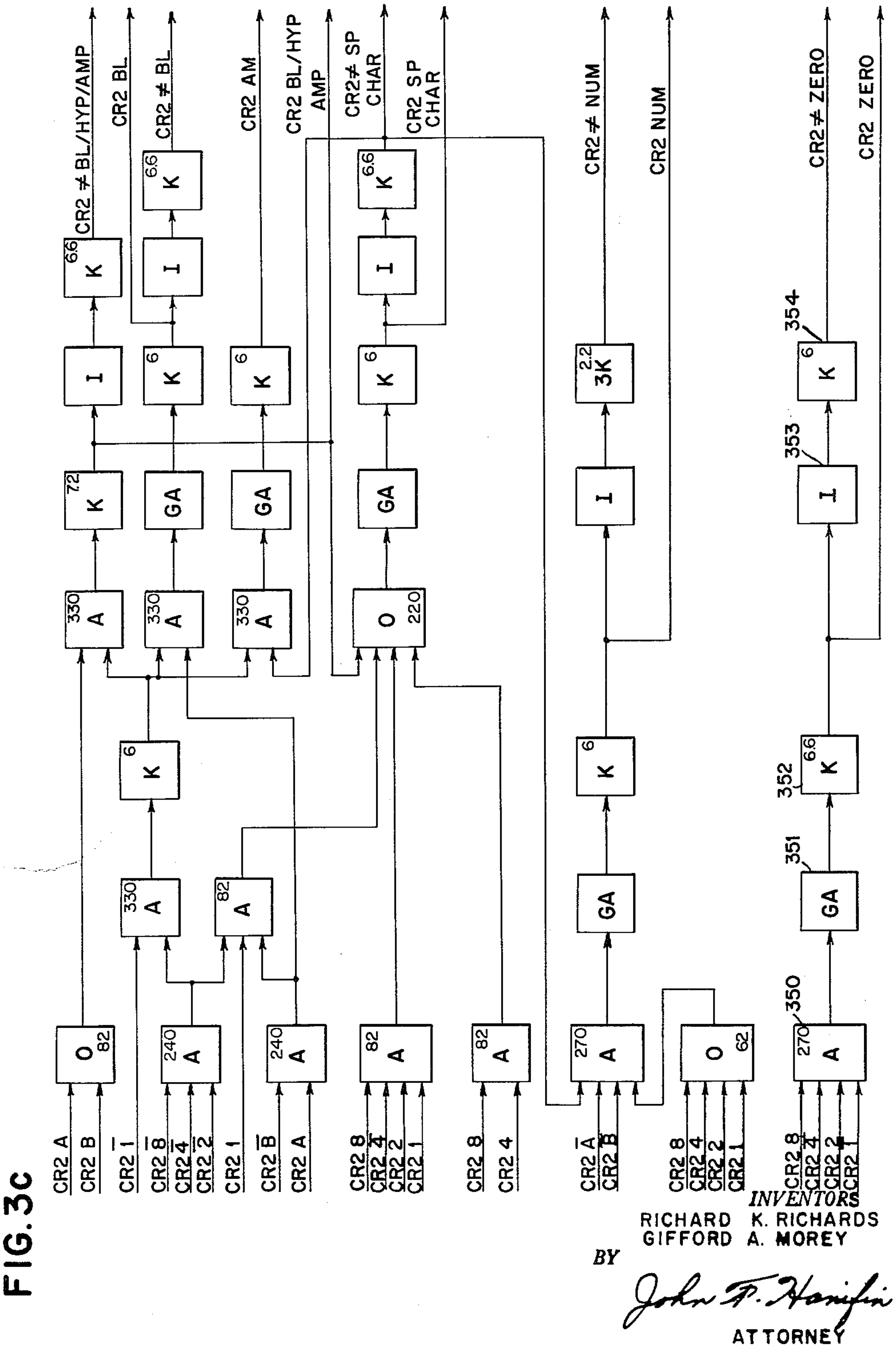
Figure 3D:
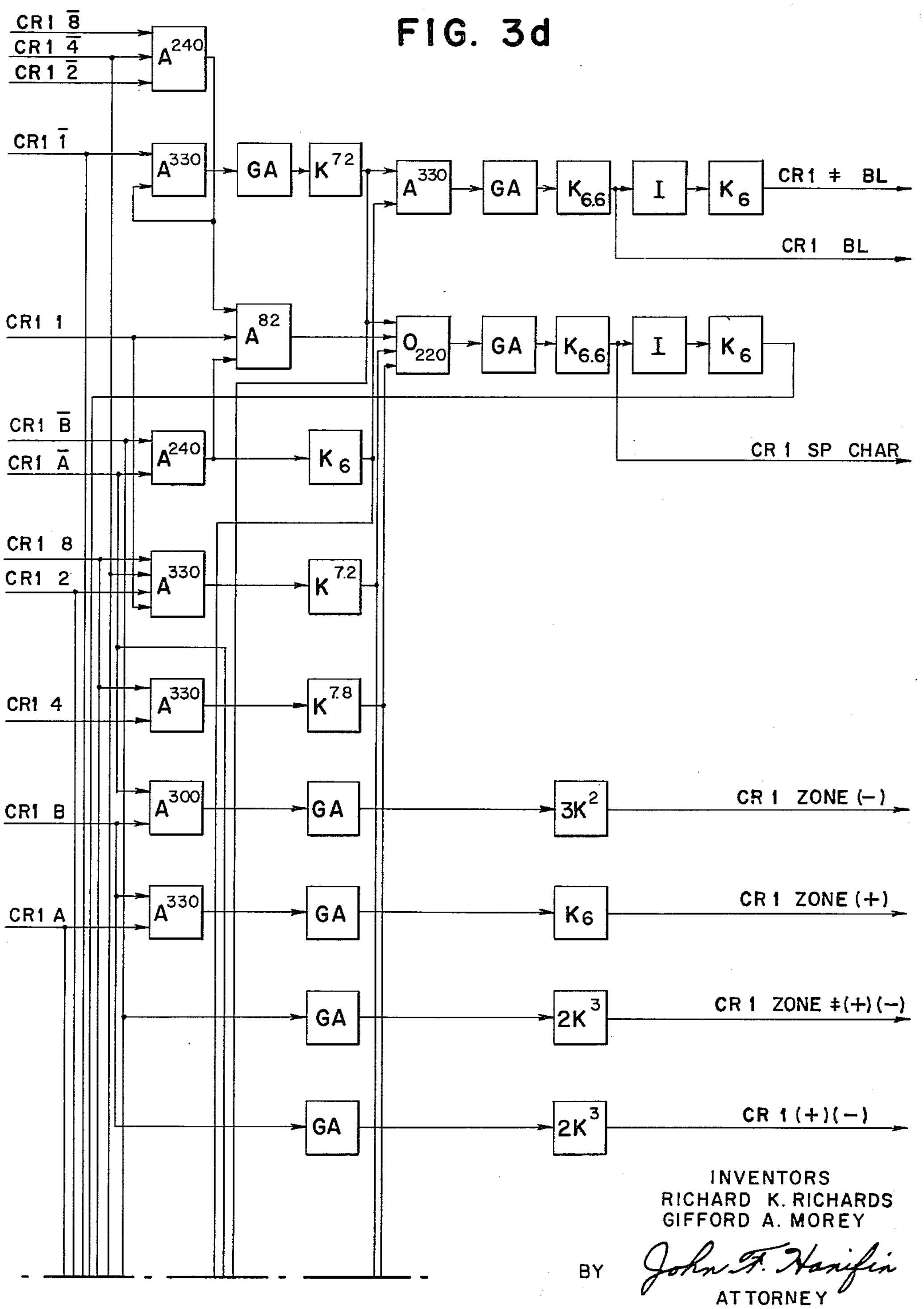
Figure 3E:
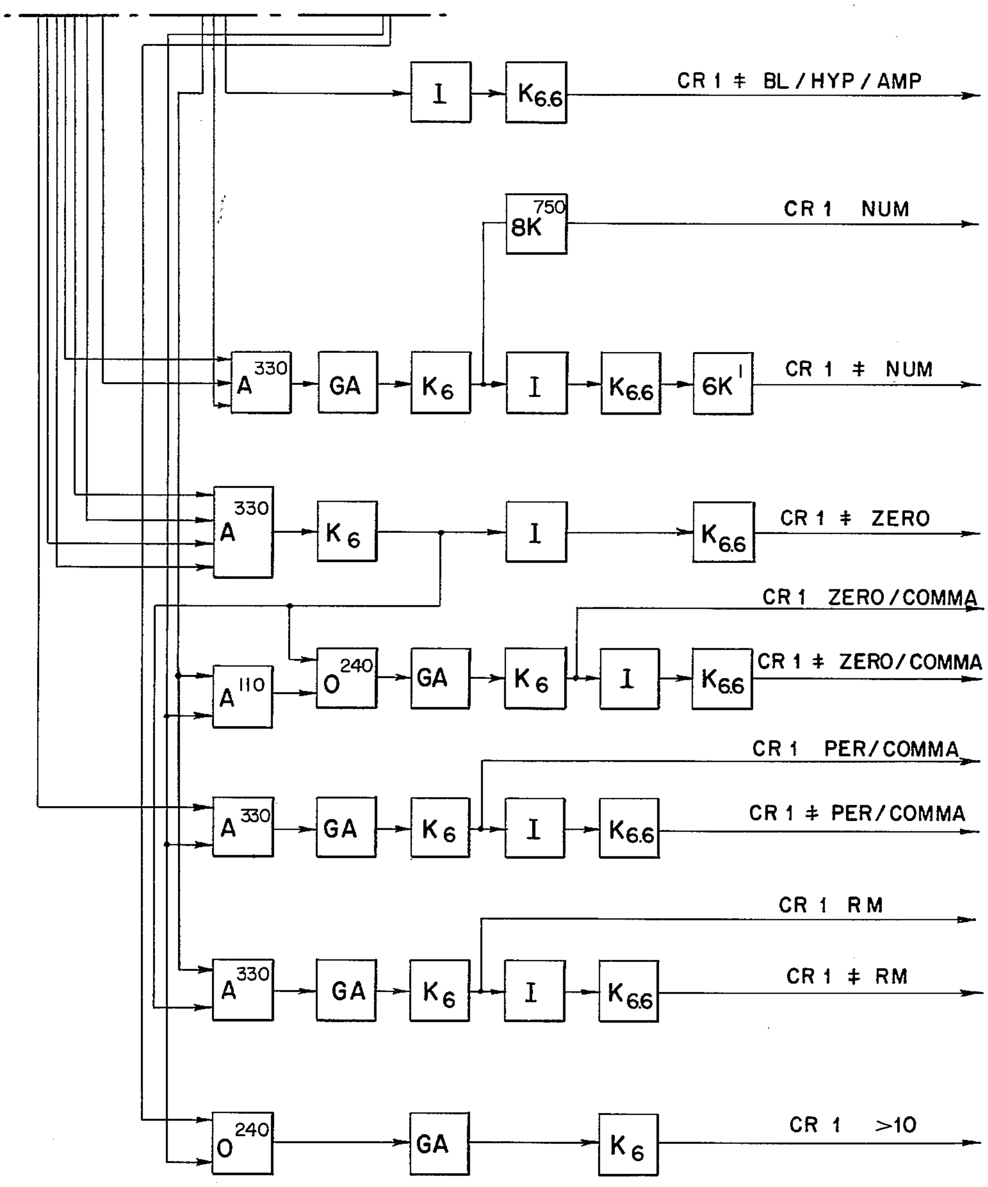

Fig. 3*c*, 3*d* and 3*e* show block diagrams of Character Recognition circuits.

Figure 4A:
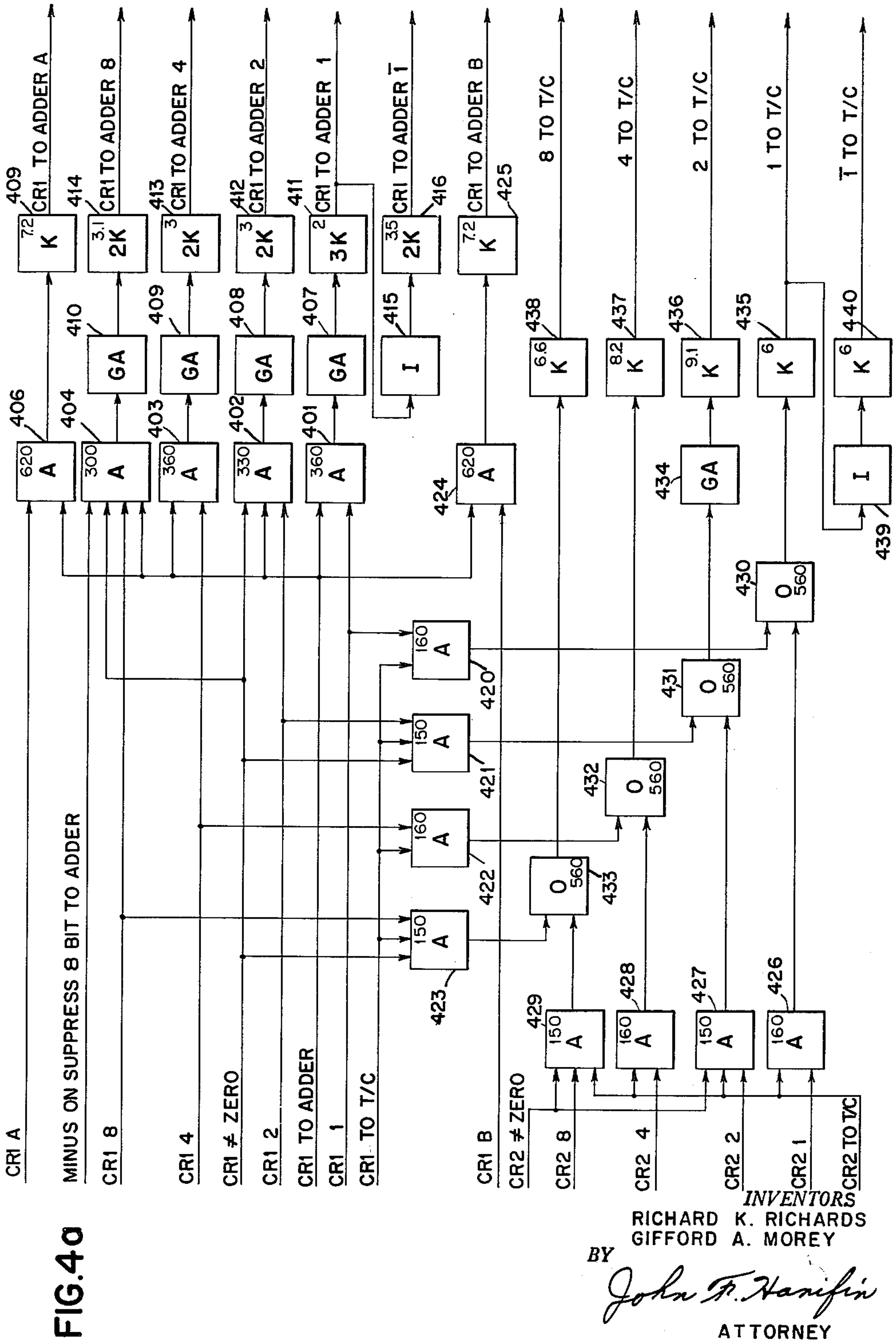

Fig. 4*a* shows a block diagram of an Arithmetic Input Switching circuit.

Figure 4B:
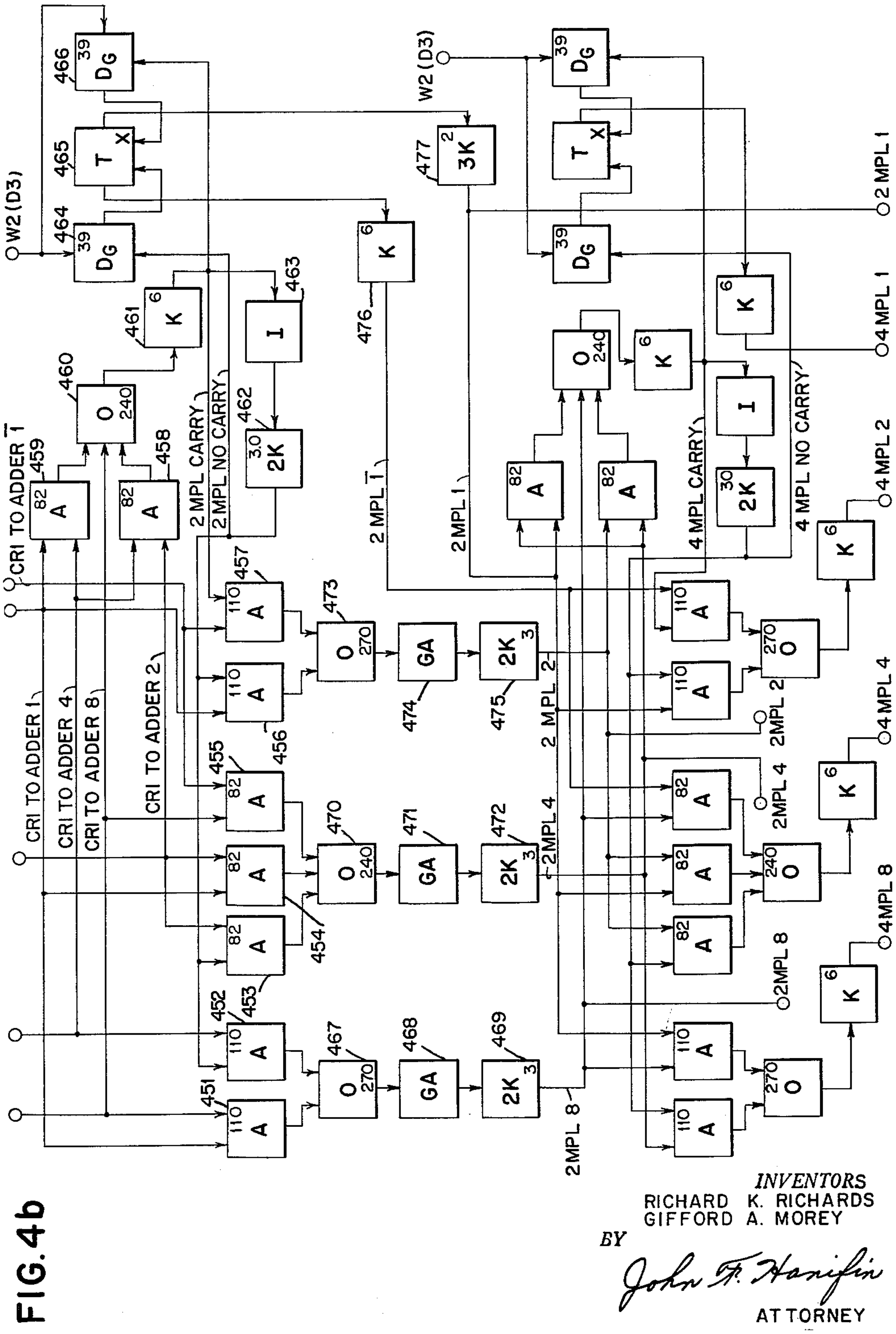

Fig. 4*b* shows block diagrams of Doubler and Quadrupler circuits.

Figure 4C:
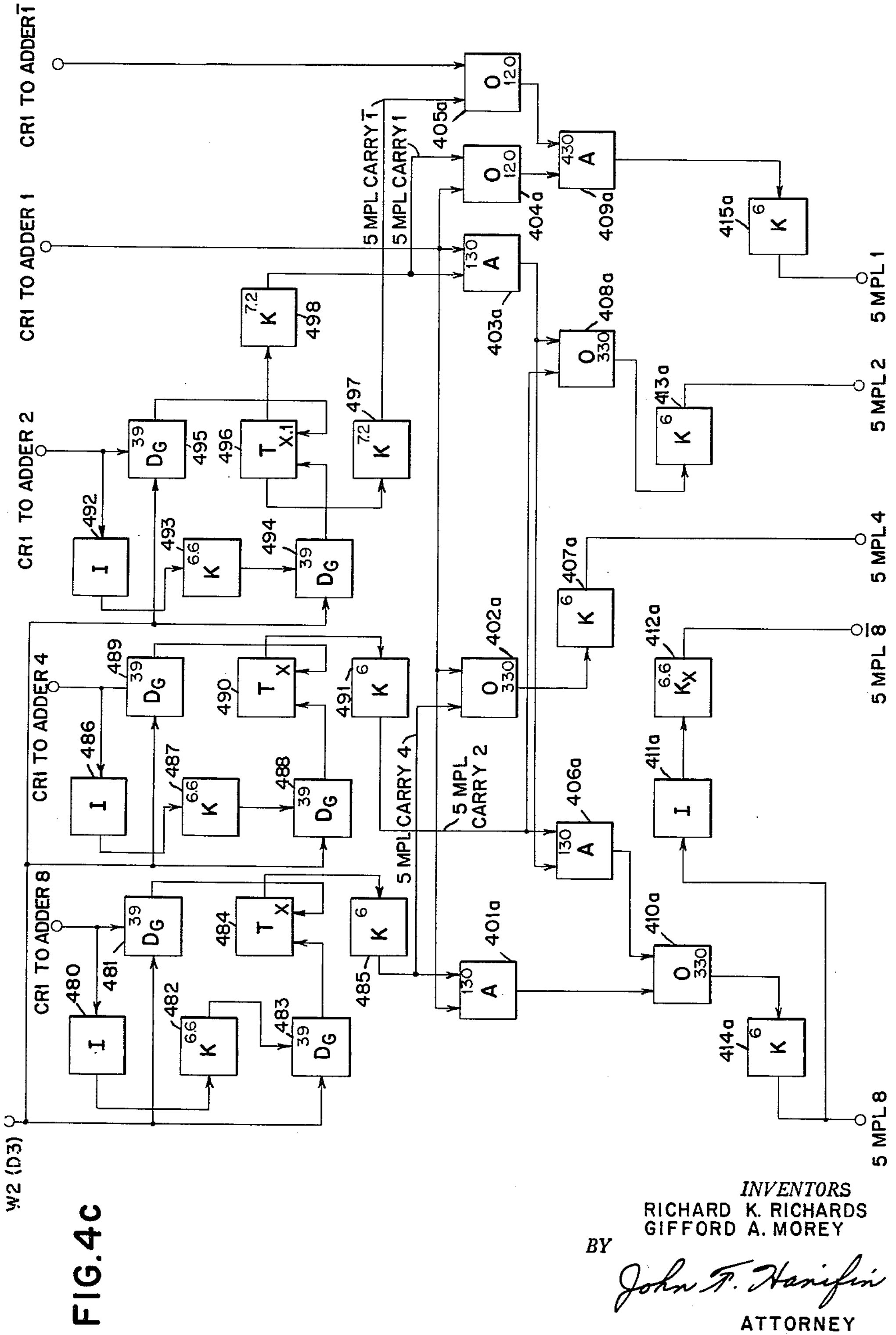

Fig. 4*c* shows a block diagram of a Quintupler circuit.

Figure 4D:
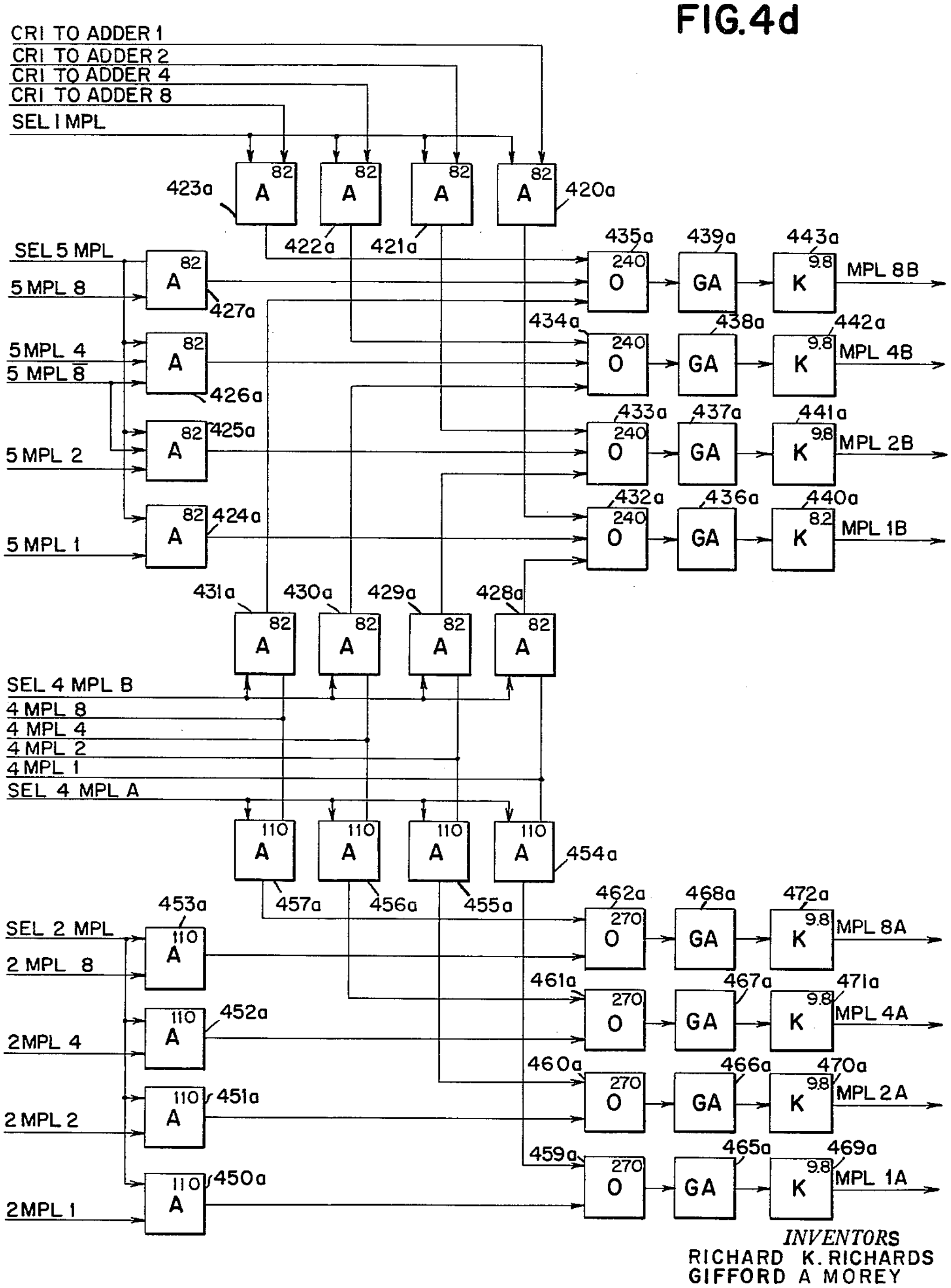

Fig. 4*d* shows a block diagram of a Multiple Selection circuit.

Figure 4E:
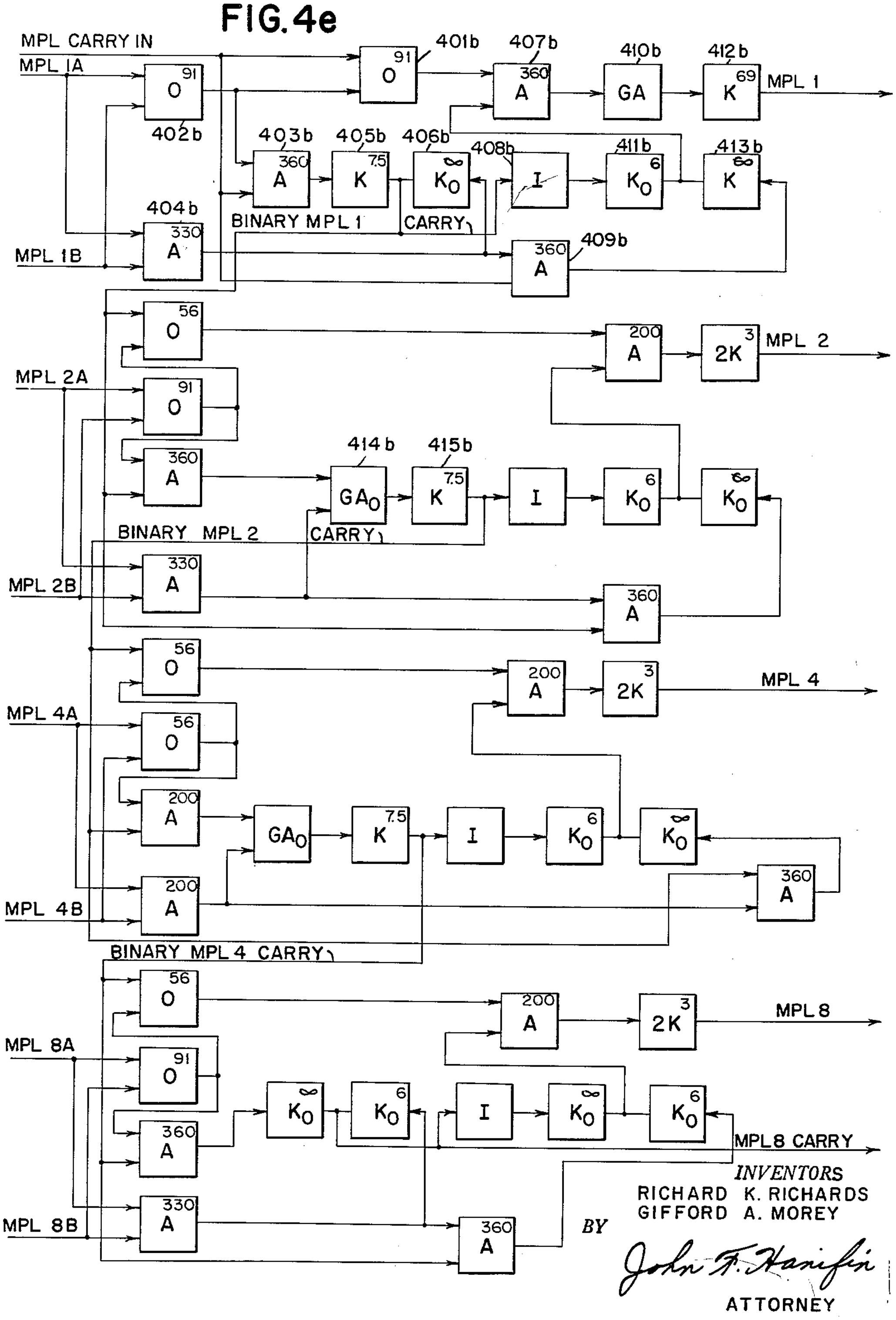

Fig. 4*e* shows a block diagram of a Multiple Adder circuit.

Figure 4F:
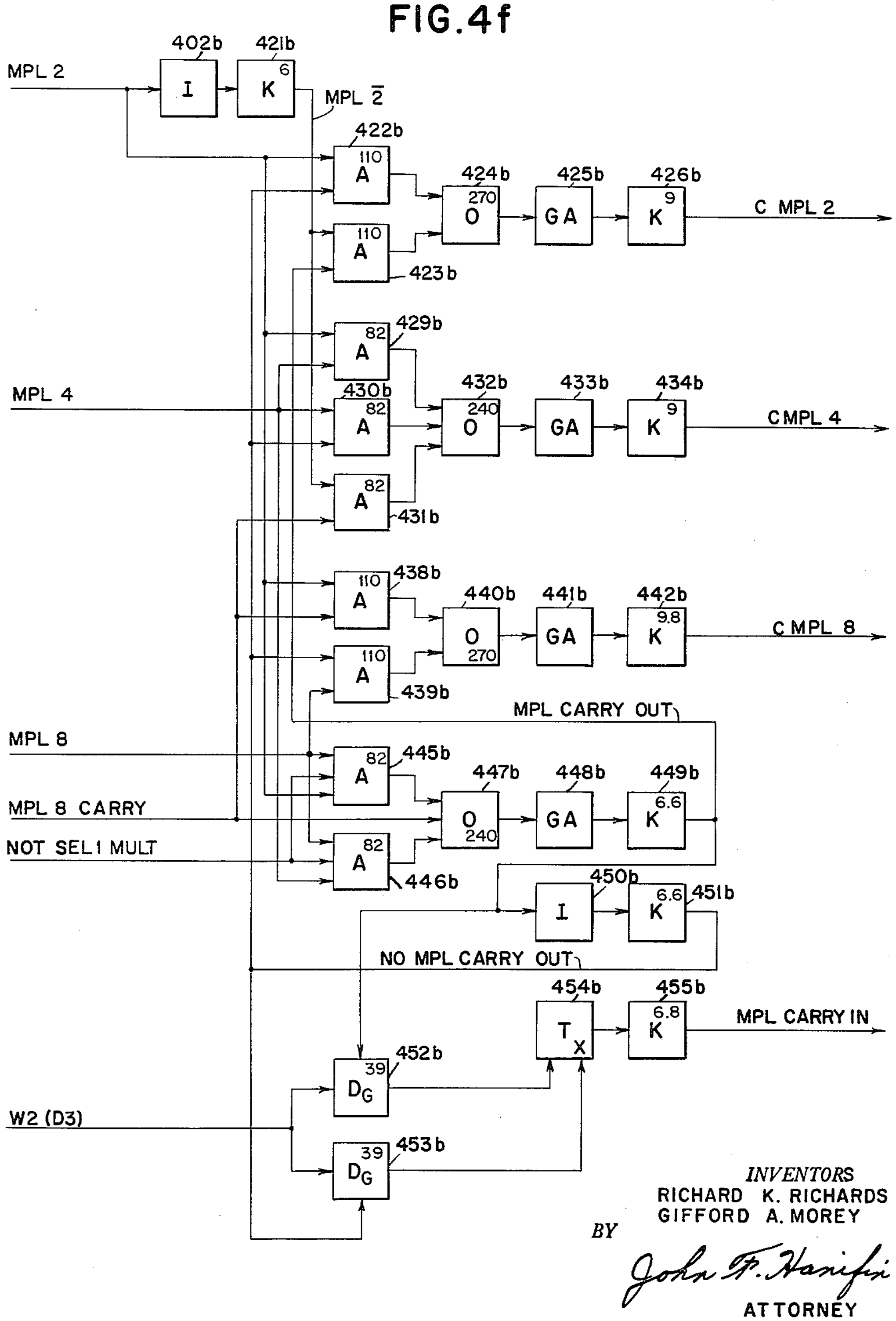

Fig. 4*f* shows a block diagram of a Multiple Adder Correction circuit.

Figure 4G:
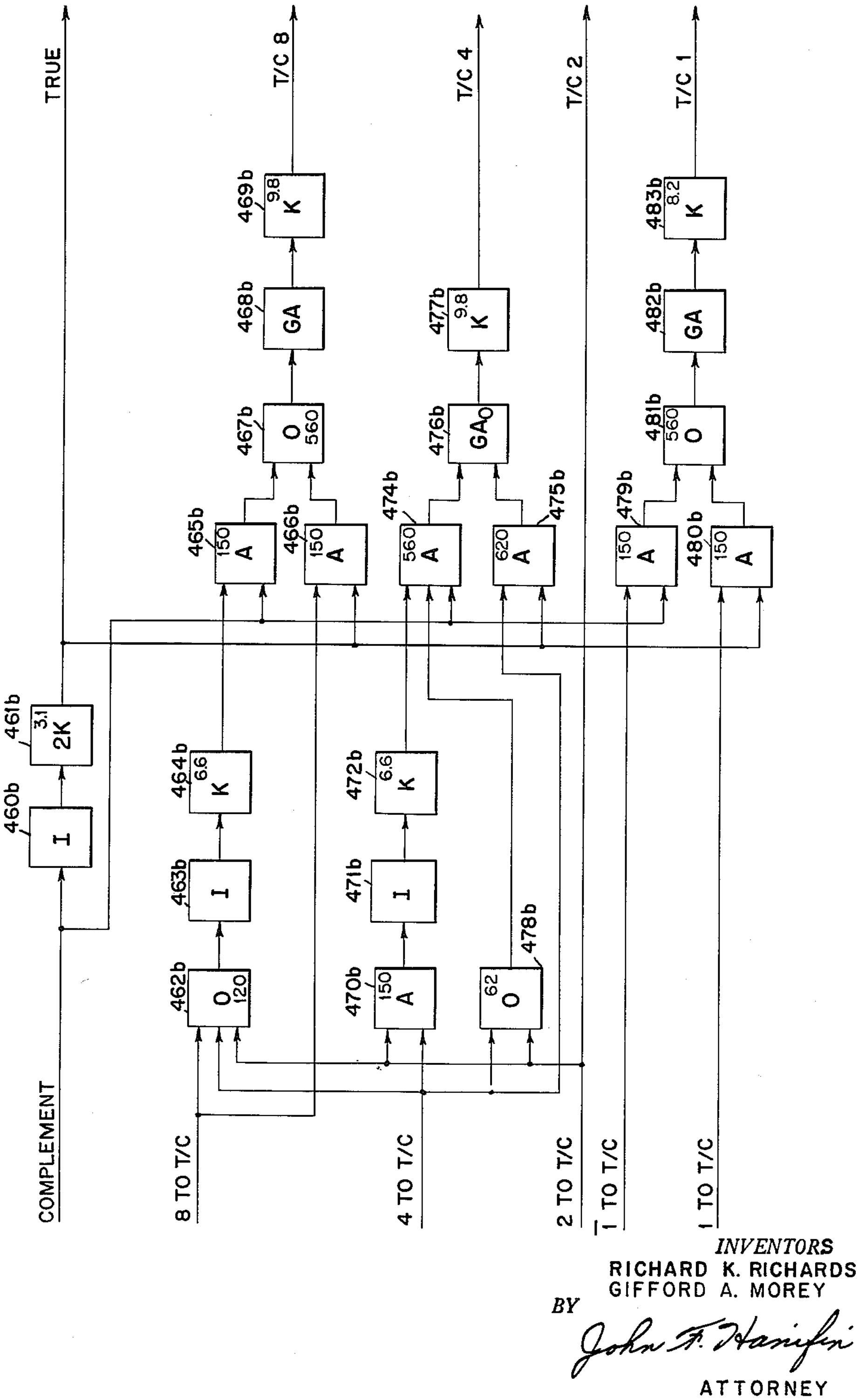

Fig. 4*g* is a block diagram of a True/Complement Control circuit.

Figure 4H:
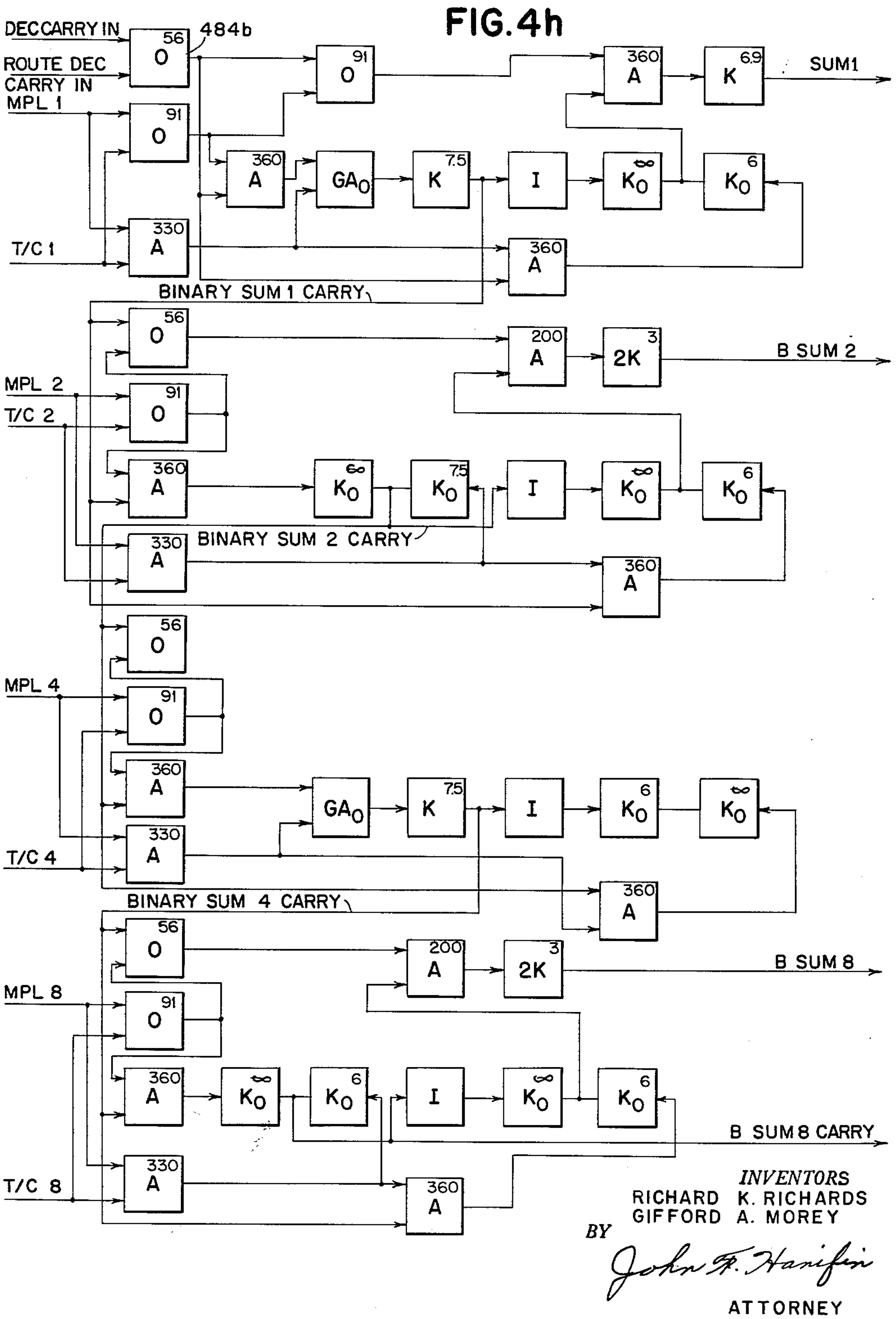

Fig. 4*h* is a block diagram of a Digit Adder.

Figure 4I:
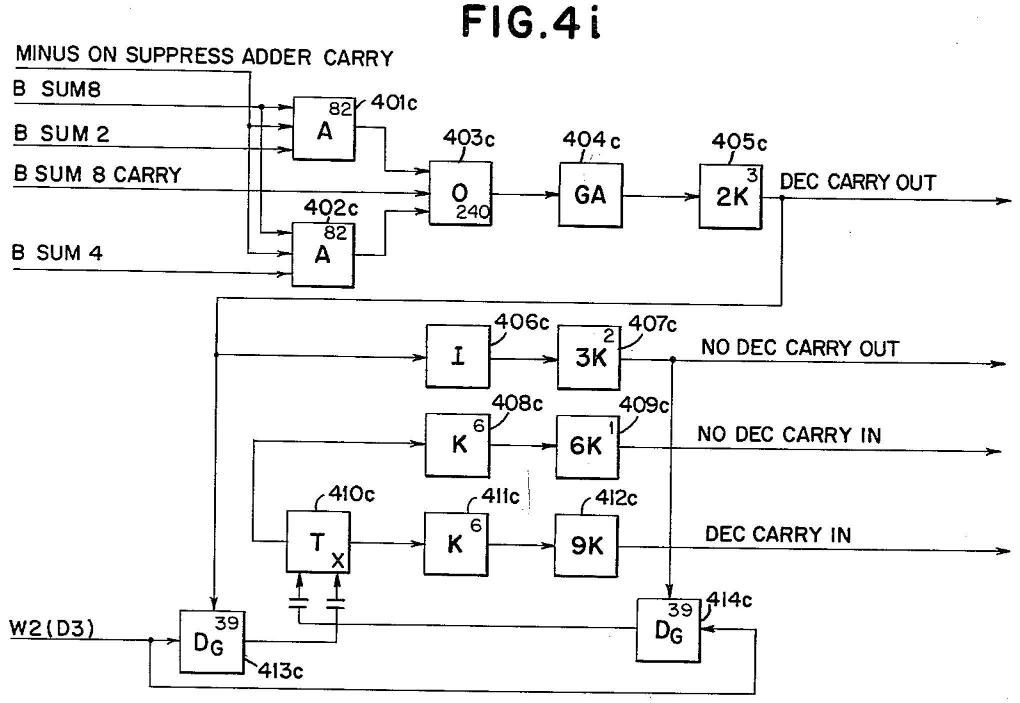

Fig. 4*i* is a block diagram of a Decimal Carry circuit.

Figure 4N:
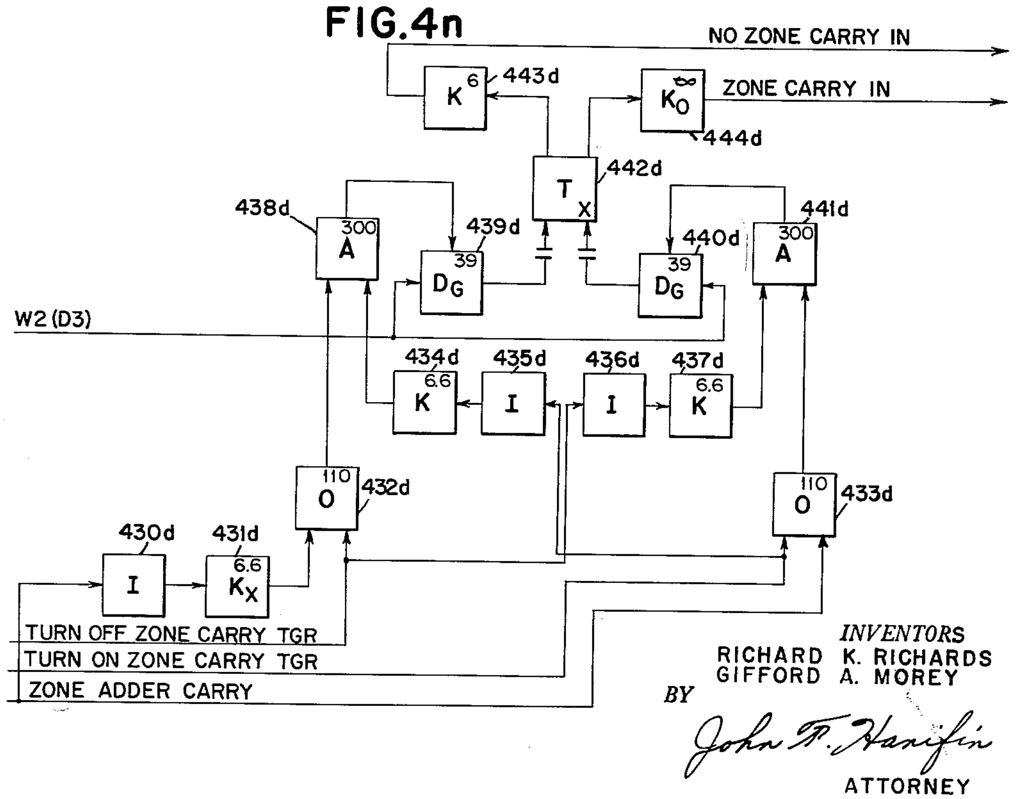
Figure 4J:
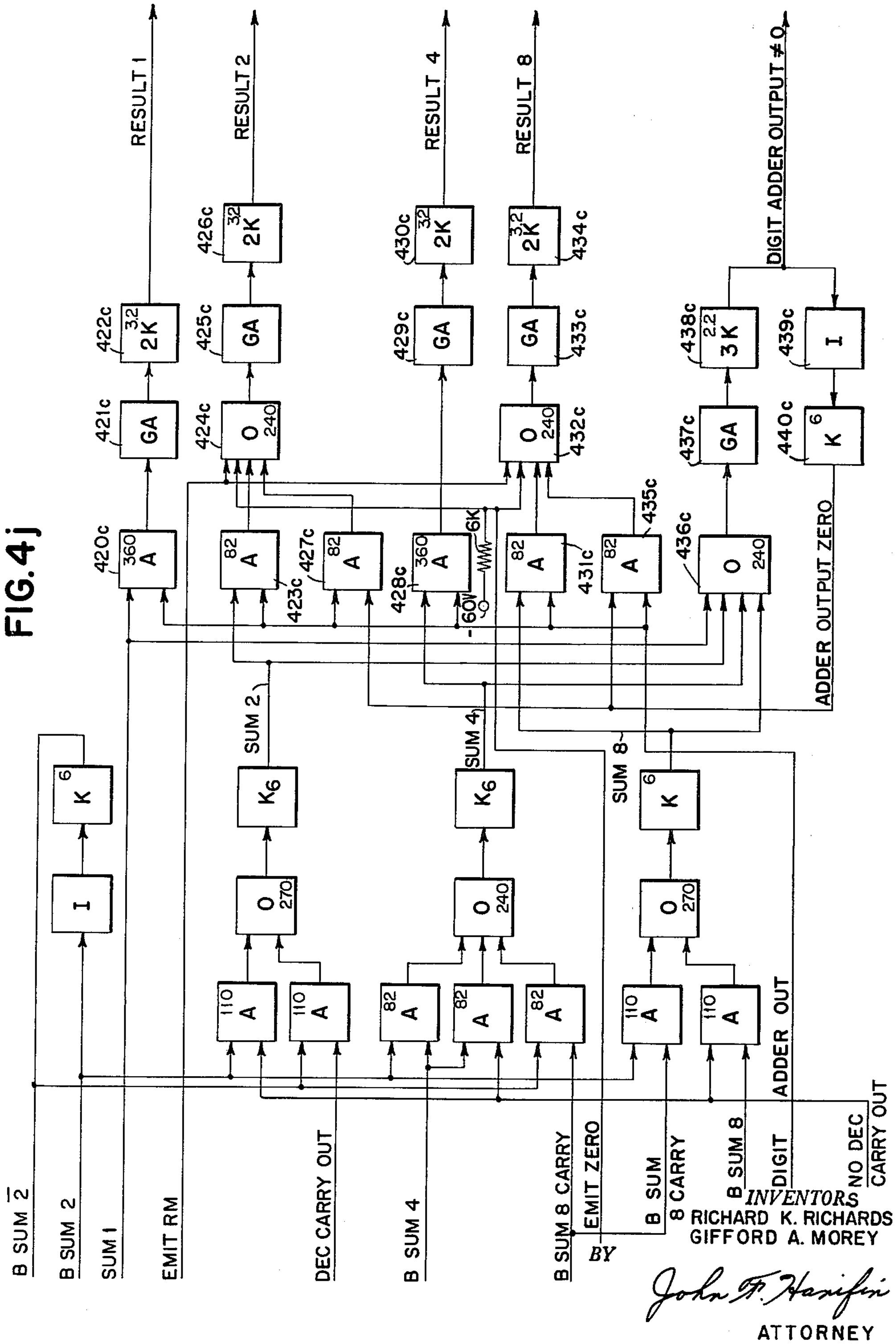

Fig. 4*j* is a block diagram of a Digit Adder Correction and Character Generator circuit.

Figure 4K:
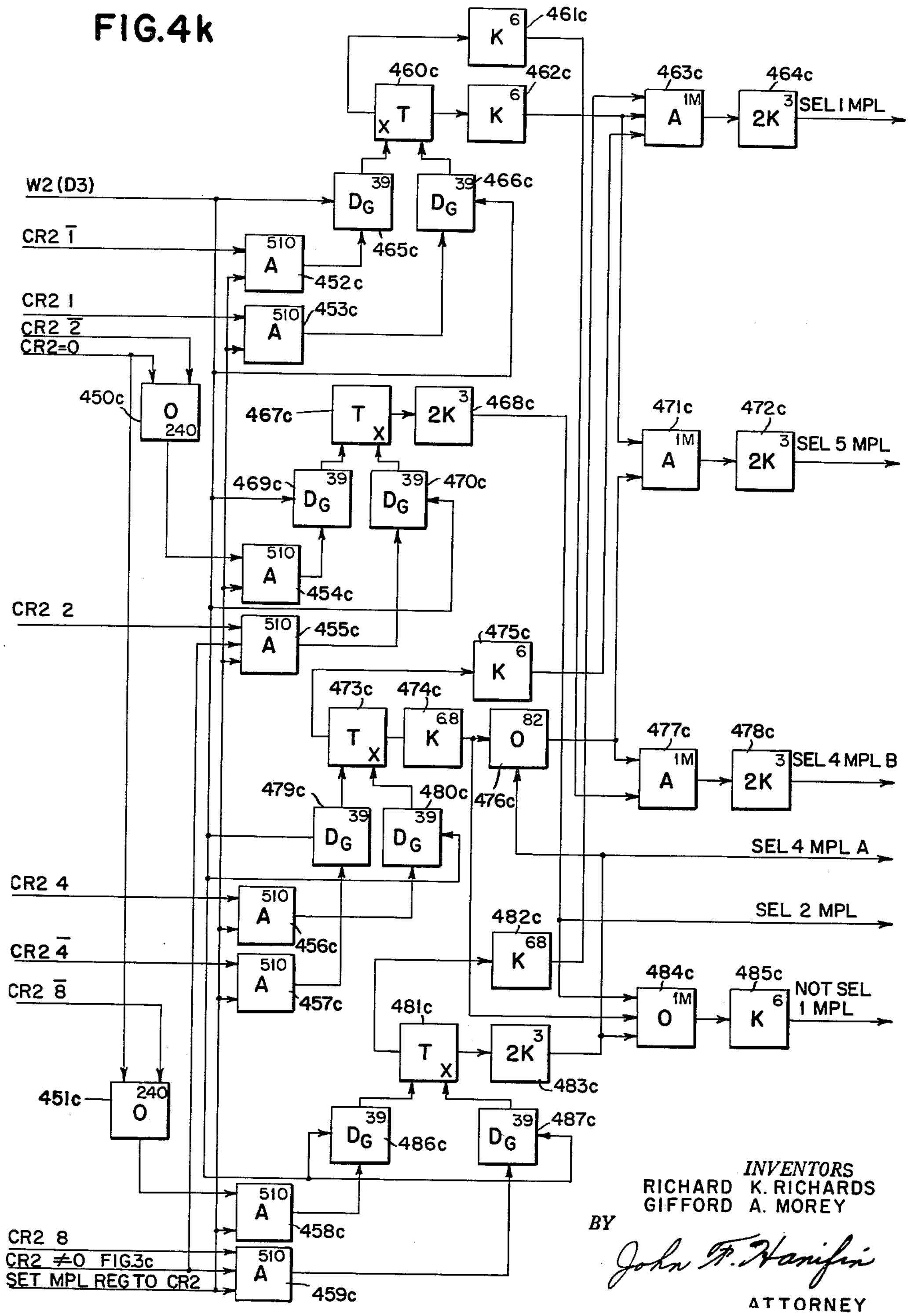

Fig. 4*k* is a block diagram of a Multiple Control circuit.

Figure 4M:
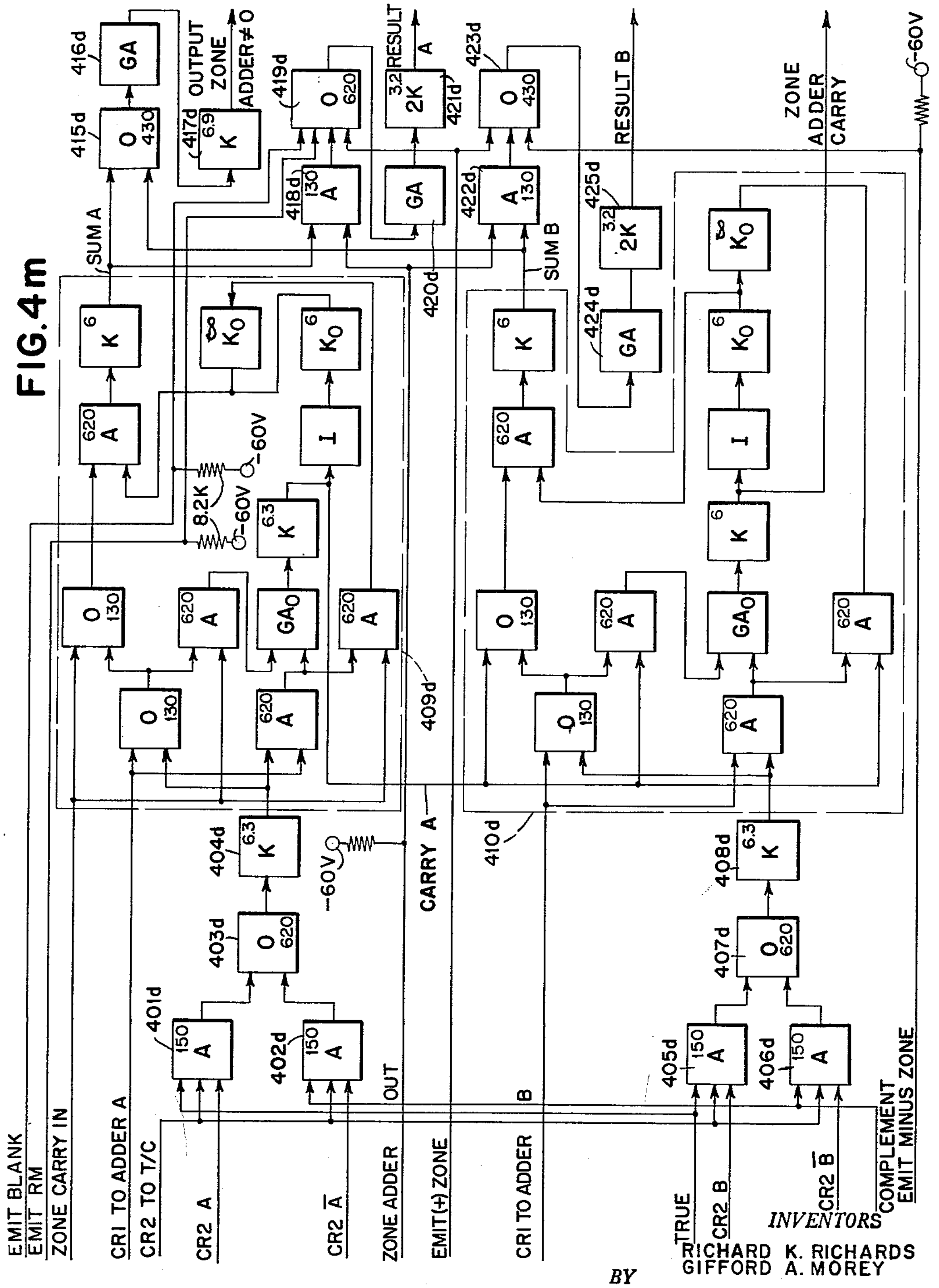

Fig. 4*m* is a block diagram of a Zone Adder and Character Generator.

Fig. 4*n* is a block diagram of a Zone Carry circuit.

Figure 4P:
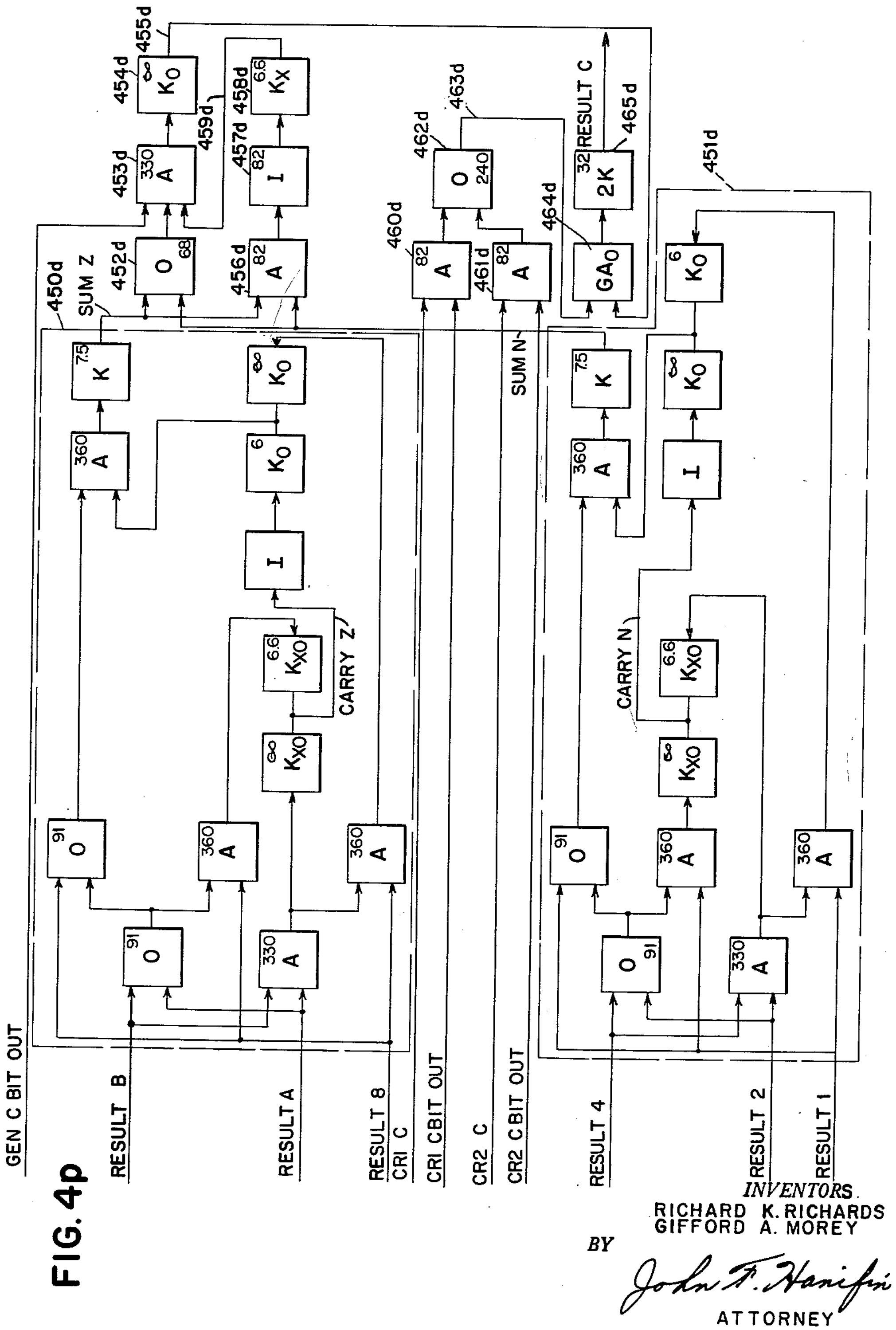

Fig. 4*p* is a block diagram of a Check Bit Generator.

Figure 4S:
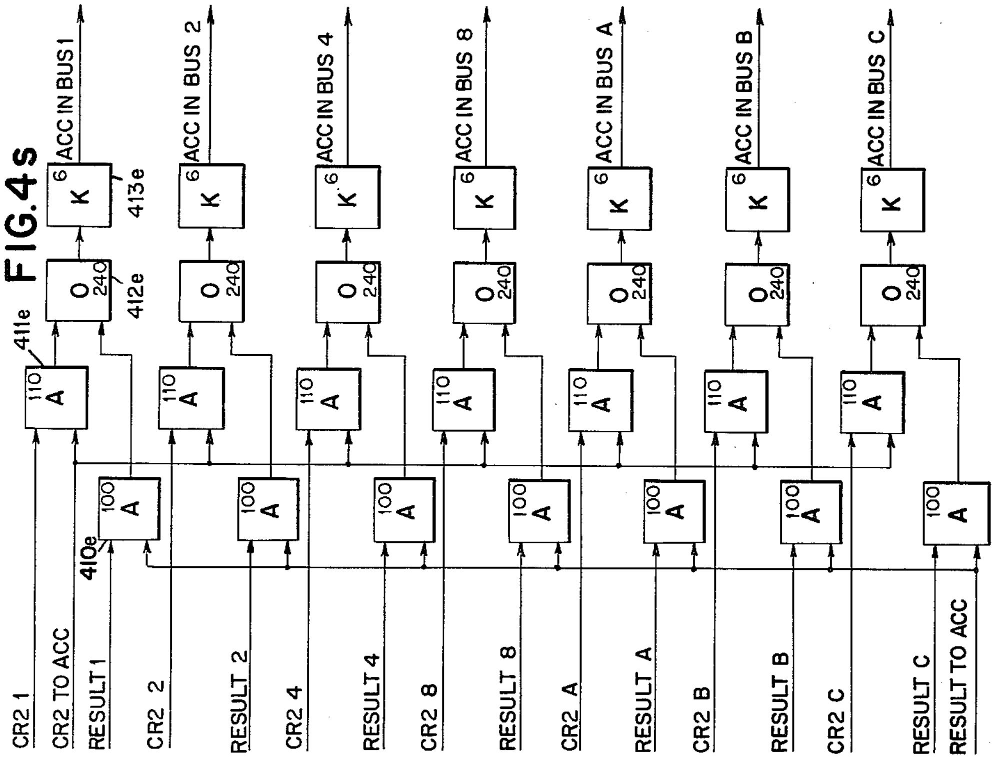
Figure 4R:
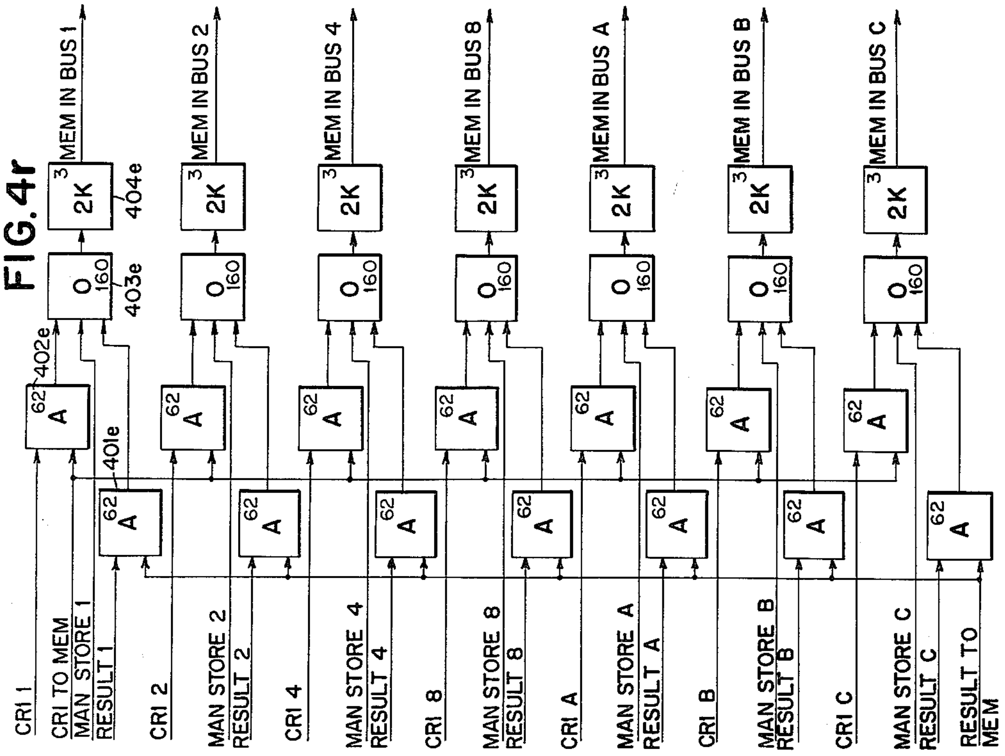

Figs. 4*r* and 4*s* are block diagrams of Output Switches.

Fig. 5*a* is a table showing the representation of various characters in the binary code.

Figure 5B:
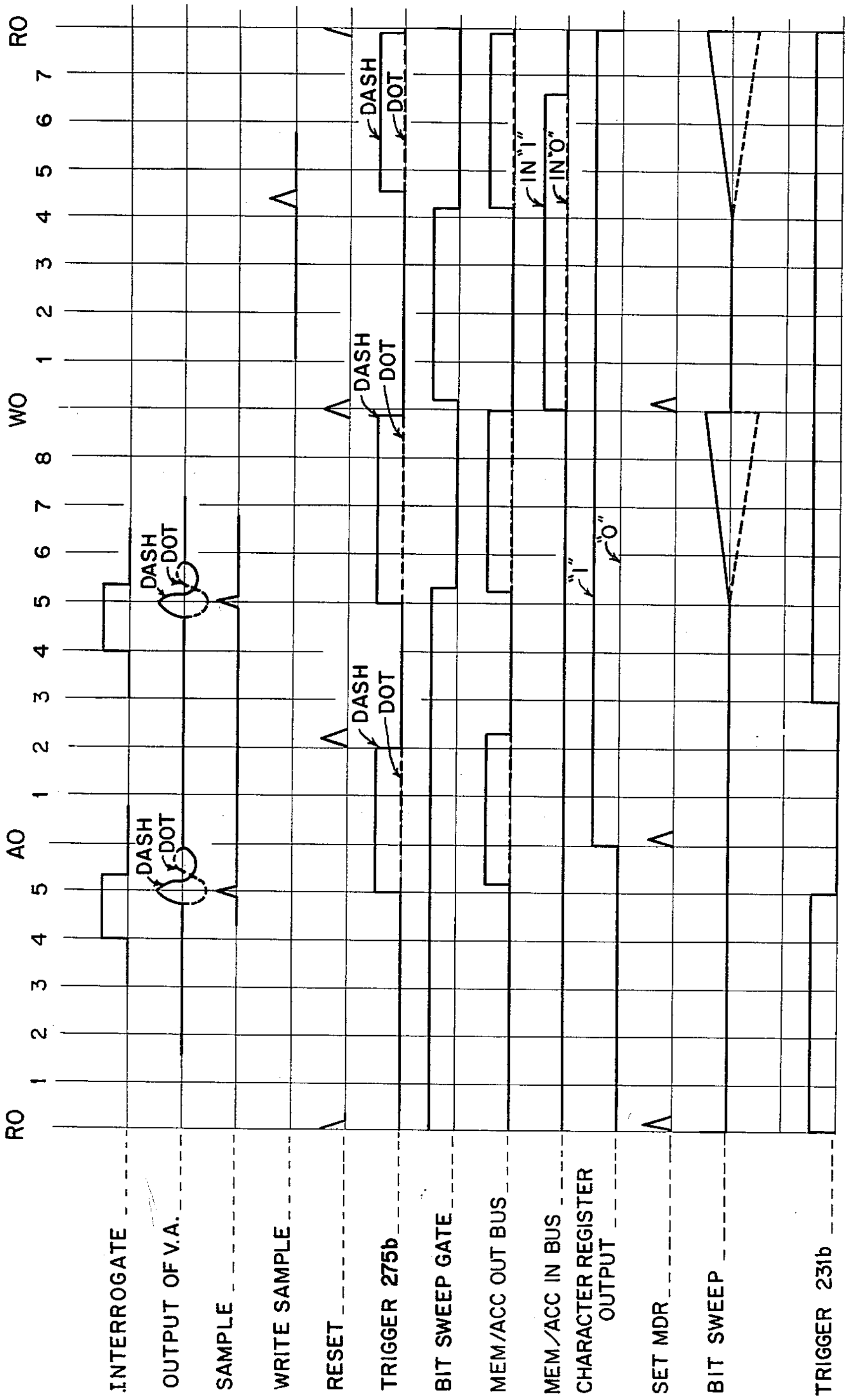

Fig. 5*b* shows a Timing diagram.

Figs. 6*a*, 6*b*, 6*c* and 6*d* show block diagrams of Multiply Routing Control circuits.

Figs. 6*e*, 6*f*, 6*h*, 6*i* and 6*j* show block diagrams of various triggers and their related circuits utilized in control of a Multiply operation.

Figure 6A:
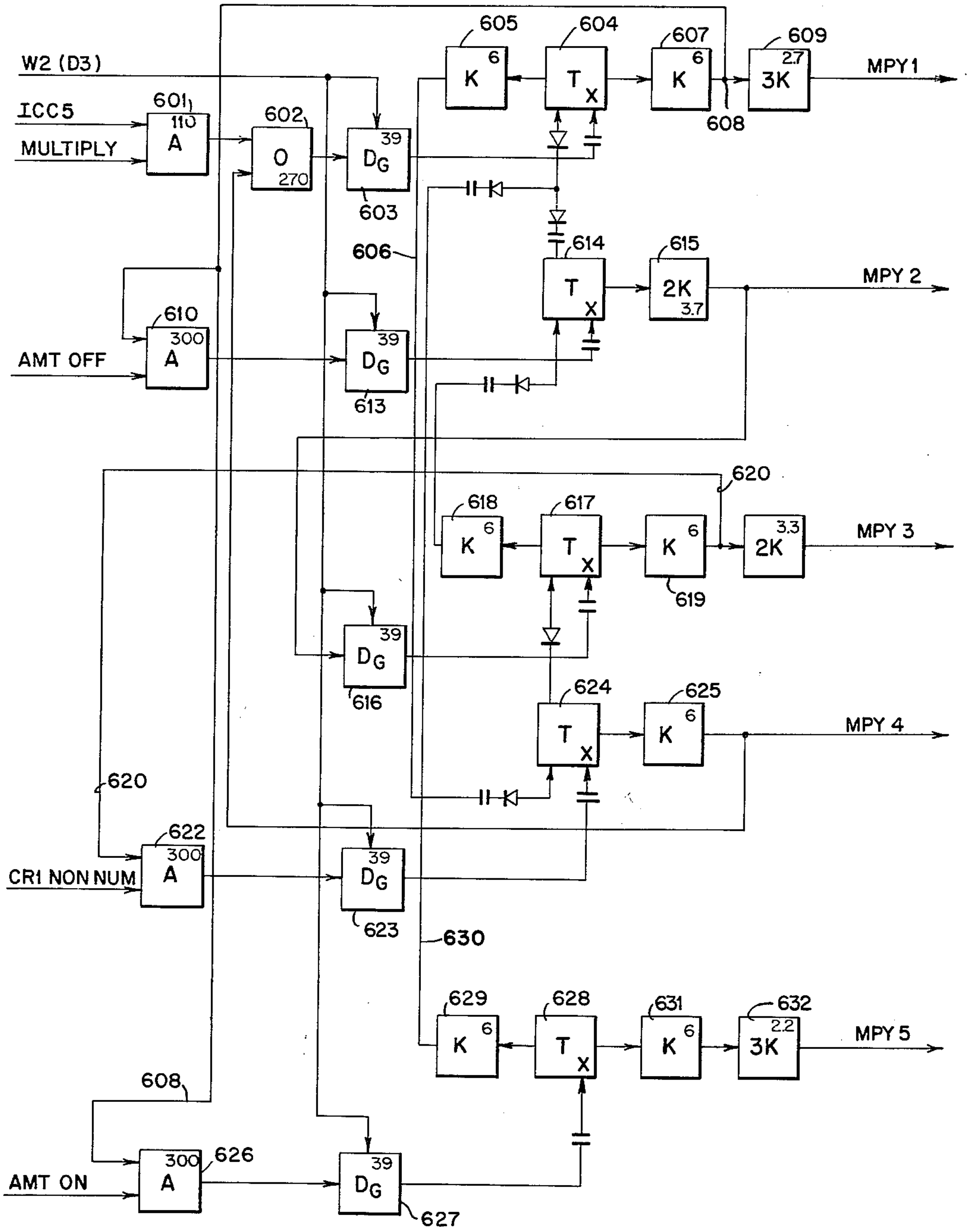
Figure 6B:
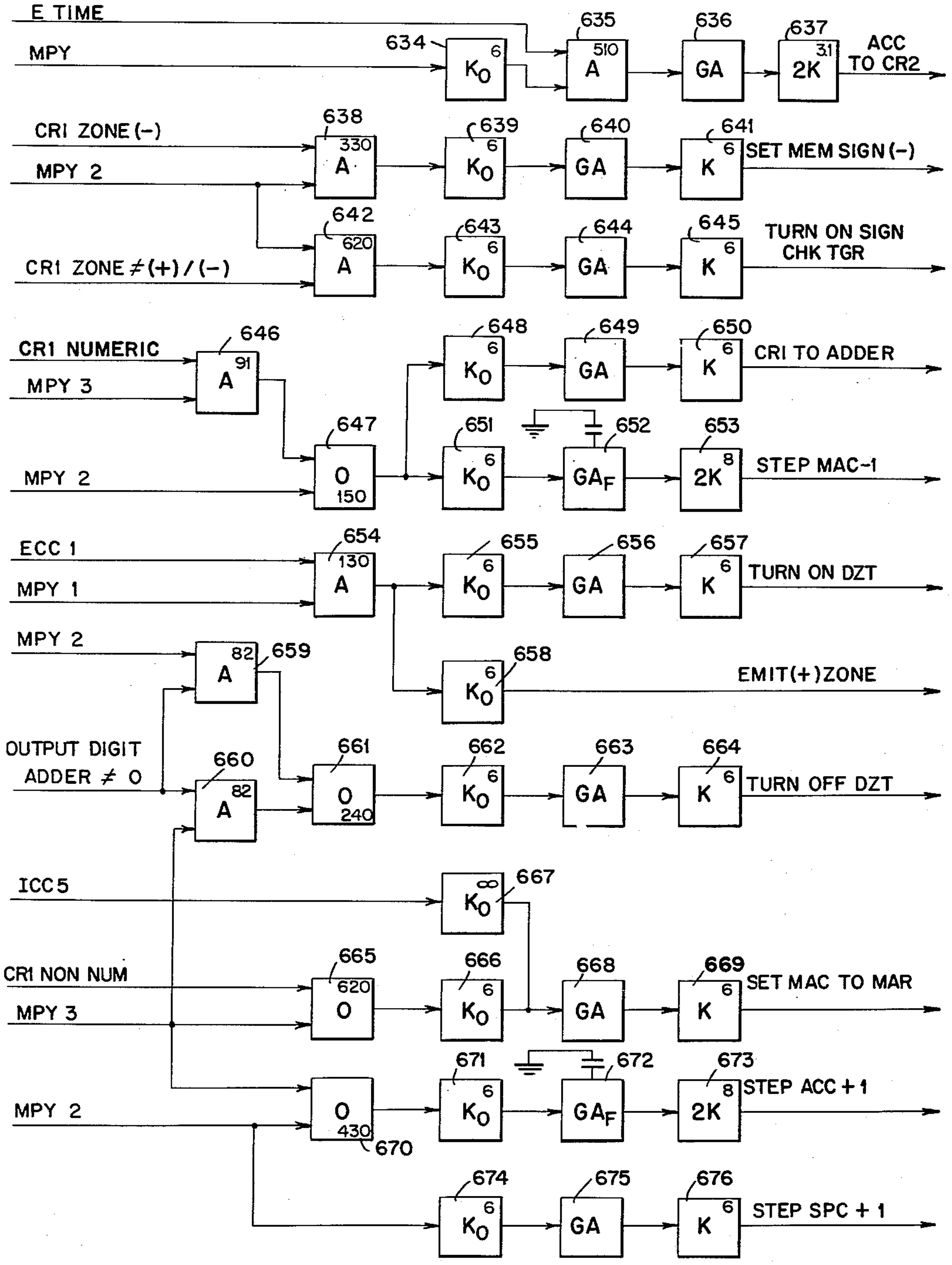
Figure 6C:
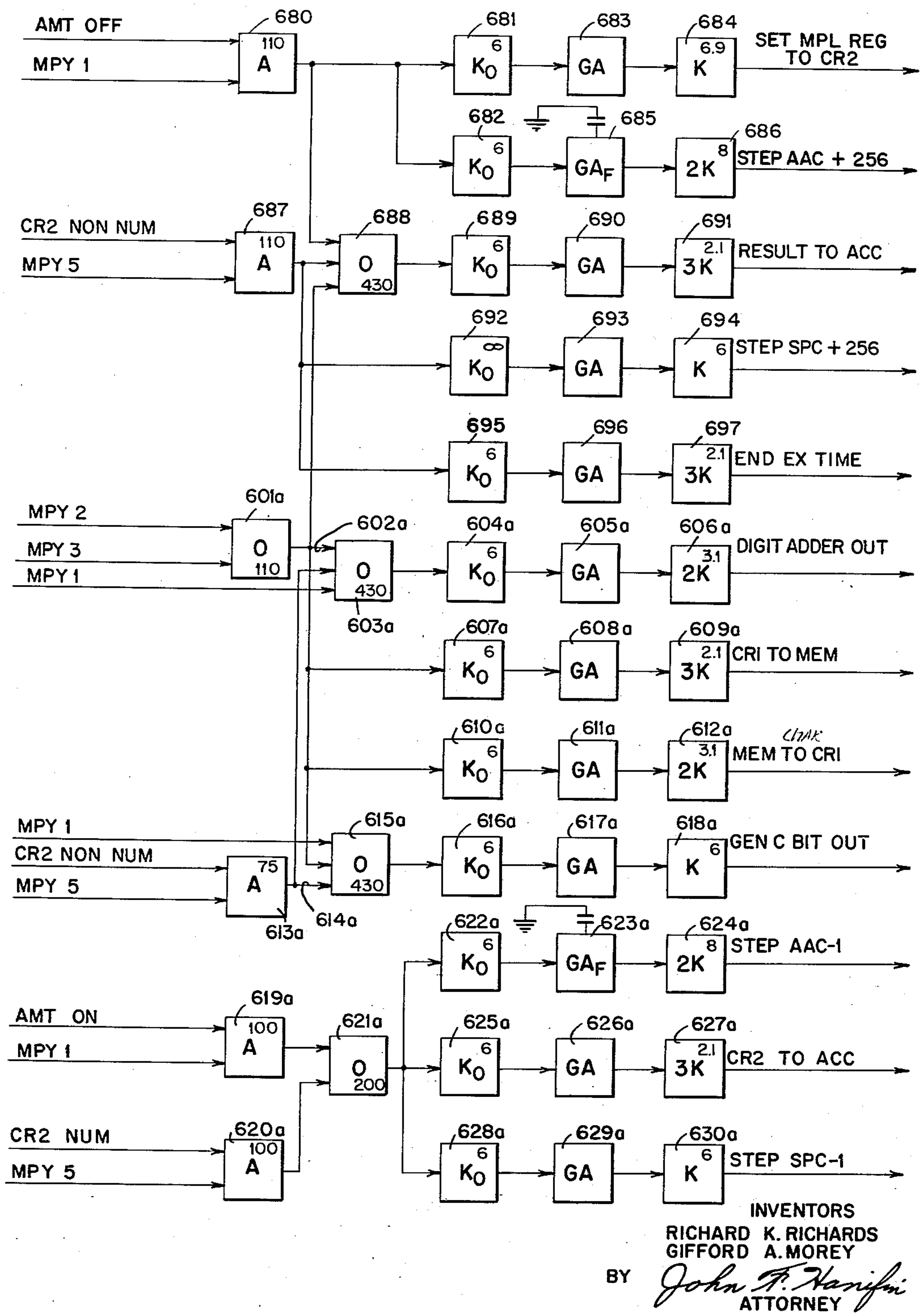
Figures 6D, 6F:
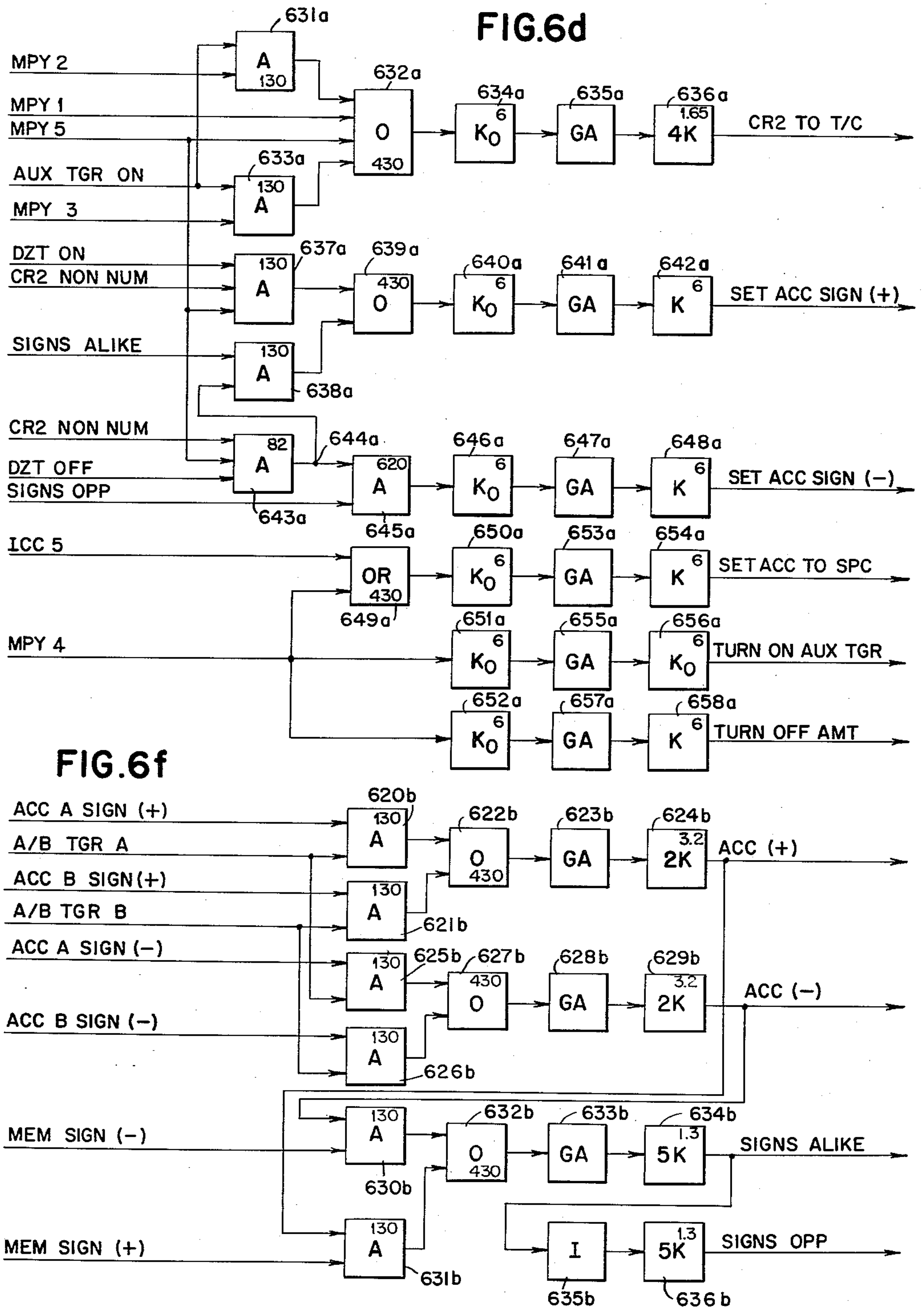
Figure 6E:
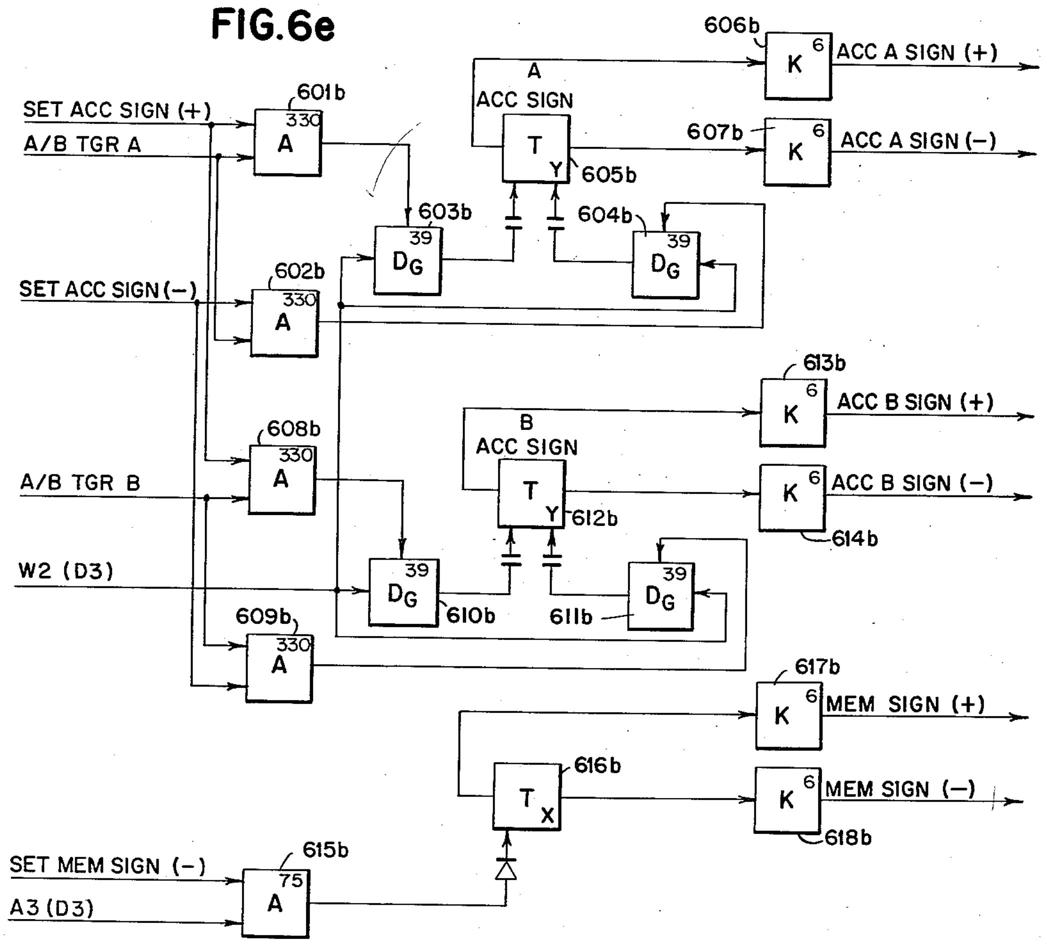
Figure 6G:
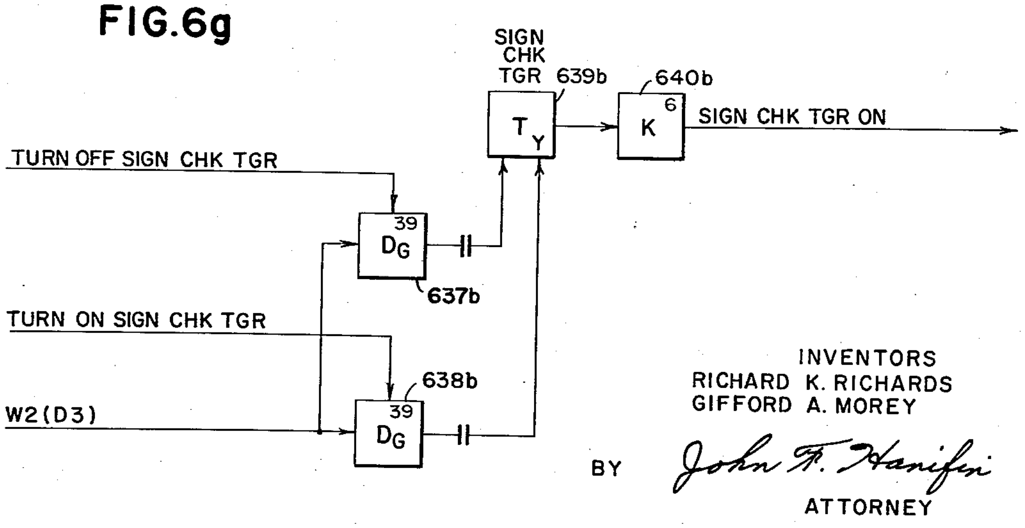
Figure 6H:
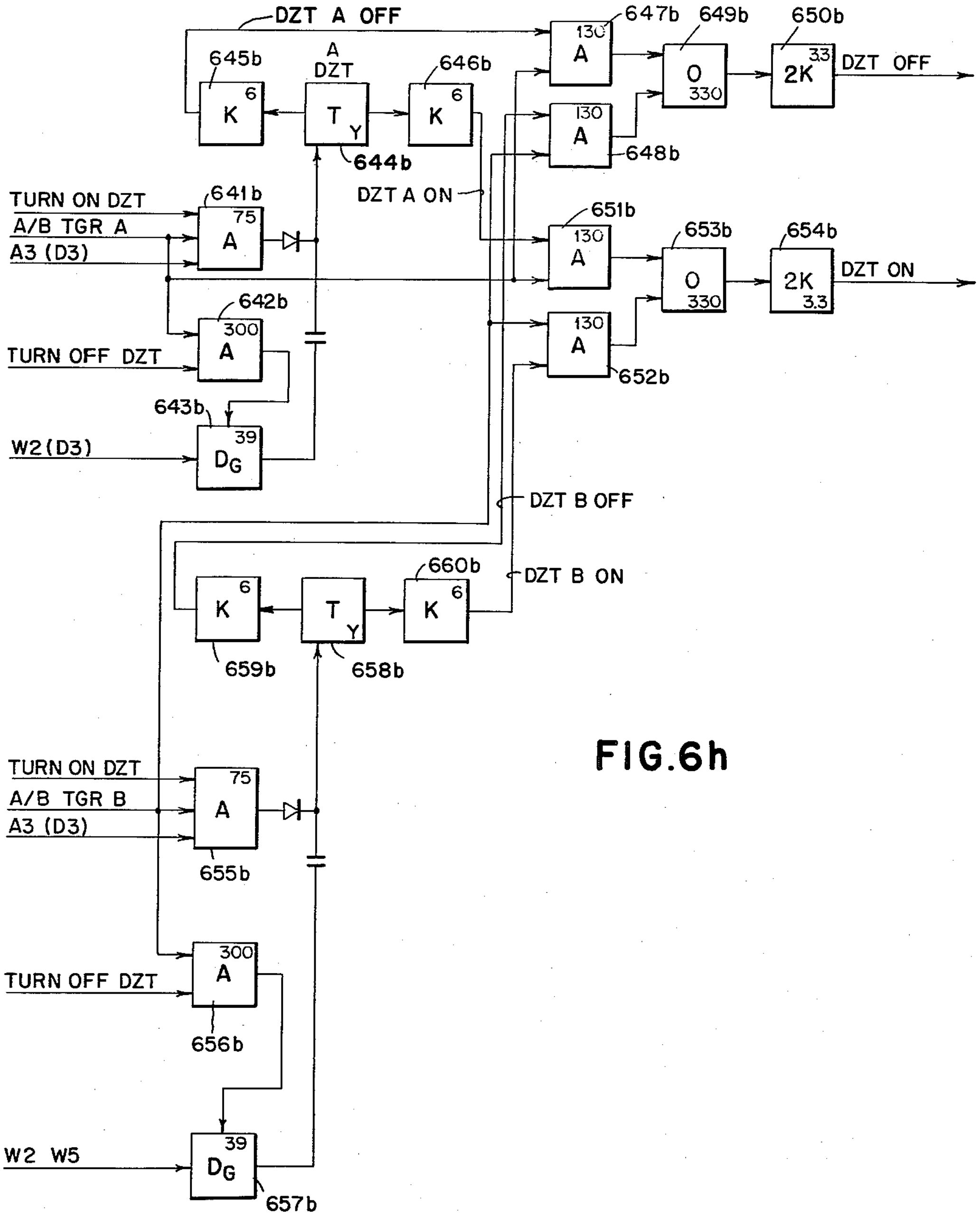
Figure 6I:
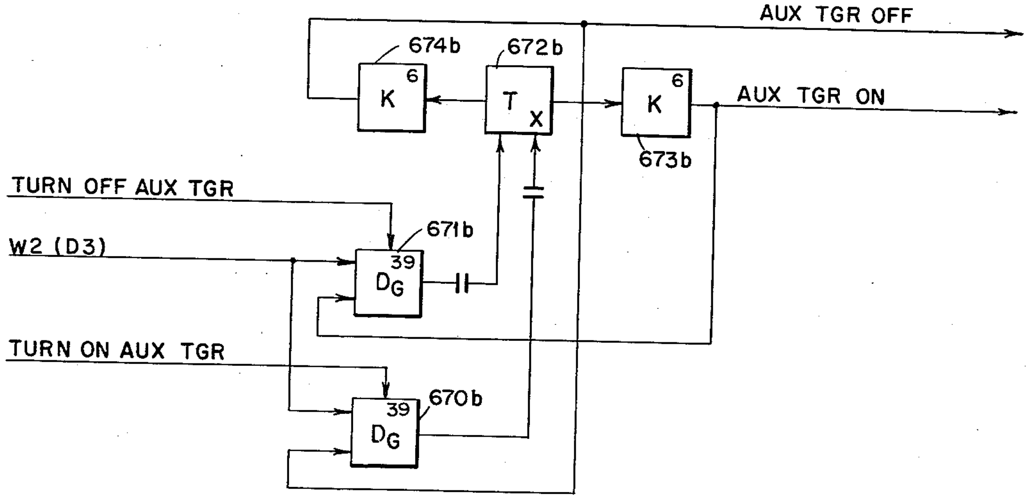
Figure 6J:
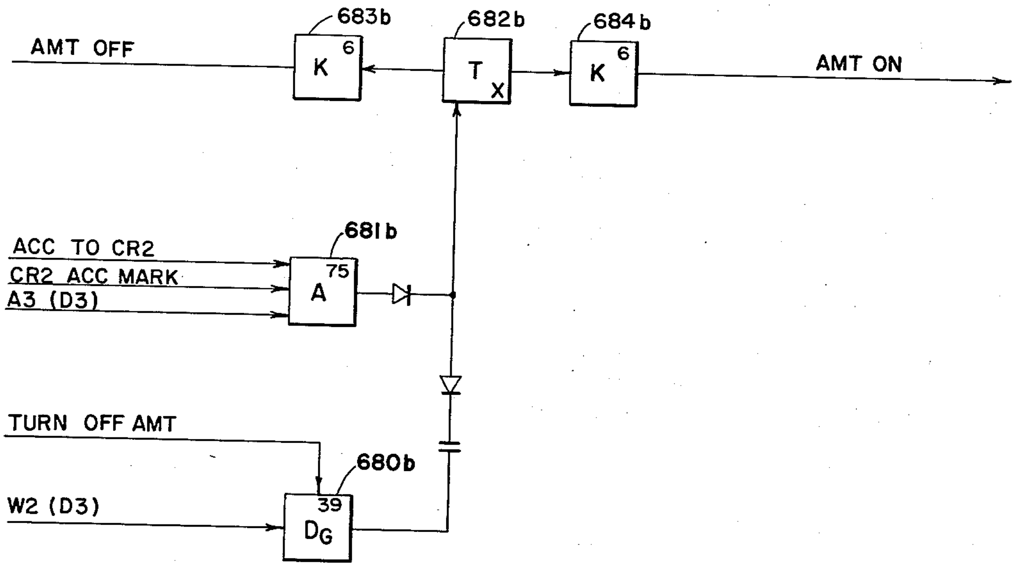
Figure 6K:
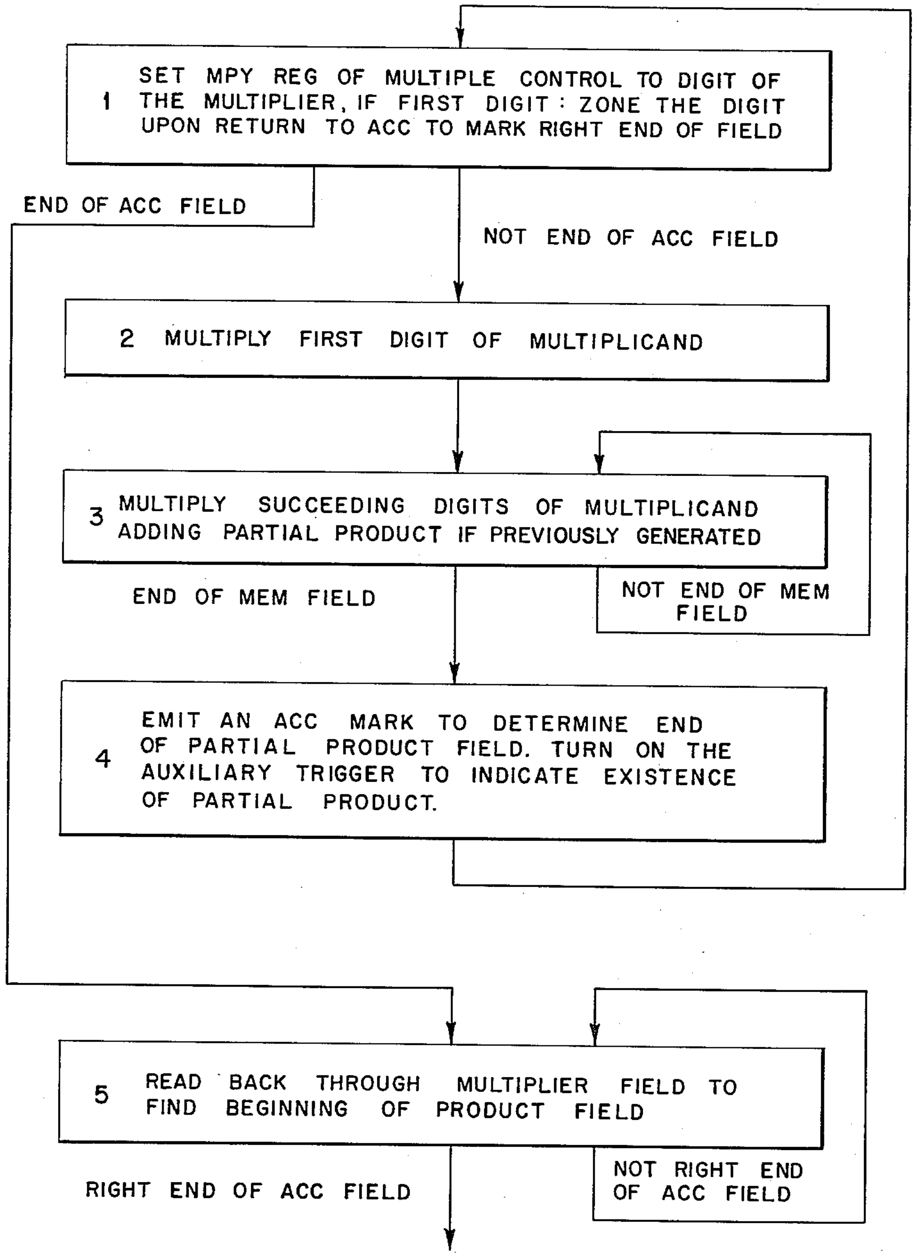

Fig. 6*k* is a flow chart illustrating calculator operation during Multiply.

Figure 7A:
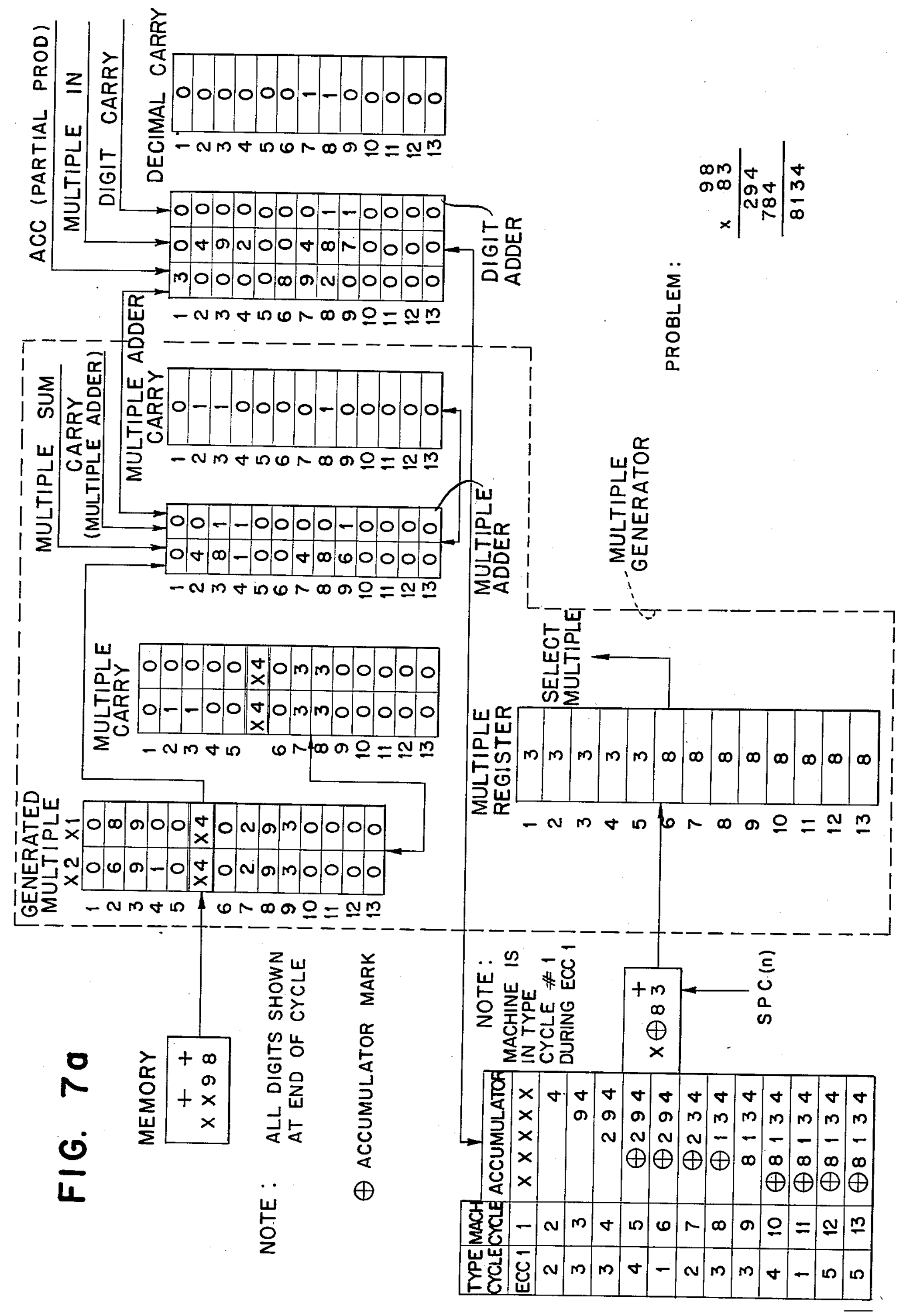

Figs. 7*a* and 7*b* are charts illustrating calculator operation for typical problems.

The basic cycle of the machine is a character cycle which includes a read portion, an add portion, and a write portion. A read portion is the time required to read a character from Memory and/or Accumulator Storage into a Character Register; an add portion is the time required to process a character or characters through the arithmetic circuits, such as the addition of two characters; a write portion is the time required to write or store a character or characters in Memory and/or Accumulator Storage. The basic cycle is illustrated in Fig. 5*b* wherein each division is of one microsecond duration. The period from RO to AO time is six microseconds, from AO to WO is 9 microseconds and from WO to RO, completing the cycle, is 8 microseconds. Thus the total character cycle is twenty-three microseconds. The subdivisions other than RO, AO and WO are referred to as R1, R2, R3, A1, A2, etc. Further a pulse described as A2(D3) refers to a pulse starting at A2 time and having three microseconds' duration.

The apparatus of the invention has the ability to observe stored program, in sequence, to determine the particular Instruction to be carried out, to determine the address of the data, in Memory, to be processed, and then execute the particular Instruction in a logical manner. The stored program mentioned above contains five characters per Instruction and will contain as many Instructions as necessary. The Instruction period of the machine consists of five machine cycles during which the five characters of the Instruction are read out of Memory. The five characters consist of four characters of address and one character of an operation part. The units digit of the address is read during the first instruction character cycle ICC1, while the tens, hundreds, and thousands digits are read during succeeding character cycles. During the fifth character cycle, or ICC5, the character assigned to represent the particular operation to be performed is read from Memory. Upon completion of read out of an Instruction, the apparatus will proceed to Execution time which consists of an indefinite number of machine cycles, the number depending upon the length of the particular value being processed and the particular Instruction being executed.

At times, special character cycles are performed solely for the purpose of regenerating the information in Memory and Accumulator storage. Memory consists of a number of cathode ray tubes in which information is stored in an array of areas on the screens of the various tubes, each tube being capable of storing 1000 bits. Each character, comprised of seven bits, whether alphabetical, numerical, or special, is represented by a combination of seven charges located in the same relative position on the screen of each of seven tubes. While any number of cathode ray tubes may be provided, in the particular embodiment of the invention which is to be described, 70 cathode ray tubes are used in Memory, so that the maximum storage capacity is 10,000 characters. Even though it consists of several tubes Memory acts as a single block of storage having locations numbered continuously from 0000 to 9999, with each location being capable of storing a single seven bit character.

Accumulator storage, as mentioned above, is also comprised of electrostatic storage tubes and is furnished with two independent Accumulator storage units, Accumulator storage A and Accumulator storage B, each having a capacity of 512 characters. As is the case of Memory the bits of a character stored, are entered in corresponding areas of the screen of each of seven cathode ray tubes. The function of the Accumulator Storage is to temporarily store a portion of the information being processed. Operations may then be performed on the contents of the Accumulator storage without altering the original field or fields which remain in Memory. These operations are not performed in the Accumulator storage, per se, but are executed in the Arithmetic unit. In the case of an Arithmetic operation, the Accumulator storage contains one of the two words to be used in the calculation, while the other word is in Memory. After the operation is performed, the result is usually stored in the Accumulator storage.

Referring to the composite of Figs. 1*a* through 1*f*, information is read out of Memory into Character Register 1 while information may be simultaneously read out of the Accumulator storage into Character Register 2. Each Character Register is combined with Character Recognition circuits, which recognize the presence of certain characters, or classes of characters, in their respective Character Registers. Further, a check for accuracy of information transfer is made each time a character is entered in a Character Register. This particular check is accomplished by Code Check circuits. The coding of each character read into the Character Register, as mentioned above, requires an even number of binary 1's in the 7 bits comprising the character.

Output signals of Character Register 1 are emitted to the Memory Address circuits for the purpose of addressing Memory; to the Arithmetic Input Switching circuits for transmission into the Arithmetic circuits; and to the Output Switch to Memory circuits for gating of the character back into Memory. The outputs of Character Register 2 feed to the Arithmetic Input Switching circuits for transmission to the Arithmetic circuits; to the Multiple Control circuits for selecting a proper multiple in the Multiple Selection circuits (described below); and also to the Output Switch to Accumulator circuits for restoring the character in Accumulator storage.

The Arithmetic Input Switching circuits are effective to gate the numeric portion of either the character in Character Register 1 or the character in Character Register 2 via the True Complement control circuits to the Digit Adder; the character in Character Register 1 directly to the Multiple Selection circuits and also to the Doubler, Quadrupler and Quintupler circuits; and the A and B bits of the character in Character Register 1 to the Zone Adder and Character Generator. The Doubler, Quadrupler and Quintupler circuits are effective to double, quadruple and quintuple the value of the input characters and the outputs are fed to the Multiple Selection circuits. Thus, the Multiple Selection circuits receive inputs of 1, 2, 4 and 5 times the values of the character in Character Register 1 as gated via the Arithmetic Input Switching circuits. The Multiple Selection circuits under control of signals from the Multiple Control circuits selects the proper multiples for gating to the Multiple Adder circuits. Frequently, however, only the single multiple of the input value is gated. During a Multiply operation, however, the 2, 4 and/or 5 multiples may be gated to the Multiple Adder where the selected multiples are added or combined. The sum output of the Multiple Adder, to be in binary coded decimal form, may require correction which is provided by the Multiple Adder Correction circuits, whose output, in turn, is emitted to the Digit Adder. The Digit Adder combines the values received via the True Complement Control circuits and the Multiple Adder Correction circuits to provide a binary coded decimal sum. This sum may also require correction, the correction being by the Digit Adder Correction and Character Generator circuits and the Decimal Carry circuits. The output of the Digit Adder Correction circuits, that is the corrected sum, is fed to the Output Switch to Memory circuits; to the Output Switch o Accumulaor circuits; and to the Check Bit Generator circuits. Thus, the corrected sum output from the Digit Adder may be gated by the Output Switches to Memory or to the Accumulator. While addition or multiplication of the numeric portion of the characters is accomplished in the circuits, just described, the Zone bits, A and B, may also be added. This addition takes place in the Zone Adder and Character Generator circuits in combination with the Zone Carry Trigger and the result of this addition is fed to the Check Bit Generator circuits. By combination of various inputs to the Check Bit Generator circuits, a new parity bit, that is a C bit, may be generated. This C bit is gated to the Output Switch to Memory circuits and to the Output Switch to Accumulator circuits. Thus the result of the Arithmetic operation may be gated to either Memory or Accumulator storage together with a newly generated and correct C bit.

BLOCK SYMBOLS

The schematic equivalents of the block symbols which are hereinafter employed to simplify the detailed description of the logical block diagrams of the invention are shown in Figs. 1*h* to 1*ac*. For convenient reference, all positive and negative supply sources are identified by a number corresponding to their potential, for example, a supply terminal labeled 140, indicates a 140 volt supply source. Further, where the terms positive and/or negative potentials, or shift of potentials are used, the terms refer to relative values, rather than values with respect to ground. Also for convenient reference inputs and outputs of the various blocks are represented by arrowheads, pointing toward the block for an input, and away from the block for an output. Whenever a prefix number is used within the block symbol, it indicates the number of circuits connected in parallel i.e., 2I indicates two inverters connected in parallel.

INVERTER I

Referring now to Fig. 1*h*, there is illustrated a block symbol of a standard inverter and also the details of the circuit within the block.

An inverter functions to produce an output signal having substantially the same wave shape as the input signal but of oppositely polarity and with no appreciably time difference between the input signal and the output signal.

The inverter may employ, for example, a triode tube, the plate of which is connected via plate circuit resistance to a positive voltage source and the output of which is taken from the plate circuit of the triode. A positive input signal applied to the grid of the triode causes an increased flow of current through the tube and the plate circuit resistance with a resulting negative shift of potential occurring at the plate. Consequently, since the output is taken from the plate circuit of the triode, a negative output signal is produced in response to the positive input signal. Likewise, a negative input signal applied to the grid of the triode causes a decreased flow of current through the tube and the plate circuit resistance with a resulting positive shift of potential at the plate. Consequently, a positive output signal is produced in response to the negative input signal.

A standard inverter, which may comprise half a 6211 tube, as indicated in Fig. 1*h*, has its plate connected via a series circuit, comprising a 250 microhenry inductor, a 3K ohm resistor and a 3.3K ohm resistor, to a +140 volt source. The plate is also connected via a voltage divider network, comprising a 390K ohm resistor and a 430K ohm resistor, to a −130 volt source. Additionally, a compensating 8.2 micro-microfarad capacitor is connected in parallel with the 390K ohm resistor. The triode also includes a grid coupled via a 150 ohm resistor and a current limiting 22K resistor, having a compensating 47 micro-microfarad capacitor connected in parallel therewith, to the input terminal and a cathode connected directly to ground. An output terminal is tapped from the voltage divider network and another output terminal is tapped from the junction of the 3K ohm resistor and the 3.3K ohm resistor in the plate circuit.

The standard inverter is hereinafter represented by a block symbol containing the alphabetic character I. Further, it should be noted that when the resistor of an AND circuit feeding the standard inverter has a value greater than 270K ohms, the 22K resistor and the 47 micro-microfarad capacitor are omitted, since the purpose of the resistor was current limiting and this function is now fulfilled by the input impedance.

TRIGGER T

Referring now to Fig. 1*i*, there is illustrated a block symbol of a standard trigger and also the details of the circuit within the block.

A trigger, commonly known as the Eccles-Jordan trigger, functions as a storage or control device inasmuch as it is a bistable device, that is, one that remains in either one of two stable states until it is forced or triggered by an input signal to assume that other state and each subsequent input signal being effective to turn the trigger to the opposite state.

The trigger may comprise a cross coupled dual triode, that is, the plate of the right-hand tube is resistively coupled via a voltage divider network to the grid of the left-hand tube, while the plate of the left-hand tube is resistively coupled via a voltage divider network, to the grid of the right-hand tube. Therefore, any changes in potential at the plates of the dual triode are coupled to the grids of the opposite tubes. One stable state of the trigger is termed the OFF or RESET state and exists when the right-hand tube is in a conductive state while the left-hand tube is in a non-conductive state. In this state, the plate of the right-hand tube is at a relatively negative potential while the plate of the left-hand tube is at a relatively positive potential. If a negative pulse or negative shift of potential is applied to the grid of the right-hand tube, the right-hand tube is forced or triggered to a non-conductive state with a resulting positive shift of potential occurring at the plate thereof which is coupled via the voltage divider cross coupling to the grid of the left-hand tube so that the left-hand tube is triggered to a conductive state with a resulting negative shift of potential occurring at the plate thereof. This is the other stable state of the trigger and is termed the ON or SET state. The trigger may also be set to the ON state by applying a positive pulse or positive shift of potential to the grid of the non-conducting left-hand tube. This causes the left-hand tube to be triggered to a conductive state with a resulting negative shift of potential occurring at the plate thereof, which is coupled via the voltage divider cross coupling to the grid of the conducting right-hand tube so that the right-hand tube is triggered to a non-conductive state. In a similar manner when the trigger is in the ON state it may be reset back to the OFF state by the application of a negative pulse or a negative shift of potential at the grid of the left-hand tube or a positive pulse or a positive shift of potential at the grid of the right-hand tube. Outputs are tapped from the plate circuit resistance of both tubes and from other voltage divider networks connected to the plates of the dual triode. Consequently, upon setting the trigger to the ON state, positive shifts of potential occur at the outputs associated with the right-hand tube while negative shifts of potential occur at the outputs associated with the left-hand tube and vice versa when the trigger is reset back to the OFF state.

A standard trigger may comprise a dual triode of the 6211 type having each plate connected via a voltage divider network comprising an 82K ohm resistor, a 62K ohm resistor and a 47K ohm resistor, to a −130 volt source. The junction of the 82K ohm resistor and the 62K ohm resistor in each voltage divider network is connected via a 150 ohm resistor to the opposite grids of the dual triode and via clamping diodes to a −12 volt source so that the potential at the grids cannot fall appreciably below −12 volts. Additionally, a 15 micro-microfarad capacitor is connected in parallel with each of the 82K ohm resistors. Also an input terminal is connected to the right-hand junction and another input terminal is connected to the left-hand junction. Each plate of the dual triode is connected via a series circuit, comprising a 750 microhenry inductor, a 3.9K ohm resistor and a 4.3K ohm resistor, to a +140 volt source. An output terminal is tapped from the junction of the 4.3K ohm resistor and the 3.9K ohm resistor associated with the right-hand tube, while a second output terminal is tapped from the junction of the 4.3K ohm resistor and the 3.9K ohm resistor associated with the left-hand tube. Each plate of the dual triode is also connected via a voltage divider network, comprising a 390K ohm resistor and a 470K ohm resistor, to a−130 volt source. An 8.2 microfarad capacitor is connected in parallel with the 390K ohm resistor in each voltage divider network. Also, output terminals are connected to the junction of the 390K ohm resistor and the 470K ohm resistor in each voltage divider network. The plate of the right-hand tube is also connected via a 1 megohm resistor to a neon tube indicator which is caused to glow when the trigger is set to the ON state.

The standard trigger is hereinafter represented by a block symbol diagram containing alphabetic character T.

In the following description, it is stated that various triggers are reset at Instruction time etc. These reset operations comprise breaking the connection from the appropriate grid and the negative 130 volt power supply. Circuits for breaking the connection are not shown but are well understood in the art.

GROUNDED GRID AMPLIFIER GA

Referring now to Fig. 1*j*, there is illustrated a block symbol of a standard grounded grid amplifier and also the details of the circuit within the block.

A grounded grid amplifier functions to amplify and reshape the input signal applied thereto, but when the output signal reaches a predetermined level of potential it remains set at this level regardless of any further positive shift in potential of the input signal.

The grounded grid amplifier may employ, for example, a dual triode, the cathodes of which are interconnected and coupled via cathode circuit resistance to a negative voltage source. The input signal is applied to the grid of the left-hand tube, while the output is taken from a voltage divider network connected to the plate of the right-hand tube. The grid of the right-hand tube is held at a slightly negative potential so that with no input signal applied to the grid of the left-hand tube, the right-hand tube will be in a conductive state while the left-hand tube will be in a non-conductive state. When a positive shift of potential is applied to the input of the grounded grid amplifier, the potential at the grid of the left-hand tube starts to rise, and when the cut off potential is reached, the left-hand tube starts to conduct. Consequently, more current is drawn through the cathode circuit resistance with a resulting positive shift of potential at the interconnected cathodes, which tends to cut off the right-hand tube. The tube characteristics of the dual triode are such that when the positive shift of potential at the input of the grounded grid amplifier reaches a slightly positive potential the right-hand tube is completely cut off and any further rise in potential at the input of the grounded grid amplifier has no effect on the output signal. Thus, the signal at the output of the grounded grid amplifier remains set at a predetermined level until a negative shift of potential is applied to the grounded grid amplifier whereupon a similar operation as described above occurs to cut off the left-hand tube and cause the right-hand tube to conduct.

A standard grounded grid amplifier, which may comprise a dual triode of the 5965 type, as indicated in Fig. 1*j*, has the plate of the right-hand tube connected via a series circuit, comprising a 750 microhenry inductor and a 9K ohm resistor, to a +140 volt source. The plate of the right-hand tube is also connected via a voltage divider network, comprising a 390K ohm resistor and a 430K ohm resistor, to a −130 volt source. Also an 8.2 micro-microfarad capacitor is connected in parallel with the 390K ohm resistor. The grid of the right-hand tube is connected via a 1.5K ohm resistor to ground and via a 30K ohm resistor to a −60 volt source, while the grid of the left-hand tube is connected via a 150 ohm resistor to the input terminal. The cathodes of the dual triode are interconnected and coupled via a 12K ohm resistor to a −130 volt source. An output terminal is connected to the junction of the 390K ohm resistor and the 430K ohm resistor of the voltage divider network.

This grounded grid amplifier is hereinafter represented by a block diagram containing the alphabetic characters $GA_F$. Additionally, it should be noted that when the standard grounded grid amplifier is feeding two successive cathode followers the voltage divider is composed of a 270K ohm resistor and a 560K ohm resistor while the capacitor in parallel with the former resistor has a value of 15 micro-microfarads.

Other grounded grid amplifiers are shown in Figs. 1*k* and 1*m* and, while differing in detail from the circuit of Fig. 1*j*, their operation will be well understood by those skilled in the art.

Fig. 1*n* illustrates a detailed circuit diagram and corresponding block symbol of a video amplifier. This video amplifier is used to amplify a low level signal originating at a pickup plate of a cathode ray tube. The video amplifier comprises six RC coupled stages of video amplification. The circuit has a very short time constant so that it differentiates the voltage pulse received from the pickup plate. Differentiation of the input signal allows the amplifier to recover more quickly when the pulses are passed through it. The amplifier contains a slight amount of cathode regeneration for stability, peaking in the plate circuit, for increased band width, and coupling of the plate supply volage, for less interaction between stages. A 2.5K gain control potentiometer adjusts the bias of the second and third stages.

CATHODE FOLLOWER

Referring now to Fig. 1*p*, there is illustrated a block symbol of a standard cathode follower and also the details of the circuit within the block.

A cathode follower functions to produce an output signal having greater power than the input signal, but of the same polarity and substantially the same wave shape and with no appreciable time delay between the input signal and the output signal.

The cathode follower may employ, for example, a triode tube, the plate of which is directely connected to a positive voltage source and the cathode of which is connected to an output terminal and via cathode circuit resistance to a negative voltage source. A positive signal applied to the grid of the triode causes an increased flow of current through the tube and the cathode circuit resistance. Consequently, due to the increased current flow, a positive shift of potential occurs at the cathode. The potential of the output signal at the output terminal remains substantially the same as that of the input signal but due to the increased current flow, the power of the signal is increased proportionately. Likewise, it is obvious that a negative signal applied to the grid of the triode tube will cause the potential at the cathode to shift relatively negative.

A standard cathode follower, which may comprise half a 5965 tube as indicated in Fig. 1*p* by a solid semicircle and dotted semicircle around the tube elements, has its plate connected to a +140 volt source, a grid connected via a 150 ohm resistor to the input terminal and a cathode connected via cathode circuit resistance, comprising a series connected 91 ohm resistor and a resistor R, to a −60 volt source. The output terminal is connected to the junction of the 91 ohm resistor and the resistor R.

The standard cathode follower is hereinafter represented by a block symbol containing an alphabetic character K. The ohmic value of the resistor R in the standard cathode follower K may vary depending upon circuit requirements. Consequently, all standard cathode followers are distinguished from each other by the ohmic value of the resistor R shown in the block.

Cathode followers $K_E$, $K_s$, $K_X$ and $K_{XO}$ (same as $K_X$) are shown in Figs. 1*q*, 1*r* and 1*s* and operate basically in the same manner as cathode follower K. The changes in the cathode followers are obvious from the respective figures and are well known to those skilled in the art. Consequently, no detailed description of these units is believed necessary.

AND CIRCUIT

Referring to Fig. 1*t*, there is illustrated a block symbol of a standard positive AND circuit and also the details of the circuit within the block.

A positive AND circuit functions to produce a positive output signal only when there is a coincidence of positive signals at all of the input terminals thereof.

The positive AND circuit employs at least two diodes, the cathodes of which are connected to the input terminals thereof, while the anodes of which are connected to the output terminal thereof and via a common resistor R to a positive voltage source. The input terminals are normally biased so that the diodes are in conductive states. It will be remembered that during conduction the resistance of a diode is negligible compared to that of the common resistor R. Consequently, the anodes are at potentials more nearly that of their respective cathodes. If a positive signal is applied to any of the input terminals, the diode to which the signal is applied, is cut off as the cathode is now at a more positive potential than the corresponding anode. However, the remaining diode or diodes are still in a conductive state or states, so that the same amount of current flows through the common resistor R and the potential at the anode of the diode, to which the positive input signal is applied, does not follow the change at the corresponding cathode but remains at relatively the same potential. Therefore, since the output terminal is connected to the anodes of the diodes, no change in potential is effectively passed to the output terminal when a positive signal is applied to less than all of the input terminals. If positive signals are coincidently applied to all of the input terminals, all of the diodes are cut off and the potential at the anodes starts to rise toward that of the positive voltage source connected at the other end of the common resistor R. When the potential reaches a value approximately that at the input terminals, all of the diodes start to conduct, whereupon the potential at the anodes stops rising and is maintained at approximately that at the input terminals. Therefore, since the output terminal is connected to the anodes of the diodes, the rise in potential at the anodes is effectively passed to the output terminal so that the potential at the output terminal is raised to approximately that existing at all of the input terminals. It should be noted at this point that the positive input signals are not necessarily applied simultaneously to the input terminals of the positive AND circuit. Hence, in instances where positive signals are applied to all but one of the input terminals thereof, the circuit is said to be conditioned so that when a positive signal is applied to the remaining input terminal there is a coincidence of positive input signals causing the production of a positive output signal.

A standard positive AND circuit is composed of at least two diodes D1 and D2, the cathode of which are connected to the input terminals, while the anodes of which are connected to the output terminal and via a common resistor R to a +140 volt source.

Referring now to Fig. 1*u*, there is illustrated a block symbol of a standard negative AND circuit and also the details of the circuit within the block.

A negative AND circuit is identical in circuitry to the positive OR circuit but functions to produce a negative output signal only when there is a coincidence of negative signals at all of the input terminals thereof.

The negative AND circuit employs at least two diodes, the anodes of which are connected to the input terminals thereof, while the cathodes of which are connected to the output terminal thereof and via a common resistor R to a negative voltage source. The input terminals are normally biased so that the diodes are in conductive states. Consequently, the cathodes are at potentials more nearly that of their respective anodes. If a negative signal is applied to any of the input terminals the diode to which the signal is applied is cut off as the anode is now at a more negative potential than the corresponding cathode. However, the remaining diode or diodes are still in a conductive state or states so that the same amount of current flows through the common resistor R. Consequently, the potential at the cathode of the diode, to which the negative input signal is applied, does not follow the change at the corresponding anode but remains at relatively the same potential and since the output terminal is connected to the cathodes of the diodes, no change in potential is effectively passed to the output terminal when a negative signal is applied to less than all of the input terminals. If negative signals are coincidently applied to all of the input terminals, all of the diodes are cut off and the potential at the cathodes starts to fall toward that of the negative voltage source connected at the other end of the common resistor R. When the potential reaches the value approximately that at the input terminals, all of the diodes start to conduct whereupon the potential at the cathodes stops falling and is maintained at approximately that at the input terminals. Therefore, since the output terminal is connected to the cathodes of the diodes, the fall in potential at the cathodes is effectively passed to the output terminal so that the potential at the output terminal falls to approximately that existing at all of the input terminals. It should be noted at this point, that the negative input signals are not necessarily applied simultaneously to the input terminals of the negative AND circuit. Hence, in instances where negative signals are applied to all but one of the input terminals thereof, the circuit is said to be conditioned so that when a negative signal is applied to the remaining input terminal, there is a coincidence of negative input signals causing the production of a negative output signal.

A standard negative AND circuit is composed of at least two diodes D3 and D4, the anodes of which are connected to the input terminals, while the cathodes of which are connected to the output terminal and via a common resistor R to a −130 volt source. While only two input terminals have been shown in Figs. 1*t* and 1*u*, it is to be understood that a positive and a negative AND circuit may have any number of input terminals so long as a diode is provided between each input terminal and the output terminal.

The standard positive AND circuit is hereinafter represented by a block symbol containing a character A while the standard negative AND circuit is hereinafter represented by a block symbol containing a minus sign, and a character A. The ohmic value of the common resistor R in an AND circuit may vary depending upon circuit requirements. Consequently, the ohmic value of the common resistor R is indicated in the upper right-hand corner of the block symbols of the positive and negative AND circuits.

OR CIRCUIT

Referring first to Fig. 1*v*, there is illustrated a block symbol of a standard positive OR circuit and also the details of the circuit within the block.

A positive OR circuit functions to isolate two or more positive input signals from each other and to produce a positive output signal in response to a positive input signal at any one or more of the input terminals thereof.

The positive OR circuit employs at least two diodes, the anodes of which are connected to the input terminals thereof, while the cathodes of which are connected to the output terminal thereof and via a common resistor R to a negative voltage source. The input terminals are normally biased so that the diodes are in conductive states. If a positive signal is applied to either or both of the input terminals, the potential at the anode or anodes, to which the input signal or signals are applied, becomes more positive causing an increased flow of current through the common resistor R. Consequently, since during conduction the resistance of a diode is negligible in comparison to that of the common resistor R, the potential at the cathodes, of those diodes to which the positive input signals are applied, follows more nearly that of their respective anodes. Also, since the output terminal is connected to the cathodes of the diodes, the rise in potential at the cathodes is effectively applied to the output terminal so that the potential at the output terminal is raised to approximately that existing at any one or more of the input terminals to which the positive input signals are applied.

A standard positive OR circuit is composed of at least two diodes D4 and D5, the anodes of which are connected to the input terminals, while the cathodes of which are connected to the output terminal and via a common resistor R to a −130 volt source. While only two input terminals have been shown in Fig. 1*v* it is to be understood that a positive OR circuit may have any number of input terminals so long as a diode is provided between each input terminal and the output terminal.

The standard positive OR circuit is hereinafter represented by a block symbol containing an alphabetic character O. The ohmic value of the common resistor R may vary depending upon circuit requirements. Consequently, the ohmic value of the common resistor R is indicated in the block symbol.

DIODE GATE

Referring now to Fig. 1*w*, there is illustrated a block symbol of a standard diode gate and also the details of the circuit within the block.

A diode gate, if properly conditioned, functions to produce a sharp negative output pulse or spike in response to a negative shift of potential.

The diode gate is composed of a diode, the cathode of which is connected to the input terminal thereof, while the anode of which is connected via a capacitor to the output terminal thereof and via a resistor R to a supply terminal thereof. The supply and input terminals are normally biased so that the diode is cut off and the output terminal is at a potential determined by the circuit to which it is connected. If a positive pulse is applied to the input terminal, the potential at the cathode is driven more positive thereby maintaining the diode in a cut off condition. If a positive signal is applied to the supply terminal, the potential at the anode is raised to a more positive value causing the diode to conduct and the gate is said to be conditioned. Now, if a positive pulse is applied to the input terminal, the positive shift of potential at the leading edge of the pulse raises the potential at the cathode to a more positive potential than that existing at the anode and the diode is cut off. The potential at the anode then rises exponentially to approximately that value existing at the input terminal, whereupon the diode again conducts and the potential at the anode stops rising and is maintained at the value existing at the input terminal. When the negative shift of potential at the trailing edge of the positive input pulse appears at the input terminal, it instantaneously appears at the anode of the diode as the resistance across a conducting diode is negligible. Further, since the potential across a capacitor cannot change instantaneously, the potential at the output terminal has the same instantaneous negative shift of potential and then rises rapidly to its quiescent state. Thus, it is apparent that if the diode gate is properly conditioned, it will generate a sharp negative pulse or spike in response to a negative shift in potential.

A standard diode gate is composed of a diode D6, the cathode of which is connected to the input terminal and the anode of which is connected via a 15 micro-microfarad capacitor to the output terminal and via the resistor R to the supply terminal.

The standard diode gate is hereinafter represented by a block symbol containing the alphabetic characters DG. The value of the resistor R is indicated in the upper right-hand corner of the block symbol.

Referring now to Fig. 1*x*, there is illustrated a block symbol of another type of diode gate and also the details of the circuit within the block.

BIT SWEEP GENERATOR

A Bit Sweep Generator circuit is shown in Fig. 1*y*. Each half of this circuit is identical to the other half. The input to this circuit is negative in nature and prior to the arrival of the negative signal the triode is conducting. Thus the potential of the cathode is relatively positive. As the negative signal is applied, the triode is cut off and the potential of the cathode tends to go negative. However, the 470 micro-microfarad condenser has a positive charge and starts discharging through the 100K cathode resistor to the negative 150 volt supply. This discharging action produces a saw-tooth voltage waveform.

The diode switch of Fig. 1*z* is merely a diode tube which, as well understood by those skilled in the art, conducts in one direction only.

MEMORY SWITCH

The Memory Switch shown in Fig. 1*aa* is comprised of two triodes having separate inputs and outputs and a common cathode resistor. As used in the Memory circuits, only one input is positive at a time, hence only one triode is conducting. The plate supply is from circuits external to the Memory Switch but the amount of current which flows through the conducting triode is determined by the value of the cathode resistor. This circuit is used in the Deflection circuits described below.

DIFFERENTIAL AMPLIFIER

Referring to Fig. 1*ab* a Differential Amplifier is shown which is comprised of two triodes having separate inputs, separate outputs and a common cathode circuit. As used in the Deflection circuits of Memory, as explained below, a negative saw-tooth voltage waveform is applied to one grid while the opposite grid is held at ground potential. Thus both triodes are conducting simultaneously. Assuming the negative saw-tooth signal is applied to the left grid, it causes the left triode to conduct less so that the output at the left plate is a positive saw-tooth voltage. As the left triode conducts less, the cathode potential goes negative and thus conduction in the right triode, whose grid is held at ground, increases. Therefore, the output from the right plate is a negative saw-tooth voltage. Therefore, push pull saw-tooth waveforms are available at the outputs. A reversal of inputs causes a reversal in the outputs.

THE MEMORY AND ACCUMULATOR

As mentioned above, the apparatus of the present invention utilizes a system of storage including cathode ray tube storage elements basically similar to those shown and described in the above identified application of Rochester et al. and also the application of Fox et al., Serial No. 417,702, filed March 22, 1954, on Electronic Data Processing Machines, granted as U.S. Patent No. 2,950,465 on August 23, 1960. As disclosed in the above mentioned applications, the data is stored by selectively producing two different states of charge on the screen of cathode ray tubes; the cathode ray beams impinging at high speed upon a selected area or address of the screen.

As mentioned above, cathode ray high speed Memory stores not only the data being processed, but also the program, that is, the operating Instructions of the machine. The Instructions, which comprise the program, must be coded in a language which the apparatus understands. The program consists of groups of five characters, alphabetic and numeric, each character having 7 bits, making up Instructions. The first four characters are digits, which comprise the address part of the Instruction and indicate the Memory address of information which is to be processed. The fifth character of the Instruction is the operation part which designates the particular operation to be performed such as Add, Subtract, Multiply, etc. Thus, each Instruction requires 5 characters, that is, an operation character and 4 digits comprising the address part. The time during which Instructions are read from Memory, are referred to as Instruction character cycles, each character requiring a complete character cycle. The particular cycles taking place during Instruction time, are abbreviated ICC1 through ICC5 signifying Instruction Character Cycle 1 through Instruction Character Cycle 5.

After an Instruction is read out of Memory, the apparatus will, of course, proceed to execute the particular operation designated by the Instruction. This part of the machine time is referred to as Execution time and is made up of Execution Character cycles. As mentioned above, there is no set number of such cycles because the number varies with the particular operation called for and the length of the words or fields being processed. In addition to the regular routine, regeneration of the cathode ray tube storage must be provided and this is provided during the add portion of the character cycle and at other times when the machine is in standby operation.

Reference is made to the composite drawing of Figs. 2*a*, 2*b* and 2*c* arranged as shown in Fig. 2. The general manner in which Memory operates will now be briefly described.

Memory consists of 70 cathode ray tubes in which information is stored on the screens of the tubes, each tube screen being capable of storing 1000 bits. It should be understood, however, that any number of cathode ray tubes can be utilized as Memory. Even though it consists of several tubes, Memory acts as a single block of storage having addresses numbered continuously from 0000 to 9999 with each address being capable of storing a single 7 bit character. The 70 cathode ray tubes, which make up Memory, are divided into 35 pairs, the two tubes of each pair being referred to respectively as the left tube and the right tube. The same deflection potentials are applied to all 70 tubes in Memory so that if the electron beams were turned on simultaneously in all tubes, all electron beams would strike or impinge on corresponding areas of each tube. However, in the normal operation only seven tubes are simultaneously unblanked, that is, have their electron beams turned on at one time. The 35 pairs of cathode ray tubes are divided into five groups of seven pairs each. Each pair of one group of cathode ray tubes is indicated in Fig. 2*a* by a "Storage Unit" block. Only one group of seven storage units out of the five groups is shown. Any particular group is selected by outputs of the Selector circuits, which circuits are conditioned by the 2, 4 and 8 bits of the thousands order of address and also by outputs of the Condition Memory Control circuits. The same Selector circuits also determine whether the left or right tubes of the selected group are to be unblanked. The Condition Memory Control circuits are controlled by the 1 bit of the low order or units order of the address. The Memory Deflection circuits comprise current increment adders producing currents, which are the sum of the increments. The produced current sums, in turn, generate potentials which are applied to the Deflection plates of all cathode ray tubes in Memory. The Memory Deflection circuits are controlled by the 2, 4 and 8 bits of the units order of the address, all bits of the tens and hundreds orders and the 1 bit of the thousands order.

The Memory Deflection Register is a 16 stage trigger register representing four binary coded decimal digits. It holds at all times the address at which a word is to be read out or stored in Memory. This register functions as a buffer between the Memory Deflection and Selector circuits, and the Memory Address Counter or the Memory Regeneration Counter. During the Read and Write portions of a Use character cycle, that is, an Instruction or Execution Character cycle when information is being read out of or into Memory for utilization by the apparatus, the Memory Deflection Register receives an address from the Memory Address Counter. During the Add portion of the Use cycles and during other times when Regeneration may take place, the Memory Deflection Register receives an address from the Memory Regeneration Counter.

The Memory Regeneration Counter is a 13 stage trigger counter having the equivalent of three decimal orders and one bit of a fourth order. This counter is capable of counting from 0000 to 2000. Therefore, this permits all addesses in a particular storage unit to be counted (two tubes, 1000 bits each making 2000 addresses) and therefore regeneration takes place simultaneously in all five groups of storage. This counter is stepped one count each machine cycle, so that Memory is periodically and systematically regenerated.

The Memory Address Counter is a sixteen stage trigger counter representing four binary coded decimal digits. It contains the address to which Memory is addressed during the Read and Write portions of the Use character cycles. The Memory Address Counter may be stepped to count up or down and can also be set to the holding of either an Instruction Counter or a Memory Address Register. The Instruct'on Counter is a sixteen stage trigger counter representing four binary coded decimal digits. It contains the address of the next Instruction, and it is stepped one count during each Instruction Character cycle. In normal operation Instructions are referred to sequentially and are five addresses removed from one another. Since each Instruction requires five characters, the Instruction Counter is stepped one count during each Instruction Character cycle bringing it to the address of the next Instruction. However, during a Transfer Instruction, such as described in the application of Rochester et al., the Instruction Counter may be set to a designated address; the representation of the designated address being passed via the Memory Address Register.

The Memory Address Register is a sixteen stage trigger register representing four binary coded decimal digits. During Instruction time the Memory Address Register receives an address character by character from Memory via Character Register 1. If the operation is a Transfer operation during Execute time the holding of the Memory Address Register is transferred to the Instruction Counter so that the next Instruction will be obtained from this designated address. However, if the operation is not a Transfer operation, the Memory Address Register holds the address of the data in Memory which is to be Processed according to the operation code of the Instruction. The holding of the Memory Address Register may be transferred, as mentioned above, to the Memory Address Counter. Before discussing components of the Memory Address System and the Storage Units in detail, it should be mentioned that the apparatus of this invention utilizes output signals of a Clock, Waveform Generator, and Instruction Timer similar in circuitry function and operation to those disclosed in the above identified application of Rochester et al. Since such circuits are now well known and understood by those skilled in the art, no purpose would be served in repeating the lengthy explanation here, but rather, output signals of a similar nature and generated in a similar way by such Clock circuits will be utilized.

Referring to Fig. 2*j*, an order of the Memory Address Register is shown. This order is comprised of four triggers, 213 through 216 inclusive. The triggers are signified by blocks T with the *x* in the lower right corner signifying that the triggers are reset OFF, that is, with left side conducting, during each Instruction time. This reset takes place at RO time of Instruction Character cycle 1. The triggers being reset OFF at the start of Instruction time are thus available for new address characters during the various Instruction Character cycles. Assuming that the particular order represented is the units order, as a character is read out of Memory into Character Register 1 (described below); binary 1's in the 1, 2, 4 and 8 bit positions cause lines CR1 1 through CR1 8, respectively, to go positive. The signals on the latter lines, if positive, condition Diode Gates 201 through 204, respectively. Then during Instruction Character cycle 1 (for the units order and corresponding Character cycles for the other orders) a positive signal occurs at A3 (D3) time on the line SET X ORDER MAR TO CR1. The trailing edge of the signal causes signals to appear on the lines 209 through 212, respectively, of the Diode Gates that are conditioned. These negative signals are effective to turn ON the respective triggers 213 through 216. Thus, during Instruction time for each binary 1 bit in the first character read from Memory, a corresponding trigger in the units order of the Memory Address Register is turned ON. During Instruction Character cycle 2 the second character is gated to the tens order; the corresponding line SET X ORDER MAR TO CR1 for the tens order then being driven positive. Whenever a zero character is represented, i.e., a binary 1 in the 2 and 8 bit positions only, circuits are effective to block the setting of the particular order of the Memory Address Register to the holding of Character Register 1. The negative signal on the line-BLOCK SET MAR, when positive, blocks passage of any signals through the Diode Gates 201 through 204 respectively, and consequently triggers 213 through 216 remain OFF to represent holding of binary 0's.

As explained below this blocking occurs when a zero is represented by binary 1's in the 2 and 8 bit positions (ordinarily a representation of ten). It is also possible to manually set information into the Memory Address Register. Manual switches (not shown) cause positive and negative signals representing binary 1's and binary 0's respectively, on the lines MAS1 through MAS8 to condition one input of the Diode Gates 205 through 208, respectively. While these Diode Gates are so conditioned a G1 (D3) signal caused by manual timer is effective to set binary 1's into the triggers 213 through 216. (G is used to denote special timing which occurs in manual operation.) The output lines MAR1, MAR2 etc. are positive when the respective triggers are ON this representing binary 1's for the particular bit positions while lines MAR$\overline{1}$, MAR$\overline{2}$ etc., when positive, represent holdings of binary 0's in the respective trigger positions.

Reference is now made to Fig. 2*h* which represents the Memory Address Register Control Circuits. These control circuits receive inputs from an Instruction Timer and Waveform Generator of the type described in the application of Rockester et al., mentioned above. During Instruction Character cycle 1, the line ICC1 is positive to condition one input of the AND circuit 230. This particular AND circuit, while conditioned, passes the A3 (D3) signal via the cathode follower 231 to drive the line SET UNITS ORDER MAR TO CR1. The positive signal on the latter line is effective to set the units order of the Memory Address Register to the holding for the 1, 2, 4 and 8 bits of the particular character then contained in Character Register 1. Likewise a positive signal on line ICC2 during Instruction Character cycle 2 is effective to gate the A3 (D3) signal via the cathode follower 233 to drive the line SET TENS ORDER MAR TO CR1 positive. It follows that during the second Instruction Character cycle, when the tens order of the address is read from Memory into Character Register 1, this particular character is gated into the tens order of the Memory Address Register. During Instruction Character cycle 3, via the action of AND circuit 234 and cathode follower 235, the hundreds order of the Memory Address Register is set as line SET HNDS ORDER MAR TO CR1 goes positive.

During Instruction Character cycle 4, via AND circuit 236 and cathode follower 237, a positive signal on the line SET THSNDS ORDER MAR TO CR1 is effective to gate the thousands order of the address then contained in Character Register 1 into the thousands order of the Memory Address Register. As explained above, the setting of the Memory Address Register is blocked whenever a zero character is represented thereby causing all four triggers of the particular order to remain OFF. A zero character is represented in Memory by binary 1's in both the 2 and 8 bit positions. Thus if binary 1's are present in the 2 and 8 bit positions, both the lines CR1 $\overline{2}$ and CR1 $\overline{8}$ are negative. These two negative signals are effective to condition negative AND circuit 238, whose negative output passes, via cathode follower 239, to drive the line-BLOCK SET MAR negative. When the latter line is negative, the setting of the holding of Character Register 1 into any order of the Memory Address Register is blocked.

Refer now to Fig. 2*n* which shows a sample order of the Instruction Counter. For purpose of explanation, it should be assumed that this order is the units order although it should be understood other orders are identical in operation. The holding of the units order of Memory Address Register bits 1, 2, 4 and 8 may be dumped into the Instruction Counter units order, when Transfer operations are required.

As indicated by the "T" in the lower right corner of the blocks representing the triggers, through the operation of control circuits (not shown), the triggers 255 through 258, representing the 1, 2, 4 and 8 bits respectively, are reset OFF at the start of TRANSFER operations. Then the holding of Memory Address Register is emitted via output lines MAR1 through MAR8. Those particular bits holding binary 1's condition the Diode Gates 250 through 253, respectively. Then as a signal occurs on the line SET IC TO MAR [A3 (D3)], its trailing edge is effective via conditioned Diode Gates 250 through 253 to turn ON the triggers 255 through 258, respectively. Thus it is seen that the holding of the Memory Address Register may be transferred into the Instruction Counter.

The triggers 255 through 258 comprise a four stage counter of the variety disclosed and described in the Patent 2,584,811 of Phelps granted February 5, 1952. This counter is stepped one count by a signal on the line-STEP IC, the signal occurring at W1 (D3) time of the cycle.

The connections between the stages of the counter are such that when one trigger is turned OFF, it is effective to shift the condition of the succeeding higher trigger. The Diode Gate 254 provides means whereby the counter is changed from a pure binary system to an effective binary coded decimal system. In other words, as the counter reaches a count of 9 and another count input occurs, the counter emits a carry signal and establishes a combined holding of zero. The outputs of the triggers 255 through 258 pass via cathode followers 259 through 262 to lines IC$\overline{1}$ through IC$\overline{8}$ respectively, which lines are positive when the respective triggers are OFF signifying a holding of a binary 0. The second outputs of the same triggers pass via cathode followers 263 through 266 to lines IC1 through IC8 respectively, which lines are positive when the respective triggers are ON signifying a holding of binary 1. The tens, hundreds, and thousands order of the Instruction Counter are identical in circuit and in operation, receiving inputs from the corresponding orders of the Memory Address Register and, further, receiving an input on a line corresponding to —STEP IC which is a carry signal from the succeeding lower order.

Referring to Fig. 2*p*, the control circuits for the Instruction Counter are shown. AND circuit 267 is conditioned by a coincidence of positive signals on the lines I TIME and W1 (D3). The output of AND circuit 267 passes, via cathode follower 268 and inverter 269, to the line —STEP IC. Thus it is seen that during each Instruction Character cycle a W1 (D3) signal is effective to step the Instruction Counter. AND circuit 270 is conditioned by a coincidence of positive signals on the lines SET IC TO MAR and A3 (D3). The output of AND circuit 270 passing, via grounded grid amplifier 271 and the cathode followers 272 and 273, to the line SET IC TO MAR [A3 (D3)].

Refer now to Fig. 2*m* which shows the circuitry of one order of the Memory Address Counter. Again for purpose of explanation, assume that the order represented is the units order, although the tens, hundreds, and thousands orders contain identical circuits. As mentioned above, the description of the composite diagram of Figs. 2*a*, 2*b* and 2*c*, the Memory Address Counter will, as required, receive the holding of the Memory Address Register or the holding of the Instruction Counter. The holding of the Instruction Counter is represented by the signals on the lines IC$\overline{1}$, IC$\overline{2}$, IC$\overline{4}$, and IC$\overline{8}$, which lines are positive if the respective bits of the Instruction Counter contain binary 0's, and on the lines IC$\overline{1}$, IC$\overline{2}$, IC$\overline{4}$ and IC$\overline{8}$, which lines are positive if the respective bits of the Instruction Counter contain binary 1's. The output lines of the Instruction Counter, from IC1 through IC8 feed to Diode Gates **201*a* through 208*a*, respectively. Thus, as the trailing edge of the signal on line SET MAC TO IC goes negative, a signal is gated through the proper Diode Gate to cause the required binary 1's and, or binary 0's to be set into triggers 243*a* through 246*a*. For example, if the 1 bit of the Instruction Counter contained a binary 1, the signal on the line SET MAC TO IC would pass via the Diode Gate 202*a* and line 219*a* to to turn ON trigger 243*a***, thereby representing a binary 1 in the 1 bit position of the Memory Address counter.

However, if the one bit of the Instruction Counter had contained a binary 0, the line IC$\bar{1}$ would be positive, and the signal on the line SET MAC TO IC would pass via the Diode Gate 201a and line 218a to turn OFF trigger 243, thereby representing binary 0 in the Memory Address Counter 1 bit position. Thus, it is seen that there is no need for resetting of the Memory Address Counter before dumping the holding of the Instruction Counter into the Memory Address Counter. It is the trailing edge of the W1 (D3) signal on line SET MAC TO IC which is effective to set the triggers. Likewise, the holding of the Memory Address Register feeding to Diode Gates 209a through 216a, operates in identical manner; the signals being gated to set the triggers 243a through 246a to represent binary 1's and, or binary 0's. The signal on the line SET MAC TO MAR passes, via conditioned Diode Gates 209a through 216a and lines 218a through 226a, to set the triggers ON or OFF, as required. Again it is the trailing edge of the signal which is effective to set the triggers.

The Memory Address Counter must have the ability to count up or down one count. This ability is provided by Diode Gates and control signals on the line STEP MAC+1 or STEP MAC—1. While the line STEP MAC+1 is positive, Diode Gates 230a, 232a, 234a, 236a and 238a are conditioned. While Diode Gate 230a is conditioned, a negative —W1 (D3) pulse is passed via the Diode Gate to a binary input of the trigger 243a, and is effective to step the counter one count by changing the condition of the latter trigger. When the trigger 243a goes from an OFF to an ON condition, it has no effect on the succeeding trigger 244a. However, as the trigger 243a is shifted from an ON to an OFF condition, its output passes, via cathode follower 254a, line MAC1, and conditioned Diode Gate 232a to the binary input of the trigger 244a and thereby shifts condition of the latter trigger. The Diode Gate 232a must be conditioned by the signal on the line STEP MAC+1 and also by a positive signal on the line MAC$\bar{8}$, signifying that the trigger 246a representing the 8 bit contains a binary 0.

The triggers 243a through 246a acting in combination with Diode Gates 230a, 232a, 234a, 236a and 238a act as count up counter similar in operation to the order of the Instruction Counter, described above. A signal on the line STEP MAC+1 CARRY feeds to the succeeding higher order of the Memory Address Counter to an input corresponding to line —W1 (D3) feeding to the Diode Gate 230a. The signal on the line STEP MAC+1 also conditions corresponding Diode Gates of the succeeding higher order counters.

The Memory Address Counter must also be capable of counting down. This is effected by a positive signal on the line STEP MAC—1 which conditions Diode Gates 231a, 233a, 235a and 237a, these gates being effective to couple the left plate output of each trigger to the binary input of the succeeding higher trigger. Thus, when any trigger goes from an OFF to an ON condition, the succeeding higher trigger is shifted from one condition of stability to another. As the trigger shifts from an ON to an OFF condition, the ouput signal to a Diode Gate is positive and therefore has no effect on the succeeding higher trigger. It should be noted, however, that as the trigger 246a which is the 8 bit trigger shifts from an ON to an OFF condition, a carry signal is emitted on the line STEP MAC—1 CARRY. This Carry Signal besides feeding the succeeding higher order also feeds via condenser 239a and diode 240a, and via condenser 241a and a diode 242a, to shift the triggers 244a and 245a OFF.

It will be apparent to those skilled in the art that the triggers 243a through 246a when operating in combination with the Diode Gates 231a, 233a, 235a and 237a acts as a count down counter. The output of the triggers 243a through 246a pass via the cathode followers 250a through 253a to the lines MAC$\bar{1}$ through line MAC$\bar{8}$, the signals on the respective lines being positive when the corresponding triggers contain binary 0's. Likewise, the outputs from the right plates of the triggers 243a through 246a pass via the cathode followers 254a through 257a to lines MAC1 through MAC8, the respective lines being positive when the corresponding triggers contain binary 1's.

Reference is now made to Fig. 2*i* which shows the Memory Address Counter Control circuits. AND circuit 260a conditioned by a positive signal on the line SET MAC TO IC (ROUTING), which signal is positive when the Routing circuits determine that the Memory Address Counter should be set to the holding of the Instruction Counter. While the AND circuit 260a is conditioned, a W1 (D3) signal is passed via cathode follower 262a, grounded grid amplifier 264a and cathode follower 265a and 266a to drive the line SET MAC TO IC positive. Likewise, the AND circuit 270a is conditioned by a positive signal on the lines SET MAC TO MAR (ROUTING) which signal is positive when the Routing circuits determine that the Memory Address Counter should be set to the holding of Memory Address Register. Thus, the W1 (D3) signal is passed via the AND Circuit 270a, cathode follower 272a, grounded grid amplifier 274a, and cathode followers 275a and 276a to the line SET MAC TO MAR.

Refer now to Fig. 2*k* which shows a sample order of the Memory Regeneration Counter. This counter is identical in operation to the Instruction Counter, explained above, except that no provision has been made for resetting the triggers nor for setting an address into the counter. Resetting is not necessary since the Regeneration Counter is continuously, systematically and repeatedly stepped through its entire range of counts. Consequently, it does not matter where the counter actually starts to count. The output of this counter is available on the lines MRC$\bar{1}$ through MRC$\bar{8}$ signifying holdings of binary 0's in the respective triggers and on lines MRC1 through MRC8 signifying a holding of a binary 1's in the respective triggers. A carry signal from one order of this counter feeds to the input of the succeeding higher order. The counter is stepped by the trailing edge of the W1 (D3) signal so that the counter is actually stepped at W4 time. The thousands order of the Memory Regeneration Counter contains one trigger only and this trigger representing the 1 bit is shifted from one condition of stability to another by carry outputs from the hundreds order.

Refer now to Fig. 2*s* which shows a sample order of the Memory Deflection Register and Use Regenerate Switching. Each bit of the Memory Deflection Register contains identical circuitry, therefore, an explanation of the circuits for one bit will suffice for the entire sixteen bits. The output of the Memory Address Counter via line MAC1, which is positive when the units order of the Memory Address Counter 1 bit contains a binary 1, conditions the gate circuit 280a. Conversely, if the one bit of the units order of the Memory Address Counter contained a binary 0, the line MAC$\bar{1}$ is positive to condition the gate circuit 281a. Assuming that the units order of the Memory Address Counter 1 bit contains a binary 1, the gate circuit 280a is conditioned positive, 0.4 microsecond pulses occurring at RO and WO times (see line SET MDR on the Timing Diagram, Fig. 5*b*) pass via the gate 280a and OR circuit 284a to turn ON the trigger 286a. Trigger 286a when ON represents a holding of a binary 1. If the Memory Address Counter contained a binary 0 and the gate 281a had been conditioned (rather than the gate 280a) the RO and WO signals would then pass via the gate 281a and the OR circuit 285a to turn the trigger 286a OFF. Thus, it is seen that the holding of the Memory Address Counter is set into the Memory Deflection Register at each RO and WO times. During the Add portion of the Character cycle when regeneration takes place, either the gate 282a or 283a is conditioned. Gate 282a is conditioned by a signal on the lines MRC1 if the Memory Regeneration Counter 1 bit contains a binary 1 or the gate 283a is conditioned if the line $\overline{MRC1}$ is positive, which means that the Memory Regeneration Counter 1 bit contains a binary 0. Assumline MRC1 is positive a 0.4 microsecond signal occurs on the line A0 (D0 4) and is then effective to pass via the gate 282a and the OR circuit 284a to turn ON the trigger 286a. If a binary 0 is to be represented, the A0 (D0 4) signal passes via the gate 283a and the OR circuit 285a to the trigger 286a. The output of the trigger 286a, passing via the cathode follower 287a, drives line $\overline{MDR1}$ positive if the trigger is OFF representing a binary 0, but if the trigger is ON, its output passes via the cahtode follower 288a to drive the line MDR1 positive. Thus, it is seen that the holding of the Memory Address Counter is dumped into the Memory Deflection Register at the beginning of the Read and Write portion of the Character cycle while the holding of the Memory Regeneration counter is dumped into the Memory Deflection Register at the beginning of the Add portion of the Charter cycle.

As noted on the overall diagram of Figs. 2*a*, 2*b* and 2*c*, the 2, 4 and 8 bits of the units order of the Memory Deflection Register, all bits of the tens order, all bits of the hundreds order, and the 1 bit of the thousands order control the Memory Deflection circuits. When considering the Deflection circuits and the manner in which the cathode ray beam is deflected, provision must be made for deflecting the beam to a particular position on the face of the tube and also for sweeping the beam in order to record a dash. The particular circuits, for controlling bit sweep deflection for writing dashes, is similar in operation to the circuits disclosed and described in the application of Fox et al. referred to above, now Patent No. 2,950,465, issued August 23, 1960. Consequently, only a brief review of the system will be made here. The Vertical Deflection circuits are shown in Fig. 2*t* while the Horizontal Deflection circuits are shown in Fig. 2*u*. To deflect the beam to any particular spot on the cathode ray tube screen, the Memory Switches MS are activated in combination by diode switches ($D_S$). The inputs to the diode switches are outputs from the Memory Deflection Register.

Referring to Fig. 2t, one input to a diode switch 201b is via line MDR100 representing, when positive, a binary 1 in the 1 bit of the hundreds order of the Memory Deflection Register, while an input to the opposite side of the diode switch via line $\overline{MDR100}$ is positive, whenever a binary 0 exists in the 1 bit of the hundreds order of the Memory Deflection Register. Therefore, a binary condition exists at the inputs to the diode switch 201b and hence to the memory switch 202b, associated therewith. If the 1 bit of the hundreds order of the Memory Deflection Register contains a binary 1, the line MDR100 is positive, while line $\overline{MDR100}$ will be necessarily negative. If the 1 bit of the hundreds order of the Memory Deflection Register did not contain a binary 1, the reverse condition would prevail. The side of the diode switch with the negative level condition transmits a negative signal to a corresponding side of memory switch 201b. A negative input to the memory switch will cause that particular side to cut-off which thereby causes the opposite side of the switch to conduct. (See Fig. 1*aa*.)

Assuming a negative input to the right side of the memory switch 202b, the right side cuts off and less current flows on the line LOWER DEFL; the current flowing from a power supply of 285 volts via a 3.055K resistor. This switching also causes a corresponding greater current on the line UPPER DEFL. The decrease in current on the line LOWER DEFL means a decrease in current through the 3.055K summing resistor and consequently an increase in voltage on the line LOWER DEFL. Likewise, an increase of current on the line UPPER DEFL causes an increase current flow through the 3.055K summing resistor and a corresponding decrease in the potential of the line UPPER DEFL. The signal on the line UPPER DEFL passes via a cathode follower 203b to the line TO UPPER DEFL PLATES, which line feeds to the upper deflection plates of all Memory cathode ray tubes. Likewise, the signal on the line LOWER DEFL passes via a cathode follower 204b to the line TO LOWER DEFL PLATES, which line feeds to the lower deflection plates of all Memory cathode ray tubes. Thus, as the various output lines from the Memory Deflection Register, representative of binary 1's or binary 0's shift from one condition to the other, the output of cathode followers 203b and 204b increase and decrease accordingly. When the output on the line TO UPPER DEFL PLATES goes more positive and the output on line TO LOWER DEFL PLATES goes more negative, the beam is deflected upwardly since these outputs are applied directly to the upper and lower deflection plates of the cathode ray tubes. The cathode resistors in the various memory switches, such as the memory switch 202b, determine how much each bit or current increment causes the beam to deflect. In the memory switch 202b the cathode resistor is such that a difference of one small vertical step in deflection occurs from a condition wherein the Memory Deflection Register 1 bit of the hundreds order contains a binary 1 rather than a binary 0. This is indicated by the notation 1SV in the block representing the memory switch 202b. Likewise, it is indicated that the bit of the thousands order causes a difference in deflection of two small vertical steps (2SV); that of the 4 bit of the tens order, one large vertical step (1LV); that of the 8 bit of the tens order, two large vertical steps (2LV); that of the 2 bit of the tens order, three large vertical steps (3LV); and the 1 bit of the tens order, five large vertical steps (5LV).

Similar circuits shown in Fig. 2*u*, are used for the horizontal deflection. In this case, the 4 bit of the hundreds order of the Memory Deflection Register is effective to cause a difference in deflection of one small horizontal step (1SH); the 8 bit of the hundreds order, a deflection of two small horizontal steps (2SH); the 2 bit of the hundreds order, a deflection of three small horizontal steps (3SH); the 4 bit of the units order, a deflection of one large horizontal step (1LH); the 8 bit of the units order, two large horizontal steps (2LH); and the 2 bit of the units order, three large horizontal steps (3LH). There is also an approximately one half small horizontal step (5HP) caused by the 1 bit of the hundreds order; this particular deflection providing the hexagonal packing, which is described in detail in the patent of Fox et al., No. 2,950,465.

In combination with hexagonal packing, the bit sweep causing a deflection for recording of dashes is also applied to the horizontal deflection plates. In one instance the dash is made by a sweep of left to right, and in another instance, it is made from right to left. The direction of the bit sweep is controlled by the 1 bit of the hundreds order. The circuits providing the bit sweep are also shown in Fig. 2*u*. If the holding of the one bit of the hundreds order of the Memory Deflection Register contains a binary 1, line $\overline{MDR100}$ conditions one input of the negative AND circuit 211b. Otherwise, if the Memory Deflection Register 1 bit of the hundreds order contains a binary 0, the line MDR100 is negative and conditions one input of the negative AND circuit 210b. The bit sweep pulse is thus fed via the negative AND circuit 210b or the negative AND circuit 211b. Assuming the signal passes via the negative AND circuit 211b, it drives the right half of the diode switch 212b negative, whose right side output to the pulse generator 213b is also negative. This negative input to the pulse generator 213*b* is effective to cut off the right side and thereby cause greater conduction on the left side. The outputs of the pulse generator 213*b* pass via a differential amplifier 214*b* and the resistors 215*b* and 216*b* to the lines LEFT DEFL and RIGHT DEFL, respectively.

Under the assumed conditions a positive saw-tooth output from the right side and a negative output from the left side of the differential amplifier 214*b* occurs. These opposite going saw-tooth ways are applied through the dropping resistors 215*b* and 216*b* to the 2K horizontal summing resistors. The signals on lines RIGHT DEFL and LEFT DEFL pass via cathode followers 217*b* and 218*b* to lines TO RIGHT DEFL PLATES and TO LEFT DEFL PLATES. These saw-tooth steps are such that the cathode ray beam sweeps from left to right. As described below, if the cathode ray tube is unblanked during the bit sweep, a dash is recorded. If the 1 bit of the hundreds order of the Memory Deflection Register had contained a binary 0, the bit sweep would have been right to left.

Inspection of the composite drawing comprised of Figs. 2*a*, 2*b* and 2*c* show that the 1 bit of the units order of the Memory Deflection Register feeds to Condition Memory Control circuits. These Memory Control circuits are shown in detail in Fig. 2*r*. In each Storage Unit, as explained above, there are left and right cathode ray tubes. The left tube is addressed when the line COND MEM LT is positive, while the right tube is addressed when the line COND MEM RT is positive. The line $\overline{\text{MDR1}}$, when positive, conditions one input of AND circuit 234*b*, while the line MRD1 conditions, when positive, one input of AND circuit 233*b*. Thus, the output of the trigger 231*b*, when ON, passes through cathode follower 232*b*, AND circuit 234*b* and cathode follower 236*b* to line COND MEM LT, or, via AND circuit 233*b* and cathode follower 235*b* to line COND MEM RT. The trigger 231*b*, as explained below, is turned ON to Read, Regenerate or Write in Memory. Consequently, whenever it is desired to Read, Regenerate or Write in Memory, either line COND MEM RT or COND MEM LT is positive. If it is desired to read a character out of Memory into Character Register 1, line MEM CHAR TO CR1 is positive and conditions one input of the AND circuit 225*b*. Then at the beginning of a character cycle a +RO (D2) signal passes via conditioned AND circuit 225*b* and an OR circuit 230*b* to turn ON the trigger 231*b*. The trigger remains ON until an R5 (D2) signal passes via an OR circuit 229*b* to turn OFF the trigger 231*b*. Thus, trigger 231*b* is ON during the read portion of a character cycle. Thereafter, during the Add portion of the character cycle, an A3 (D3) signal passes via the OR circuit 230*b* to turn ON trigger 231*b*. The trigger remains ON until the next character cycle. At the start of the next character cycle either the line MEM CHAR TO CR1 is positive, if Memory is to be read out, or is negative if Memory is not to be read out. If Memory is not to be read out, the negative signal on the line MEM CHAR TO CR1 passes via an inverter 226*b* and a cathode follower 227*b* to condition an AND circuit 228*b*. The conditioned AND circuit 228*b* passes a +RO (D2) signal via the OR circuit 229*b* to turn OFF the trigger 231*b*. Thus, it is seen that the trigger 231*b* is turned ON during a Read portion of a character cycle when a character is to be read from Memory; it is reset OFF and then turned ON during the Add portion of the character cycle (to provide for regeneration) and remains ON during the Write portion of the cycle. However, if it is not necessary to write information into Memory during the Write portion of the character cycle, there are no outputs from the Output Switch to Memory circuits, other than negative signals, and these negative signals are effective, as explained below, to prevent unblanking of the cathode ray tubes. Thus, even though the trigger 231*b* is ON during the Write portion of the character cycle, a write operation will not necessarily take place.

As mentioned above, there are thirty-five Memory Storage Units, divided into five separate groups of 2000 storage positions each, there being 1000 storage positions on each cathode ray tube. Each group consists of seven pairs of cathode ray tubes, the seven pairs operating in parallel so that all 7 bits of a character are either read or stored simultaneously during a cycle of operation. Inspection of the composite Figs. 2*a*, 2*b* and 2*c* show that the 2, 4 and 8 bits of the thousands order of the Memory Deflection Register are utilized to condition the Selector circuits and thereby select one of the five groups. The Selector circuits, shown in detail in Fig. 2*z*, require binary 0's in the 2, 4 and 8 bit positions of the thousands order to cause a selection of Unit 1; the combination of a binary 1 in the 2 bit position and a binary 0 in the 4 bit position to cause a selection of Unit 2; a binary 1 in the 4 bit position and a binary 0 in the 2 bit position for selection of Unit 4; and a binary 1 in the 8 bit position to select Unit 5. For example, to select Unit 1 with binary 0's in the 2, 4 and 8 bit positions, lines $\text{MDR}\overline{2000}$, $\text{MDR}\overline{4000}$ and MDR8000 are positive. All three of these positive inputs feed to the AND circuit 250*b*. The output of the AND circuit 250*b* is then positive and feeds via a cathode follower 251*b* to the line SEL1. It should be noted that all storage units are selected during Regenerate time since a positive signal occurs on a line AO to WO which, by way of example, feeds via cathode follower 252*b* to drive the line SEL1 positive.

The positive signal on the line SEL1 conditions one input of both AND circuits 253*b* and 254*b*. The second input to the AND circuit 253*b* is via line COND MEM LT. The output of the AND circuit 253*b*, upon coincidence of two positive inputs, passes via cathode follower 255*b* to drive the line SEL1 LT positive and thereby causes selection of the left cathode ray tube of each Storage Unit in Memory Unit 1. The second input to the AND circuit 254*b* is via line COND MEM RT and, upon coincidence of two positive inputs, the output of the AND circuit passes via a cathode follower 256*b* to the line SEL1 RT to cause a selection of the right cathode ray tube of each Storage Unit of Memory Unit 1. Thus, it is seen the holdings 2, 4, and 8 bit positions of the thousands order of the Memory Deflection Register (or during Regeneration time a signal on the line AO TO WO) in combination with signals on lines COND MEM LT and COND MEM RT, a selection is made of a particular Memory section and of the left or right tubes of that particular section. During Regeneration time, all sections are energized but there is a selection of the left or right cathode ray tubes in the sections.

As explained in the application of Fox et al. mentioned above, the process of producing a charge on the screen of a cathode ray tube depends upon the phenomenon of secondary emission. An electron striking a surface with a certain initial velocity will tend to liberate more electrons from the surface than are arriving at the surface. In the case where the number of secondary electrons leaving an area is greater than the primary electrons arriving, the net result is the production of a positive charge on that particular spot of the cathode ray tube screen. Such a charge area is called a dot and can be thought of as a potential well dug by the impending primary electrons. If the cathode ray beam, that has dug a potential well on the cathode ray tube screen, is deflected a short distance, secondary electrons are liberated from the new area and will tend to fill the original dot area. The elongated charged area is called a dash. This phenomena is taken advantage of, so that information in a binary notation may be stored in the form of a dot charge and can be destroyed by writing a dash charge. The slight deflection of the beam to produce a dash is called a bit sweep. In the particular embodiment of storage utilized in this apparatus, the dash charge represents storage of a binary 1, and the dot a storage of binary 0. The period of time that a charge remains on the face of the cathode ray tube, depends among other things, upon the resistivity of the cathode ray tube screen, and the presence of free electrons in the space adjoining the screen which may be attracted to the particular spot. Since it is possible that these charges could leak off particular areas of the cathode ray tube's face, a Regeneration counter, described above is provided to provide for systematic periodic regeneration of each particular storage area of the cathode ray tube screen.

Both dots and dashes on the face of the cathode ray tube are read by the writing of a dot. In the case where the beam is directed to a point on the face of the cathode ray tube, where a positive charge exists, that is, where a dot had been previously written, the signal on a pickup plate causes a slight negative shift of potential. However, when the beam is directed at a point of little or no positive charge, that is, where a dash has been previously written, the signal from the pickup plate produces a positive shift in potential. Thus, by time sampling the output of the pickup plate which is amplified by a video amplifier, the presence of a dash or dot charge on the cathode ray tube screen can be determined.

In the process of reading a dash, the particular area is left with a dot stored, that is, if the dash is read it is always destroyed and a dot is left in its place. Because of this, means must be provided to restore the dash whenever information is to be retained. If a dot had been previously stored and is read, a dot is stored and there is no need for further unblanking of the cathode ray tube to effectively restore information.

In Fig. 2*x*, the circuits for a representative Storage Unit are shown. It should be realized, as explanation of this circuit proceeds, that six identical Storage Units are operating in parallel with the one explained. Therefore, for any particular address, seven bits of information are read, written or regenerated, as the case may be. Refer to Fig. 2*x*, and to the Timing Diagram of Fig. 5*b*, and assume that the machine is starting a Character cycle at RO time. A positive signal on the line RESET is effective to reset the trigger **275*b* OFF. The output of the trigger 275*b* passing via the cathode follower 272*b* to line 273*b* is then negative. At R4 time, a positive signal slightly in excess of one microsecond on the line INTERROGATE passes via an OR circuit 260*b* to the AND circuits 259*b* and 261*b*. Assume, for the purpose of explanation, that the left tubes are selected. Thus, the line SELECT LEFT is positive to condition the second input of the AND circuit 261*b*. The AND circuit 261*b* emits a positive output via an inverter 262*b* and a peaker 263*b* to line LEFT DOT DASH. The signal on the latter line passes via a condenser 264*b* to the grid 266*b* of the cathode ray tube 267*b* thereby unblanking the cathode ray beam. At this particular moment, the proper deflection voltages for addressing are applied to all deflection plates of all cathode ray tubes. As the beam is unblanked, a dot is recorded on the particular address then selected on the screen of the cathode ray tube. If the dot was previously stored in that address of the cathode ray tube, relatively no output occurs at the pickup plate 268*b* and on the line 269*b*, but if a dash had been previously stored, a signal is generated on the pickup plate 268*b* and passed via line 269*b* and a video amplifier 271*b* to one input of the switch 274*b*. The second input to the switch 274*b* is via line SAMPLE, which input is a sharp positive pulse occurring at approximately R5 time. Thus, if a dash had been read from the cathode ray tube, the R5 signal passes via the switch 274*b* to turn ON the trigger 275*b*. Otherwise, if a dot had been stored previously at the particular address, the signal on the line SAMPLE is blocked from passing through the switch 274*b* and the trigger 275*b* remains OFF. The trigger 275*b*, if turned ON, remains on until A2 time when a signal on the line RESET is effective to reset the trigger OFF. Inspection of the Timing Diagram shows that the output of the trigger 275*b*** may be positive from R5 to A2 time to represent readout of a dash, signifying a binary 1, or may remain relatively negative to represent readout of a dot which represents a binary 0.

A positive output from the trigger **275*b* when ON, passes via the cathode follower 272*b* and line 273*b* to the OR circuit 260*b*. This opposite signal passes via the OR circuit 260*b* and would ordinarily cause a further unblanking of the cathode ray tube 267*b* through the circuits, as just described. However, the signals on the lines SELECT LEFT and SELECT RIGHT, which condition one input of the AND circuits 261*b* and 259*b*, respectively, are negative, since at R5 time the trigger 231*b*** of the Conditioned Memory Control Circuits (see Fig. 2*r*) is reset OFF. Since neither AND circuit **259*b* nor 261*b* is conditioned, the positive signal of the OR circuit 260*b* is not effective to cause an unblanking of either cathode ray tube. It should be noted at this point that identical circuits are provided for the unblanking of the cathode ray tube 270*b*, the right cathode ray tube, so that if the line SELECT RIGHT had been positive the described readout would have been from cathode ray tube 270*b* rather than tube 267*b***.

As mentioned above, the ON or OFF condition of the trigger **275*b* is indicated by a positive or negative signal on the dot line 273*b*. This signal passes via a cathode follower 276*b*** to the line MEM/ACC OUT BUS. Thus, the holding of the particular bit read out of the cathode ray tube, causes the latter line to be relatively positive for representation of a binary 1 or relatively negative for represenation for a binary 0. The condition of line MEM/ACC OUT BUS and corresponding lines are sampled by the Character Register circuits, described below.

At AO time, as explained above, the holding of the Memory Regeneration Counter is set into the Memory Deflection Register so that during the Add portion of the Character cycle, regeneration may take place. Also, as explained above, at A2 time, the trigger **275*b*** is reset OFF. Thereafter, at A4 time a signal again occurs on the line INTERROGATE, which is effective to unblank the cathode ray tube, since at A3 time either line SELECT LEFT or line SELECT RIGHT is driven positive (see Fig. 2*r*). Again the output of the cathode ray tube is sampled, at this time by a signal at A5 time to turn ON the trigger **275*b*. The trigger 275*b* going on emits a positive signal via the cathode follower 272*b*, line 273*b* and the OR circuit 260*b* to again unblank the cathode ray tube which, at the moment is still selected. A bit sweep gate is effective slightly after A5 time, so that a sweep of the beam occurs while the beam is unblanked and therefore records the dash. Since a dash had been read out of the cathode ray tube, it was necessary to record a dash; if a dot had been read out, trigger 275*b*** would remain OFF and no unblanking of the cathode ray tube would occur during the bit sweep.

The trigger **275*b* is again reset OFF at WO time by a signal on the line RESET. At WO time the holding of the Memory Address Counter is again dumped into the Memory Deflection Register, as described above, and the machine enters the Write portion of the Character cycle. While this change in address occurs, the trigger 275*b* is OFF but no signal occurs on the line INTERROGATE so that there is no cathode ray beam in the cathode ray tube. At W4 time, a signal occurs on the line WRITE SAMPLE. This W4 signal passes through a diode gate circuit, provided the line MEM/ACC IN BUS is positive. If the latter line is positive, it is representative of a binary 1, and if negative, representative of a binary 0. As explained below, the signal on the latter line may be the result of a calculation or it may be the output of a Character Register. Assuming the binary 1 is represented the Write Sample signal is effective to turn the trigger 275*b***

ON. Again the output of the trigger 275*b* going positive, causes an unblanking of the selected cathode ray tube. At the same time, the bit sweep gate is effective to cause a sweep of the beam and thereby records a dash. If the signal on the line MEM/ACC IN BUS had been representative of a binary 0, and therefore negative, trigger 275*b* would have remained OFF, the cathode ray tube would not have been unblanked and a dot would be stored, since the particular address was read out by recordation of a dot. As RO time again occurs the trigger 275*b* is turned OFF and the entire process may be repeated. The detailed circuits of the representative Storage Unit up to and including the line LEFT DOT DASH and RIGHT DOT DASH are shown in Fig. 2*y*. Since overall operation of these circuits has been set-forth in connection with Fig. 2*x*, and the details are well understood by those skilled in the art, no purpose would be served in further explanation at this point. It should be understood, however, that the values set-forth are merely representative.

Refer now to Figs. 2*e*, 2*f*, and 2*g* arranged as shown in Fig. 2*d* which shows the Accumulator Storage system. The Accumulator is comprised of seven pairs of cathode ray tubes, each pair comprising a Storage Unit, identical in circuitry to the Storage Units described above. However, each tube in the Accumulator stores 512 bits. The seven left tubes comprise one Accumulator while the right tubes comprise a second Accumulator, referred to as Accumulator A and Accumulator B, respectively.

The Starting Point counters, one for Accumulator A and one for Accumulator B, keep track of the address of the word stored in the Accumulator, that is, the address of the least significant digit position. Both counters are nine stage trigger counters, capable of counting up or counting down. It is unnecessary that the Starting Point counter be reset to 0 or any particular address, whenever the machine is turned ON since the 512 addresses, corresponding to the 512 bits, provide a closed loop of 512 addresses. The upper limit of a word stored in either Accumulator is noted and recognized by a special character called the Accumulator Mark.

Both the Starting Point counter of the Accumulator A and the Starting Point counter of Accumulator B feed to the Accumulator Address Counter. The Accumulator Address Counter is a 9 stage trigger counter which is effective to represent by various permutations, the 512 addresses of either Accumulator Storage A or Accumulator Storage B. Also utilized in combination with the Accumulator Address Counter is the Accumulator A/B Trigger, which trigger is used to determine which of the two Accumulators, A or B, is being used. The Accumulator Address Counter may be stepped up or down.

The Accumulator Addressing system also contains an Accumulator Regeneration Counter. This counter is a ten stage trigger counter capable of directing regeneration of the 512 addresses of both Accumulators. This counter, as is the Memory Regeneration Counter, is stepped once each Regeneration cycle so that each address of both Accumulators is systematically regenerated.

The Accumulator Deflection Register is a nine stage trigger register functioning as a buffer between the Deflection Circuits and both the Accumulator Address Counter and the Accumulator Regeneration Counter. The Accumulator Deflection Register may be set to the holding of either the Accumulator Address Counter for a read or write operation as characters are processed, or to the Accumulator Regeneration Counter during the Add portion of the character cycle, or whenever regeneration may otherwise occur. The Accumulator Deflection Register feeds to the Accumulator Deflection Circuit so that the proper deflection voltages for horizontal and vertical deflection are generated. These deflection voltages are fed to each of the fourteen cathode ray tubes comprising Accumulator Storage.

The circuits for each Storage Unit, as used in Accumulator Storage, are identical to those shown and described for the Memory Storage Unit (see Fig. 2*x*). Likewise, the circuits of the Accumulator Deflection Circuits are identical to those of the Memory Deflection Circuits (see Figs. 2*t* and 2*u*). However, the Accumulator Addressing System is in a pure binary notation, as distinguished from the binary coded decimal notation used in addressing Memory. The nine triggers feeding to the Accumulator Deflection circuits cause the following amount of deflection. The 1 bit causes a difference in deflection of two large horizontal increments; the 2 bit causes a deflection of one large horizontal increment; the 4 bit causes a deflection of four large vertical increments; the 8 bit causes deflection of two large vertical increments; the 16 bit causes a deflection of one large vertical increment; the 32 causes two small horizontal increments; the 64 bit causes two small vertical increments; the 128 bit causes one small horizontal increment; and the 256 bit causes one one small vertical increment.

It is the 256 bit which controls the hexagonal packing and also the direction of bit sweep, that is, either from left to right or right to left. The Condition Accumulator Control Circuits are identical to the Condition Memory Control (see Fig. 2*r*), except that the latter is controlled by the 1 bit of the units order output of the Memory Deflection Register and the former is controlled by the output of the Accumulator A/B trigger, described below. The Accumulator Deflection Register and Use Regeneration Switching circuits are identical to those described for the Memory Deflection Register and Use Regeneration Switching.

Referring to Fig. 2*v*, details of three bits of the Accumulator Starting Point Counter are shown. The Starting Point Counters may be stepped up or down one count. If the particular Starting Point Counter, say Starting Point Counter A or Starting Counter B is to be stepped up, a signal on the line STEP SPC X+1 goes positive to condition Diode Gates 204*c* to 206*c*. This signal, of course, would be unique to the particular counter which is to be stepped up. As the line STEP SPC+1 is positive, a negative W1 (D3) signal passes via the Diode Gate 204*c* to the binary input of the trigger 201*c*, causing the trigger to shift from one condition of stability to another. As the trigger 201*c* shifts from an ON to an OFF condition, a negative signal is emitted from its right plate and fed via a cathode follower and the conditioned Diode Gate 205*c* to a binary input of trigger 202*c*, thereby causing the latter to shift from one condition to another. Likewise, succeeding bit triggers of the counter receive inputs from the succeeding lower order. Positive going outputs from the triggers have no effect on succeeding triggers.

If the particular counter were to be stepped down one count, the line STEP SPC X–1 is positive to condition Diode Gates 207*c* through 209*c*, and a negative W1 (D3) signal is then passed via the Diode Gate 207*c* to the binary input of the trigger 201*c*. However, in this instance only when the trigger 201*c* shifts from an OFF to an ON condition is a negative signal emitted. This negative signal passes via the conditioned Diode Gate 208*c* to provide a binary input to the trigger 202*c*. The same type of circuitry and explanation applies to succeeding higher triggers. On occasion it is desired to step the Starting Point Counter by a count of 256. This is accomplished by providing a Diode Gate 210*c* to the ninth or highest bit stage of the counter. When the signal on the line STEP SPC X 256 is positive, it conditions the Diode Gate 210*c* so that a negative W1 (D3) signal is effective at the binary input of trigger 203*c* (by example) to cause a shifting of its condition. Since this is applied to the highest stage, or the 256 stage, there would be no carry to a succeeding higher trigger and the mere shifting in condition is effective to change the count of the particular counter by an amount of 256.

Three representative orders of the Accumulator Address Counter are shown in Fig. 2*w*. This counter is somewhat similar in operation to the Memory Address Counter in that Diode Gates are provided for dumping the setting of either the Starting Point Counter A or B into the Accumulator Address Counter. Likewise, circuits are provided to enable the counter to count up or down one count as required.

Refer now to Fig. 2*aa* which shows the Accumulator A Starting Point Counter Controls. If the Accumulator A/B trigger is in condition to select the Accumulator A, the line A/B TRIG A is a positive to condition AND circuits **230*c*, 231*c* and 232*c*. While the AND circuit 230*c* is conditioned, a positive signal on the line STEP SPC 256 passes via the conditioned AND circuit, a grounded grid amplifier 234*c* and a cathode follower 235*c* to drive line STEP SPC A 256 positive. Likewise, a signal on the line STEP SPC+1 may pass via the conditioned AND circuit 231*c*, a grounded grid amplifier 236*c* and a cathode follower 237*c* to line STEP SPC A+1. As explained above, the latter signal is effective to cause a stepping of the Accumulator A Starting Point Counter at W1 time. A positive signal on the line STEP SPC—1 may pass via the conditioned AND circuit 232*c*, a grounded grid amplifier 238*c* and a cathode follower 239*c*** to line STEP SPC A—1. Identical circuits are utilized for the Accumulator B Starting Point Counter, the difference being that signals on lines having an "A" as part of a reference notation would have letter "B."

Refer now to Fig. 2*ab* which shows the Accumulator Address Counter Control circuits. These circuits develop signals for causing the Accumulator Address Counter to be set to the holding of the Starting Point Counters. The AND circuit **250*c* receives signals via lines SET AAC TO SPC, A/B TRIG A and W1 (D3). Upon coincidence of all three inputs, which occur at W1 time of Character cycle when the Accumulator Address Counter is to be set to a Starting Point Counter and when Accumulator A is selected, the positive output of the AND circuit 250*c* passes via a grounded grid amplifier 251*c* and cathode followers 252*c* and 253*c*** to line SET AAC TO SPC A. The latter signal is effective (see Fig. 2*w*) to set the Accumulator Address Counter to the holding of the Accumulator A Starting Point Counter. The AND circuit **254*c* receives signals via line W1 (D3), via line SET AAC TO SPC, and via line A/B TRIG B, to select Accumulator B. Upon coincidence of these three positive inputs, the output of the AND circuit 254*c* passes via a grounded grid amplifier 255*c* and cathode followers 256*c* and 257*c*** to line SET AAC TO SPC B. The signal on the latter line is effective to set the Accumulator Address Counter to the holding of the Accumulator B Starting Point Counter.

Refer now to Fig. 2*ac* which shows the Accumulator A/B Trigger and related circuits. As an Instruction is read out of Memory, a character read during the fourth Instruction Character (ICC4) Cycle is set into Character Register 1. During this particular Character cycle, a numeric character is required, having the purpose of providing one digit of the address to be operated upon. Since this character is numeric, only the 1, 2, 4 and 8 bits are required for representation. However, the A and B bits, while not utilized for the purpose of Addressing Memory, are available for any other use or purpose which may be required. Thus, during Instruction Character Cycle 4, the B bit of the character is utilized to determine whether Accumulator A or Accumulator B is to be used. The trigger **273*c* is reset atthe start every Instruction time. Thus, the trigger 273*c* is OFF shortly after the start of every Instruction Time. However, if Accumulator B is to be selected a binary 1 will be provided in the B bit of the particular character of the address, read during Instruction Character cycle 4. If the Accumulator A is to be utilized, a binary 0 is present in that particular bit position. Trigger 273*c*, when OFF, emits a positive signal via a cathode follower 275*c* to line A/B TRIG A, which signal is effective, as explained above, to cause a holding of Accumulator A Starting Point Counter to be dumped into the Accumulator Address Counter, and is also effective via the Condition Accumulator Control Circuits to select Accumulator A. When the trigger 273*c* is ON it emits a positive signal via a cathode follower 274*c* to line A/B TRIG B which acts, in like manner, on circuits of Accumulator B. During the fourth Instruction Character cycle, the line ICC4 is positive to condition a Diode Gate 272*c*. If at that time, a binary 1 is contained in the B bit of a Character Register 1, it causes line CR1 B to go positive. A positive signal on the latter line conditions one input of AND circuit 270*c*. When the AND circuit 270*c* is conditioned, an A3 (D3) signal is passed via a cathode follower 271*c* and the conditioned Diode Gate 272*c* to turn ON the trigger 273*c*. However, if a binary 0 had been held in the B bit of Character Register 1, the AND circuit 270*c* would not have been conditioned and the trigger 273*c*** would remain OFF. Thus, it is seen that the selection of Accumulator A or Accumulator B depends upon the particular holding of the B bit of the character read from Memory during Instruction Character cycle 4.

Referring to Fig. 2*ad*, three representative stages of the Accumulator Regeneration Counter are shown. This counter is comprised of nine triggers of which triggers **280*c*, 281*c* and 282*c* are representative. The binary input of the trigger 280*c* receives a negative W1 (D3)** signal, which is effective to shift the condition of the trigger. This counter is a pure binary counter so that as a trigger shifts to an OFF from an ON condition, it emits a negative pulse to the succeeding higher trigger, thereby shifting the condition of the latter. The outputs of the various triggers are passed via cathode followers to represent, by positive or negative outputs, a binary 1 (when ON) or a binary 0 (when OFF).

CHARACTER REGISTERS

Characters which may be read out of Memory and the selected Accumulator, are set at AO time of the character cycle, into Character Register 1 and Character Register 2, respectively. The information is in the form of a 7 bit character and a character stored in a Character Register remains in the register until RO time of the next Character cycle. The circuits for Character Register 1 are shown in Fig. 3*a*. Inasmuch as the circuits for each of the respective bits 1, 2, 4, 8, A, B, and C are identical in circuitry only the details of circuits for the 1 bit are shown and described. If a binary 1 is contained in the 1 bit position of the Character read out of Memory, the line MEM1 is positive to condition one input of a gate circuit 302. The gate circuit 302, while conditioned, passes an A0 (D4) signal, which is effective to turn ON a trigger 303. If a binary 0 had been read out of Memory, the gate circuit 302 would not have been conditioned and the trigger 303 would have remained OFF. Trigger 303, when ON, emits a positive signal via a grounded grid amplifier 305 and cathode followers 307 and 309 to line CR1 1. The trigger 303, when OFF, emits a positive signal via a grounded grid amplifier 304 and cathode followers 306 and 308 to line CR1 $\bar{1}$. Thus, the holding of the trigger 303, when OFF and representing a binary 0, causes a positive signal on the line CR1 $\bar{1}$, while the same trigger, when ON and representing a binary 1, causes a positive signal on the line CR1 1. A binary 1 may be also set into the trigger 303 as certain control circuits (not shown), cause the line SET CR1 to 1 to go positive. This signal feeds via cathode follower 301 to condition the gate 302, which passes the A0 (D4) signal to turn the trigger 303 ON. The trigger is reset OFF every R0 time as indicated by a W in the lower right corner of the block representing the trigger.

The circuits of Character Register 2 are identical to those shown for Character Register 1 and no point would be served in duplicating drawings. A line ACC1 (Accumulator output for the 1 bit) corresponds to line MEM1 and Character Register 2 output lines CR2 $\overline{1}$ and CR2 1 correspond to output lines CR1 $\overline{1}$ and CR1 1.

Refer now to Fig. 3*b* which shows Code Checking circuits. For Character Register 1 identical circuits are used for Code Checking of Character Register 2. The signals for the 1, 2, and 4 bits signifying holdings of binary 1's or binary 0's, as the case may be, are fed in various combinations to AND circuits 310 through 313 so that if only a single binary 1 is contained in the three bits, or if binary 1's are contained in all three bits, the output of one or more of the AND circuits is positive and passes through the OR circuit 314. The output of the OR circuit 314 passes via a cathode follower 315 to line 316. Thus, the signal on the line 316 is positive if an odd number of binary 1's are contained in the 1, 2, and 4 bit positions. In an identical manner, signals representative of bits 8, A, and B are fed to AND circuits 317 through 320, whose outputs feed via an OR circuit 321 and a cathode follower 322 to line 323. It follows that the line 323 is positive if an odd number of binary 1's are contained in the 8, A and B bit positions. The remaining circuitry in Fig. 3*b* is utilized to fulfill the determination of whether an ODD or EVEN number of binary 1's are contained in Character Register 1. Assume for purpose of explanation that lines 316 and 323 are positive, indicating an odd number of binary 1's in the 1, 2, and 4 bits and an odd number of binary 1's in the 8, A, and B bits, respectively. This signifies, in effect, an even number of binary 1's in the 1, 2, 4, 8, A, and B bits. Since both lines 316 and 323 are positive, the output of OR circuit 324 drives line 325 positive. Line 325 being positive, conditions one input of the AND circuit 328 and also feeds via an OR circuit 326 and line 327 to condition one input of an AND circuit 340. The second input to the AND circuit 328 is via line CR1 C. If an even number of binary 1's are contained in the 1, 2, 4, 8, A, and B bits, this second input to the AND circuit 328 should be negative since the C bit should contain a binary 0. Thus, the output of the AND circuit 328 should be negative and feed via a cathode follower 329 to line 330. However, as assumed, lines 323 and 316 are positive and thereby condition both inputs of AND circuit 331, whose output via line 332 and cathode follower 333 drives line 330 positive. Since cathode followers 329 and 333 act as an OR circuit, the signal on line 330 is positive and passes via an inverter 336 and a cathode follower 337 to line 339. The alternate circuit to line 339 is via an AND circuit 334. As explained above, under the assumed conditions, line 332 is positive and therefore conditions one input of AND circuit 334. If the C bit contains a binary 0, which it should for a correct code, the second input of the AND circuit 334 via line CR1 C is negative. The negative output of the AND circuit 334 feeds via line 335 and a cathode follower 338 to line 339. Therefore if a correct code exists in Character Register 1, under the assumed conditions, no signal is developed to drive line 339 positive. Since line 339 is negative, the second input of AND circuit 340 is not conditioned. Hence, a negative output of AND circuit 340 passes via a grounded grid amplifier 341 and a cathode follower 342 to line CR1 CODE CHECK ODD. It follows under the assumed conditions, that line CR1 CODE CHECK ODD is negative, since an even number of binary 1's exists in Character Register 1. It will be apparent and obvious to those skilled in the art how the circuit functions for various bit conditions. If an Odd number of binary 1's had been contained in the particular 7 bits, the line CR1 CODE CHECK ODD would be driven positive and the positive signal can be utilized to signify an error.

As mentioned above, in combination with each Character Register, there is provided switching circuits for recognizing the presence or absence of certain characters, or a particular permutation of certain bits comprising the character, contained in Character Register 1 or Character Register 2. The recognition of these characters or combination of bits is utilized, in combination with other signals, to control a sequence of operations for carrying out the execution of a particular Instruction.

Referring to Fig. 3*c* the Character Recognition circuits, associated with Character Register 2, are shown. Character Recognition circuits of Character Register 1 are shown in Figs. 3*d* and 3*e* with Fig. 3*d* arranged above 3*e*. Both of these Recognition circuits are similar to those shown and described in the application of Rochester et al. mentioned above, and the operation of these circuits is well known and understood by those skilled in the art. By way of example, refer to Fig. 3*c* wherein an AND circuit 350 receives inputs via lines CR2 $\overline{1}$, CR2 2, CR2 $\overline{4}$ and CR2 8. Inspection of the code chart Fig. 5*a* shows that a numerical 0 is represented by a binary 1010, i.e., binary 1's in the 2 and 8 positions. Thus, if all four inputs to the AND circuit 350 are positive, it signifies a holding of a numerical zero in Character Register 2, and its positive output passes via a grounded grid amplifier 351 and a cathode follower 352 to line CR2 ZERO. It follows that line CR2 ZERO is positive when a numerical zero is contained in Character Register 2. The positive signal on line CR2 ZERO also passes via an inverter 353 and a cathode follower 354 to line CR2≠ZERO, which line is positive when the holding of Character Register 2 is not numerical zero.

The reference Characters used to identify outputs of the Character Recognition circuits, although abbreviated, indicate the holding of the associated Character Registers. Line CR2≠BL/HYP/AMP when positive signifies the character in Character Register 2 is not a Blank, Hyphen, or Ampersand; CR2 BL signifies a Blank; CR2≠BL signifies not a Blank; CR2 AM signifies an Accumulator Mark; CR2 BL/HYP/AMP signifies a Blank, Hyphen or Ampersand; CR2≠SP CHAR signifies not a Special Character; CR2≠NUM signifies not a Numeric Character and CR2 NUM signifies a Numerical Character.

Referring to Figs. 3*d* and 3*e*, output line CR1≠BL/HYP/AMP, when positive, signifies the character in Character Register 1 is not a Blank, a Hyphen or an Ampersand; CR1≠BL signifies not a Blank; CR1 BL signifies a Blank; CR1 NUM signifies a Numeric Character; CR1≠NUM signifies not a Numeric Character; CR1 SP CHAR signifies a Special Character; CR1≠ZERO signifies not a Zero; CR1≠ZERO/COMMA signifies not a Zero or Comma; CR1 PER/COMMA signifies a Period or Comma; CR1≠PER/COMMA signifies not a Peroid or Comma; CR1 ZONE (−) signifies zone bits representing a Negative Sign; CR1 ZONE (+) represents zone for Positive Sign; CR1 ZONE≠(+)(−) signifies not zoned for Positive or Negative Sign; CR1≠RM signifies not a Record Mark; CR1 RM signifies a Record Mark; CR1 (+) (−) signifies a Positive or Negative Sign and CR1>10 signifies a holding greater than ten.

ARITHMETIC CIRCUITS

The Arithmetic Input Switching circuits are shown in Fig. 4*a*. The output signals representing the numeric portion of the character in Character Register 1, present on lines CR1 1, CR1 2, CR1 4 and CR1 8 are fed to AND circuits 401 through 404 respectively. For those bits in Character Register 1 which contain binary 1's, positive signals are emitted to condition the respective AND circuits. The output of the ZONE bits A and B of Character Register 1 are fed via line CR1 A to an AND circuit 406, and via line CR1 B to an AND circuit 424, the respective bits, if representing a binary 1, conditioning the AND circuits. If the holding of Character Register 1 is not ZERO, the line CR1≠ZERO is positive and is effective to condition AND circuits 402 and 404. Then as the line CR1 TO ADDER goes positive, those AND circuits which are then otherwise conditioned, emit positive signals. The outputs of the AND circuits 401 through 404 pass via the grounded grid amplifiers 407 through 410 and cathode followers 411 through 414 to lines CR1 TO ADDER 1, CR1 TO ADDER 2, CR1 TO ADDER 4 and CR1 TO ADDER 8, respectively. The output of the AND circuit 406 passes via a cathode follower 409 to line CR1 TO ADDER A, while the output of AND circuit 424 passes via a cathode follower 425 to a line CR1 TO ADDER B. A positive signal on the line CR1 TO ADDER 1 is passed via an inverter 415 and a cathode follower 416 to the line CR1 TO ADDER $\bar{1}$. The line CR1 TO ADDER $\bar{1}$ is positive when the holding of Character Register 1 is gated to the adder and the 1 bit of Character Register 1 contains a binary 0. Likewise, the signals on lines CR1 TO ADDER 1 through CR1 TO ADDER 8 are positive when their respective bits of Character Register 1 contain binary 1's and the holding of Character Register 1 is gated to the adder.

Positive signals on lines CR1 1 through CR1 8 also condition one input of AND circuits 420 through 423, respectively. The signal on the line CR1≠ZERO is effective, when positive, to condition the second input to AND circuits 421 and 423. Thus, a positive signal on the line CR1 TO T/C, is effective to gate the holding of Character Register 1, 2, 4 and 8 bits via the AND circuits 420 through 423 to the OR circuits 430 through 433, respectively. The outputs of the OR circuits 430 through 433 are passed via cathode followers 435 through 438, to lines 1 TO T/C, 2 TO T/C, 4 TO T/C and 8 TO T/C, respectively; the output of the OR circuit 431 via a grounded grid amplifier 434 before reaching the cathode follower 436. The output signal on the line 1 TO T/C is passed via an inverter 439 and a cathode follower 440 to the line $\bar{1}$ TO T/C; the signal on the latter line being positive when a binary 0 is contained in the 1 bit of Character Register 1 and the holding of Character Register 1 is gated to the True Complement circuits.

The purpose of the signal on line CR1≠ZERO in gating information to the adder or to the True Complement circuits from Character Register 1 is to provide means for changing a binary 1010 representation to a representation of a numerical zero. If Character Register 1 contains a zero represented by a binary 1010, it is comprised of binary 1's in the 2 and 8 bit positions and the line CR1≠ZERO, as explained above, goes negative. The line CR1≠ZERO feeds to the AND circuits 402 and 404 and, when negative, is effective to prevent full conditioning of those particular AND circuits. Therefore, whenever a zero is held in Character Register 1, the binary 1's held in the 2 and 8 bit positions are blocked from passage to the adder. Effectively, binary 0 representations, i.e., negative outputs, are passed for those particular bits. Likewise, when information is gated from Character Register 1 to the True Complement circuits, passage of binary 1's in the 2 and 8 bit positions are prevented when Character Register 1 contains a zero representation, as the AND circuits 421 and 423 receive a negative input via line CR1≠ZERO. Outputs from Character Register 2 may be gated to the True Complement circuits, as lines CR2 1, CR2 2, CR2 4 and CR2 8 condition one input of AND circuits 426 through 429, respectively. The line CR2≠ZERO, when positive, conditions a second input of AND circuits 427 and 429. When AND circuits 426 through 429 are conditioned, a positive signal on line CR2 TO T/C is effective to gate the holding of Character Register 2 via OR circuits 430 through 433 and cathode followers 435 through 438 to lines 1 TO T/C through 8 TO T/C respectively. As described above, the output of OR circuit 431 passes via a grounded grid amplifier 434 to the cathode follower 436. A negative signal on the line CR2≠ZERO removes conditioning from the AND circuits 427 and 429 to prevent passage of binary 1's in the 2 and 8 bit positions when a zero is represented in Character Register 2. It should also be noted that the signal on line 1 TO T/C is passed via an inverter 439 and a cathode follower 440 to line $\bar{1}$ TO T/C. Thus, it is seen that the holding of Character Register 1, both numeric portion and zoning portions (A and B bits), may be gated to an adder, while the numeric portions of Character Register 1 or Character Register 2 may be gated to the True Complement circuits.

As mentioned above, multiplication is accomplished by means of a Multiple Generator which provides multiples of each digit of the multiplicand, specifically, one times, two times, four times, and five times the digit contained in Character Register 1. Proper multiples are selected in a Multiple Selection circuit which is controlled by Multiple Control circuits, the latter circuit containing a digit of the multiplier. After selection, the multiples of a digit are added in a Multiple Adder and are then passed through a Multiple Adder Correction circuit to the Digit Adder. In the Digit Adder, the sum of the multiples are added to digits of a previous partial product.

Since a doubled, quadrupled or quintupled multiple of a multiplicand digit may produce a carry, means are employed to store the carries so they may be added to the generated multiples of a succeeding higher order digit during the next Character cycle. The doubled, quadrupled and quintupled values of each digit gated from Character Register 1 are generated whether or not multiplication is being performed. The Multiple Control circuits contain a Multiplier Register, which during multiplication contains a multiplier digit, but is otherwise reset to represent a value of a decimal 1, and is thereby effective, as explained below, to gate a one times multiple for operations other than multiply.

A Doubler circuit, shown in the upper portion of Fig. *4b*, provides a doubled or two times multiple of the digit received from Character Register 1. Digits 0 through 4, when doubled, provide a factor consisting of a digit and no carry. Digits 5 through 9 result in a factor consisting of an even digit and a carry of one to the succeeding higher order digit. It follows then that for digits 5 through 9 means must be provided to store the carry so that it may be added to a succeeding higher order digit of the multiplicand during the next Character cycle. Signals on lines CR1 TO ADDER 1, CR1 TO ADDER 2, CR1 TO ADDER 4, CR1 TO ADDER 8 and CR1 TO ADDER $\bar{1}$ are positive to represent, respectively, a binary 1 in the 1, 2, 4, and 8 bit positions and a binary 0 in the 1 bit position of Character Register 1.

The Doubler emits signals, representing the doubled value of the character input thereto, which signals are emitted to the Multiple Selection circuits and also to the quadrupler circuits on the lower half of Fig. *4b*. The quadrupler is in fact, another doubler, so that upon doubling the double value, a quadruple value is produced. Since the circuitry of each doubler is identical an explanation of one will suffice.

The following Table I shows the binary representations for binary coded decimal digits (0 through 9) and the binary representations for the doubled value thereof.

*Table I*

| Digit | Binary Code | | | | Double | | | |
|---|---|---|---|---|---|---|---|---|
| | $X_8$ | $X_4$ | $X_2$ | $X_1$ | $D_8$ | $D_4$ | $D_2$ | $D_1$ |
| 0 | 0 | 0 | 0 | 0 | 0 | 0 | 0 | 0 |
| 1 | 0 | 0 | 0 | 1 | 0 | 0 | 1 | 0 |
| 2 | 0 | 0 | 1 | 0 | 0 | 1 | 0 | 0 |
| 3 | 0 | 0 | 1 | 1 | 0 | 1 | 1 | 0 |
| 4 | 0 | 1 | 0 | 0 | 1 | 0 | 0 | 0 |
| 5 | 0 | 1 | 0 | 1 | 0 | 0 | 0 | 0+carry out. |
| 6 | 0 | 1 | 1 | 0 | 0 | 0 | 1 | 0+carry out. |
| 7 | 0 | 1 | 1 | 1 | 0 | 1 | 0 | 0+carry out. |
| 8 | 1 | 0 | 0 | 0 | 0 | 1 | 1 | 0+carry out. |
| 9 | 1 | 0 | 0 | 1 | 1 | 0 | 0 | 0+carry out. |

In the following explanation, CI will indicate a carry from a succeeding lower order, while CO will indicate a carry output to a succeeding high order. By inspection of a particular digit and its double value, in Table I, it can be seen that a carry output is required when in the digit representation a binary 1 is contained in the 8 bit or when binary 1's are contained in both the 4 and 2 bits or when binary 1's are contained in both the 4 and 1 bits. For no other conditions is a carry output required. Similarly, a binary 1 will be present in the 8 bit of the doubled value when, in the digit representation, binary 1's are contained in the 8 and 1 bits, or a binary 1 is contained in the 4 bit and there is no carry CO. A binary 1 will be present in the 4 bit output of the doubler when, a binary 1 is contained in the 2 bit of the digit and there is no carry CO, or a binary 1 is contained in the 1 and 2 bits of the digit and there is a carry CO, or a binary 1 is present in the 8 bit and a binary 0 in the 1 bit. The doubled value requires a binary 1 in the 2 bit when, there is a binary 1 in the 1 bit and there is no carry output CO, or there is a binary 0 in the binary 1 bit and there is a carry output CO. There should be a binary 1 in the 1 bit of the double value, only if there is a carry input CI.

Inspection of circuits of Fig. 4*b* discloses how the requirements under the various rules, stated above, are provided. A carry CO is necessary when a binary 1 is contained in the 8 bit position. Therefore, a positive signal on line CR1 TO ADDER 8 passes via or OR circuit 460, cathode follower 461 and line 2MPL CARRY to a diode gate 466, thereby conditioning the latter. The output of the OR circuit 460 is also positive to condition the diode gate 466 when there is a coincidence of binary 1's in the 1 and 4 bits as represented by positive signals on the lines CR1 TO ADDER 1 and CR1 TO ADDER 4 feeding via an AND circuit 459 as well as when binary 1's are contained in both the 2 and 4 bits as represented by positive signals on line CR1 TO ADDER 4 and CR1 TO ADDER 2 feeding to the AND circuit 458. Positive outputs of AND circuits 458 and 459 also pass via the OR circuit 460. The diode gate 466 being conditioned, under any of the three situations passes a W2 (D3) signal to turn ON a trigger 465. (The trigger 465 goes ON at W5 time.) The signal on line 2MPL CARRY is also passed via an inverter 463 and a cathode follower 462 to a line 2MPL NO CARRY, the latter being positive when no carry CO is required. When no carry CO is required, the signal on line 2MPL NO CARRY conditions a diode gate 464 which passes a W2 (D3) signal to turn OFF the trigger 465. Thus, it is seen that trigger 465 is turned ON or OFF at W5 time to emit a carry or no carry signal to the succeeding higher order.

The 8 bit output of the doubled multiple contains a binary 1, when there is a coincidence of positive inputs to AND circuit 451 or AND circuit 452. The AND circuit 451 is conditioned positive when binary 1's are contained in the 1 and 8 bits of the digit as lines CR1 TO ADDER 1 and CR1 TO ADDER 8 are positive. The AND circuit 452 is conditioned positive, when there is a binary 1 in the 4 bit position, as evidenced by the positive signal on the line CR1 TO ADDER 4, and there is no carry output CO, as evidenced by a positive signal on the line 2MPL NO CARRY. The outputs of the AND circuits 451 and 452 pass through an OR circuit 467, a grounded grid amplifier 468 and a cathode follower 469 to the line 2MPL 8. The latter line then is positive when the 8 bit of the doubled multiple contains a binary 1.

The four bit output of the doubled digit should contain a binary 1, as explained above, when there is a binary 1 in the 2 bit of the digit and there is no carry CO required. This condition is evidenced by positive signals on lines CR1 TO ADDER 2 and 2MPL NO CARRY feeding to the AND circuit 453. Further, a binary 1 is generated in the 4 bit by a coincidence of positive signals on lines CR1 TO ADDER 1 and CR1 TO ADDER 2, signifying a binary 1's in the 1 and 2 bit positions of the digit, feeding to an AND circuit 454. The 4 bit output is also driven positive as coincidence of positive signals occur on the line CR1 TO ADDER $\overline{1}$ and CR1 TO ADDER 8 feeding to an AND circuit 455 which signals represent a binary 0 in the 1 bit position and a binary 1 in the 8 bit position, respectively. The outputs of AND circuits 453, 454, and 455 pass via an OR circuit 470, a grounded grid amplifier 471 and a cathode follower 472 to the line 2MPL 4. It follows that the latter line is positive, when a binary 1 is contained in the 4 bit of the double value.

A binary 1 is represented in the 2 bit position of the doubled value when a coincidence of positive inputs occurs at AND circuit 456 or AND circuit 457. Thus, if a binary 1 is contained in the 1 bit of the digit but there is no carry output, positive signals occur on line CR1 TO ADDER 1 and line 2MPL NO CARRY, which lines feed the AND circuit 456. The AND circuit 457 is conditioned by a coincidence of positive signals on line CR1 TO ADDER $\overline{1}$ and line 2MPL CARRY signifying a binary 0 in the 1 bit of the digit and a carry output CO, respectively. The outputs of the AND circuits 456 and 457 pass via an OR circuit 473, a grounded grid amplifier 474 and a cathode-follower 475 to line 2MPL 2. The latter line is positive when a binary 1 is contained in the 2 bit of the doubled value. The line 2MPL 1 is driven positive by an output of the trigger 465, when ON, passing via a cathode follower 477. The trigger 465, when OFF, represents a condition of no carry from the succeeding lower order and a positive signal is emitted via cathode follower 476 to line 2MPL $\overline{1}$. Thus, means for doubling a digit value has been shown and described.

Assume that successive digits of a multiplicand were 29, the 9 being the units order and the 2 being the tens order. The character 9, read out of Memory, is passed via Character Register 1 and the Arithmetic Input Switching circuits to the Doubler. The character 9 is represented by binary 1's in the 1 and 8 positions. Thus, representation of a binary 1 on the line 2MPL 8 is caused by the Doubler circuits as described, and the trigger 465 is turned ON to represent a carry to the succeeding digit.

During the next Character cycle the character 2 is gated to the Doubler and line CR1 TO ADDER 2 is positive. The binary 1 is represented in the 4 bit output of the doubled value since there is a binary 1 in the 2 bit digit of the input and there is no carry output. Further, since there was a carry from the previous order, the line 2MPL 1 is driven positive. Therefore, during the second Character cycle, the 1 and 4 bits of the doubled value are positive to represent a sum of 5. However, at W5 time of this second cycle, since there is no carry to the succeeding order, trigger 465 is turned OFF. Summarizing, the operation of the Doubler circuits is to emit signals representative of a Doubled value, immediately, and also store a carry, if any, which is added to the succeeding order, doubled value, as it is processed during the succeeding Character cycle.

As mentioned above, the outputs of the Doubler are passed through another Doubler circuit, whose operation is identical. The outputs of the second Doubler result in quadrupled values. The Quadrupled values are also emitted to the Multiple Selection circuits.

Refer now to Fig. 4*c*, which shows the circuitry for the Quintupler. Any digit from 0 through 9, when multiplied by five, that is when quintupled, results in a product consisting of 0 or five in the order being processed and possible carries to the succeeding higher orders. For example, one times five results in a product of five in a units order and no carry to a ten's position. Eight times five results in a product of 0 in the corresponding order and a carry of four to the succeeding order position. It so happens that for even digits, a quintupled output is equal to zero in the corresponding order, while for odd digits, a quintupled output requires a five in the corresponding order. In the Quintupler, five is represented by binary 1's in the 1 and 4 bits and, as in the Doubler and Quadrupler, any carries, resulting from the quintupling of a digit, are stored, so that carries may be added to the quintupled value of the succeeding higher order digit. Thus, upon quintupling a digit value, the result may be modified by any carry or carries from the quintupling of the succeeding lower order digit. In the Quintupler, three triggers are provided for storing carries, one trigger for storing a carry of 1, a second trigger for storing a carry of 2, a third trigger for storing a carry of 4. If a carry of 3 should occur, the triggers for carries of 1 and 2 are energized simultaneously.

By study of the following Table II, the relationship of the outputs of the Quintupler to the fundamental digit representation may be analyzed.

*Table II*

| Digit | Binary Code | | | | 5 Multiple | | | |
|---|---|---|---|---|---|---|---|---|
| | $X_8$ | $X_4$ | $X_2$ | $X_1$ | $Q_8$ | $Q_4$ | $Q_2$ | $Q_1$ |
| 1 | 0 | 0 | 0 | 1 | 0 | 1 | 0 | 1. |
| 2 | 0 | 0 | 1 | 0 | 0 | 0 | 0 | 0+1 carry. |
| 3 | 0 | 0 | 1 | 1 | 0 | 1 | 0 | 1+1 carry. |
| 4 | 0 | 1 | 0 | 0 | 0 | 0 | 0 | 0+2 carry. |
| 5 | 0 | 1 | 0 | 1 | 0 | 1 | 0 | 1+2 carry. |
| 6 | 0 | 1 | 1 | 0 | 0 | 0 | 0 | 0+3 carry. |
| 7 | 0 | 1 | 1 | 1 | 0 | 1 | 0 | 1+3 carry. |
| 8 | 1 | 0 | 0 | 0 | 0 | 0 | 0 | 0+4 carry. |
| 9 | 1 | 0 | 0 | 1 | 0 | 1 | 0 | 1+4 carry. |

In the following discussion, the notations C1, C2, C4 will refer to carries of 1, 2, and 4, respectively. A binary 1 in the 8 bit position of the quintupled value is required, if there is a binary 1 in the 1 bit of the digit being quintupled and there is a carry of 4, C4, from the succeeding lower order. A binary 1 is also required in the 8 bit position of the quintupled value, if there is a binary 1 in the 1 bit of the digit being quintupled and a carry of 3, that is, a combination of C1 and C2 from a succeeding lower order. There is a binary 1 in the 4 bit of the quintupled value for every odd original digit, that is, for every digit containing a binary 1 in the 1 bit position provided, however, that the quintupled value is not modified by carries from a lower order sufficient to cause a binary 1 in the 8 bit position of the quintupled value, i.e. carries of 3 or 4. There is also a binary 1 in the 4 bit position whenever there is a carry of 4 from a succeeding lower order unless quintupling of the digit modifies the final result to cause a binary 1 in the 8 bit.

A binary 1 in the 2 bit of the quintupled value is required, only when there is a binary 1 in the 1 bit of the digit being processed and a carry of 1 from a succeeding lower order but no binary 1 in the 8 bit position of the quintupled value. A binary 1 in the 2 bit is also required when there is a carry of 2 but no other carries or bits of the digit being processed sufficient to cause a binary 1 in the 8 bit position of the quintupled value.

There is a binary 1 in the 1 bit of the quintupled value, if there is a binary 1 in the 1 bit position of the digit being processed, and no carry of 1 from the succeeding lower order. Otherwise, there is a binary 1 in the 1 bit of the final value if there is a carry of 1 from the succeeding lower order and no binary 1 in the 1 bit position of the digit being processed.

Referring to Fig. 4*c*, a binary 1 in the 8 bit position of the digit being processed causes a positive signal on line CR1 TO ADDER 8, which positive signal is effective to condition a diode gate 481. The diode gate 481, being conditioned, passes a positive W2 (D3) pulse, which pulse, upon going negative at W5 time, is effective to turn ON a trigger 484. Trigger 484, when ON emits a positive signal via a cathode follower 485 to line 5MPL CARRY 4. Thus, it is seen that if there is a binary 1 in the 8 bit position of the digit being processed a carry of 4 is stored by turning ON trigger 484. If there was no binary 1 in the 8 bit position of the digit being processed, then no carry of 4 should be provided and a negative signal on line CR1 TO ADDER 8 passes via an inverter 480 and a cathode follower 482 to condition the diode gate 483. The diode gate 483, while conditioned, passes a W2 (D3), which is effective at W5 time to turn OFF the trigger 484. Thus, it is seen that if a digit being processed contains a binary 1 in the 8 bit position, a carry of 4 is stored for addition to the quintupled value of the next digit, but if the 8 bit of the digit being processed contains a binary 0, no carry of 4 is provided.

If the 4 bit of the digit being processed contains a binary 1, a positive signal occurs on the line CR1 TO ADDER 4, to condition a diode gate 489. Therefore, a W2 (3D) pulse passes via the conditioned diode gate 489 to turn ON a trigger 490. The trigger 490 is turned OFF when a binary 0 is contained in the 4 bit of the digit being processed as a negative signal on line CR1 TO ADDER 4 is passed via an inverter 486 and a cathode follower 487 to condition a diode gate 488. When the latter diode gate is conditioned a W2 (3D) signal is passed to turn OFF the trigger 490. The trigger 490, when ON, emits a positive signal via the cathode follower 491 to line 5MPL CARRY 2 signifying, when positive, a carry output of 2. When trigger 490 is OFF the latter line is negative to signify no carry output of 2.

In a similar manner, a binary 1 in the 2 bit of the digit being processed is effective via a diode gate 495 to gate a W2 (3D) signal to turn ON the trigger 496. When a binary 0 is contained in the 2 bit, a negative signal on the line CR1 TO ADDER 2 is effective via an inverter 492 and a cathode follower 493 to condition a diode gate 494 which passes a W2 (3D) pulse to turn OFF the trigger 496. The trigger 496, when ON, emits a positive signal via a cathode follower 498 to line 5MPL CARRY 1 to signify a carry of 1 exists and when OFF emits a positive signal via a cathode follower 497 to the line $\overline{5\text{MPL CARRY 1}}$ to signify no carry of 1.

It should be noted that the triggers 484, 490 and 496 are reset OFF during each Instruction time and are otherwise turned ON or OFF at W5 time of the Character cycle, that is, the triggers are turned ON or OFF during the concluding portion of a Character cycle to emit a carry or no carry signal to the succeeding order cycle.

As mentioned above, there should be a binary 1 in the 8 bit position of the final result when the digit being processed contains a binary 1 in the 1 bit position and a carry of 4 exists.

This condition is provided by a coincidence of positive signals on the lines CR1 TO ADDER 1 and 5MPL CARRY 4 feeding to an AND circuit **401*a*. The positive output of the AND circuit 401*a* passes via an OR circuit 410*a* and a cathode follower 414*a* to drive line 5MPL 8 positive. There is also a binary 1 in the 8 bit position of the final result when there is a binary 1 in the 1 bit of the value being processed and carries of 1 and 2 exist. This latter condition is partially satisfied by coincidence of positive signals on lines CR1 TO ADDER 1 and 5MPL CARRY 1 feeding to an AND circuit 403*a* whose positive output conditions one input of an AND circuit 406*a*. Thus, this first input of an AND circuit 406*a* is conditioned when therein a binary 1 in the 1 bit position and a carry of 1. The second input to the AND circuit 406*a* is via line 5MPL CARRY 2, which is positive when there is a carry of 2. The output of the AND circuit 406*a*, then, is positive when there is both a carry of 2 and a carry of 1 from the previous Character Cycle and also a binary 1 in the 1 bit of the digit being processed. The positive output of the AND circuit 406a passes via the OR circuit 410a and the cathode follower 410a to the line 5MPL 8. The signal on the latter line passes via an inverter 411a and a cathode follower 412a to line 5MPL $\overline{8}$**. The latter line is positive when there is a binary 0 in the 8 bit output of the final result. This latter signal is used as a condition to determine whether or not there should be a binary 1 in the 4 and 2 bit positions, but the determination is made in the Multiple Selection circuits, Fig. 4*d*, explained below.

As mentioned above, a binary 1 is required in the 4 bit position of the quintupled result when there is a binary 1 in the 1 bit position of the value being processed but no binary 1 in the 8 bit position of the quintupled result, or, when there is a carry 4 from the succeeding lower order but no binary 1 in the 8 bit position of the quintupled result. A positive signal on the line 5MPL CARRY 4 or line CR1 TO ADDER 1 passes via an OR circuit 402a and a cathode follower 407a to line 5MPL 4. The signal on the latter line, then is positive when there is a carry of 4, or when there is a binary 1 in the 1 bit position of the digit being processed. The blocking required by a binary 1 in the 8 bit of the final result is effected by the signal on the line 5MPL $\overline{8}$ in Multiple Selection circuits.

A binary 1 is required in the 2 bit position of the final result, as explained above, when there is a carry of 2 from the lower order. The signal on line 5MPL CARRY 2 passes via an OR circuit 408a and a cathode follower 413a to line 5MPL 2. A binary 1 is also required in the 2 bit when there is a carry of 1 from a succeeding lower order and binary 1 in the 1 bit position of the digit being processed but no binary 1 in the 8 bit of the result. This condition is partially provided as a coincidence of positive signals on lines 5MPL CARRY 1 and CR1 TO ADDER 1 feeding to the AND circuit 403a. The positive output of AND circuit 403a passes via the OR circuit 408a, and the cathode follower 414a to the line 5MPL 2. If there is a binary 1 in the 8 bit of the result, the positive signal on the line 5MPL 2 is blocked in the Multiple Selection circuits.

As mentioned above, a binary 1 is required in the 1 bit of the quintupled result provided there is a carry of 1 from the succeeding lower order but no binary 1 in the 1 bit of the digit being processed or if there is no carry from the succeeding lower order but a binary 1 in the 1 bit of the digit being processed. The circuits determining the presence of these conditions are an OR circuit 404a, which receives inputs via lines CR1 TO ADDER 1 and 5MPL CARRY 1, and an OR circuit 405a, which receives inputs via lines CR1 TO ADDER $\overline{1}$ and 5MPL CARRY $\overline{1}$. The outputs of the OR circuits 404a and 405a feed to an AND circuit 409a, whose positive output passes via a cathode follower 415a to drive a line 5MPL 1 positive.

Thus, except for the blocking condition made necessary by the fact that a binary 1 is present in the 8 bit of the final quintupled result, circuits have been shown and described for generating a quintupled value of a digit which is gated from Memory to the Arithmetic circuits.

The Multiple Selection circuits shown in Fig. 4*d*, are utilized to select the desired multiple or multiples of single, double, quadruple or quintuple multiples. During most operations, such as Add, Subtract, etc. one times the digit in Character Register 1 or the single multiple is gated by this circuit. However, during a Multiply operation, the Multiple Control circuit emits outputs representing a digit of the multiplier. These outputs, representing a multiplier digit, condition certain AND circuits in the Multiplier Selection circuits. For example, signals on lines CR1 TO ADDER 1, CR1 TO ADDER 2, CR1 TO ADDER 4, and CR1 TO ADDER 8 feed to AND circuits 420a through 423a, respectively and those bits representing binary 1's, condition the respective AND circuits 420a through 423a. The second input to each respective AND circuit 420a through 423a is via line SEL1 MPL. Thus, if line SEL1 MPL is positive, the signals representing binary 1's on lines CR1 TO ADDER 1 through CR1 TO ADDER 8 are gated respectively to inputs of OR circuits 432a through 435a, respectively. Likewise, the quintupled value contained on lines 5MPL 1 through 5MPL 8 are gated via AND circuits 424a through 427a, to OR circuits 432a through 435a, respectively, by a positive signal on line SEL5 MPL. It should be noted that the AND circuits 425a and 426a require a third positive input via line 5MPL $\overline{8}$ for complete coincidence. As stated above, in the determination of the requirements of the 2 and 4 bits of a quintupled value, if a binary 1 is contained in the 8 bit of the quintupled value, then, the 2 and 4 bits should contain binary 0's. The line 5MPL $\overline{8}$, which is positive only when a binary 0 is contained in the 8 bit of the quintupled value, is one input of the AND circuits 425a and 426a. Therefore only if the 8 bit of the quintupled value contains a binary 0 are the binary 1 values for the 2 and 4 bits, otherwise generated for the quintupled value, allowed to pass to the OR circuits 433a and 434a.

The quadrupled value is represented on lines 4MPL 1 through 4MPL 8 feeding to AND circuits 428a through 431a, respectively, and to AND circuits 454a through 457a respectively. The signals are gated through the AND circuits 428a through 431a to the OR circuits 432a through 435a by a positive signal on line SEL4 MPL B, and through the AND circuits 454a through 457a to OR circuits 459a through 462a, respectively, by a positive signal on line SEL4 MPL A. Positive signals emitted to the OR circuits 432a through 435a are passed via grounded grid amplifiers 436a through 439a and cathode followers 440a through 443a to lines MPL 1B, MPL 2B, MPL 4B and MPL 8B, respectively. Thus, it is seen that the single, quadruple or quintuple values may be gated to the lines MPL 1B through MPL 8B.

The signals of the Doubled value present on the lines 2MPL 1 through 2MPL 8 condition one input of AND circuits 450a through 453a, respectively, and are gated by a positive signal on line SEL2 MPL to OR circuits 459a through 462a, respectively. Positive inputs to the OR circuits 459a through 462a are passed via grounded grid amplifiers 465a through 468a and cathode followers 469a through 472a to lines MPL 1A, MPL 2A, MPL 4A and MPL 8A. Thus, it is seen that a Doubled or Quadrupled value may be gated to lines MPL 1A through MPL 8A, depending upon signals on lines SEL2 MPL and SEL4 MPL A.

If the particular Multiplier digit present in the Multiple Control circuits is 9, then outputs lines SEL5 MPL and SEL4 MPL A of the Multiple Control circuits are positive. Positive signals on the latter lines, as described above, condition AND circuits 424a through 427a and 454a through 457a. Thus, a quintupled value is present on lines MPL 1B through MPL 8B, while a quadrupled value is present on lines MPL 1A through MPL 8A. The multipled values are emitted to a Multiple Adder circuit, Fig. 4*e*.

Fig. 4*e* shows four full adders connected in combination so that the sum of two binary coded decimal digits may be obtained. A carry from each binary order is connected to an input of the succeeding higher binary order except the "1" bit carry input is a decimal carry from the addition of the succeeding lower order of binary coded decimal digits. In accordance with the rules of binary arithmetic each full adder has three inputs, an A input, a B input and a carry input. If binary 0's are contained in all three inputs, both sum and carry outputs are binary 0. When one input only contains a binary 1, the sum output only contains a binary 1. When any two inputs simultaneously contain binary 1's the carry output only contains a binary 1. When all three inputs contain binary 1's, both the sum and carry outputs should contain binary 1's.

As shown in Fig. 4e, four full adders are connected in combination but the explanation of one full adder will suffice as slight differences in circuitry in the other orders, are apparent to those skilled in the art and well understood. As stated above, one of the requirements of a full adder is that a carry output must be positive to represent a binary 1, if two or more inputs are positive. If binary 1's are represented on line MPL 1A and MPL 1B, both inputs to a AND circuit 404b are positive and its output is positive. The output of the AND circuit 404b passes via cathode follower 406b to the line BINARY MPL1 CARRY. Thus, if binary 1's are contained on the A and B inputs, simultaneously, a binary 1 carry is emitted to carry input of the 2 bit adder. If there was a decimal carry output from processing of the succeeding lower decimal orders, the line MPL CARRY IN is positive and conditions one input of AND circuit 403b. The second input of AND circuit 403b is conditioned positive, if there is a binary 1 input via line MPL 1A or line MPL 1B, both lines feeding via an OR circuit 402b. Thus, if both inputs to the AND circuit 403b are positive, it signifies a combination of a decimal carry input and a binary 1 input from either, or both, the A or B inputs. The output of the AND circuit 403b passes via a cathode follower 405b to the line BINARY MPL1 CARRY. Thus, if two or more binary 1 inputs occur, a carry output is emitted to the succeeding higher order.

Another rule of binary addition, as set forth above, is that there should be a binary 1 sum output if there is a binary input to only one of the three inputs. Assume, that line MPL CARRY IN is positive to represent a binary 1, and lines MPL 1A and MPL 1B are negative to represent binary 0's. The signal on line MPL CARRY IN, when positive, passes via an OR circuit 401b to condition one input of an AND circuit 407b. Under the assumed conditions, the line BINARY MPL1 CARRY is negative since no carry should exist. The negative signal on the latter line is passed via an inverter 408b and a cathode follower 411b to a second input of the AND circuit 407b. Thus, if there is a binary 1 represented on the line MPL CARRY IN but no binary 1 input on either input A or B sufficient to cause a binary carry, both inputs to the AND circuit 407b are positive and its positive output passes via a grounded grid amplifier 410b and a cathode follower 412b to the line MPL1. If, instead of a decimal carry input, there is a binary 1 input on either line MPL 1A or line MPL 1B, a positive signal passes via an OR circuit 402b and the OR circuit 401b to condition one input of the AND circuit 407b. As long as there is no other binary 1 input sufficient to cause a carry, both inputs of the AND circuit 407b are positive, and the line MPL1 is driven positive, as described, to signify a sum output of binary 1.

The third rule of binary addition, set forth above, is that there should be a binary 1 output for both the sum and carry outputs if all three inputs contain binary 1's. Assuming binary 1's on all three inputs, the outputs of the OR circuits 401b and 402b are positive. The positive output of OR circuit 402b conditions one input of the AND circuit 403b. The second input to the AND circuit 403b is conditioned by a positive signal on the line MPL CARRY IN while both inputs to the AND circuit 404b are conditioned positive by signals on lines MPL 1A and MPL 1B and therefore causes a positive signal on line BINARY MPL1 CARRY. The positive output of the OR circuit 401b conditions one input of the AND circuit 407b. Since under the assumed conditions, a carry signal is emitted, the output of the cathode follower 411b tends to be negative. However, the positive output of the AND circuit 404b conditions one input of the AND circuit 409b whose second input is positive when line MPL CARRY IN is positive. Thus, the output of the AND circuit 409b is positive when all three inputs contain binary 1's and this positive signal passes via the cathode follower 413b to condition the second input of the AND circuit 407b. Since both inputs to the AND circuit 407b are positive, the line MPL1 is positive. Thus, it is seen that a binary 1 sum output and a binary 1 carry output are emitted when all three inputs to one order to the adder contain binary 1's.

The adders for the 2, 4 and 8 bits operate in a similar manner, except that in the 2 and 4 bit orders grounded grid amplifiers are provided. For example, in the 2 bit order a grounded grid amplifier 414b and a cathode follower 415b are substituted to perform the function of cathode followers 405b and 406b of the 1 bit order. Thus, it is seen that the particular multiples gated by Multiple Selection circuits of Fig. 4d, are added in the Multiple Adder of Fig. 4e. The carry input via line MPL CARRY IN to the 1 bit position is a carry from the addition of succeeding lower orders, while the carry output via line MPL8 CARRY is effectively a carry to the succeeding higher order. The output signals from the Multiple Adder, including carries, may represent any binary coded decimal value 0 through 19. Sums in excess of 9 must be correct according to the rules of binary coded decimal addition to obtain corrected binary coded decimal representations. The following Table III shows the coding of digits 10 through 19, inclusive, according to the 1, 2, 4 and 8 binary coded decimal representations and also the corrected coded representation.

*Table III*

| Decimal | MPL Adder Sum | Corrected Code |
|---|---|---|
| | 8421 | 8421. |
| Digit: | | |
| 10 | 1010 | 0000+Carry. |
| 11 | 1011 | 0001+Carry. |
| 12 | 1100 | 0010+Carry. |
| 13 | 1101 | 0011+Carry. |
| 14 | 1110 | 0100+Carry. |
| 15 | 1111 | 0101+Carry. |
| 16 | 0000+MPL8 Carry | 0110+Carry. |
| 17 | 0001+MPL8 Carry | 0111+Carry. |
| 18 | 0010+MPL8 Carry | 1000+Carry. |
| 19 | 0011+MPL8 Carry | 1001+Carry. |

Inspection of Table III discloses that the 1 bit need not be corrected since wherever a binary 1 or binary 0 is contained in the 1 bit of the Multiple Adder Sum, a binary 1 or binary 0 respectively, is contained in the Corrected Code. Thus, the 1 bit output line MPL1 is not passed through the Multiple Adder Correction circuits but is fed directly to the Digit Adder (see Fig. 4h). The other outputs of the Multiple Adder, that is, signals on lines MPL2, MPL4, MPL8 and MPL8 CARRY are fed to the Multiple Adder Correction circuits so that the necesary correction may be made.

Inspection of Table III also discloses that for the decimal digits 10 through 19, a Carry output is required. This carry output will, as described below, furnish a Carry input to a succeeding lower order. Table III shows that there are binary 1's in both the 2 and 8 bit positions of decimal digit sums of 10, 11, 14 and 15 and that there are binary 1's in both the 4 and 8 bit positions of decimal digit sums of 12, 13, 14 and 15. Thus, if binary 1's are contained in both the 2 and 8 bit positions or in both the 4 and 8 bit positions of the uncorrected sum, a carry output is required. Further, for uncorrected digit sums of 16, 17, 18 and 19, there is a carry output via line MPL8 carry. Signals indicative of the above conditions served to develop a stored Carry.

Referring to the Multiple Adder Correction circuits of Fig. 4f, if binary 1's are contained in the 2 and 8 bit positions of the uncorrected sum, the lines MPL2 and MPL8 are positive to condition two inputs of an AND circuit 445b. If binary 1's are contained in both the 4 and 8 positions, positive signals on the lines MPL4 and MPL8 condition two inputs of an AND circuit **446*b*. The third input to the AND circuits 445*b* and 446*b* is via line NOT SEL1 MULT, which line is positive as explained below (see Multiple Control circuits), whenever a selection of any multiple other than a 1 times multiple is made. Thus, the output of AND circuit 445*b* or AND circuit 446*b* is positive whenever there are binary 1's simultaneously in the 2 and 8 bit positions or in the 4 and 8 bit positions. These positive outputs feed to the OR circuit 447*b*. A third input to the OR circuit 447*b* is via line MPL8 CARRY, which line is positive when a carry is emitted from the 8 bit position. Thus, for all conditions, for which there should be a carry output, there is a positive input to the OR circuit 447*b*, whose output passes via a grounded grid amplifier 448*b* and a cathode follower 449*b* to the line MPL CARRY OUT. The signal on the latter line is passed via an inverter 450*b* and a cathode follower 451*b* to the line NO MPL CARRY OUT. The latter line is positive when there is no carry output from the Multiple Adder, that is, for decimal sums below 10. Thus, for decimal sums of less than 10 the line MPL CARRY OUT is negative while the line NO MPL CARRY OUT is positive. A positive signal on the latter line conditions one input of AND circuits, 422*b*, 430*b* and 439*b*. When the line NO MPL CARRY OUT is positive, no correction is necessary of the binary 1's or binary 0's contained in the 2, 4 and 8 bit positions and the holding of those particular bits should be gated to the respective output lines of the Multiple Adder Correction circuits. Thus, while line NO MPL CARRY OUT is positive, a signal representative of a binary 1 in the 2 bit position is passed via the condition AND circuit 422*b*, an OR circuit 424*b*, a grounded grid amplifier 425*b* and a cathode follower 426*b* to the line C MPL2 (the "C" on this notation signifying a corrected value). The signal representative of binary 1 on line MPL4, is passed via the conditioned AND circuit 430*b*, an OR circuit 432*b*, a grounded grid amplifier 433*b* and a cathode follower 434*b* to a line C MPL4. Likewise, a signal representative of a binary 1 in the 8 bit position is passed from line MPL8 via the conditioned AND circuit 439*b*, an OR circuit 440*b*, a grounded grid amplifier 441*b* and a cathode follower 442*b*** to line C MPL8. Thus, it is seen for sums less than ten no correction is applied.

For sums equal to and greater than 10, the line NO MPL CARRY OUT is negative since a carry does exist, and the signals for the 2, 4, and 8 bits are not gated through the circuits, as described. However, for sums equal to and greater than 10, the line MPL CARRY OUT is positive. It should be noted (see Table III) that each binary 1 or 0 in the 2 bit of the Multiple Adder Sum, requires a complement of the binary 1 or 0 in the same bit of the Corrected Code. For example, the decimal digit 10, which contains a binary 1 in the 2 bit position, requires a binary 0 in the 2 bit position of the Corrected Code. This complementing is provided by the following circuits. A negative signal on line MPL2 passes via an inverter **402*b*, a cathode follower 421*b* and line $MPL\overline{2}$ to condition one input of the AND circuit 423*b*. This input to the AND circuit 423*b* represents, when positive, a binary 0 in the Multiple Adder Sum 2 bit position. The second input to the AND circuit 423*b* is via line MPL CARRY OUT so that whenever the uncorrected sum is above 10 and a binary 0 is contained in the 2 bit position both inputs to the AND circuit 423*b* are positive. The positive output passes via the OR circuit 424*b*, the grounded grid amplifier 425*b* and the cathode follower 426*b*** to drive line C MPL2 positive. Conversely, if the signal on line MPL2 had been positive, representing a binary 1, the line C MPL2 would be negative to represent a binary 0.

Inspection of Table III also shows that if binary 1's are contained in both the 2 and 4 bit positions of the Multiple Adder Sum, a binary 1 is required in the 4 bit position of the Corrected Code. This rule applies specifically to sums of 14 and 15. To provide for this rule, signals on lines MPL2 and MPL4, both positive when binary 1's are contained in their respective bit positions, condition both inputs to AND circuit **429*b* whose positive output passes via an OR circuit 432*b*, a grounded grid amplifier 433*b* and a cathode follower 434*b*** to drive line C MPL4 positive. The latter line, when positive, represents a binary 1 in the 4 bit position.

For sums of 16 and 17, it may be noted that Multiple 8 Carry outputs are emitted and binary 0's are contained in the 2 bit positions. Further, for corrected Sums of 16 and 17 binary 1's are required in the 4 bit positions. These binary 1's in the 4 bit positions are provided by AND circuits **431*b* which is conditioned by positive signals on lines MPL2 and MPL8 CARRY, which are positive when the Multiple Adder Sum contains a binary 0 in the 2 bit position and a carry is emitted from the 8 bit position. The output of the AND circuit 431*b* passes via the OR circuit 432*b*, the grounded grip amplifier 433*b* and the cathode follower 434*b*** to the line C MPL4. Thus, circuits have been shown and described to provide for various conditions requiring correction to the 4 bit.

For corrected sums of digits 18 or 19, a binary 1 is required in the 8 bit position. Inspection of Table III shows that the Multiple Adder Sums for these decimal digits contain a binary 1 in the 2 bit position and also a carry from the 8 bit position. Thus, positive signals on the lines MPL2 and MPL8 CARRY are fed to an AND circuit **438*b*, whose positive output passes via the OR circuit 440*b*, the grounded grid amplifier 441*b* and the cathode follower 442 to line C MPL8. Thus, it is seen for each digital output of the multiple Adder Sum, a Corrected Code Sum is developed. There remains, however, the generation of a signal indicating a carry or no carry to the succeeding high order digits. The line NO MPL CARRY OUT, when positive, conditions the diode gate 453*b* whereby a W2 (D3) signal passes via the diode gate to turn OFF a trigger 454*b*. The trigger 454*b*, when OFF, emits a negative output via a cathode followed 455*b* to the line MPL CARRY IN. It should also be noted that the line MPL CARRY OUT, when positive, conditions one input of a diode gate 452*b*. Under the latter condition the W2 (D3) signal passes via the diode gate 452*b* to turn ON the trigger 454*b*. The trigger 454*b*, when ON, emits a positive output via the cathode follower 455*b* to the line MPL CARRY IN. Thus, if there has been a carry output from the 8 bit of the Multiple Adder sum to the Multiple Adder Correction circuits, the line MPL CARRY IN goes positive, but if there has been no carry the latter line goes negative. It should be noted that the shifting of trigger 454*b*** occurs at approximately W5 time of the cycle, after processing of the particular digital order has been completed. Thus, the line MPL CARRY IN is positive or negative, as required, during the succeeding Character cycle when succeeding higher digital orders are processed.

Referring to Fig. 4*g*, the True Complement Control circuits are shown. These True Complement Control circuits consist of switching circuits necessary to generate a 9's complement of the input thereto and also to gate either the True or Complement representation of the particular digit to the Digit Adder circuits. The input signals to the True Complement Control circuits are emitted from the Arithmetic Input Switching circuits of Fig. 4*a*, described above, and may represent characters from either Memory or Accumulator storage.

The 9's complement of a digit is that digit, which, when added to the digit being complemented, results in a sum of 9. The following Table IV shows the representation of binary coded decimal digits in true and complement form.

*Table IV*

| Digit | True | Complement |
|---|---|---|
| | 8421 | 8421 |
| 0 | 0000 | 1001 |
| 1 | 0001 | 1000 |
| 2 | 0010 | 0111 |
| 3 | 0011 | 0110 |
| 4 | 0100 | 0101 |
| 5 | 0101 | 0100 |
| 6 | 0110 | 0011 |
| 7 | 0111 | 0010 |
| 8 | 1000 | 0001 |
| 9 | 1001 | 0000 |

A True or Complement representation is emitted from the True Complement Control circuits depending upon the signal present on line COMPLEMENT. If the signal or line COMPLEMENT is positive, then a complement of an input digit is gated to the Digit Adder. However, if the signal on line COMPLEMENT is negative, that signal is passed via an inverter 460*b* and a cathode follower 462*b* to line TRUE. The latter line, when positive, is effective to gate a true value of the input digit. A reference to Table IV shows that there is a binary 1 in the 1 bit of the complement representation, if there is a binary 0 in the 1 bit of the true representation. Thus, a positive signal on the line 1 TO T/C conditions one input of an AND circuit 480*b*, whose second input is conditioned a positive signal on the line TRUE. Thus, if there is a binary 1 in the 1 bit of the input digit and a true representation is required, the output of the AND circuit 480*b* goes positive and passes via an OR circuit 481*b*, a grounded grid amplifier 482*b* and a cathode follower 483*b* to drive the line T/C 1 positive. The latter line, when positive, represents a binary 1 in the 1 bit position. If, however, there is a binary 0 in the 1 bit of the input digit, the line $\overline{\mathbf{1}}$ TO T/C is positive and conditions one input of the AND circuit 479*b*; the second input being conditioned by a positive signal on the line COMPLEMENT. When both inputs are positive, the output of the AND circuit 479*b* is positive and passes via the OR circuit 481*b*, the grounded grid amplifier 482*b* and the cathode follower 483*b* to line T/C 1. Thus, it is seen that if there is a binary 1 in the 1 bit position of the input digit and a True representation is required, a binary 1 signal is present on line T/C 1 and also when there is a binary 0 in the 1 bit digit and a Complement is required.

Inspection of Table IV also shows that the binary 1's or 0's for the 2 bit are the same in both Complement and True representations. Hence no gating is necessary for the representation of this particular bit. It should be noted that the input line 2 TO T/C is connected directly to the output line T/C 2.

Inspection of Table IV also shows that there is a binary 1 in the 4 bit of the Complement representation, when there is a binary 1 in the 2 bit or a binary 1 in the 4 bit of the True representation, but not when there are binary 1's, simultaneously, in both the 2 and 4 bits. If there is a binary 1 in the 4 bit of the input digit, the line 4 TO T/C is positive and conditions one input of the AND circuit 475*b*. If a True representation is required, the line TRUE is positive, therefore, both inputs to the AND circuit 475*b* are positive. The positive output of the latter AND circuit is passed via a grounded grid amplifier 476*b* and a cathode follower 477*b* to line T/C 4. If a Complement representation is required, then the logic for the rules, stated above, are provided by the following circuits. If there is a binary 1 in either the 2 or 4 bit of the input digit, then either line 2 TO T/C or 4 TO T/C is positive. Both lines 2 TO T/C and 4 TO T/C feed via an OR circuit 478*b* to condition one input of an AND circuit 477*b*. Thus, if there is a binary 1 in the 2 or in the 4 bit position of an input digit, one input of the AND circuit 474*b* is conditioned positive. However, according to the rule, as stated above, there must not be binary 1's in both the 2 and 4 bit positions. This latter condition is provided as the lines 2 TO T/C and 4 TO T/C feed to the AND circuit 470*b*. If both inputs are positive, the output of the AND circuit 470*b* passes via an inverter 471*b* and a cathode follower 472*b* to a second input of the AND circuit 474*b*. This output of the cathode follower 472*b* is positive only when there is not a coincidence of positive inputs to the AND circuit 470*b*. Thus, the second input of the AND circuit 474*b* is conditioned positive only if there is a binary 0 in either one or both the 2 and 4 bit positions. The third input of the AND circuit 474*b* is via line COMPLEMENT. It is apparent that upon coincidence of three positive inputs, the output of the AND circuit 474*b* passes via the grounded grid amplifier 476*b* and the cathode follower 477*b* to the line T/C 4.

Inspection of Table IV shows that the 8 bit of the Complement representation contains a binary 1 when binary 0's are contained, simultaneously, in the 8, 4 and 2 bits of the true value. A true representation of the 8 bit is provided by a coincidence of positive signals on lines 8 TO T/C and TRUE feeding to the AND circuit 466*b*. The output of the AND circuit 466*b* passes via an OR circuit 467*b*, a grounded grid amplifier 468*b* and a cathode follower 469*b* to the line T/C 8. Provision for the complement representation is provided as signals on lines 2 TO T/C, 4 TO T/C and 8 TO T/C feed via an OR circuit 462*b*, an inverter 463*b*, and a cathode follower 464*b* to an AND circuit 465*b*. Thus, if there is a binary 1 in the 2, 4 or 8 bit positions, this particular input to the AND circuit 465*b* is negative. However, if the 2, 4 and 8 bits all contain binary 0's, this input to the AND circuit 465*b* is positive and, if coincident with a positive signal on the line COMPLEMENT, causes a positive output to pass via the OR circuit 467*b*, the grounded grid amplifier 468*b* and the cathode follower 469*b* to the line T/C 8. Thus, circuits have been shown and described for gating a True Complement representation of the Digit Adder.

The Digit Adder is shown in Fig. 4*h*. This Digit Adder adds, parallel by bit and serially by digit, inputs received from the True Complement Control circuits, the Multiple Adder and Multiple Adder Correction circuits and the Decimal Carry circuits. Four binary full adders, substantially identical to those of the Multiple Adder, described above, comprise the Digit Adder. Since a detailed explanation was made of one order of the Multiple Adder, no purpose would be served in repeating an explanation at this time. As explained above, a full adder receives three inputs and produces output signals consisting of sum and carry signals. The output of the entire Digit Adder, comprised of four binary full adders, may represent a sum of 0 through 19. A sum of 19 would result from the addition of digits 9 plus 9 plus a carry from a succeeding lower order. Because the Digit Adder is a pure binary adder, correction is necessary since the sum must be represented in a binary coded decimal form. The correction required is provided by the Digit Adder Correction circuits. It should be noted that decimal carry inputs to the Digit Adder may arrive via line DEC CARRY IN, i.e., a decimal carry emitted by the Decimal Carry circuits of Fig. 4*i*, or via line ROUTE DEC CARRY IN, i.e., a manufactured decimal carry signal emitted under certain conditions. Both decimal carry input signals pass via an OR circuit 484*b*.

The Decimal Carry circuits are shown on Fig. 4*i*. These circuits receive input signals from the Digit Adder and produce output signals for the Digit Adder circuits, the Digit Adder Correction and Character Generator circuits and other Control circuits. The Decimal Carry circuits recognize if the output of the Digit Adder is a sum greater or less than 9, and emit output signals to provide, accordingly, an indication of a Carry or No Carry condition. This carry output is necessary for correction of the binary sum in a binary coded decimal representation, and also to store a carry for addition to a succeeding higher order during the next Character cycle. The logic of the Decimal Carry circuit is identical to the logic for carries in the Multiple Adder Correction circuits, that is, a carry output is developed whenever the uncorrected binary sum contains a binary 1's, simultaneously, in both the 2 and 8 bit positions or simultaneously in both the 4 and 8 bit positions, or a binary 8 carry (the latter carry occurs for sums in excess of the digit 15). Referring to Fig. 4*i*, the AND circuits 401c and 402c are conditioned by a signal on the line MINUS ON SUPPRESS ADDER CARRY, which signal is positive except when it is desired to suppress the adder carry. The remaining two inputs to the AND circuit 401c are conditioned by positive signals on lines B SUM 2 and B SUM 8 signifying binary 1's in the 2 and 8 bit positions, respectively. Thus, the output of the AND circuit 401c is positive when binary 1's are contained in the 2 and 8 bit positions of the uncorrected sum provided there is no suppression of the adder carry. The remaining two inputs of the AND circuit 402c are conditioned by positive signals when binary 1's are present in the 4 and 8 bit positions of the uncorrected sum, as lines B SUM 4 and B SUM 8 are positive. The outputs of the AND circuits 401c and 402c feed to an OR circuit 403c, which has a third input via line B SUM 8 CARRY, the latter line, as explained above, being positive when a carry is emitted from the 8 bit position (a sum in excess of 15). Thus, all conditions for which a decimal carry should occur are indicated by a positive output from the OR circuit 403c, which signal passes via a grounded grid amplifier 404c and a cathode follower 405c to line DEC CARRY OUT. The signal on the latter line conditions one input of a diode gate 413c and also passes via an inverter 406c and a cathode follower 407c to line NO DEC CARRY OUT. A positive signal on the line NO DEC CARRY OUT conditions one input of the diode gate 414c. The diode gate 413c, when conditioned, passes a W2 (D3) signal to turn ON a trigger 410c, while the diode gate 414c, when conditioned will pass W2 (D3) signal to turn OFF the trigger 410c. Trigger 410c, when ON, emits a positive output via cathode followers 411c and 412c to the line DEC CARRY IN, and, when OFF, emits a positive signal via cathode followers 408c and 409c to line NO DEC CARRY IN. Thus, when a decimal carry is emitted to a succeeding character cycle, the line DEC CARRY IN is driven positive but when no decimal carry occurs, the line NO DEC CARRY IN is positive. These signals, which represent the presence or absence of a decimal carry, are effective until W5 time of the next Character cycle, so that as the succeeding higher order is processed, a decimal carry, if any, from the previous Character cycle is available.

The Digit Adder Correction and Character Generator circuits are shown in Fig 4*j*. These circuits contain switching circuits necessary to correct the uncorrected sum developed by the digit adder to a corrected binary coded decimal form, to convert a zero 0000 to 1010 (equivalent to a decimal value of ten), to emit a zero (1010), to emit the numeric portion of a Record Mark (1010), and to gate signals to the Check Bit Generator, Output Switch to Memory, and Output Switch to Accumulator. The Digit Adder Correction circuits are identical to those circuits utilized in the Multiple Adder Correction circuits except that the Multiple Adder Correction circuits are provided, at certain points, with grounded grid amplifiers to obtain greater power. Since the logic of the circuits as well as the circuits were explained in some detail in connection with Fig. 4*f*, no purpose would be served in repeating the explanation at this time. Suffice to state that the signals on the lines SUM 1, SUM 2, SUM 4, and SUM 8 represent a corrected binary coded decimal sum.

A positive signal on line DIGIT ADDER OUT is effective to condition AND circuits 420c, 423c, 427c, 428c, 431c and 435c and thereby to gate signals representative of the corrected sum to the proper output lines. A signal representative of the 1 bit passes from line SUM 1 via the conditioned AND circuit 420c, a grounded grid amplifier 421c, and a cathode follower 422c to line RESULT 1. A signal representative of the 2 bit passes from line SUM 2 via the conditioned AND circuit 423c, an OR circuit 424c, a grounded grid amplifier 425c, and cathode follower 426c to line RESULT 2. A signal representative of the 4 bit passes from line SUM 4 via the conditioned AND circuit 428c, a grounded grid amplifier 429c and a cathode follower 430c to line RESULT 4. A signal representative of the 8 bit passes from line SUM 8 via the conditioned AND circuit 431c, an OR circuit 432c, a grounded grid amplifier 433c and a cathode follower 434c to line RESULT 8. As mentioned above, an Adder output of Zero, signified by binary 0's in all bit positions (0000), must be converted to the equivalent of a decimal ten (1010). The output signals of corrected sum on lines SUM 1, SUM 2, SUM 4, and SUM 8 feed a four way OR circuit 436c whose output passes via a grounded grid amplifier 437c, and a cathode follower 438c to the line DIGIT ADDER OUTPUT≠0. Thus, if a binary 1 is contained in any one of the four bits representing the corrected sum, the line DIGIT ADDER OUTPUT≠0 is positive. However, if each bit contains a binary 0 (code of 0000), the line DIGIT ADDER OUTPUT≠0 negative. The negative signal is passed via an inverter 439c and a cathode follower 440c to drive line ADDER OUTPUT ZERO positive. A positive signal on line ADDER OUTPUT ZERO conditions one input of AND circuit 427c and one input of AND circuit 435c. Since the AND circuits 427c and 435c are conditioned by a positive signal on the line DIGIT ADDER OUT as the line ADDER OUTPUT ZERO goes positive, both inputs to both AND circuits 427c and 435c are positive. The output of the AND circuit 427c passes via the OR circuit 424c, the grounded grid amplifier 425c, and the cathode follower 426c to the line RESULT 2, and the output of the AND circuit 435c passes via the OR circuit 432c, the grounded grid amplifier 433c and the cathode follower 434c to the line RESULT 8. Thus, when a sum of zero occurs, binary 1's are effectively inserted in the 2 and 8 bit positions and the zero is represented by a binary code of 0101. The emission of a zero or emission of the numeric portion of a Record Mark, which is equivalent to a zero, may be made via the same circuits. If a positive signal EMIT RM, which is positive to cause emission of a Record Mark, or line EMIT ZERO, which is positive to cause emission of a zero, then positive signals are fed to both OR circuits 424c and 432c. Since positive signals to the OR circuits 424c and 432c result in positive signals on the lines RESULT 2 and RESULT 8, it follows that when a positive signal occurs on line EMIT RM or line EMIT ZERO, output signals representative of a 1010 code result. The signals on lines RESULT 1, RESULT 2, RESULT 4 and RESULT 8 feed to the Check Bit Generator, the Output Switch to Memory, and the Output Switch to Accumulator circuits.

The Multiple Control circuits, shown in Fig. 4*k*, receive signals representative of the numeric portion of the character held in Character Register 2 and emit signals to select the proper multiple or multiples in the Multiple Selection circuits of Fig. 4*d*, explained above. Thus, during a Multiply operation, the Multiple Control circuits receive a digit of the multiplier and cause selection of the proper multiples of the multiplicand in order to carry out the multiply operation. During each Instruction time, triggers 460c, 467c, 473c, and 481c are set to represent a decimal quantity of one as the 1 bit trigger 460c is reset ON and the triggers 467c, 473c and 481c, representing the 2, 4 and 8 bits, respectively, are reset OFF. This reset is indicated by the *x* in the lower left corner of the block representing trigger 460c and by *x*'s in the lower right corner of blocks representing triggers 467c, 473c, and 481c. Thereafter, these triggers are turned ON or OFF depending upon status of corresponding triggers of Character Register 2 and also dependent upon whether the digit in Character Register 2 is, or is not, equal to zero. The holding of the 1, 2, 4 and 8 bits of Character Register 2 are dumped or set into the triggers of the Multiple Control circuits whenever the line SET MPL REG TO CR2 goes positive. This latter line conditions the AND circuits 452c, 453c, 454c, 455c, 456c, 457c, 458c and 459c. If the 1 bit of Character Register 2 contains a binary 0, the line CR2 $\overline{1}$ is positive and conditions a second input of the AND circuit 452c, whose positive output thereby conditions a diode gate 465c. However, if there is a binary 1 in the 1 bit of Character Register 2, the line CR2 1 is positive and conditions a second input to the AND circuit 453c, whose positive output conditions a diode gate 466c. If the diode gate 465c is conditioned positive, a W2 (D3) signal is passed to turn OFF the trigger 460c. However, if the diode gate 466c is conditioned positive, the W2 (D3) signal is passed to turn ON the trigger 460c. Thus, it is seen that the trigger 460c is reset ON during every Instruction time to represent a holding of binary 1 in the 1 bit position and may be turned ON or OFF at W5 time of the Character cycle depending upon the holding of the 1 bit of Character Register 2, when the holding of Character Register 2 is gated to the Multiple Control circuits.

The 2 bit trigger 467c is turned ON or OFF depending on the holding of Character Register 2. If the 2 bit of Character Register 2 contains a binary 0, the signal on line CR2 $\overline{2}$ is positive and passes via an OR circuit 450c to condition a second input of the AND circuit 454c. The second input of AND circuit 454c is also conditioned when a positive signal on line CR2=0 passes via the OR circuit 450c, whenever Character Register 2 contains a zero. A positive output of the AND circuit 454c conditions a diode gate 469c which, when conditioned, passes a W2 (D3) signal to turn OFF the trigger 467c. Thus, if the holding of the 2 bit of Character Register 2 is a binary 0 or if the decimal representation is zero (equivalent of ten) the trigger 467c is turned OFF. However, if the 2 bit of Character Register 2 contains a binary 1, a second input to the AND circuit 455c is conditioned as line CR2 2 is positive. The third input to the AND circuit 455c is via line CR2≠0, which line is an output of the Character Recognition circuits, and is positive only if the holding of Character Register 2 is not zero. If a zero is present in Character Register 2, it is represented by the equivalent of ten (0101) and the binary 1 contained in the 2 bit is prevented from being transferred to the Multiple Control circuits as the AND circuit 455c cannot be fully conditioned as line CR2≠0 is then negative and the trigger 467c is turned OFF as described above. However, assuming all inputs are positive, a positive output from AND circuit 455c conditions a diode gate 470c. Therefore a W2 (D3) signal may be passed via the diode gate 470c to turn ON the trigger 467c. It follows that the trigger 467c is turned OFF whenever a binary 0 is contained in the 2 bit of Character Register 2 or when the character represented in Character Register 2 is zero. Conversely, it is turned ON to represent a binary 1, if a binary 1 exists in the 2 bit of Character Register 2 as long as the character in Character Register 2 is not zero.

Circuits for the 4 bit are identical to those of the 1 bit and signals CR2 4 and CR2 $\overline{4}$ representing the holding of the 4 bit of Character Register 2 pass via AND circuits 456c and 457c to condition diode gates 479c and 480c, respectively. The W2 (D3) signals is then passed by the conditioned diode gate to turn the trigger 473c ON or OFF, as required.

The circuits for the 8 bit are similar in operation to those circuits for the 2 bit. If a decimal quantity of zero is represented in Character Register 2 or if the 8 bit held in Character Register 2 contains a binary 0, the signal on line CR2=0 or the signal on line CR2 $\overline{8}$ is positive and feeds via an OR circuit 451c and the conditioned AND circuit 458c to condition a diode gate 486c. However, if the 8 bit of Character Register 2 contains a binary 1 and the holding of Character Register 2 is not zero, positive signals on the lines CR2 8 and CR2≠0 condition the remaining two inputs of the AND circuit 459c, whose positive output conditions a diode gate 487c. If the diode gate 486c is conditioned, the W2 (D3) signal is passed to turn the trigger 481c OFF, while if the diode gate 487c is conditioned the W2 (D3) signal is effective to turn the trigger 481c ON. Thus, it is seen that the holding of Character Register 2 for the 1, 2, 4 and 8 bits may be gated to the triggers 460c, 467c, 473c and 481c, respectively, provided the line SET MPL REG TO CR2 is positive. However, if a decimal zero is contained in Character Register 2 although the 2 and 8 bits contain binary 1's, the 2 and 8 triggers 467c and 481c are turned OFF. The holdings of the triggers 460c, 467c, 473c and 481c are mixed by various AND and OR circuits to provide outputs according to the following Table V.

*Table V*

| Digit | Multiple Control | | | | Multiple Control Outputs |
|---|---|---|---|---|---|
| | 8 | 4 | 2 | 1 | |
| 0 | 0 | 0 | 0 | 0 | None. |
| 1 | 0 | 0 | 0 | 1 | SEL1 MPL. |
| 2 | 0 | 0 | 1 | 0 | SEL2 MPL. |
| 3 | 0 | 0 | 1 | 1 | SEL1 MPL, SEL2 MPL. |
| 4 | 0 | 1 | 0 | 0 | SEL4 MPL B. |
| 5 | 0 | 1 | 0 | 1 | SEL5 MPL. |
| 6 | 0 | 1 | 1 | 0 | SEL2 MPL, SEL4 MPL B. |
| 7 | 0 | 1 | 1 | 1 | SEL2 MPL, SEL5 MPL. |
| 8 | 1 | 0 | 0 | 0 | SEL4 MPL B, SEL4 MPL A. |
| 9 | 1 | 0 | 0 | 1 | SEL MPL4 A, SEL5 MPL. |

Inspection of the Table V shows that for the holding of a digit zero, all triggers of the Multiple Control circuits are OFF (signified by the holding of 0000). Under this particular condition, none of the output lines of the Mulitple Control circuit are positive. Inspection of Table V shows that line SEL1 MPL is positive provided there is a binary 1 in the 1 bit unless there is a binary 1 in the 4 bit or a binary 1 in the 8 bit. The output of the trigger 460c, when ON, emits a positive signal via a cathode follower 462c to condition one input of the AND circuit 463c. The second input of the AND circuit 463c is conditioned when the trigger 473c is OFF (representing a binary 0 in the 4 bit) and emitting a positive signal via a cathode follower 475c. The third input is conditioned as the trigger 481c, when OFF (representing a binary 0 in the 8 bit), emits a positive signal via a cathode follower 482c. Thus, all three inputs to the AND circuit 463c are conditioned positive while a binary 1 is contained in the 1 bit and binary 0's are contained in both the 4 and 8 bits. The positive output of the AND circiut 463c passes via a cathode follower 464c to drive line SEL1 MPL positive.

Inspection of Table V also shows that whenever the 2 bit contains a binary 1, the output line SEL2 MPL should be positive. This is provided as the trigger 467c, when ON representing a binary 1, emits a positive signal via a cathode follower 468c to line SEL2 MPL.

Inspection of Table V shows that line SEL4 MPL B should be positive provided there is a binary 1 in the 4 bit position or if there is a binary 1 in the 8 bit position, provided, however, in both instances, that there is no binary 1 in the 1 bit position. Thus, the trigger 473c, when ON representing a binary 1, emits a positive signal via a cathode follower 474c and an OR circuit 476c to condition one input of an AND circuit 477c. Likewise, the trigger 481c may, when ON representing a binary 1, emit a positive signal via a cathode follower 483c and the OR circuit 476c to condition the same input of the AND circuit 477c. The second input of the AND circuit 477c is conditioned by trigger 460c, when OFF, emitting a positive signal via a cathode follower 461c. The positive output of the AND circuit 477c passes via a cathode follower 478c to drive line SEL4 MPL B positive. Thus, it is seen that the latter line is positive when there is a binary 1 in the 4 or 8 bit position provided there is no binary 1 in the 1 bit position.

Inspection of Table V also shows that the line SEL4 MPL A is positive whenever there is a binary 1 in the 8 bit position. Thus, the trigger 481c, when ON representing a binary 1 emits a positive signal via a cathode follower 483c to drive line SEL4 MPL A positive.

Inspection of Table V shows that the line SEL5 MPL is positive whenever there is a binary 1 in the 4 or 8 bit position simultaneous with a binary 1 in the 1 bit position. As explained above, the output of the OR circuit 476c is positive whenever there is a binary 1 in the 4 or 8 bit position. This positive signal conditions one input of an AND circuit 471c. The second input of the AND circuit 471c is conditioned positive when the trigger 460c is ON, representing a binary 1 in the 1 bit position, and emitting a positive signal via the cathode follower 462c. When both inputs to the AND circuit 471c are positive, its positive ouput via a cathode follower 472c drives line SEL5 MPL positive. Thus, it is seen that the holding of the triggers 460c, 467c, 473c and 481c representing digits by permutations of a 1, 2, 4 and 8 bit code is converted to a digit representation according to a 1, 2, 4 and 5 bit code.

The Multiple Control circuits also generate a signal indicative of the condition that the single (one) multiple is not to be selected. This signal is provided whenever there is a binary 1 in the 2, 4 or 8 bit positions. Thus, positive signals pass from triggers 467c, 473c, and 481c via cathode followers 468c, 474c and 483c, respectively, an OR circuit 484c and the cathode follower 485c to the line NOT SEL1 MPL. The various outputs of the Multiple Control circuits are utilized in the Multiple Selection circuits, described above (see Fig. 4*d*), to select the proper Multiples of the digit contained in Character Register 1.

Refer now to Fig. 4*m* which shows the Zone Adder, the Input and Output switches thereof and circuits generating signals for representing positive and negative zone indications, a Blank character and a Record Mark Character. As described above (see Fig. 4*a* showing the Arithmetic Input Switching circuits), signals representing the holding of the A and B bits are gated to lines CR1 TO Adder A and CR1 TO Adder B, respectively. Signals on these lines, when positive, represent the presence of a binary 1 in the A and B bits, respectively, and feed to the Zone Adders represented by blocks 409d and 410d. It should be noted that the adders, represented by the blocks 409d and 410d, are identical in operation to those used in the Multiple Adder circuits (Fig. 4*e*) and no purpose would be served in repeating an explanation here. Output signals from Character Register 2 representing the A and B bit positions may be gated in True Complement form to the Zone Adder. As described above, the output of the A bit in Character Register 2 causes line CR2 A to be positive if there is a binary 1 in the A bit position, while line CR2 $\bar{A}$ is positive if a binary 0 is present. The signals on lines CR2 A and CR2 $\bar{A}$ feed to inputs of AND circuits 401d and 402d, respectively. The second input to both AND circuits 401d and 402d is via line CR2 TO T/C which is positive when the character of Character Register 2 is gated to the Zone Adder True Complement circuits. The third input to the AND circuit 401d is via the TRUE which line is positive when a True representation is to be gated to the Zone Adder. Conversely, the third input to the AND circuit 402d is via line COMPLEMENT, which line is positive when a Complement of the value in Character Register 2 is to be gated to the Zone Adder. Upon coincidence of three positive inputs to the AND circuit 401d or the AND circuit 402d, the positive output signal is emitted via an OR circuit 403d and the cathode follower 404d to the A bit adder 409d. The third input to the A bit adder 409d is via the line ZONE CARRY IN, which signifies a carry from the succeeding lower order. These three inputs to the adder are combined, as described above, to give a sum and carry output. The sum is indicated by the signal on the line SUM A which is positive for a sum of binary 1 and negative for a sum of binary 0. A carry is indicated by a signal on line CARRY A, which is positive for a carry, or negative for no carry. The circuits for the B bit are identical to those described for the A bit, AND circuits 405d and 406d corresponding to the AND circuits 401d and 402d, an OR circuit 407d corresponding to the OR circuit 403d and a cathode follower 408d corresponding to the cathode follower 404d. The sum output of the B bit adder is via line SUM B and the carry output is a signal via line ZONE ADDER CARRY, which signal is effective to set the Zone Carry Trigger (Fig. 4*n*), described below.

Positive signals on the lines SUM A and SUM B condition one input of AND circuits 418d and 422d, respectively. These signals are gated through the respective AND circuits as their second inputs are conditioned by a positive signal on line ZONE ADDER OUT. The output of the AND circuit 418d passes via an OR circuit 419d, a grounded grid amplifier 420d and a cathode follower 421d to line RESULT A. The output of AND circuit 422d passes via an OR circuit 423d, a grounded grid amplifier 424d and a cathode follower 425d to line RESULT B.

Circuits are also provided for the emission of signals to represent certain characters, these signals feeding via OR circuits 419d and 423d. If a character blank is required the line EMIT BLANK goes positive and feeds via the OR circuit 419d to cause a positive signal on the line RESULT A signifying a binary 1 in the A bit position. Since the coding for the blank character contains a binary 1 in the A bit position and a binary 0 in the B bit position no other signal is required since line RESULT B is normally negative which represents a binary 0. Likewise, a positive signal occurs on line EMIT RM when a Record Mark is required. This positive signal passes via the OR circuit 419d and thereby causes a positive signal representing a binary 1 on line RESULT A. A positive signal on the line EMIT (+) ZONE occurs, when a positive sign representation is required, and feeds to both OR circuit 419d and OR circuit 423d to cause binary 1 representations on both lines RESULT A and RESULT B. In the event that a negative sign is required, the signal on line EMIT MINUS ZONE is positive and feeds via the OR circuit 423d to cause a positive signal representing a binary 1 on line RESULT B. Thus, it is seen circuits have been provided for the addition of the A and B or Zone bits and also for the emission of signals representing the Zone bits for certain characters such as Blank, Record Mark Positive zone and Negative zone.

Refer now to Fig. 4*n*, which shows the Zone Carry Trigger 442d and related circuits. As explained above, and shown in Fig. 4*m*, the addition of A and B bits in the Zone Adder may result in a Zone Carry. This particular carry is stored in the Zone Carry Trigger for addition to the A and B bits of the succeeding higher order during the next cycle of operation. Assuming a carry has resulted from a zone addition, the signal on line ZONE ADDER CARRY is positive and is fed via an OR circuit 433d to condition one input of an AND circuit 441d. The second input of the AND circuit 441d is normally conditioned positive, except when there is a positive signal, calling for a turning OFF of the Zone Carry Trigger on line TURN OFF ZONE CARRY TGR. The output of the AND circuit 441d positive upon coincidence of two positive inputs conditions a diode gate 440d. The diode gate 440d when conditioned, passes a W2 (D3) signal to emit a negative going signal, at W5 time, to the trigger 442d. This negative signal turns ON the trigger 442d. However, if there was no carry from the Zone adder, the signal on line ZONE ADDER CARRY is negative and via an inverter 430d, a cathode follower 431d and an Or circuit 432d conditions one input of an AND circuit 438d. The second input to AND circuit 438d is normally positive unless a positive signal occurs on line TURN ON ZONE CARRY TGR. The output of the AND circuit 438d positive upon coincidence of two positive inputs, conditions a diode gate 439d so that the W2 (D3) signal is effective to turn OFF the trigger 442d at W5 time. The output of the trigger 442d, when ON passes via a cathode follower 444d to drive line ZONE CARRY IN positive and, when OFF, emits a positive signal via a cathode follower 443d to line NO ZONE CARRY IN. The effect of signals on the lines TURN OFF ZONE CARRY TGR and TURN ON ZONE CARRY TGR have precedence over a signal on line ZONE ADDER CARRY. If a signal is emitted from Control circuits requiring a turning OFF of the Zone Carry Trigger, this signal on line TURN OFF ZONE CARRY TGR passes via the OR circuit 432d to condition one input of the AND circuit 438d and thereby cause the Zone Carry Trigger to be turned OFF. At the same time the signal on line TURN OFF ZONE CARRY TGR passes via an inverter 436d and a cathode follower 437d, to remove the normal positive condition from one input of the AND circuit 441d and thereby prevent any effect that a positive signal on line ZONE ADDER CARRY may have had. Likewise, a positive signal on the line TURN ON ZONE CARRY TGR passes via the OR circuit 433d to cause a turning ON of the Zone Carry Trigger, as described above, and also passes via an inverter 435d and a cathode follower 434d to remove the normal positive condition from one input of the AND circuit 438d, thereby preventing any effect that a negative signal on the line ZONE ADDER CARRY may have had. Thus, if is seen that a carry output from the Zone Adder is effective to turn the trigger 442d ON, or a no carry output is effective to turn the trigger OFF. Otherwise, signals on the lines TURN OFF ZONE CARRY TGR and TURN ON ZONE CARRY TGR are effective, respectively, to turn the Zone Trigger 442d OFF or ON; taking precedence in effect over signal on the line ZONE ADDER CARRY. The signal on lines ZONE CARRY IN feeds to the Zone Adder Fig. 4m, described above, for addition to the A bits of the succeeding higher orders.

The checking system utilized in the calculator of this invention is an even redundancy check, that is, the number of binary 1's comprising each character must be an even number. Thus, as characters are transmitted from one portion of the machine to another, a check can be made that each character contains an even number of binary 1's. If an odd number of binary 1's is received to represent a character, the machine may be stopped or an error indicated. It should be noted, however, that as two digital values are added, subtracted, multiplied, etc. or changed in any way the sum, difference or product character may not contain an even number of binary ones. Consequently, a Check Bit Generator is provided so that a new check or redundancy bit may be generated as required. Circuits for generating this check bit are shown in Fig. 4p, which also contains circuits for gating the C bit of the particular character in Character Register 1 or Character Register 2, described above, to Output Switching circuits. The number of binary ones in a particular character may be the result of addition of two digits by the Digit Adder and corresponding Correction circuits and/or addition by the Zone Adder circuits. As shown on the overall diagram of Figs. 1a through 1f, the Check Bit Generator receives inputs from the Decimal Adder Correction and Character Generator circuits, the Zone Adder and Character Generator circuits, Character Register 1 and Character Register 2. The output of the Check Bit Generator feeds to the Output Switch to Memory and Output Switch to Accumulator circuits. The circuits shown in Fig. 4p, consists mainly of two full adders similar to the adder circuits, described above, used in the Digit Adder. These adders are represented by blocks 450d and 451d. The adder circuit of 450d combines the holding of the B, A and 8 bits, while the adder 451d combines the 4, 2 and 1 bits. Only the sum output of the adders are utilized. Carry signals are utilized only in the internal logic of the adder there being no carry from one adder to the other. From the rules of adder operation, explained above, it may be stated that when all three inputs are negative signifying binary 0's, or if two inputs *only* are positive, signifying binary 1's the sum line is negative representing a binary 0. Thus, the two adders 450d and 451d determine whether or not the three particular inputs thereto comprise an even (signified by a binary 0 sum) or an odd (signified by a binary 1 sum), numbers of binary 1's. Thus, the line SUM Z is positive, when the 8, A and B bits contain one or three binary 1's, while the line SUM N is positive when the 1, 2 and 4 bit (inputs via lines RESULT 1, RESULT 2 and RESULT 4) contain one or three binary 1's. When the outputs of the Adders 450d and 451d agree, that is, both outputs are positive or both outputs are negative, the redundancy or check bit generated should be negative signifying a binary 0. When the outputs of the adders disagree, a binary 1 redundancy or Check bit is required. This Check bit is provided by feeding the signals on both lines SUM N and SUM Z to an AND circuit 456d and an OR circuit 452d. If either line SUM N or SUM Z is positive, the OR circuit 452d emits a positive output to condition one input of an AND circuit 453d. However, both lines SUM N and SUM Z must be positive to condition both inputs of the AND circuit 456d. Assuming both inputs are positive, the output of the AND circuit 456d is positive, and via an inverter 457d, a cathode follower 458d and line 459d removes conditioning from the second input of the AND circuit 453d. Therefore, if both ADDER outputs are positive, the input to the AND circuit 453d via line 459d is negative preventing coincidence. If both sums are negative, then the output of the OR circuit 452d is negative and the first input of the AND circuit 453d is not conditioned. However, if one, and one only, of the sums is positive, two inputs of the AND circuit 453d are conditioned positive as there is no coincidence of positive inputs to the AND circuit 456d and therefore line 459d is positive, while at least one input to the OR circuit 452d is positive and therefore its output is positive. Then as a control signal on line GEN C BIT OUT goes positive, the output of the AND circuit 453d goes positive and passes via a cathode follower 454d, line 455d, a grounded grid amplifier 464d and a cathode follower 465d to line RESULT C. Thus, if a binary 1 is required in the C bit position, the signal on line RESULT C is positive, otherwise the signal is negative.

As mentioned above, at times it is desired to merely gate the C bit holding of Character Register 1 or Character Register 2, as the case may be, to the Output Switches. Thus, a positive signal on the line CR1 C signifying a binary 1 in the C bit position of Character Register 1, conditions one input of the AND circuit 460d. This latter signal is gated as line CR1 C BIT OUT goes positive. Likewise, a positive signal on the line CR2 C signifies a binary 1 in the C bit position of Character Register 2 and conditions one input of AND circuit 461d. This latter signal is gated to the output as the signal on line CR2 C BIT OUT goes positive to condition the second input of the AND circuit 461d. The outputs of AND circuits 460d and 461d pass via an OR circuit 462d, line 463d, an amplifier 464d and a cathode follower 465d to drive line RESULT C positive. If the C bit holding of either Character Register 1 or Character Register 2, under the conditions described, were negative to represent binary 0's and the particular holding was gated via AND circuits 460*d* and 461*d*, the line RESULT C would be negative to signify a binary 0. Thus, it is seen that the C bit holding of Character Register 1 or Character Register 2 or a Generated C bit may be gated to the line RESULT C.

As indicated on the overall block diagram Figs. 1*a* through 1*f*, the Output Switch to Memory receives inputs from Character Register 1, from the Digit Adder and Character Generator circuits, from the Zone Adder and from the Check Bit Generator circuits.

The Output Switch to Memory circuits, shown in Fig. 4*r*, permit information from the various inputs to be gated via Memory In Busses to Memory. Since the circuitry for each bit is identical, the description of circuits for one bit will suffice. The signal on the line RESULT 1, which is a signal for the 1 bit, conditions one input of an AND circuit 401*e*. This signal is gated through the AND circuit 401*e* provided a positive signal exists on line RESULT TO MEM, which signal is effective to gate circuits for each of the seven bits. The output of the AND circuit 401*e* is positive when both inputs thereto are positive and feeds to the OR circuit 403*e*. Likewise, a signal on the line CR1 1, indicative of the holding of the 1 bit Character Register 1, feeds to one input of the AND circuit 402*e* and is gated to the output by a positive signal on line CR1 to MEM, which signal is effective to gate the holding of all bits of Character Register 1 to the Memory In Busses. The output of the AND circuit 402*e* also feeds to the OR circuit 403*e*. A third input to the OR circuit 403*e* is via line MAN STORE 1. A signal on the latter line provides means for manually entering information into Memory by means of switches (not shown). When any one input on the OR circuit 403*e* is positive, its output passes via a cathode follower 404*e* to drive line MEM IN BUS 1 positive. A positive signal on the latter line represents a binary 1 while a negative signal represents a binary 0. Thus, it is seen that various calculated results may be gated to Memory; the character in Character Register 1 may be gated to Memory; and switches may be provided to manually enter information into Memory.

Referring now to Fig. 4*s*, circuits are shown for the Output Switch to Accumulator. It can be seen that provision is made for gating the result of an addition to the Accumulator via Accumulator Input Busses, or for gating the holding of Character Register 2 to Accumulator Input Busses. The signal on the line RESULT 1 is fed to one input of an AND circuit 410*e* and is gated to the output by a positive signal on line RESULT TO ACC. The output of the AND circuit 410*e* is positive, when both inputs thereto are positive, and feeds to one input of an OR circuit 412*e*. Signals representing other bits of a result are also gated by a positive signal on line RESULT TO ACC. The holding of the 1 bit of Character Register 2 is represented by a signal on line CR2 1, which feeds to one input of the AND circuit 411*e*. This signal is gated through the latter AND circuit by a positive signal on line CR2 TO ACC. When both inputs to the AND circuit 411*e* are positive, its output is positive and feeds to the OR circuit 412*e*. When either input to the OR circuit 412*e* is positive, its positive output passes via a cathode follower 413*e* to drive line ACC IN BUS 1 positive. The positive signal on the latter line represents a binary 1, while a negative signal represents a binary 0. Thus, it is seen that the holding of Character Register 2 or the result of an Arithmetic process may be gated, via Accumulator In Busses to the Accumulator Storage.

MULTIPLY

A Multiply Instruction causes the addressed field in

Memory, which contains the multiplicand, to be multiplied by a field or word, which is the multiplier in the selected Accumulator. The units digit or low order digit of the product, as described presently, will appear in the selected Accumulator, at an address, 256 addresses removed from the units or low order digit of the multiplier. The number of digits in the product is equal to the sum of the digits in the multiplier and the multiplicand. Consequently, a maximum product of 255 digits is allowable in the particular system shown and described, since the particular Accumulator storage has a capacity of 512 characters, and one of those character positions must always be reserved for an Accumulator Mark. The purpose of the Accumulator Mark is to define the high order digit of the field or the end of the word stored in the Accumulator. It will be understood, however, that Accumulators with increased capacity could be easily furnished, and multiplication carried out in the system as described for an unlimited number of digits. Multiplication, of course, involves only the use of numeric fields although it is understood that the apparatus of the invention is capable of handling non-numeric characters. Either the Accumulator Storage A or the Accumulator Storage B may be used in the Multiplication process and data stored in the unselected Acumulator Storage is not affected by execution of the Multiply Instruction. The Multiply Instruction is executed in a logical order under control of an Execution timer. This Execution timer provides for five different type of cycles, the particular type of cycle being controlled by a particular trigger circuit of the Execution timer being ON. The output of the triggers of the Execution timer combine with various other conditions existing in the machine to produce Routing functions which govern the flow of information and cause execution of the Instruction.

During an Instruction time, which Instruction shall call for Multiply operation, a coded character for Multiply is read to an Instruction Decoder similar to that shown and described in the application of Rochester et al., and the address portion of the Instruction is fed into the four orders of the Memory Address Register, described above. The address read into the Memory Address Register is the address of the multiplicand. At this time, the Starting Point Counters of both Accumulator A and Accumulator B are set to the address of the words stored in the respective Accumulators.

As explained above, either Starting Point Counter A or Starting Point Counter B may be selected. The selected Accumulator holds the multiplier. Since either Accumulator A or Accumulator B may be selected for these operations, no special reference will be made to either in the following explanation. It will be assumed that a Starting Point Counter and, an Accumulator Address Counter are those of the selected Accumulator. During the last cycle of Instruction time, this Accumulator Address Counter is set to the holding of the Starting Point Counter, the Memory Address Counter is set to the holding of the Memory Address Register and the Calculator then proceeds into EXECUTE time, specifically to a Multiply 1 type subroutine.

The multiply operation progresses according to rules illustrated by the Flow Diagram of Fig. 6*k*. During the Multiply 1 type subroutine, a character is read out of Accumulator Storage, and via Character Register 2 to the Multiplier Register of the Multiple Control circuits. If this is the first character of the multiplier, it is re-stored in the Accumulator Storage along with Zoning bits to indicate the low order digit of the field. If the particular character read out of Accumulator storage during this Multiply 1 subroutine is not an Accumulator Mark, which would indicate the end of an Accumulator Field, the calculator proceeds to a Multiply 2 type subroutine. During the first Multiply 2 type subroutine, the Multiplier Register in the Multiple Control circuits holds the first digit of the Multiplier and as the first digit of the multiplicand is read from Memory, it is passed through the doubler, quadrupler and quintupler, and via the Multiple Selection circuits, the Multiple Adder and the Digit Adder, so that the resultant sum is the product of the particular multiplicand digit multiplied by the first digit of the multiplier. If any partial product had previously been formed (which, of course, would not be the case during multiplication of the first digit of the multiplicand by the first multiplier digit), the partial product would be added in the Didit Adder to the output of the Multiple Adder. Partial products are stored in Accumulator Storage, as described later, at an address, 256 addresses removed from the address of the multiplier and are read from Accumulator storage, as needed, to be used to form a new partial product. Only the first digit of the multiplicand is processed during the Multiply 2 subroutine, and the Calculator proceeds to a Multiply 3 type subroutine.

During the Multiply 3 type subroutine succeeding higher order digits of the multiplicand are read out of Memory (serially digit by digit and one digit per Character cycle), are multiplied by the digit of the multiplier then existing in the Multiple Control circuits and added to a partial product which may have been previously generated. This process continues until the end of the field in Memory, that is the end of the multiplicand, is recognized, as described later, at which time the calculator proceeds to a Multiply 4 type subroutine.

During the Multiply 4 type subroutine, which is initiated at the completion of the multiplication of all the digits of the multiplicand by the first digit of the multiplier, an Accumulator Mark is emitted, as described later, and stored in the Accumulator to indicate the end of the partial product field then existing in the Accumulator and also an auxiliary trigger is turned ON, which trigger, when ON, indicates the existence of a partial product. At the end of the Multiply 4 type subroutine the machine re-enters the Multiply 1 type subroutine, whereby the next succeeding, higher order digit, of the Multiplier is read out of Accumulator storage into the Multiple Control circuits and the entire process is repeated to develop successive partial products. After the highest order digit of the multiplier has been processed and an attempt is made to read another multiplier digit, an Accumulator Mark, demarcating the end of the multiplier, is read from the Accumulator and is recognized by the Character Recognition circuits. From the Multiply 1 type subroutine, the machine now proceeds directly to the Multiply 5 type subroutine. The purpose of the Multiply 5 type subroutine is to read back, through the multiplier field, so that the calculator may ascertain the low order address of the product field, this low order being removed from the low order of the multiplier field by 256 address positions. The Starting Point Counter is thereby set to the address of the final product and end of execution may be signaled.

More specifically, the operations which take place during a multiply operation are as follows:

MULTIPLY 1

During the character cycle of a Multiply 1 type subroutine, a character is read from an address of the selected Accumulator into Character Register 2. This character in Character Register 2 is gated via the True Complement circuits through the Digit Adder. At this time, this is the only digit input to the Digit Adder so no addition takes place. The Digit Adder output is gated to the Output Switch TO Accumulator and a Check BIT GENERATOR. If this happens to be the first Execution Character cycle, a digit 0 trigger, described below, is turned ON. The purpose of the digit 0 trigger is to indicate if all characters in the Accumulator are zero and in the event that they are zero, it will be known by the condition of the trigger. During this first cycle, namely, ECC1, of Execution time, the Zone Adder circuits, as described above, emit signals to the Output circuits, which signals represent positive field mark zoning.

A. If the Accumulator Mark trigger is OFF, which is an indication that the character read out of Accumulator Storage is not the final character of the multiplier, the output of the adder which is, of course merely the digit read out of Accumulator Storage, is gated to Accumulator Storage but is provided with a generated check bit and if this is during ECC1, the digit is provided with positive field mark zoning, set forth above. At the same time, the Multiplier Register in the Multiple Control circuits is set to the holding of Character Register 2. Then the Accumulator Address Counter is stepped 256 counts, but the Starting Point Counter is still set to the address of the multiplier. Thus the Accumulator Address Counter has been stepped 256 addresses, preparatory to storing a partial product. The calculator then proceeds to a Multiply 2 type subroutine.

B. However, if the Accumulator Mark Trigger is turned ON, which indicates that the last character of the Multiplier Digit has been processed, the Accumulator Mark character, then contained in Character Register 2, is gated via the Output Switch TO Accumulator to be stored in the Accumulator. Both the Accumulator Address Counter and the Starting Point Counter are stepped down one count and the calculator then proceeds to a Multiply 5 type subroutine. This stepping down of both the Accumulator Address Counter and the Starting Point Counter, by one count, is preparatory to the Multiply 5 type subroutine, during which the calculator reads back through the multiplier field, as described later.

MULTIPLY 2

During a Multiply 2 type subroutine, a character is read out of Memory into Character Register 1, this character being the first character of the multiplican. At the same time, a character is read out of Accumulator Storage under control of the Accumulator Address Counter, which is set to the address of the lowest order digit of the partial product, which at this time is zero, into Character Register 2. The character in Character Register 1, being the first digit of the multiplicand is gated to the Doubler, Quadrupler, and Quintupler, etc. so that proper multiples are selected by the first multiplier digit previously entered in the Multiple Control circuits, the multiples are combined in the Multiple Adder and gated to the Digit Adder. The character now in Character Register 2, a character of a partial product, if any (determined by the auxiliary trigger being ON), is also gated to the Digit Adder where it is combined with the output of the Multiple Adder. The output of the Digit Adder is gated to the Output Switch TO Accumulator along with a Check bit, which is generated. These inputs to the Output Switch TO Accumulator are gated to the Accumulator for storage. At the same time, the character in Character Register 1 is gated via the Output Switch TO Memory for storage in Memory. If the output of the adder is not zero, the digit 0 trigger is turned OFF, since obviously the partial product to be stored in the Accumulator would no longer be zero. Both the Accumulator Address Counter and the Starting Point Counter are stepped up one count, to step the Starting Point Counter to the address of the succeeding higher order digit of the multiplier while the Accumulator Address Counter being stepped one count is set to a correct address position, i.e., 257 addresses, from the multiplier digit being processed for the next addition of the partial product. At the same time the Memory Address Counter is stepped down one count to the address of the succeeding higher order digit of the multiplicand. The machine remains in the Multiply 2 type subroutine for one character cycle only and then proceeds to the Multiply 3 type subroutine. However, during the Multiply 2 type subroutine, if the zoning bits of the character read into Character Register 1 signify a negative quantity a Memory Sign Tribber is set to signify a negative sign but if the character read out of Memory to Character Register 1 has no zone bits to indicate either a positive or negative sign, a sign check trigger is turned ON. If the zone bits, indicate a positive quantity, no further action need be taken, since the Memory Sign Trigger, in the reset position, indicates a positive quantity.

MULTIPLY 3

During Multiply 3 type subroutine, the succeeding higher orders of the multiplicand are read out of Memory, multiplied by the particular multiplier digit then existing in the Multiple Control circuits and added to existing partial products to form a new partial product. Thus, during the Multiply 3 type subroutine, a character is read out of Memory into Character Register 1 and out of the Accumulator into Character Register 2 and then to the adder. The Digit Adder output is gated via output circuits to the Accumulator with a newly generated check bit. The character in Character Register 1 is stored in Memory. If, and only if, the auxiliary trigger is ON, signifying the presence of a partial product, is the character in Character Register 2 gated via the True Complement circuits to the Digit Adder. Further the Accumulator Address Counter is stepped up one count and if the output of the Digit Adder is not zero, the digit 0 trigger is turned OFF.

A. Besides the Routing of information described above, if the character in Character Register 1 is a numeric character, it is gated via the Doubler, the Quadrupler, the Quintuper, the Multiple Selection and the Multiple Adder circuits to the Digit Adder. Further the Memory Address Counter is stepped down one count to the address of the succeeding higher order of the multiplicand and a Multiple 3 type subroutine character cycle is repeated.

B. If the character in Character Register 1 is non-numeric, which is indicated by the zone bits and recognized by the Character Recognition circuits, then the character is not gated to be doubled, etc., and added to the partial product. However, carries existing in the Doubler, Quadrupler, Quintupler as well as in the Multiple Adder and Digit Adder are processed to obtain the high order digit of the result. The Memory Address Counter is set to the holding of the Memory Address Register, thereby bringing the Memory Address Counter back to the address of the lowest order digit of the multiplicand and the calculator proceeds to a Multiply 4 type subroutine.

MULTIPLY 4

During the Multiply 4 type subroutine, a character is read out of the Accumulator into Character Register 2 for the purpose of erasing any character that may have been previously stored at the address held by the Accumulator Address counter. Then an Accumulator Mark is stored in the particular address, this being accomplished by not routing any information to the Accumulator (the code for an Accumulator Mark is all binary 0's). Thereafter, but during the same Character cycle, the Accumulator Address counter is set to the holding of the Starting Point counter. The setting of the Accumulator Address counter to the Starting Point counter is effectively setting the Accumulator Address counter to the address of the succeeding higher order of the multiplier which is to be processed, since the Starting Point counter was stepped up one count to this address upon completion of the previous Multiply 2 type subroutine. Further the auxiliary trigger **672*b*** (Fig. 6*i*) is turned ON during the Multiply 4 type subroutine, since a partial product should now exist even if one had not existed previously. It is possible during the Multiply 3 type subroutine to read an Accumulator Mark from the Accumulator storage and thereby causes an Accumulator Mark trigger to be turned ON. However, the reading of an Accumulator Mark during the Multiply 3 type subroutine is of no significance and the Accumulator Mark trigger must be turned OFF during the Multiply 4 type subroutine so that no false conditions are indicated. From the Multiply 4 type subroutine, the Calculator proceeds again to the Multiply 1 type subroutine.

MULTIPLY 5

During the Multiply 5 type subroutine a character is read out of the Accumulator storage into Character Register 2 and gated from Character Register 2 via the True Complement circuits to the Digit Adder.

A. If the character in Character Register 2 is numeric, then it is stored in Accumulator storage at the address from which it was read and the Accumulator Address counter and the Starting Point counter are stepped down one count. The calculator remains in this Multiply 5 type subroutine and proceeds to additional character cycles.

B. If Character Register 2 contains a non-numeric character, then the Digit Adder output is gated to the Check Bit Generator and the Output Switch To Accumulator circuits so that a check bit is generated and, therefore, the numeric portion of the character and a generated check bit are stored in the Accumulator. Thus the zoning added to this character in the first cycle of Execution time is erased reverting it to its original status. At this point, the Starting Point counter is at the address of the lowest order digit of the multiplier. Then the Starting Point Counter is stepped 256 counts which brings it to the address of the low order digit of the product. As the Starting Point Counter holds the address of the field or word now present in the Accumulator i.e., the product, an End of Execution time is signaled and the calculator may proceed to another Instruction time. However, during this last character cycle, the Accumulator Sign Trigger must be set according to the algebraic rules of multiplication.

BA. If the digit 0 trigger (Fig. 6*h*) is OFF, signifying that the holding of the Accumulator is something other than 0, BAA. And, if the Accumulator and Memory signs, i.e., the Multiplicand and Multiplier signs, were opposite, the Accumulator sign, i.e., now to be the Product sign, is set to indicate a negative sign. This follows the ordinary rules of algebraic multiplication of unlike quantities gives a negative result.

BAB. If the Memory and Accumulator signs are alike, the Accumulator Sign is set to indicate a positive quantity.

BB. If the digit 0 trigger is ON it signifies that the product is zero. In this calculator, zeroes are represented as positive quantities and, consequently, if the digit 0 trigger is ON, the Accumulator sign is set to indicate a positive sign.

Before proceeding to an explanation of the specific Routing circuits which control the flow of information in general, an explanation of certain miscellaneous Control circuits should be given. Refer to Fig. 6*e* which shows the Accumulator Sign and Memory Sign trigger circuits. Triggers are provided to indicate the sign of a word in Accumulator A, for a word in Accumulator B, and for the word in Memory being processed. If Accumulator A is the selected Accumulator, the line A/B TRIG A is positive to condition one input each of AND circuits **601*b* and 602*b*. If a positive signal should occur on line SET ACC SIGN (+), calling for a setting of the Accumulator sign trigger to indicate a positive value, it is passed via the conditioned AND circuit 601*b* to condition a diode gate 603*b*. Thus a W2 (D3) signal passes via the diode gate 603*b* to turn OFF trigger 605*b*. Trigger 605*b*, when OFF, signifies a positive quantity and emits a positive signal via a cathode follower 606*b* to line ACC A SIGN (+). Likewise the trigger 605*b* may be turned ON, to indicate a negative sign, as a positive signal on line SET ACC SIGN (−) passes via the conditioned AND circuit 602b to a diode gate 604b. The W2 (D3) signal is then passed by the diode gate 604b to turn ON the trigger 605b. The trigger 605b, when ON, emits a positive signal via the cathode follower 607b to line ACC A SIGN (−) to signify a negative sign. Identical circuits are utilized to indicate the sign of the word in Accumulator B wherein a trigger 612b corresponds to the trigger 605b, AND circuits 608b and 609b correspond to AND circuits 601b and 602b, diode gates 610b and 611b correspond to diode gates 603b and 604b and cathode followers 613b and 614b correspond to cathode followers 606b and 607b**.

A trigger 616b is utilized to indicate the sign of the word or field in Memory being processed and, during each Instruction time it is reset to an OFF condition. The trigger 616b, when OFF, emits a positive signal via a cathode follower 617b to line MEM SIGN (+) to indicate a positive sign. Whenever it is necessary to indicate a negative sign, a positive signal on the line SET MEM SIGN (−) conditions one input of an AND circuit 615b so that an A3 (D3) signal is passed to turn ON the trigger 616b. The trigger 616b, when ON, emits a positive signal via a cathode follower 618b to the line MEM SIGN (−) to signify a negative sign.

Refer now to Fig. 6*f* which shows circuits for determining the sign of the word in the selected Accumulator and whether or not this sign is alike or opposite to that of the sign of the word in Memory being processed. If Accumulator A is selected, the line A/B TRIG A is positive and conditions one input each of AND circuits 620b and 625b. The AND circuit 620b, when conditioned, passes a positive signal on the line ACC A SIGN (+), signifying that Accumulator A sign is positive, via an OR circuit 622b, a grounded grid amplifier 623b, and a cathode follower 624b to line ACC (+). A positive signal on the latter line signifies that the word in the selected Accumulator has a positive sign. If Accumulator B had been selected then AND circuit 621b would have been conditioned by a positive signal on line A/B TRIG B and would thereby pass a positive signal on the line ACC B SIGN (+) via an OR circuit 622b, a grounded grid amplifier 623b, and a cathode follower 624b to line ACC (+). Likewise, AND circuits 625b and 626b whose outputs pass via an OR circuit 627b, a grounded grid amplifier 628b and a cathode follower 629b to line ACC (−) determine whether or not the sign of the word in the selected Accumulator is negative.

If the sign of the word in the selected Accumulator is positive, then a positive signal on the line ACC (+) conditions an AND circuit 631b whose second input is via line MEM SIGN (+). Therefore the output for the AND circuit 631b is positive when the signs of the words being processed are alike. Likewise, if the sign of the word in the selected Accumulator is negative, a positive signal on the line ACC (−) conditions one input of an AND circuit 630b whose second input is via line MEM SIGN (−). Thus, it is seen that the output of the AND circuits 630b and 631b are positive, only if the signs are alike. These output signals pass via an OR circuit 632b, a grounded grid amplifier 633b and a cathode follower 634b to line SIGNS ALIKE. If the latter line is negative, the signal passes via an inverter 635b and a cathode follower 636b to drive line SIGN OPP positive. The latter line is positive when the signs of the words being processed are opposite.

The sign check trigger and related circuits are shown in Fig. 6*g*. A positive signal occurring on the line TURN OFF SIGN CHK TGR conditions a diode gate 637b where by a W2 (D3) signal is passed to turn OFF a trigger 639b. Likewise, if a positive signal occurs on line TURN ON SIGN CHK TGR, a diode gate 638b is conditioned so that the W2 (D3) signal is passed to turn ON the trigger 639b. The turning OFF or ON of trigger 639b, as the case may be, is at W5 time. Trigger 639b, when ON emits a positive signal via a cathode follower 640b to line SIGN CHK TGR ON, to signify that the Sign Check Trigger is ON.

Refer now to Fig. 6*h* which shows the circuitry for both Accumulator A and Accumulator B Digit 0 Triggers. If Accumulator A is selected, a positive signal on line A/B TGR A conditions one input of an AND circuit 641b. Further, if conditions require the Digit 0 Trigger 644b to be turned ON, a positive signal occurs on line TURN ON DZT to condition the second input of AND circuit 641b. The third input to AND circuit 641b, a positive A3 (D3) signal, is passed to turn ON trigger 644b. Likewise the trigger 644b may be turned OFF by a coincidence of positive signals on lines A/B TGR A and TURN OFF DZT to inputs of an AND circuit 642b. The output of the AND circuit 642b, when both inputs thereto are positive, conditions a diode gate 643b so that a W2 (D3) signal is passed to turn OFF the trigger 644b. Trigger 644b when OFF, emits a positive signal via a cathode follower 645b to line DZT A OFF and when ON emits a positive signal via a cathode follower 646b to line DZT A ON. Identical circuits are utilized for Accumulator B; AND circuits 655b and 656b corresponding in operation to AND circuits 641b and 642b, diode gate 657b corresponding to diode gate 642b, trigger 658b corresponding to trigger 644b, and cathode followers 659b and 660b corresponding to cathode followers 645b and 646b.

If the digit 0 trigger 644b for Accumulator A is OFF, its output via line DZT A OFF conditions one input of AND circuit 647b. If the selected Accumulator is Accummulator A, the second input of AND circuit 647b is conditioned by a positive signal on line A/B TGR A. Likewise, if the digit 0 trigger 658b of Accumulator B is OFF, via line DZT B OFF, one input of AND circuit 648b is conditioned positive while the second input is conditioned if Accumulator B is selected as line A/B TGR B is positive. The output of AND circuits 647b or 648b, when positive, pass via an OR circuit 649b and a cathode follower 650b to line DZT OFF. A positive signal on the latter line signifies that the digit 0 trigger of the selected Accumulator is OFF. Likewise, AND circuits 651b and 652b, an OR circuit 653b and a cathode follower 654b provide indications that the digit 0 trigger of the selected Accumulator is ON by causing a positive signal on line DZT ON.

Refer to Fig. 6*i* which shows an Auxiliary trigger and related circuits. The auxiliary trigger circuit 672b, when ON, signifies that a partial product exists and is reset OFF every Instruction time, as indicated by the *x* in the lower right corner of the block representing the trigger. The trigger may be turned ON, when a diode gate 670b is conditioned by positive signals on both lines TURN ON AUX TGR and AUX TGR OFF so that a W2 (D3) signal is passed to the trigger. Likewise, the trigger 672b may be turned OFF by a combination of positive signals on lines TURN OFF AUX TGR and AUX TGR ON conditioning a diode gate 671b to pass a W2 (D3) signal. The trigger 672b, when ON, emits a positive signal via a cathode follower 673b to line AUX TGR ON and, when OFF, emits a positive signal via a cathode follower 674b to line AUX TGR OFF.

As explained above, during a Multiply operation, it is necessary to determine whether an Accululator Mark has or has not been read from the Accumulator. Therefore, trigger 682b, of Fig. 6*j*, is provided, and whether or not an Accumulator Mark has been read from the Accumulator, is noted by the condition of the trigger 682b. Trigger 682b is reset OFF each Instruction time, as indicated by an *x* in the lower right corner of the block representing the trigger. Whenever a character is read from the Accumulator to Character Register 2, line ACC to CR2 goes positive, which besides gating the character into Character Register 2, as explained above, also conditions one input of an AND circuit 681b. If the particular character is an Accumulator Mark, the Character Recognition circuits recognize it and a positive signal on line CR2 ACC MARK conditions the second input of the AND circuit **681*b*. An A3 (D3) signal is then passed by the conditioned AND circuit 681*b* to turn ON the trigger 682*b*. The trigger 682*b* may be turned OFF as line TURN OFF AMT conditions one input of a diode gate 680*b* whereby a W2 (D3) signal is passed to the trigger 682*b*. The Accumulator Mark Trigger (AMT) 682*b*, when OFF, emits a positive signal via a cathode follower 683*b* to line AMT OFF, and when ON, emits a positive signal via a cathode follower 684*b*** to line AMT ON.

The Multiply Routing Control circuits are shown in Figs. 6*a* through 6*d*. As mentioned above, during the Instruction time preceding a Multiply operation, a character, signifying in code that the operation should be Multiply, is read out to an Operation Decoder (not shown) and the address part of the Instruction is read into the Memory Address Register. Further, one of the Accumulators, either Accumulator A or Accumulator B is selected (see Fig. 2*ac*). During the last Character cycle of Instruction time, i.e., ICC5, the Accumulator Address Counter of the selected Accumulator is set to the holding of the Starting Point Counter of the selected Accumulator as a positive signal on line ICC5 passes via an OR circuit **649*a*** (Fig. 6*d*), a cathode follower **650*a*, a grounded grid amplifier 653*a* and a cathode follower 654*a* to line SET AAC TO SPC. At the same time, the Memory Address counter is set to the holding of the Memory Address Register as the positive signal on line ICC5 passes via a cathode follower 667** (Fig. 6*b*), a grounded grid amplifier 668 and a cathode follower 669 to line SET MAC TO MAR.

Upon completion of the last Instruction Character cycle, i.e., ICC5, the calculator should proceed to a Multiply 1 type subroutine. This is accomplished as positive signals occur on lines ICC5 and MULTIPLY feeding to an AND circuit 601 (Fig. 6*a*) whose output passes via an OR circuit 602 to condition a diode gate 603. The diode gate 603, being conditioned, passes a W2 (D3) signal whereby the trigger 604 is turned ON at W2 time. The trigger 604, when ON, emits a negative output via a cathode follower 605 to line 606, which output would be effective to turn the trigger 624 OFF if it had been ON. At the same time a positive signal is emitted via a cathode follower 607, line 608, and a cathode follower 609 to the line MPY1, the latter line being positive to maintain the calculator in a Multiply 1 type subroutine. During the Multiply 1 type subroutine Character cycles, in fact during all Multiply Character cycles, a character read from Accumulator Storage is gated to Character Register 2 as a positive signal on the line MPY passes via cathode follower 634 (Fig. 6*b*) to condition one input of an AND circuit 635. As long as the calculator is in Execute time, the line E Time is positive and the output of the AND circuit 635, going positive, passes via a grounded grid amplifier 636 and a cathode follower 637 to line ACC to CR2. The character in Character Register 2 is gated to the True Complement circuits as a signal on line MPY1 feeds via an OR circuit **632*a*** (Fig. 6*d*), a cathode follower **634*a*, a grounded grid amplifier 635*a* and a cathode follower 636*a* to line CR2 TO T/C. The output of the Digit Adder is gated to its output lines as a positive signal on line MPY1, feeds via an OR circuit 603*a*** (Fig. 6*c*), a cathode follower **604*a*, a grounded grid amplifier 605*a* and a cathode follower 606*a*** to line DIGIT ADDER OUT. This latter signal is effective as explained above (see Fig. 4*j*) to gate the output of the Digit Adder to the Result lines. A Check Bit, for whatever outputs that may be generated or developed by the Digit Adder, is gated to the Output circuits as a positive signal as line MPY1 feeds via an OR circuit **615*a*** (Fig. 6*c*), a cathode follower **616*a*, a grounded grid amplifier 617*a* and a cathode follower 618*a*** to line GEN C BIT OUT.

If the calculator is in the first Execution Character cycle of a Multiply operation, the digit 0 trigger should be turned ON. This is accomplished by a coincidence of positive signals on line ECC1 (generated by an Instruction Timer similar to that shown and described in the above identified application of Rochester et al.) and on line MPY1 feeding to an AND circuit 654 (Fig. 6*b*), whose output passes via a cathode follower 655, a grounded grid amplifier 656 and a cathode follower 657 to line TURN ON DZT. At the same time A and B bits representative of positive zoning should be emitted by the Character Generator of Fig. 4*m*. Therefore, the output of the AND circuit 654 is also passed via a cathode follower 658 to line EMIT (+) ZONE. As mentioned above, in paragraph A, during the Multiply 1 type subroutine, if the Accumulator Mark trigger is OFF, the Result must be gated to the Accumulator, the Multiplier Register in the Multiple Control circuits must be set to the holding of Character Register 2 when it contains a digit of the multiplier, the Accumulator Address Counter must be stepped 256 counts during MPY1. This is accomplished by a coincidence of positive signals on the lines (Fig. 6*c*) AMT OFF and MPY1 feeding to an AND circuit 680 (Fig. 6*c*), whose output passes via a cathode follower 681, a grounded grid amplifier 683 and a cathode follower 684 to line SET MPL REG TO CR2; the output of the AND circuit 680 also passes via a cathode follower 682, a grounded grid amplifier 685 and a cathode follower 686 to line STEP AAC+256. Further, the output of the AND circuit 680 also passes via an OR circuit 688, a cathode follower 689, a grounded grid amplifier 690 and a cathode follower 691 to line RESULT TO ACC. As the Accumulator Mark trigger is OFF, the calculator should proceed to a Multiply 2 type subroutine. Referring to Fig. 6*a*, line 608 positive, when the calculator is in a Multiply 1 type subroutine, conditions one input of an AND circuit 610. The second input to AND circuit 610 is via line AMT OFF, which is positive when the Accumulator Mark trigger is OFF. Upon coincidence of these two positive inputs, the output of AND circuit 610 conditions a diode gate 613 so that a W2 (D3) signal is passed to turn ON the trigger 614. Trigger 614 going on emits a negative output from its left plate to turn OFF trigger 604 and also emits a positive output via a cathode follower 615 to line MPY2.

As stated in paragraph B of the Multiply 1 type subroutine, if the Accumulator Mark trigger is ON, the holding of Character Register 2 is gated so that it may be stored in the Accumulator and both the Accumulator Address Counter and the Starting Point Counter are stepped down one count. This is accomplished by a coincidence of positive signals on lines AMT ON and MPY1 feeding to an AND circuit **619*a*** (Fig. 6*c*), whereby its positive output passes via an OR circuit **621*a* to cathode followers 622*a*, 625*a*, and 628*a*. The output of cathode follower 622*a* passes via a grounded grid amplifier 623*a* and a cathode follower 624*a* to line STEP AAC−1; the output of cathode follower 625*a* passes via a grounded grid amplifier 626*a* and a cathode follower 627*a* to line CR2 TO ACC; and the output of cathode follower 628*a* passes via a grounded grid amplifier 629*a* and a cathode follower 630*a* to line STEP SPC−1. Under the same conditions, the calculator should also proceed directly from a Multiply 1 to a Multiply 5 type subroutine. This is accomplished since the output line 608 of trigger 604** (Fig. 6*a*) is positive when the machine is in a Multiply 1 subroutine and therefore via line 608 conditions one input of an AND circuit 626. The second input of AND circuit is via line AMT ON which is positive when the Accumulator Mark trigger is ON. When both inputs are positive, the positive output of AND circuit 626 conditions a diode gate 627 so that a W2 (D3) signal is passed to turn ON a trigger 628. Trigger 628, going ON, emits a negative signal via a cathode follower 629 and line 630 to turn OFF the trigger 604, and trigger 628 emits a positive signal via cathode followers 631 and 632 to line MPY5, the latter line being positive to maintain the calculator in a Multiply 5 type subroutine.

Refer now to the Routing which should take place during a Multiply 2 type subroutine. A character read from Memory is routed to Character Register 1, as a positive signal on line MPY2 feeds via an OR circuit 601*a* (Fig. 6*c*), line 602*a*, a cathode follower 610*a*, a grounded grid amplifier 611*a* and a cathode follower 612*a* to line MEM CHAR TO CR1. The Digit Adder output is gated to the Result lines, as the signal on line 602*a* also passes via an OR circuit 603*a*, a cathode follower 604*a*, a grounded grid amplifier 605*a* and a cathode follower 606*a* to line DIGIT ADDER OUT. The signal on line 602*a* also passes via the OR circuit 615*a*, the cathode follower 616*a*, the grounded grid amplifier 617*a* and the cathode follower 618a to the line GEN C BIT OUT, so that a generated Check Bit is gated to the Output switches. The signal on the line 602*a* also passes via a cathode follower 607*a*, a grounded grid amplifier 608*a* and a cathode follower 609*a* to line CR1 TO MEM whereby the character in Character Register 1 is gated back to Memory. Further, the signal on line 602*a* passes via an OR circuit 688, a cathode follower 689, a grounded grid amplifier 690 and a cathode follower 691 to the line RESULT TO ACC so that the output of the Digit Adder, along with the Check Bit is gated to and stored in the Accumulator. A character read out of the Accumulator during a Multiply 2 type subroutine is gated to Character Register 2 by the same circuits causing this particular routing during the Multiply 1 type subroutine (see Fig. 6*b*). The positive signal on the line MPY2 feeds via an OR circuit 647 (Fig. 6*b*), a cathode follower 651, a grounded grid amplifier 652 and a cathode follower 653 to drive the line STEP MAC−1 positive and also via a cathode follower 648, a grounded grid amplifier 649 and a cathode follower 650 to line CR1 TO ADDER whereby the Memory Address Counter is stepped down one count and the holding of Character Register 1 is gated to the Digit Adder.

Both the Accumulator Address Counter and the Starting point Counter are stepped one count as a positive signal on the line MPY2 passes via an OR circuit 670 (Fig. 6*b*), a cathode follower 671, a grounded grid amplifier 672, and a cathode follower 673 to drive line STEP AAC+1 positive, while the signal on the line MPY2 also passes via a cathode follower 674, a grounded grid amplifier 675 and a cathode follower 676 to line STEP SPC+1.

If during the Multiply 2 type subroutine, the output of the Digit Adder is not equal to Zero, the digit 0 trigger should be turned OFF. This is accomplished by coincidence of positive signals on the lines MPY2 and line OUTPUT DIGIT ADDER≠0 feeding to an AND circuit 659 (Fig. 6*b*) whose output passes via an OR circuit 661, a cathode follower 662, a grounded grid amplifier 663 and a cathode follower 664 to line TURN OFF DZT. If the zone bits of the character read out of Memory into Character Register 1 represent a negative sign, a coincidence of positive inputs on lines MPY2 and CR1 ZONE (−) feeding to an AND circuit 638 (Fig. 6*b*) cause a positive output to pass via a cathode follower 639, a grounded grid amplifier 640 and a cathode follower 641 to drive line SET MEM SIGN (−) positive and thereby cause a negative sign indication to be set into the Memory Sign Trigger. Further, if neither a positive or a negative sign is indicated by the character in Character Register 1, the Sign Check Trigger should be turned ON. This is accomplished by coincidence of positive signals on lines MPY2 and CR1 ZONE≠(+)/(−) feeding to an AND circuit 642 whose output passes via a cathode follower 643, a grounded grid amplifier 644 and a cathode follower 645 to line TURN ON SIGN CHK TGR. If the Auxiliary Trigger is ON which, as explained above, indicates an existing partial product during the Multiply 2 type subroutine, the character in Character Register 2 should be gated to the True Complement circuits. This is accomplished by a coincidence of positive signals on the lines MPY2 and AUX TGR ON feeding to an AND circuit 631*a* (Fig. 6*d*) whose output passes via an OR circuit 632*a*, a cathode follower 634*a*, a grounded grid amplifier 635*a* and a cathode follower 636*a* to the line CR2 TO T/C. As explained above, the calculator remains in a Multiply 2 type subroutine for one character cycle only. Therefore, the positive signal on the line MPY2 conditions a diode gate 616 (Fig. 6*a*) so that a W2 (D3) signal is passed to turn ON a trigger 617. The trigger 617 emits a negative signal via a cathode follower 618 to turn OFF trigger 614, thereby taking the calculator out of Multiply 2 type subroutine, and emits a positive signal via a cathode follower 619, line 620, and cathode follower 621 to line MPY3, thereby sending the calculator into a Multiply 3 type subroutine.

During the Multiply 3 type subroutine, a character is read out of Accumulator Storage and is gated to Character Register 2 by action of the circuits causing the identical routing during the Multiply 1 subroutine (see AND circuit 635, Fig. 6*b*). Referring to Fig. 6*c*, a positive signal on line MPY3 passes via an OR circuit 601*a* to drive the line 602*a* positive and thereby causes various Routing functions so that a positive signal on the latter line is caused to occur as during the Multiply 2 type subroutine, i.e., the signals on the Result lines are gated to the Accumulator as the line RESULT TO ACC goes positive, a character read from Memory is gated to Character Register 1 as line MEM CHAR TO CR1 goes positive, the holding of Character Register 1 is restored in Memory as line CR1 TO MEM goes positive, the Generated C bit output is gated to the Output Switches as the line GEN C BIT OUT goes positive and the sum of the Digit Adder is gated to the Output Switches as line DIGIT ADDER OUT goes positive. Further, if the Auxiliary Trigger is ON, a coincidence of positive signals on lines AUX TGR ON and MPY3 feeding to an AND circuit 633*a* (Fig. 6*d*), causes a positive signal to pass via the OR circuit 632*a*, the cathode follower 634*a*, the grounded grid amplifier 635*a* and the cathode follower 636*a* to the line CR2 TO T/C so that the holding of Character Register 2 is gated to the True Complement circuits. A positive signal on the line MPY3 passes via the OR circuit 670 (Fig. 6*b*) to cause a positive signal on the line STEP AAC+1, which as explained above, causes the Accumulator Address Counter to be stepped up one count. During the Multiply 3 type subroutine it is also necessary to turn OFF the digit 0 trigger if the output of the Digit Adder is not equal to Zero. Therefore a coincidence of positive signals on lines MPY3 and OUTPUT DIGIT ADDER≠0 feed to an AND circuit 660 (Fig. 6*b*), whose output passes via the OR circuit 661, the cathode follower 662, the grounded grid amplifier 663 and the cathode follower 664 to line TURN OFF DZT.

Refer now to the Routing functions which take place according to paragraph A of the Multiply 3 subroutine. If Character Register 1 contains a numeric character, it is necessary to gate that character via the Doubler, etc., to the Digit Adder and to step the Memory Address Counter down one count. Thus, a coincidence of positive signals on the lines CR1 NUMERIC and MPY3 feeding to an AND circuit 646, of Fig. 6*b*, cause a positive output to pass via the OR circuit 647 to cathode followers 648 and 651. As explained above, the output of the cathode follower 648 passes via the grounded grid amplifier 649 and the cathode follower 650 to the line CR1 TO ADDER while the output of the cathode follower 651 passes via the grounded grid amplifier 652 and the cathode follower 653 to the line STEP MAC−1. In the event that the character in Character Register 1 is numeric the calculator remains in the Multiply 3 type subroutine as trigger 617 (Fig. 6*a*) remains ON. However, as stated above under paragraph B of the Multiply 3 type subroutine, if Character Register 1 contains a non-numeric character, the Memory Address Counter should be set to the holding of the Memory Address Register. This Routing is provided as a coincidence of positive signals on lines CR1 NON NUM and MPY3 feed to an AND circuit 665 (Fig. 6*b*). A positive output of the AND circuit 665 passes via a cathode follower 666, the grounded grid amplifier 668 and the cathode follower 669 to line SET MAC TO MAR. Further, the calculator proceeds to a Multiply 4 type subroutine as a signal on line 620, which is positive when the calculator is in a Multiply 3 type subroutine, conditions one input of an AND circuit 622 (Fig. 6*a*) whose second input is via line CR1 NON NUM. The positive output of the AND circuit 622 conditions a diode gate 623 so that a W2 (D3) signal is passed to turn ON a trigger 624. The trigger 624 going on emits a negative signal to turn OFF the trigger 617 and, at the same time, emits a positive signal via a cathode follower 625 to line MPY4.

During the Multiply 4 type subroutine, a character, read out of the Accumulator, is routed to Character Register 2 by the action of the same circuits which cause this particular Routing during all Multiply subroutines (see AND circuit 635, Fig. 6*b*). An Accumulator Mark is stored in the Accumulator by Routing nothing to the Accumulator and therefore binary 0's are stored in each of the seven positions of the address then addressed. Further, the Accumulator Address Counter is set to the holding of the Starting Point Counter, the Auxiliary trigger is turned ON, and the Accumulator Mark trigger is turned OFF as a result of a positive signal on line MPY4 feeding via the OR circuit **649*a*** (Fig. 6*d*) and via the cathode followers **651*a* and 652*a*. The output of the OR circuit 649*a* passes via the cathode follower 650*a*, the grounded grid amplifier 653*a* and the cathode follower 654*a* to line SET AAC TO SPC. The output of the cathode follower 651*a* passes via a grounded grid amplifier 655*a* and a cathode follower 656*a* to line TURN ON AUX TGR, and the output of cathode follower 652*a* passes via a grounded grid amplifier 657*a* and a cathode follower 658*a* to line TURN OFF AMT. The calculator remains in the Multiply 4 type subroutine for one character cycle only, and then returns to a Multiply 1 type subroutine. Thus the signal on the line MPY4 feeds via an OR circuit 602** (Fig. 6*a*) to condition the diode gate 603 so that the W2 (D3) signal is passed to turn ON the trigger 604. As explained above, trigger 604, going ON, emits a negative signal via the cathode follower 605 to line 606, which signal is effective to turn OFF the trigger 624.

The Multiply 5 type subroutine is entered directly from the Multiply 1 type subroutine whenever the Accumulator Mark trigger is ON. Thus line 608 which is positive when the calculator is in a Multiply 1 subroutine, conditions one input of an AND circuit 626 whose second input is conditioned by a positive signal on line AMT ON. The positive output of the AND circuit 626 conditions a diode gate 627 so that a W2 (D3) signal is passed to turn ON a trigger 628. The trigger 628, going ON, emits a negative output via a cathode follower 629 and line 630 to turn OFF trigger 604, and a positive output via cathode followers 631 and 632 to line MPY5. Trigger 628 remains ON during the Multiply 5 type subroutine. It should be noted that all triggers of the Multiply Execution Timer (Fig. 6*a*) are reset OFF every Instruction time as indicated by an *x* in the lower right hand corner of each block representing the respective triggers.

During the Multiply 5 type subroutine, a character read from the Accumulator storage is gated into Character Register 2 by action of the same circuits causing this Routing during each character cycle of the Multiply operation (see the AND circuit 635, Fig. 6*b*). The Character in Character Register 2 is gated to the True Complement circuits since a positive signal on line MPY5 feeds via the OR circuit **632*a*** (Fig. 6*b*), whose positive output as described above, causes a positive signal on line CR2 TO T/C. As stated above, under paragraph A of the Multiply 5 type subroutine, if the character in Character Register 2 is numeric, the Accumulator Address Counter is stepped down one count, the character in Character Register 2 is gated to the Accumulator and the Starting Point Counter is stepped down one count. Such Routing functions are provided by a coincidence of positive signals on lines CR2 NUM and MPY5 which feed to an AND circuit **620*a*** (Fig. 6*c*). As described above, the positive output of AND circuit **620*a* passes via the OR circuit 621*a*** and other circuits to cause positive signals on lines STEP AAC—1, CR2 TO ACC and STEP SPC—1. The calculator remains in the Multiply 5 type subroutine as long as numeric characters are read from the Accumulator.

However, as stated in paragraph B of the Multiply 5 type subroutine, if the character in Character Register 2 is non-numeric, the Digit Adder output and a Generated Check bit must be gated to the Accumulator, the Starting Point Counter must be stepped 256 counts and an End of Execution time must be signalled. This Routing is provided as a coincidence of positive signals on lines CR2 NON NUM and MPY5 feed to the AND circuit **613*a*** (Fig. 6*c*) whose output drives line **614*a* positive. The line 614*a*, going positive, feeds via the OR circuit 603*a* to cause positive signals on the line DIGIT ADDER OUT. The signal on line 614*a* also passes via the OR circuit 615*a* to cause a positive signal on line GEN C BIT OUT. At the same time, positive signals on lines CR2 NON NUM and MPY5 feed via an AND circuit 687 whose output passes via the OR circuit 688 and to cathode followers 692 and 695. As explained above, a positive signal input to the OR circuit causes a positive signal on the line RESULT TO ACC. A positive signal to the cathode follower 692 passes via a grounded grid amplifier 693 and a cathode follower 694 to cause a positive signal on line STEP SPC+256. A positive input signal to cathode follower 695 passes via a grounded grid amplifier 696 and a cathode follower 697 to line END EX TIME to signal End of Execution time. As the calculator signals End of Execution time, as described in the above identified application of Rochester, et al., Instruction time is entered and, as explained above, all triggers of the Multiply Execution Timer are reset, including trigger 628**.

During the Multiply 5 type subroutine, the Accumulator Sign must be set in accordance with the algebraic rules of multiplication as stated under paragraph BA of the Multiply 5 type subroutine. If the digit 0 trigger is OFF indicating that a quantity other than zero exists in the Accumulator, and if the Accumulator and Memory signs opposite, the Accumulator Sign is set to indicate a negative quantity. This is accomplished during the Multiply 5 type subroutine as a coincidence of positive signals on the lines MPY5, DZT OFF and CR2 NON NUM feed to an AND circuit **643*a*** (Fig. 6*d*) to drive the line **644*a* positive. Line 644*a* conditions one input each of an AND circuit 638*a* and 645*a*. If the Accumulator and Memory signs are opposite, line SIGNS OPP conditions a second input of the AND circuit 645*a*. The positive output of AND circuit 645*a* passes via a cathode follower 646*a*, a grounded grid amplifier 647*a* and a cathode follower 648*a* to line SET ACC SIGN (—). If, however, the Accumulator and Memory signs were alike, an AND circuit 638*a* is conditioned by a coincidence of positive signals on line 644*a* and line SIGNS ALIKE. The positive output of AND circuit 638*a* passes via an OR circuit 639*a*, a cathode follower 640*a*, a grounded grid amplifier 641*a* and a cathode follower 642*a* to drive line SET ACC SIGN (+) positive. In the event that the digit 0 trigger is ON, indicating that a zero quantity exists in the Accumulator, at the time the Multiply 5 type subroutine is reached, then the Accumulator sign must be set to indicate a positive quantity since negative zeros are not allowed in the calculator. This is accomplished by a coincidence of positive signals on the lines MPY5, CR2 NON NUM and DZT ON which feed to an AND circuit 637a, whose positive output passes via the OR circuit 639a** to cause a positive signal online SET ACC SIGN (+). All circuitry necessary for accomplishing a Multiply operation has now been shown and described.

Summarizing as a Multiply Instruction is programmed, the calculator proceeds into a Multiply 1 type subroutine as the first trigger of the Multiply Execution timer is turned ON at W5 time of the last Instruction Character cycle, this being Instruction Character cycle 5. During this Multiply 1 type subroutine, the low order digit of the Multiplier is read from the Accumulator and is gated to the Multiplier Register and the Multiple Control circuits, and is also gated through the Digit Adder to be restored in the Accumulator storage. The character, as it is restored in Accumulator Storage, is also provided with a (+) zoning during this first character cycle. The purpose of the (+) zoning is to provide an indication of the right end or low order digit of the Multiplier field. Provided the Character read from Accumulator storage is not an Accumulator Mark, the Accumulator Address Counter is stepped 256 counts at W4 time of the character cycle, so that the Accumulator Address controls will be at the proper address to store the first digit of a product or a partial product developed during the next character cycle. At W2 time of the character cycle, the trigger which controls the Multiply 2 type subroutine is turned ON.

During the Multiply 2 type subroutine, the low order digit of the Multiplicand is read out of Memory and is multiplied by the low order digit of the Multiplier then present in the Multiple Control circuits. At W4 time of the Multiply 2 type subroutine character cycle, the Accumulator Address Counter is stepped one count to be in position to control the address at which there is stored a succeeding higher order digit of the product and the Starting Point Counter is stepped one count to be in position to address the succeeding higher order Multiplier digit. The Memory Address Counter is stepped down one count to the address of the succeeding higher order of the Multiplicand. The calculator then proceeds to the Multiply 3 type subroutine.

During the Multiply 3 type subroutine, the succeeding higher orders of the Multiplicand are read from Memory, one order during each Character cycle and are effectively multiplied by the order of the Multiplier then existing in the Multiple Control circuits. During each character cycle the Memory Address Counter is stepped down one count so that succeeding higher orders of the Multiplicand may be addressed while the Accumulator Address Counter is stepped up one count to store succeeding higher orders of the partial product or the product as the case may be. These Character cycles are repeated until a non-numeric character is read out of Memory, which indicates that all digits of the Multiplicand have been processed, that is, have been multiplied by the particular digit of the Multiplier in the Multiple Control circuits and, after clearing carries, if any, of the Multiple Generator and Adder circuits, the calculator is now ready to obtain a succeeding higher order Multiplier digit. It should be remembered that the Starting Point Counter contains the address of a succeeding higher Multiplier digit as it was stepped up one count during the previous Multiply 1 type subroutine.

During the Multiply 4 type subroutine, a character read out of the Accumulator is replaced by an Accumulator Mark. This means an Accumulator Mark is stored at the address to the left of the highest order of the product or partial product. The auxiliary trigger is turned ON during the first Multiply 4 type subroutine to signify that a partial product or product exists. At W4 time of this Character cycle, the Accumulator Address Counter is set to the holding of the Starting Point Counter and the Multiply 1 type subroutine is again entered. Since the Accumulator Address counter has been set to the holding of the Starting Point Counter, both counters now hold the address of the succeeding higher order digit of the Multiplier.

Upon re-entering the Multiply 1 type subroutine, the previously described operations again take place as a succeeding higher order digit of the Multiplier, if one exists, is read out of the Accumulator and is stored in the Multiple Control circuits. If this is the first reentry into the Multiply 1 type subroutine, the particular digit is the tens order digit of the multiplier. Further, as the Accumulator Address Counter is stepped 256 counts from this particular address position, it now addresses the address of the tens order of the product. Thus a proper column shift is maintained as the calculator proceeds to a Multiply 2 type subroutine and as the low order digit of the Multiplicand is multiplied by this succeeding higher order Multiplier digit, say the tens digit, the resulting partial product is added to the tens digit of the previously stored partial product. However, if during the Multiply 1 type subroutine, an Accumulator Mark is read out of the Accumulator, it is an indication that the entire multiplier field has been processed and an Accumulator Mark trigger is turned ON. If the Accumulator Mark trigger is turned ON, the calculator proceeds to a Multiply 5 type subroutine and both the Accumulator Address Counter and the Starting Point counter are stepped down one count.

The purpose of the Multiply 5 type subroutine is to step through all orders of the Multiplier to find the units or low order position of the Multiplier. It should be recalled that the units order of the Multiplier was provided with positive zoning during the first Multiply Execution cycle and therefore is recognized as a nonnumeric character as read from the Accumulator. Thus during the Multiply 5 type subroutine succeeding lower order digits of the Multiplier are read out of Accumulator storage until the units order is found. As the units order is recognized, both the Starting Point Counter and the Accumulator Address Counters hold the address of the units order of the Multiplier, which is known to be 256 addresses removed from the low order digit of the product. The zoning bits are removed and the Starting Point Counter is stepped 256 counts. The Starting Point Counter then contains the address of the product and an end of execution time is signaled. The calculator may then proceed to Instruction time. It is important to note that the Starting Point Counter now contains the address of the word stored in the selected Accumulator Storage, this word being the product.

A sample problem showing, in general, the operation of the Arithmetic units for multiplication of a multiplicand +98 by a multiplier of +83 is shown in Fig. 7a. As indicated, in this problem thirteen Character cycles are required to obtain the solution. The digital holdings of the various units which are indicated include the Multiple Generator, the Multiple Adder, the Digit Adder, the Multiplier Register, Memory and Accumulator. It should be understood however, that each of the digits is represented in the calculator in a binary coded decimal notation. The particular Multiply type of subroutine, in which the calculator is operating during the various Character cycles, is indicated under the column TYPE CYCLE of the block in the lower left corner of the drawing. During the first character cycle, which is a Multiply 1 type subroutine cycle, the low order digit of the multiplier, a quantity 3, is read out of the Accumulator storage into the Multiplier Register and controls are thereby energized to provide selection of the proper multiples. The same digit 3 is restored in the Accumulator with positive zoning, as indicated. The machine then proceeds to a Multiply 2 type subroutine during which the first character of the Multiplicand is read out of Memory and the Accumulator Address Counter is stepped 256 counts. During this second character cycle, the lowest order digit of the multiplicand, namely, the character 8, is gated to the Multiple Generator circuits and the output of the one times multiple, a quantity of eight with no carry is indicated under the X1 column of the block, Generated Multiple for the 2 cycle, while a zero is indicated in the corresponding 2 cycle position of the block, Multiple Carry. Two times the multiple results in a quantity of six as indicated in X2 column, 2 cycle of the block, Generated Multiple and a carry of one which is indicated in column X2 for the 2 cycle of the block Multiple Carry. Four and five times multiples are also generated, but during multiplication by this first digit of the multiplier, namely, the digit three, the quadruple and quintuple values are not to be used and hence are not indicated. The multiplier digit 3 causes a gating into the Multiple Adder circuits of both single and doubled multiples, in this instance, values of eight and six which, since 8 plus 6, respectively, equals 14, result in a Multiple Sum of 4 and a carry of 1. The 4 is represented in the Multiple Sum column of the block, Multiple Adder, while the 1 is represented in the 2 cycle position in the block, Multiple Adder Carry. The sum of 4 is passed through the Digit Adder where it would combine with a partial product, if any. At this point, there is no partial product, so that the resultant sum is a 4 which is stored in the Accumulator Multiple In column for 2 cycle, and since there was no decimal carry in the Digit Adder, it is indicated as a binary 0 in the 2 cycle position of the block, Decimal Carry. The calculator then proceeds to a Multiply 3 type subroutine which, in this instance, is also the 3 character cycle of the operaton. During this 3 Character cycle, the tens digit of the multiplicand, a 9, is read from Memory and the proper multiples are generated. In this instance, the one times multiple is a quantity 9, and the doubled multiple is two times 9, or 18, plus a carry of 1 from the succeeding lower order, resulting in a digit 9 plus a carry of 1. The carry of 1 is indicated under the X2 column of the block Multiple Carry and 9's for single and double quantities, are represented under both the X2 and the X1 columns, of the block, Generated Multiple for 3 cycle. Again both the single and double multiples are added by the Multiple Adder circuits and the addition of 9 plus 9 is 18 which is plus a carry of 1 from the succeeding lower order, results in a sum of 9 being emitted to the Digit Adder. Since no partial product as yet exists, the final sum therefor is 9 with no decimal carry. The Multiple Adder carry of 1, which resulted from the addition of 9 plus 9 plus 1, is indicated in the 3 cycle position of the block, Multiple Adder Carry. The Memory Address Counter is then stepped to the address of the next character which is read from Memory. Under the assumed conditions, this particular character is provided with positive zoning which is recognized as non-numeric and thus indicates that all digits of the multiplicand have been processed. Consequently, no single, double, quadruple or quintuple values of this particular character are generated. However, carries from the succeeding lower order must be processed. Therefore, the output of one times the Generated Multiple output is a 0 while the output of two times the Generated Multiple is a 1. Since both the single and double multiples are gated into the Multiple Adder, the quantities of 1 plus 0 plus a Multiple Adder carry of 1 results in a Multiple Adder output of 2.: This quantity of 2 is fed to the Digit Adder and is the final sum since no decimal carry from a succeeding lower order and no prior partial product exists.

The Digit Adder Sum of 2 is stored in the Accumulator. The calculator then proceeds to a Multiply 4 type subroutine, this being the fifth Character cycle of the operation. During this particular cycle, an Accumulator Mark is stored in the Accumulator at an address adjacent the highest order digit of the now existing partial product. During the 6th character cycle, the calculator returns to a Multiply 1 type subroutine and the tens order of the Multiplier, a digit 8 is read out of the Accumulator and is gated to the Multiple Register. The calculator then proceeds to the 7th Character cycle and to a Multiply 2 type subroutine. During this 7th Character cycle the units digit of the Multiplicand, a digit 8, is read out of Memory and the various multiples are generated. In this instance, since a Multiplier digit 8 is contained in the Multiple Register, the selected multiples will both be quadruple multiples. In other words a quadrupled value is gated to both inputs of the Multiple Adder circuits. Multiples are generated also for the single, double, and quintuple values, but since those multiples have no utilization during this portion of the operation, only the digits resulting from quadrupled multiples are indicated in the block, Generated Multiple. Four times a quantity 8 results in a Generated Multiple output of 2 and a carry of 3; a quantity 2 being indicated in the 7 cycle position under both X4 columns of the block, Generated Multiple, and a quantity 3 being indicated in the 7 cycle position under both X4 columns of the block, Multiple Carry. Both quadrupled multiples are passed to the Multiple Adder wherein 2 plus 2 results in a Multiple Adder sum of 4 since there are no Multiple Adder carry values from succeeding lower orders. The Multiple Adder sum of 4 is gated to the Digit Adder and is there combined with a value 9, the tens order of the then existing partial product. The addition of 4 plus 9 results in a sum of 3 which is stored in the tens position of the partial product (replacing the 9) and a carry of 1 as indicated under the Decimal Carry column. The calculator now proceeds to a Multiply 3 type subroutine, this being the eighth character cycle and the digit 9, the tens order of the Multiplicand is read out of Memory. The quantities of 9 quadrupled equal 36 and with both combined with a carry value of 3 from the succeeding lower order, the resulting multiples are quantities of 39. The digits 9 are indicated in the 8 cycle position, under both X4 columns of the block, Generated Multiple and again carries of three are indicated in both columns of the block, Multiple Carry. Combining quadrupled multiples 9 plus 9 equals 18 and, since there is no carry from the succeeding lower order, the Multiple Sum is 8 and the Multiple Adder Carry is 1. The digit 8 is gated to the Digit Adder to be combined with the digit 2 from the existing partial product and the Decimal carry of 1 from the succeeding lower order. Combining 8 plus 2 plus 1 results in a Digit Adder output of 1 and a Decimal carry of 1. The sum 1 is stored in the Accumulator, as indicated, and the carry of 1 is held by the Decimal Carry circuits. Proceeding to another character cycle, the 9th, and reading the next character from Memory, it is recognized that the entire Multiplicand has been processed and, therefore, no Multiples of the character read are generated. However, the carries from the succeeding lower orders must be processed. Thus both carries of 3 are gated from the Generated Multiple circuits to be added to a Multiple adder carry of 1, and 3 plus 3 plus 1 results in a Multiple Sum of 7. The Multiple Sum of 7 is further combined with a Decimal carry of 1 in the Digit Adder and consequently a final sum of 8 is stored in the Accumulator.

The calculator then proceeds to a Multiply 4 type subroutine in the 10th Character cycle, for the purpose of storing an Accumulator Mark adjacent to the high order digit of the product, or partial product, as the case may be. Upon completion of this Character cycle, the calculator again proceeds to a Multiply 1 type subroutine. The purpose of returning to a Multiply 1 type subroutine is to obtain the succeeding higher order digit of the Multiplier. However, at this time an Accumulator Mark is read from the Accumulator and indicates that the entire Multiplier has been processed. The calculator then enters the Multiply 5 type subroutine for Character cycles 12 and 13, and steps down through the Multiplier field to find the low order digit. During these cycles no information is processed by the Arithmetic circuits. Upon finding the low order digit of the Multiplier, during the 13th Character cycle, the Starting Point Counter is stepped 256 counts to the address of the low order digit of the product. The End of Operation is signaled during this 13th character cycle, and thus the quantity of 8134, which is the product of 98 times 83, is stored in the Accumulator storage at the address held by the Starting Point Counter.

The operation of a sample problem requiring the multiplication of a quantity 692 by 405 is shown in Fig. 7*b*. In this problem the complexity of various carries resulting in the Doubler, Quadrupler and Quintupler circuits, the Multiple Adder circuits, and in the Digit Adder circuits are neglected. The sole purpose of this illustration is to show how various characters are read out of certain addresses in Memory and Accumulator Storage and how the results are stored in other addresses. The Memory addresses are referred to as $m$, $m-1$, $m-2$, etc., and the Accumulator addresses are $n$, $n+1$, $n+2$, $n+ \ldots n+256$, etc. Special notations for indicating the address held by various counters are used, such as, an open triangle for both the Starting Point Counter and the Memory Address Register, and an arrow head for indicating the address held by the Accumulator Address Counter and the Memory Address Counter. As in Fig. 7*a*, the symbol for the Accumulator Mark is a circle with a positive sign in the center of the circle. A column (MPL REG) is provided to show the digit contained in the Multiplier Register, which controls the outputs of the Multiple Control circuits and a column is also provided for showing the ON/OFF condition of the Auxiliary trigger. During the Instruction time preceding a Multiply operation, the address of the Multiplicand is read out of memory into the Memory Address Register, say address $m$. The Starting Point Counter contains the address of the word stored in the selected Accumulator, say address $n$, the address of the Multiplier. During the last Instruction Character cycle, the Accumulator Address Counter is set to the holding of the Starting Point Counter and the Memory Address Counter is set to the holding of the Memory Address Register. During the first Character cycle of Execution time, which is a Multiply 1 type subroutine, a character 5 is read out of address $n$ of the Accumulator storage and is placed in the Multiplier Register of the Multiple Control circuits. This character 5 is also restored in the Accumulator address $n$ and is provided with a positive zoning. During the latter part of the Character cycle, the Accumulator Address Counter is stepped 256 counts to the address $n+256$. The calculator then proceeds to a Multiply 2 type subroutine wherein a character 2 is read out of Memory address $m$, is multiplied by the 5 in the Multiple Register, and a partial product character 0 is stored at address $n+256$. During this particular cycle, the Starting Point Counter is stepped up one count to address $n+1$, the address of the tens digit of the multiplier. Further, the Memory Address counter is stepped down one count to address $m-1$. The machine then proceeds to a Multiply 3 type subroutine to cause a read out of the tens digit of the multiplicand, a digit 9. This digit 9 is multiplied by the digit 5 contained in the Multiplier Register, the carry from the succeeding lower order is added and a sum of 6 results and is stored in the Accumulator at address $n+257$. During the same Character cycle, the calculator steps the Accumulator Address Counter up one count to address $n+258$ and the Memory Address Counter down one count to address $m-2$. The calculator then proceeds to another Character cycle during which a character 6 is read out of Memory address $m-2$ and is multiplied by the digit 5. Carries are added from succeeding lower order and a resultant sum of 4 is stored in the Accumulator at address $n+258$. Again the Accumulator Address Counter is stepped up one count, at this time, to address $n+259$ and the Memory Address Counter is stepped one count to address $m-3$. During the succeeding character cycle a character X with sign zoning, is read out of Memory, indicating that all digits of the multiplicand have been processed. Consequently, carries from the succeeding lower order multiplication are processed and the digit is stored in the Accumulator at address $m+259$. During the latter part of this character cycle the Accumulator Address counter is stepped one count to address $m+260$ while the Memory Address Counter is again set to the holding of the Memory Address register address $m$.

The calculator proceeds to a Multiply 4 type subroutine during which an Accumulator Mark is stored at address $n+260$ and during the latter part of the Character cycle, the Accumulator Address Counter is set to the holding of the Starting Point Counter, at this time, address $n+1$. The calculator proceeds to the Multiply 1 type subroutine, the second digit 0, of the multiplier, is read out of the Accumulator Address $n+1$, and is stored in the Multiplier Register. Again the Accumulator Address Counter is stepped up 256 counts, now to address $n+257$. As explained above, stepping of the Memory Address Counter 256 counts from the address of the digit of the multiplier being processed, provides a proper column shift.

The calculator proceeds to a Multiply 2 type subroutine during which a digit 2 is read out of Memory address $m$, is multiplied by 0, and the resulting multiple sum of 0 is added to the digit 6 of the partial product, held at address $n+257$. The resulting Digit Adder sum of 6 is stored in Accumulator address $n+257$. During the latter part of the character cycle, the Accumulator Address Counter is stepped up one count to address $n+258$, the Starting Point Counter is also stepped up one count to address $n+2$, and the Memory Address Counter is also stepped one count to address $m-1$. The operation continues as described above, until it is again recognized that all digits of the multiplicand have been processed. The calculator again proceeds to a Multiply 4 type subroutine, stores an Accumulator Mark at address $n+261$ and once again returns to the Multiply 1 type subroutine.

At this time, the digit 4, is read out of the Accumulator at address $n+2$ and is stored in the Multiplier Register. The Accumulator Address Counter is then stepped 256 counts to address $n+258$, the calculator proceeds to the Multiply 2 type subroutine for one character cycle and thereafter to the Multiply 3 type subroutine so that the quantity 692 is multiplied by 4, proceeding from low order to high order of the multiplicand with the resulting multiple sums being added, with proper column shifts to the existing partial product 346. This process continues until it is recognized that all digits of the multiplicand have been processed.

The calculator then returns to a Multiply 1 type subroutine but, on reading out a character at address $n+3$, recognizes that the next character is an Accumulator Mark. Consequently, a Multiply 5 subroutine is entered and the entire multiplier is read through from high order digit to low order digit, and upon reading out the quantity five which, as explained above, was provided with positive zoning, it is realized that the low order digit of the multiplier has been reached. During this last cycle of the Multiply 5 subroutine, the zoning added to the lower order digit (as above) is erased, and the Starting Point Counter is stepped 256 counts from address $n$ to address $n+256$. It follows that the Starting Point Counter now holds the address of the low order digit of the product. An End of Execution time is signaled and the product of 280260 is held at address $n+256$, which is also the address held by the Starting Point Counter. The multiplicand 692 is still stored in Memory at address $m$.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An electronic multiplier for providing the product of a multiplier having one or more digital orders and a multiplicand having one or more digital orders including, in combination, digit registering means, multiplier presenting means registering a first digital order of the multiplier in said digit registering means, means presenting said multiplicand digital orders digit by digit, means generating predetermined multiples of each multiplicand digital order as said multiplicand digital orders are presented, means receiving said generated multiples and, under control of said digit registering means, selecting certain multiples of the generated multiples in accordance with the digit registered in said digit registering means, means adding the selected multiples to form a multiple sum, means continuing the process of presenting multiplicand digital orders, of generating multiples, of selecting multiples and of adding selected multiples until all orders of the multiplicand have been presented and a first series of multiple sum digits form a partial product, means thereupon controlling said multiplier presenting means to register a succeeding higher order digit of the multiplier in said digit registering means and repeating the process of receiving said multiplicand digital orders digit by digit, of generating, selecting and adding multiples to form another series of multiple sum digits, and means to add said last formed series of multiple sum digits to the previously formed partial product with the low order of the last formed series of multiple sum digits being added to that order of the previously formed partial product as many orders removed from its low order as the digital order of the multiplier contained in the digit registering means is removed from its low order, whereby a latter partial product is formed, means thereupon repeating the process of registering a succeeding higher order digit of the multiplier in said digit registering means, of receiving the orders of the multiplicand digit by digit, of generating, selecting and adding multiples to form another series of multiple sum digits and of adding the last formed series of multiple sum digits to the last formed partial product with the low order of the last formed series of multiple sum digits being added to that order of the last formed partial product as many orders removed from its low order as the digital order of the multiplier contained in the digit registering means is removed from its low order until all digital orders of the multiplier have been presented whereby a complete product is formed.

2. The invention set forth in claim 1 and including means recognizing that all digital orders of the multiplicand have been presented.

3. The invention set forth in claim 1 and including means recognizing that all digital orders of the multiplier have been presented.

4. In an electronic multiplier, a data storage device storing a multiplier having one or more digital orders and a multiplicand having one or more digital orders, each of said multiplicand and multiplier digital values being represented by permutations of coded signals, a multiplier register associated with said data storage device, arithmetic circuits controlled by outputs of said multiplier register, means for transferring a first digit of said multiplier from the storage device to said multiplier register, means for transferring, digit by digit, all digits of said multiplicand to said arithmetic circuits, means for sensing when all digits of said multiplicand have been transferred, and means controlled by said sensing means for causing the first named transfer means to transfer another digit of said multiplier to said multiplier register.

5. In an electronic multiplier, a data storage device storing a multiplier having one or more digital orders and a multiplicand having one or more digital orders, each of said multiplicand and multiplier digital values being represented by permutations of coded signals, a multiplier register associated with said data storage device and adapted to store a digit, an arithmetic circuit controlled by outputs of said multiplier register, means for transferring a first digit of said multiplier from the data storage device to said multiplier register, means for transferring, digit by digit, all digits of said multiplicand to said arithmetic circuits, a first sensing means for sensng when all digits of said multiplicand have been transferred, and means controlled by said first sensing means for causing the first named transfer means to transfer another digit of said multiplier to said multiplier register as said first sensing means senses that all digits of said multiplicand have been transferred, a second sensing means for sensing when all digits of said multiplier have been transferred, and means for repeating the process of alternately transferring a digit of said multiplier to the multiplier register and then all digits of said multiplicand to the arithmetic circuits until the second sensing means senses that all digits of said multiplier have been transferred.

6. The invention set forth in claim 5 and including means in said arithmetic circuits to generate multiples of said multiplicand digits and means controlled by outputs of said multiplier register for selecting certain ones of said multiples in accordance with the digit in the multiplier register.

7. In an electronic multiplier, a data storage device storing a multiplier having one or more digital orders and a multiplicand having one or more digital orders, a multiplier register associated with said data storage device and adapted to store a digit, multiple generator circuits connected to said data storage device, adapted to receive digits from said storage device and to generate multiples of digits as received, switching circuits connected to receive the generated multiples and controlled by outputs of said multiplier register to select certain of the generated multiples in accordance with the digit in said multiplier register, a first adding means connected to receive the selected multiples and combine the selected multiples to form a multiple sum, means for storing said multiple sum in said storage device, means initiating a multiply operation including means for transferring a first digit of said multiplier from the data storage device to said multiplier register, means for transferring, digit by digit, all digits of said multiplicand, to said multiple generator circuits whereby a partial product consisting of a series of multiple sums, equal to the multiplicand times the first digit of the multiplier, is formed and stored in said data storage device, a first sensing means sensing when all digits of said multiplicand have been transferred, means controlled by said first sensing means for causing the first named transfer means to transfer another digit of said multiplier from the data storage device to the multiplier register as said first sensing means senses all digits of the multiplicand have been transferred, a second sensing means for sensing when all digits of the multiplier have been transferred, means for repeating the process of alternately transferring a digit of the multiplier to the multiplier register and then all digits of the multiplicand to the multiple generator until said second sensing means senses all digits of the multiplier have been transferred, means effective, however, after partial products exist and as series of multiple sums are formed, to add the series of multiple sums to a last formed partial product with the low order digit of the series of multiple sums being added to that order of the last formed partial product as many orders removed from its low order as the digit of the multiplier in the multiplier register is removed from its low order, the last named means including a second adder connected to said first adder and to said storage means, adapted to receive the multiple sum outputs of said first adder and digits from said storage means, and to add the digits received to form a products sum, and means for transferring, digit by digit, a previous formed partial product, starting with an order removed from its low order as many orders as the multiplier digit in the multiplier register is removed from its low order, from the data storage device to said second adder, simultaneous with digit by digit transfer of the multiplicand to the multiple generator circuits, and means to store said product sums in the storage device to form another partial product whereby a complete product is formed when all digits of the multiplier have been transferred.

8. In an electronic multiplier, a data storage device storing a multiplier having one or more digital orders and a multiplicand having one or more digital orders, wherein each digital order is represented in a first binary coded decimal notation by storage elements, each of which corresponds to a different one of the binary values of the code, and which are capable of assuming conditions representative of the presence or absence of the respective binary values, a multiplier register associated with said data storage device capable of storing digits in the binary coded decimal notations, AND and OR circuits associated with said multiplier register and connected to provide outputs representing a digit in said multiplier in a second binary coded decimal notation, the outputs of the AND and OR circuits corresponding to different ones of the binary values of the second code and capable of assuming conditions indicating the presence or absence of the binary values of the second code, arithmetic circuits connected to receive digits from said data storage device and including means for generating multiples of digits as digits are received, said multiples corresponding in multiple factor values to the binary values of the second code, switching means connected to receive generated multiples and controlled by outputs of the AND and OR circuits to select certain ones of the generated multiples, in accordance with binary values in the second which are indicated present by the outputs of the AND and OR circuits and adder means connected to receive and add the selected multiples, to form a multiple sum; means to initiate a multiply operation including means for transferring a first digit of said multiplier from the storage device to the multiplier register, means for transferring, digit by digit, all digits of said multiplicand to said arithmetic circuits, whereby a partial product equal to the multiplicand times the multiplier digit is formed by the multiple sums, means for sensing when all digits of the multiplicand have been transferred and means controlled by said sensing means for causing the first named transfer means to transfer another digit of said multiplier to said multiplier register.

9. In an electronic multiplier, a data storage device having addressable positions, each addressable position containing elements of storage having weighted values for representing digital values according to a notation comprising combinational bits, each of said elements capable of storing an indication of the presence or absence of the weighted values, a multiplier storing section comprised of one or more of the addressable positions storing a multiplier having one or more digital orders, a multiplicand storing section comprised of one or more of the addressable positions storing a multiplicand having one or more digital orders, a product storing section comprised of one or more of the addressable positions for storing a product having one or more digital orders, a multiplier register having elements of storage adapted to store a digit and to emit output signals representative of the digit stored therein, multiple generator circuits connected to receive digits from said storage device and to generated multiples of the digits as received, switching means connected to receive the generated multiples and controlled by the outputs of the multiplier register to select certain ones of the generated multiples, means adapted to receive and add the selected multiples to form a multiple sum, and means to store the multiple sum in the product storing section, means to initiate a multiply operation including means causing transfer of a first multiplier digit from the multiplier storing section to the multiplier register, means for transferring, digit by digit, all digits of the multiplicand from the multiplicand storing section to the multiple generator circuits whereby a series of multiple sums, equal to the multiplicand times the multiplier digit stored in said multiplier register, is formed and is stored in the product storing section, means sensing when all digits of said multiplicand have been transferred, and means controlled by said sensing means for causing the first named transfer means to transfer another digit of said multiplier from the multiplier storing section to the multiplier register.

10. The invention set forth in claim 9 wherein the multiple generator circuits include means for storing a carry value when a carry is provided by generation of multiples, for addition to generated multiples of a succeeding higher digit.

11. In an electronic multiplier, a data storage device having addressable positions, each addressable position containing elements of storage having weighted values of 1, 2, 4 and 8 for representing digital values according to a notation comprising combinational bits, each of said elements capable of storing an indication of the presence or absence of the respective weighted values, a multiplier storing section comprised of one or more of the addressable positions storing a multiplier having one or more digital orders, a multiplicand storing section comprised of one or more of the addressable positions storing a multiplicand having one or more digital orders, a product storing section comprised of one or more of the addressable positions for storing a product having one or more digital orders, a multiplier register having elements of storage having weighted values of 1, 2, 4 and 8 adapted to store a digit and to emit output signals representative of the digit stored therein, multiple generator circuits connected to receive digits from said storage device and to generate multiples of the digits as received, switching circuits connected to receive the generated multiples and controlled by outputs of the multiplier register to select certain ones of the generated multiples, means adapted to receive and add the selected multiples to form a multiple sum, and means to store the multiple sum in the product storing section, means to initiate a multiply operation including means causing a transfer of a first multiplier digit from the multiplier storing section to the multiplier register, parallel by bit, means for transferring, parallel by bit and serial by digit, all digits of the multiplicand storing section to the multiple generator circuits whereby a series of multiple sums, equal to the multiplicand times the multiplier digit stored in said multiple register, is formed and is stored in the product storing section, means sensing when all digits of said multiplicand have been transferred, and means controlled by said sensing means for causing the first named transfer means to transfer another digit of said multiplier from the multiplier storing section to the multiplier register.

12. In an electronic multiplier, a data storage device having addressable positions, each addressable position containing elements of storage having weighted values of 1, 2, 4 and 8 for representing digital values according to a notation comprising combinational bits, each of said elements capable of storing an indication of the presence or absence of the respected weighted values, a multiplier storing section comprised of one or more of the addressable positions storing a multiplier having one or more digital orders, a multiplicand storing section comprised of one or more of the addressable positions storing a multiplicand having one or more digital orders, a product storing section comprised of one or more of the addressable positions for storing a product having one or more digital orders, a multiplier register having elements of storage with weighted values of 1, 2, 4 and 8 adapted to store a digit and to emit output signals representative of the digit stored therein, multiple generator circuits connected to receive digits from said storage device and to generate multiples of the digits as received, switching circuits connected to receive the generated multiples and controlled by outputs of the multiplier register to select certain ones of the generated multiples, first adding means connected to receive and add the selected multiples to form a multiple sum, means to initiate a multiply operation including means causing a transfer of the first multiplier digit, parallel by bit, from the multiplier storing section to the multiplier register, means for transferring, parallel by bit and serial by digit, all digits of the multiplicand from the multiplicand storing section to the multiple generator circuits whereby a first series of multiple sums forms a partial product, equal to the multiplicand times the multiplier digit stored in said multiple register, means storing the partial product in the product storing sections, means sensing when all digits of said multiplicand have been transferred, and means controlled by said sensing means for causing the first named transfer means to transfer another digit of said multiplier from the multiplier storing section to the multiplier register and thereafter to repeat the transfer of all digits of the multiplicand from the multiplicand storing section to the multiple generator circuits whereby a second series of multiple sums is formed, second adding means connected to receive said second series of multiple sums, means for transferring the partial product from the product storing section, parallel by bit, serial by digit and starting with a digit removed from the low order of the partial product as many orders as the multiplier digit in the multiplier register is removed from its low order whereby the second series of multiple sums is combined with the previous partial product to form a subsequent partial product, means for storing the subsequent partial product in said product storing section, means sensing when all digits of said multiplier have been transferred, and means for repeating the process of transferring a digit of said multiplier from the multiplier storing section to the multiplier register, transferring the multiplicand digit by digit from the multiplicand storing section to the multiple generator circuits and transferring a last formed partial product to the second adding means until the last named sensing means senses all digits of said multiplier have been transferred whereby a complete product is formed and is stored in the product storing section.

13. In an electronic multiplier, a data storage device having addressable positions, each addressable position containing elements of storage having weighted values of 1, 2, 4 and 8 for representing digital values according to a notation comprising combinational bits, each of said elements capable of storing an indication of the presence or absence of the weighted values, a multiplier storing section comprised of one or more of the addressable positions storing a multiplier having one or more digital orders, a multiplicand storing section comprised of one or more of the addressable positions storing a multiplicand having one or more digital orders, a product storing section comprised of one or more of the addressable positions for storing a product having one or more digital orders, a multiplier register having elements of storage with weighted values of 1, 2, 4 and 8 adapted to store a digit and having AND and OR circuits associated therewith and connected to emit output signals having weighted values of 1, 2, 4 and 5 representative of the digit stored therein, multiple generator circuits connected to receive digits from said storage device and to generated single, double, quadruple and quintipule multiples of the digits as received, switching means connected to receive the generated multiples and controlled by the output signals of the multiplier register to select certain ones of the generated multiples, means adapted to receive and add the selected multiples to form a multiple sum, and means to store the multiple sum in the product storing section, means to initiate a multiply operation including means causing transfer of a first multiplier digit from the multiplier storing section to the multiplier register, means for transferring, digit by digit, all digits of the multiplicand from the multiplicand storing section to the multiple generator circuits whereby a series of multiple sums, equal to the multiplicand times the multiplier digit stored in said multiplier register, is formed and is stored in the product storing section, means sensing when all digits of said multiplicand have been transferred, and means controlled by said sensing means for causing the first named transfer means to transfer another digit of said multiplier from the multiplier storing section to the multiplier register.

14. In an electronic data processing machine operating in machine cycles designated as character cycles, a first storage means comprising memory, a second storage means comprising an accumulator, said memory and accumulator having addressable positions, each addressable position containing seven elements of storage, having weighted values of 1, 2, 4, 8, A, B, C for representing decimal values, each of said elements capable of storing an indication of the presence or absence of the weighted values, the elements of storage being stored in patterns for representing, in combination, the numeric characters, 0 through 9 and non-numeric characters, a multiplicand factor having one or more orders stored in memory with each order occupying an addressable position, a multiplier factor having one or more orders stored in said accumulator with each order of the multiplier occupying an addressable position, representations of non-numeric characters being stored in memory at an address adjacent to the high order of the multiplicand, and in the accumulator at an address adjacent the high order of the multiplier, the addresses of the low orders of the multiplicand and multiplier being regarded as the addresses of the multiplicand and the multiplier, respectively, a memory address register settable to represent addresses including that of the low order of the multiplicand, a memory address counter settable to the holding of the memory address register and capable of being stepped a desired number of counts, means controlled by outputs of said memory address counter for selecting an address in memory, a starting point counter settable to represent the address of the low order of the multiplier and capable of being stepped a desired number of counts, an accumulator address counter connected to and settable to the holding of the starting point counter and capable of being stepped a desired number of counts, address selecting means controlled by said accumulator address counter for addressing said accumulator, a first character register capable of receiving character representations from memory and storing a character representation, and a second character register capable of receiving character representations from said accumulator and storing a character representation, character recognition circuits connected to said first and second character registers and capable of determining whether the characters therein are numeric or non-numeric, a multiple control circuit connected to said second character register and capable of receiving and storing a character therefrom, said multiple control circuit having output lines of weighted values of 1, 2, 4 and 5 and emitting signals on said output lines to indicate the presence or absence of the weighted values and thereby representing the value of the character stored therein, multiple generator circuits connected to said first character register and capable of generating single, double, quadruple and quintuple multiples of the character in the first character register, multiple selection circuits connected to said multiple generator circuits, controlled by the outputs of said multiple control circuits in accordance with the character stored therein, to select certain ones of the generated multiples, a multiple adder connected to the multiple selection circuits and adapted to receive and combine the selected multiples and to emit signals representing a multiple sum, a digit adder connected to said multiple adder to receive signals representing said multiple sum, switching circuits connected to said second character register and to said digit adder and capable of regulating a transfer of characters in the second character register to the digit adder, said digit adder adapted to receive and combine signals representing multiple sums received from the multiple adder and signals representing digits transferred from the second character register to form and emit signals representing an output sum to said accumulator, partial product indicating means for indicating the presence or absence of a partial product, means initiating a multiply operation, control means setting said memory address counter to the holding of said memory address register and setting the accumulator address counter to the holding of said starting point counter, means producing read-out of the low order of the multiplier from accumulator to said second character register and thereafter to said multiple control circuit, means thereupon stepping starting point counter one count to an address of succeeding higher order of the multiplier and said accumulator address counter a preset number of counts to an address representing a partial product address, means initiating successive character cycles, means during each character cycle producing a read out of a character from memory and stepping memory address counter one count whereby the multiplicand is read from memory order by order, selected multiples are selected and combined under control of the multiple control circuits according to the multiplier digit contained therein and the resulting multiple sum is received by the digit adder means simultaneously, each character cycle producing a read-out of a character from accumulator to second character register, stepping said accumulator address counter and, if said partial product indicating means indicates the presence of a partial product, controlling the switch circuits to effect transfer of the character in the second character register to the digit adder, but if said partial product indicating means indicates the absence of a partial product, controlling the switch circuits to block transfer of the character in the second character register to the digit adder, the digit adder ouput sum being stored in said accmulator to form a partial product, means continuing said process of reading the multiplicand order by order, of generating multiples, of selecting multiples, of adding multiples to form a multiple sum and of selectively combining the multiple sum with a character read from accumulator to second character register until all orders of the multiplicand have been processed, means operative upon ascertainment by said recognition circuits of a non-numeric character read from memory to terminate said process and set said accumulator address counter to holding of said starting point counter and setting memory address counter to address of memory address register, means thereupon controlling the reading of a character of the multiplier from the accumulator to the multiple control circuits, and thereafter again reading the multiplicand order by order from memory, of generating multiples, of selecting and combining selected multiples to form multiple sums, of stepping the accumulator address counter the present number of counts to read the partial product order by order from the accumulator, of combining multiple sums with orders of a partial product a number of addresses equal to the preset number removed from the address of the multiplier digit being processed, whereby the lowest order of a series of multiple sum digits is added to that order of the last formed partial product, which is removed from the lowest order of the partial product a number of orders equal to the number of orders that the multiplier digit in the multiple control circuits is removed from its lowest order, means continuing said process of reading successive higher orders of the multiplier into the multiple control circuits from the accumulator, of reading the multiplicand order by order from memory, of generating multiples, of selecting multiples according to multiplier digit in the multiple control circuits, of reading a partial product order by order starting the preset number of addresses removed from accumulator address of the multiplier digit being processed, of combining selected multiples to form a multiple sum, of combining the multiple sum with the partial product where by the low order of the multiple sum is added to that order of the partial product which is removed from the low order of the partial product as many orders as the order of the multiplier contained in the multiple control circuits is removed from the low order of the multiplier, until all multiplier digits have been processed but means effective as a non-numeric character is ascertained on read-out from said accumulator, signifying that all multiplier digits have been processed, to terminate said last stated process, said product being thus completed and stored in said accumulator, a preset number of addresses, removed from the address of said multiplier.

References Cited in the file of this patent

UNITED STATES PATENTS

| | | |
|---|---|---|
| 2,604,262 | Phelps et al. | July 22, 1952 |
| 2,638,267 | Hartley et al. | May 12, 1953 |
| 2,672,283 | Havens | Mar. 16, 1954 |
| 2,685,407 | Robinson | Aug. 3, 1954 |
| 2,776,794 | Williams et al. | Jan. 8, 1957 |
| 2,802,625 | Dickinson | Aug. 13, 1957 |

FOREIGN PATENTS

| | | |
|---|---|---|
| 705,476 | Great Britain | Mar. 17, 1954 |

OTHER REFERENCES

Harvard Univ. Computation Lab., Synthesis of Electronic Computing and Control Circuits, vol. XXVII, Harvard Univ. Press, Cambridge, Mass., May 17, 1951, pages 200 to 204.